US009588550B2

(12) United States Patent
Smith

(10) Patent No.: US 9,588,550 B2
(45) Date of Patent: Mar. 7, 2017

(54) APPARATUS OPERABLE TO FACILITATE ACCESS TO INFORMATION

(71) Applicant: Originatic LLC, Chicago, IL (US)

(72) Inventor: Renato L. Smith, Fayetteville, NY (US)

(73) Assignee: Orginatic LLC, Chicago, IL (US)

(*) Notice: Subject to any disclaimer, the term of this patent is extended or adjusted under 35 U.S.C. 154(b) by 0 days.

(21) Appl. No.: 14/595,204

(22) Filed: Jan. 12, 2015

(65) Prior Publication Data

US 2016/0202734 A1 Jul. 14, 2016
US 2016/0320808 A9 Nov. 3, 2016

Related U.S. Application Data

(63) Continuation of application No. 13/571,761, filed on Aug. 10, 2012, now Pat. No. 8,934,226, which is a continuation-in-part of application No. 13/532,890, filed on Jun. 26, 2012, now abandoned, which is a continuation of application No. 12/470,426, filed on May 21, 2009, now abandoned, which is a continuation-in-part of application No. 11/787,999, filed on Apr. 17, 2007, now abandoned, which is a continuation-in-part of application No. 11/315,830, filed on Dec. 22, 2005, now Pat. No. 7,826,205, which is a continuation-in-part of application No.

(Continued)

(51) Int. Cl.

| | |
|---|---|
| ***G06F 1/16*** | (2006.01) |
| ***H05K 5/00*** | (2006.01) |
| ***H05K 7/00*** | (2006.01) |
| *H04M 1/04* | (2006.01) |

(52) U.S. Cl.
CPC .......... *G06F 1/1667* (2013.01); *G06F 1/1601* (2013.01); *G06F 1/1613* (2013.01); *G06F 1/1632* (2013.01); *G06F 1/1635* (2013.01); *G06F 1/1637* (2013.01); *H04M 1/04* (2013.01)

(58) Field of Classification Search
CPC ..... G06F 1/1624; G06F 1/1632; G06F 1/1662
USPC ............... 361/679.11–679.17, 679.21–679.3, 361/679.41–679.44
See application file for complete search history.

(56) References Cited

U.S. PATENT DOCUMENTS

| | | | |
|---|---|---|---|
| 750,193 | A | 1/1904 | James |
| 1,228,042 | A | 5/1917 | O'Dowd |
| 3,431,002 | A | 3/1969 | Melgaard |

(Continued)

FOREIGN PATENT DOCUMENTS

| | | | |
|---|---|---|---|
| DE | 19909398 | A1 | 9/2000 |
| DE | 10314554 | A1 | 10/2004 |

(Continued)

OTHER PUBLICATIONS

Allin—Oct. 5, 2016, All-In-One Multimedia Powerhouse, Cnet [online]. [retrieved on or before Oct. 5, 2006]. Retrieved from the Internet: <http://www.cnet.com>.

(Continued)

*Primary Examiner* — Anthony Haughton

(57) ABSTRACT

The apparatus, in an embodiment, is structured to support a display device and keyboard. The apparatus has one or more members or portions. The one or more members or portions of the apparatus are moveable to facilitate access to information.

22 Claims, 165 Drawing Sheets

Related U.S. Application Data

10/795,684, filed on Mar. 8, 2004, now Pat. No. 7,158,373.

(56) References Cited

U.S. PATENT DOCUMENTS

| | | | | |
|---|---|---|---|---|
| 3,980,869 | A | 9/1976 | Lombardino et al. | |
| 4,227,190 | A | 10/1980 | Kelley et al. | |
| 4,281,874 | A | 8/1981 | Iwans et al. | |
| 4,325,060 | A | 4/1982 | Purtell et al. | |
| 4,326,193 | A | 4/1982 | Markley et al. | |
| 4,330,776 | A | 5/1982 | Dennison et al. | |
| 4,718,740 | A | 1/1988 | Cox | |
| 4,804,947 | A | 2/1989 | Geleziunas | |
| 4,861,121 | A | 8/1989 | Gotz | |
| 4,922,980 | A | 5/1990 | Parker | |
| 4,982,618 | A | 1/1991 | Culver | |
| 5,037,054 | A | 8/1991 | McConnell | |
| D321,340 | S | 11/1991 | Savio | |
| 5,091,716 | A | 2/1992 | Nelson et al. | |
| 5,168,423 | A | 12/1992 | Ohgami et al. | |
| 5,229,757 | A | 7/1993 | Takamiya et al. | |
| 5,262,762 | A | 11/1993 | Westover et al. | |
| 5,268,817 | A | 12/1993 | Miyagawa et al. | |
| 5,281,018 | A | 1/1994 | Cullinan | |
| D349,693 | S | 8/1994 | Brossardt | |
| 5,351,066 | A | 9/1994 | Rucker et al. | |
| D351,160 | S | 10/1994 | Massey et al. | |
| 5,376,934 | A | 12/1994 | Savazzi | |
| 5,388,032 | A | 2/1995 | Gill et al. | |
| 5,438,331 | A | 8/1995 | Gilligan et al. | |
| 5,541,593 | A | 7/1996 | Arsem | |
| 5,564,844 | A | 10/1996 | Patterson et al. | |
| 5,594,619 | A | 1/1997 | Miyagawa et al. | |
| 5,615,081 | A | 3/1997 | Ma | |
| 5,629,832 | A | 5/1997 | Sellers | |
| 5,646,819 | A | 7/1997 | Hill, III | |
| 5,648,772 | A | 7/1997 | Friedrich et al. | |
| 5,657,370 | A | 8/1997 | Tsugane et al. | |
| 5,673,169 | A | 9/1997 | Wicks | |
| 5,707,126 | A | 1/1998 | Neufeld et al. | |
| 5,740,744 | A | 4/1998 | Nashirozawa et al. | |
| 5,800,085 | A | 9/1998 | Lee | |
| D404,025 | S | 1/1999 | Van Horne et al. | |
| 5,944,432 | A | 8/1999 | Richardson | |
| 5,992,809 | A | 11/1999 | Sweere et al. | |
| 5,996,956 | A | 12/1999 | Shawver | |
| 6,095,702 | A | 8/2000 | Garbacik | |
| 6,121,958 | A | 9/2000 | Clark et al. | |
| 6,189,849 | B1 | 2/2001 | Sweere et al. | |
| 6,233,138 | B1 | 5/2001 | Osgood | |
| 6,256,018 | B1 | 7/2001 | Zarek | |
| 6,381,132 | B1 | 4/2002 | Nakamoto | |
| 6,392,871 | B1 | 5/2002 | Yanase | |
| 6,411,502 | B1 | 6/2002 | Burrell | |
| 6,414,840 | B2 | 7/2002 | Suzuki | |
| 6,437,692 | B1 | 8/2002 | Petite et al. | |
| 6,480,372 | B1 | 11/2002 | Vong et al. | |
| 6,483,695 | B1 | 11/2002 | Hartstein | |
| 6,490,154 | B2 | 12/2002 | Thompson | |
| 6,587,094 | B2 | 7/2003 | Anderson | |
| 6,621,691 | B2 | 9/2003 | Howell | |
| 6,628,508 | B2 | 9/2003 | Lieu et al. | |
| 6,628,510 | B2 | 9/2003 | Genin | |
| 6,646,863 | B1 | 11/2003 | White et al. | |
| 6,665,175 | B1 | 12/2003 | deBoer et al. | |
| 6,667,759 | B2 | 12/2003 | Gerszbert et al. | |
| 6,680,843 | B2 | 1/2004 | Farrow et al. | |
| 6,688,518 | B1 | 2/2004 | Valencia et al. | |
| 6,700,774 | B2 | 3/2004 | Chien et al. | |
| 6,733,094 | B1 | 5/2004 | Chang | |
| D494,582 | S | 8/2004 | Lancaster, Jr. | |
| 6,791,826 | B2 | 9/2004 | Ho | |
| 6,795,304 | B1 | 9/2004 | Lam | |
| 6,807,054 | B1 | 10/2004 | Waller et al. | |
| 6,827,409 | B2 | 12/2004 | Michael | |
| 6,856,505 | B1 | 2/2005 | Venegas et al. | |
| 6,909,408 | B2 | 6/2005 | Matko et al. | |
| 6,945,412 | B2 | 9/2005 | Felcman et al. | |
| 6,956,735 | B2 | 10/2005 | Lee et al. | |
| 6,994,306 | B1 | 2/2006 | Sweere et al. | |
| 7,004,430 | B2 | 2/2006 | Weekly | |
| 7,019,963 | B2 | 3/2006 | Lee et al. | |
| 7,029,079 | B2 | 4/2006 | Holt | |
| D551,224 | S | 9/2007 | Hatling et al. | |
| 7,425,947 | B1 | 9/2008 | Tseng et al. | |
| 7,506,592 | B2 | 3/2009 | Rossini | |
| 7,775,424 | B1 | 8/2010 | Helzer et al. | |
| 7,911,784 | B2 * | 3/2011 | Jones | G06F 1/1632 248/346.03 |
| 8,081,429 | B2 * | 12/2011 | Horie | G06F 1/16 361/679.01 |
| 8,441,782 | B2 * | 5/2013 | Thomas | A47B 43/00 361/679.02 |
| 8,724,312 | B2 * | 5/2014 | Jones | G06F 1/1632 361/679.41 |
| 2002/0070922 | A1 | 6/2002 | Zarek | |
| 2002/0104271 | A1 | 8/2002 | Gallant | |
| 2002/0149905 | A1 | 10/2002 | Jackson, Jr. | |
| 2002/0190172 | A1 | 12/2002 | Oddsen, Jr. | |
| 2003/0184957 | A1 | 10/2003 | Stahl et al. | |
| 2004/0004810 | A1 | 1/2004 | Kim | |
| 2004/0148958 | A1 | 8/2004 | Park | |
| 2004/0208681 | A1 | 10/2004 | Dechene | |
| 2004/0227733 | A1 | 11/2004 | Fyke et al. | |
| 2004/0246234 | A1 | 12/2004 | Serra et al. | |
| 2005/0070324 | A1 | 3/2005 | Chadha | |
| 2005/0139679 | A1 | 6/2005 | Salvato | |
| 2005/0148395 | A1 | 7/2005 | Kim et al. | |
| 2005/0195561 | A1 | 9/2005 | Smith | |
| 2005/0243505 | A1 | 11/2005 | Jackson, Jr. | |
| 2006/0098403 | A1 | 5/2006 | Smith | |
| 2006/0208139 | A1 | 9/2006 | Mossman | |
| 2007/0001413 | A1 | 1/2007 | Rossini | |
| 2007/0047193 | A1 | 3/2007 | Smith | |
| 2007/0247800 | A1 | 10/2007 | Smith et al. | |
| 2007/0295870 | A1 | 12/2007 | Peterson et al. | |
| 2008/0183586 | A1 | 7/2008 | Smith | |
| 2010/0134964 | A1 | 6/2010 | Smith et al. | |
| 2010/0213151 | A1 | 8/2010 | Theesfeld et al. | |
| 2010/0213679 | A1 | 8/2010 | Smith et al. | |
| 2012/0218701 | A1 | 8/2012 | Thomas | |
| 2012/0268878 | A1 | 10/2012 | Smith | |
| 2012/0305503 | A1 | 12/2012 | Smith | |

FOREIGN PATENT DOCUMENTS

| | | | |
|---|---|---|---|
| JP | 4000620 | | 1/1992 |
| JP | 8223797 | A | 8/1996 |
| JP | 2002041177 | A | 2/2002 |
| WO | WO2008130868 | | 10/2008 |

OTHER PUBLICATIONS

Beyon—Mar. 7, 2003, Beyond Digital Living—Press, Salton's Beyond ICEBOX FlipScreen Wins the Consumer Electronics Association Mark of Excellence Award, Seattle—Mar. 7, 2003, 2 pages [online]. [retrieved on Aug. 12, 2007]. Retrieved from the Internet: <http://www.beyondconnectedhome.com/aboutus/press/pr_ 030307 html>.

Beyon—Aug. 16, 2006, Beyond Icebox Flipscreen '04 Kitchen Entertainment, eSalton [online]. [retrieved on Aug. 16, 2006]. Retrieved from the Internet: <http://www.esalton.com/control/product>.

Bolda—Oct. 5, 2006, Boldata LCD PC CP414 Series, Cnet [online]. [retrieved on or before Oct. 5, 2006]. Retrieved from the Internet: <http://www.cnet.com>.

Calero—Mar. 4, 2009, Non-Final Office Action Dated Mar. 4, 2009 of U.S. Appl. No. 11/622,317, Publication No. 2008/0168930.

Calero—Jun. 25, 2009, Final Office Action Dated Jun. 25, 2009 of U.S. Appl. No. 11/622,317, Publication No. 2008/0168930.

(56) References Cited

OTHER PUBLICATIONS

Calero—Nov. 25, 2009, Non-Final Office Action Dated Nov. 25, 2009 of U.S. Appl. No. 11/622,317, Publication No. 2008/0168930.
Carst—1997, Wallaroo General Catalog, dated as early as Jul. 1, 1997.
Carst—2003, Carstons Wallaroo Web pages, dated prior to Jan. 1, 2003, https://web.archive.org/web [retrieved Mar. 2014].
Datal—Jan. 25, 2004, Datalux—Internet Archive Wayback Machine for www.datalux.com, dated Jan. 25, 2004, 2 pages [online]. [retrieved on Aug. 12, 2007]. Retrieved from the Internet: <http://web.archive.org/web/*http://www.datalux com>.
Flatp—Jan. 21, 2004, Flat Panel—Internet Archive Wayback Machine for www.flat-panel-mount.com, dated Jan. 21, 2004, 5 pages [online]. [retrieved on Aug. 12, 2007]. Retrieved from the Internet: <http://web.archive.org/web/*http://www.flat-panel-mount.com>.
Fujitsu—May 23, 2003, Fujitsu Unveils Style-Conscious Desktop, Cnet, dated May 23, 2003 [online]. [retrieved Oct. 17, 2011]. Retrieved from the Internet: <http://www.zdnet.com>.
Gatew—Jan. 7, 2004, Gateway's Media Center PC, Cnet, dated Jan. 7, 2004 [online]. [retrieved on or before Oct. 5, 2006]. Retrieved from the Internet: <http://www.cnet.com>.
Gatew—Oct. 5, 2006, Gateway Profile 6C, Cnet, dated Oct. 12, 2006 [online]. [retrieved on or before Oct. 5, 2006]. Retrieved from the Internet: <http://www.cnet.com>.
Infoa—Jul. 21, 2005, "Info Appliance Offers Nice Touches, but It's Costly, Has Limitations" by Walter S. Mossberg, The Wall Street Journal, Personal Technology, col. B2, Jul. 21, 2005.
Infol—Jan. 8, 2004, Infologix—Internet Archive Wayback Machine for www.infologixsys.com, dated Jan. 8, 2004, 3 pages [online]. [retrieved on Aug. 12, 2007]. Retrieved from the Internet: <http://web.archive.org/web/*http://www.infologixsys.com>.
Inveh—Nov. 3, 2005, In-Vehicle Computer, Stargate Mobile [online]. [retrieved on Nov. 3, 2005]. Retrieved from the Internet: <http://www.stargatemobile.com/ASC.html>.
Ionea—Oct. 5, 2006, I-One All-In-One LCD PC-TV, Cnet [online]. [retrieved on or before Oct. 5, 2006]. Retrieved from the Internet: <http://www.cnet.com>.
Issin—Feb. 7, 2004, ISS—Internet Archive Wayback Machine for www.issltd.co.uk, dated Feb. 7, 2004, 3 pages [online]. [retrieved on Aug. 12, 2007]. Retrieved from the Internet: <http://web.archive.org/web/*http://www.issltd.co.uk.com>.
LIT-AFC1—Mar. 7, 2014, Litigation Materials, Answer and Counterclaims, *Originatic LLC* v. *AFC Industries, Inc.*, Case No. 13-CV-05343-KAM-MO, dated Mar. 7, 2014.
Medic—Jan. 8, 2007, Medical Computers Compilation, compiled by Originatic LLC, Jan. 8, 2007, pp. 1-16.
MPCSC—Jul. 21, 2003, MPC's ClientPro Line, Cnet, dated Jul. 21, 2003 [online]. [retrieved on or before Oct. 5, 2006]. Retrieved from the Internet: <http://www.cnet.com>.
NOA—Sep. 15, 2014, Notice of Allowance of U.S. Appl. No. 13/571,761 dated Sep. 15, 2014.
OA—Feb. 4, 2014, Non-Final Office Action of U.S. Appl. No. 13/571,761 dated Feb. 4, 2014.
Panel—Aug. 21, 2006, Panel Industrial Systems, year 2002 [online]. [retrieved on Aug. 21, 2006]. Retrieved from the Internet: http://webarchive.org/web/20030902013810/www.panelpc.com/2002/.
Pelha—Sep. 11, 2003, Pelham Sloan PS1500, Cnet, dated Sep. 11, 2003 [online]. [retrieved on or before Oct. 5, 2006]. Retrieved from the Internet: <http://www.cnet.com>.
Proxim—Jan. 2002, Proximity Systems Web pages, dated on or before Dec. 31, 2002, https://web.archive.org/web/20020307022123/http:/wwww.proximitysystems.com/comp_prod.htm [retrieved Apr. 2014].
Proxim—Feb. 2002, Proximity Systems Web pages, dated on or before Dec. 31, 2002, https://web.archive.org [retrieved Apr. 2014].
Saran—Nov. 3, 2005, Jennifer and Chon, Gina, *Coming Soon to Your Car, The Wall Street Journal*, p. D1 (Nov. 3, 2005), pp. 1-4.
Sinoc—Oct. 5, 2006, Sinocan All-In-One PC 2006, Cnet [online]. [retrieved on or before Oct. 5, 2006]. Retrieved from the Internet: <http://www.cnet.com>.
Sonys—Nov. 8, 2002(1), "Sony's All-in-One Desktop" by Bill Howard, PC Magazine, dated Nov. 8, 2002 [retrieved on Jan. 7, 2007]. Retrieved from the Internet: <http://www/pcmag.com/article2/0,4149,677305,00.asp>.
Sonys—Nov. 8, 2002(2), Sony's All-in-One Desktop—Enlarged Product Image, by Bill Howard, PC Magazine, dated Nov. 8, 2002 [retrieved on Aug. 12, 2007]. Retrieved from the Internet: <http://www/pcmag.com/article2/0,4149,677305,00.asp>.
Super—Aug. 2, 2006, SuperLogics, SL-PPC-120 [online]. [retrieved on Aug. 2, 2006]. Retrieved from the Internet: <http://www.superlogics.com/industrial-computers/panel-pc-computer/SL-PPC-120/35-1900.htm>.
Tekpa—Oct. 5, 2006, Tek Panel 320, Cnet [online]. [retrieved on or before Oct. 5, 2006]. Retrieved from the Internet: <http://www.cnet.com>.
Wallc—Jun. 20, 2007, Wall Computers with Keyboard Compilation, compiled by Originatic LLC, Jun. 20, 2007, pp. 1-26.

* cited by examiner

APPARATUS OPERABLE TO FACILITATE ACCESS TO INFORMATION

CROSS REFERENCE TO RELATED APPLICATIONS

This application is a continuation of, and claims the benefit and priority of, U.S. patent application Ser. No. 13/571,761, filed on Aug. 10, 2012, now U.S. Pat. No. 8,934,226, which is a continuation-in part of, and claims the benefit and priority of, U.S. patent application Ser. No. 13/532,890, filed on Jun. 26, 2012, now abandoned, which is a continuation of, and claims the benefit and priority of, U.S. patent application Ser. No. 12/470,426, filed on May 21, 2009, now abandoned, which is a continuation-in-part of, and claims the benefit and priority of, U.S. patent application Ser. No. 11/787,999, filed on Apr. 17, 2007, now abandoned, which is a continuation-in-part of, and claims the benefit and priority of, U.S. patent application Ser. No. 11/315,830, filed on Dec. 22, 2005, now U.S. Pat. No. 7,826,205, which is a continuation-in-part of, and claims the benefit and priority of, U.S. patent application Ser. No. 10/795,684, filed on Mar. 8, 2004, now U.S. Pat. No. 7,158,373, and the entire contents of such applications are hereby incorporated by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

There is a growing need and demand for access to devices which provide electronic information or enable electronic-based transactions. There is a growing need and demand for the use of devices which electronically provide information, transactions and entertainment. As a result, there is a need to increase the utility, accessibility, operational convenience, number of functions, versatility and space efficiency of such devices.

SUMMARY

Part A

In one embodiment, the electronic device includes: (a) a main housing defining a cavity; (b) a display screen supported by the main housing; (c) a motherboard positioned within the cavity behind the display screen; and (d) a keyboard assembly supported by the main housing.

The keyboard assembly has: (a) a keyboard housing having a plurality of ends; (b) a plurality of shafts, each one of the shafts coupled to one of the ends; and (c) at least one keyboard position controller.

The keyboard position controller has: (a) a spring device coupled to the main housing, the spring device having a contact portion; and (b) a spring device engager coupled to the at least one shaft. The spring device engager is configured to be: (i) engaged with the contact portion when the keyboard is subject to a first force; and (ii) disengaged from the contact portion when the keyboard is subject to a greater, second force.

In one embodiment, the electronic device has a camera assembly supported by the main housing. The camera assembly has: (a) a camera having a lens; (b) a lens holder which holds the lens of the camera, the lens holder being movably coupled to the main housing; and (c) a lens position controller which is adjustable to cause movement of the lens holder.

In one embodiment, the electronic device has a desktop stand assembly supported by the main housing. The desktop stand assembly has: (a) a stand having a foot portion; (b) at least one stand coupler unit which pivotably couples the stand to the main housing so that the stand is pivotable between: (i) an upward position in which the foot portion is adjacent to the upper rear side of the main housing; and (ii) a downward position in which the foot portion is engaged with a support surface.

In one embodiment, the at least one keyboard position controller has a resistance device configured to produce a resistance to a rotation of the at least one shaft.

In one embodiment, the resistance device includes: (a) a support coupled to the main housing, the support defining an opening which receives a portion of the at least one shaft; (b) an extension coupled to the at least one shaft; and (c) a fastener configured to apply a force to press the extension against the support.

In one embodiment, the spring device engager has a cam device coupled to the at least one shaft. The cam device has at least one protrusion which moves with a rotation of the at least one shaft. The protrusion is movable between: (a) a first position in which the protrusion is engaged with the contact portion; and (b) a second position in which the protrusion has moved past the contact portion and is disengaged from the contact portion.

In one embodiment, the spring device engager: (a) has a first angular position when the keyboard is subject to the first force; (b) has a second angular position when the keyboard is subject to the second force; and (c) is configured to be moved relative to the at least one shaft between: (i) a first adjustable position associated with a keyboard set mode, wherein the spring device engager is positioned to be brought into engagement with the contact portion when the spring device engager has the first angular position; and (ii) a second adjustable position associated with a keyboard release mode, wherein the spring device engager is positioned to be disengaged from the contact portion when the spring device engager has the first angular position.

In one embodiment, the electronic device includes a grasp coupled to the spring device engager. The grasp extends through an opening defined by the main housing, and the grasp is movable between: (i) a first grasp position associated with the keyboard set mode; and (b) a second grasp position associated with the keyboard release mode.

In one embodiment, the main housing defines a latch space, and the keyboard assembly has a keyboard latch. The keyboard latch includes: (i) a latch grasp; (ii) a latch spring coupled to the latch grasp; and (iii) a male member configured to be movable into and out of the latch space.

In one embodiment, the keyboard latch has a latch set device which is operable to set the keyboard latch in a closed mode, wherein the male member is positioned within the latch space when the keyboard latch has the closed mode.

In one embodiment, the lens holder is pivotably coupled to the main housing.

In one embodiment, the camera assembly has a spring coupled to the lens holder.

In one embodiment, a portion of the lens position controller is a camera adjustment grasp.

In one embodiment, the main housing has a rear side. The rear side defines a camera adjustment grasp opening configured to receive the camera adjustment grasp.

In one embodiment, the desktop stand assembly has a stand latch coupled to the main housing. The stand latch is configured to secure the stand in the upward position.

In one embodiment, the stand has a coupling wall, and the coupling wall defines: (i) an opening; and (ii) a protrusion.

In one embodiment, the stand coupler unit has a position setter coupled to the main housing. The position setter has a protrusion engager, and the position setter is movable between: (a) a first position in which the protrusion engager is engaged with the protrusion; and (b) a second position in which the protrusion engager is disengaged from the protrusion.

In one embodiment, the stand coupler unit has a housing coupler which is coupled to the housing. In one embodiment, the position setter has a stand coupler configured to mate with the housing coupler so that the housing coupler has a fixed angular position relative to the stand coupler.

In one embodiment, the stand coupler unit has a spring configured to bias the position setter to have the first position.

In one embodiment, the foot portion defines an opening, and the stand latch has a protrusion and a spring configured to bias the protrusion to project into the opening.

Additional features and advantages of the present invention are described in, and will be apparent from, the following Detailed Description of the Invention and the figures.

Part B

The accessory, in one embodiment, is compatible with, and attachable to, a plurality of different electronic devices of different brands, shapes and sizes. Depending upon the embodiment, the electronic devices can include a computer, an all-in-one computer, a personal computer, a tablet computer, a panel PC, a kiosk touchscreen, a display device, a monitor, a television, or a mobile device having a display screen. In one embodiment, the electronic devices are all-in-one computers of different brands. The terms, "brand H," "brand D," and "brand L" are used herein to refer to three different brands of computers, where each brand has a different shape or size than the other.

In one embodiment, by attaching the accessory to an electronic device, the accessory converts the chassis of the electronic device to an all-in-one chassis having an integrated, rotatable keyboard, a pivotable kickstand, a plurality of VESA-compliant mounting hole patterns, a power unit holder defining mount-down security holes, security covers, peripheral couplers and a plurality of other utilities.

The accessory, in one embodiment, includes a frame configured to be attached to an electronic device which has a screen extending in a plane. The frame has an upper portion and a lower portion. The upper portion has a mount interface configured to attach the frame to a mount device. The accessory includes a keyboard holder moveably coupled to the lower portion of the frame. The keyboard holder has a base wall, and the keyboard holder is rotatable about a keyboard axis. In particular, the keyboard holder is rotatable between: (a) a closed keyboard holder position in which the base wall is substantially coplanar with the plane of the screen when the frame is attached to the electronic device; and (b) an open keyboard holder position in which the base wall extends in a plane which intersects with the plane of the screen when the frame is attached to the electronic device.

Also, the accessory includes a foot coupled to the lower portion of the frame. The foot is positioned below the keyboard axis. In addition, the accessory has a stand moveably coupled to the frame. The stand is pivotable between: (a) a closed position associated with use of the electronic device when the mount device is mounted to a structure; and (b) an open position associated with use of the electronic device when the electronic device is set on a substantially horizontal surface.

Additional features and advantages of the present invention are described in, and will be apparent from, the following Detailed Description of the Invention and the figures.

BRIEF DESCRIPTION OF THE FIGURES

FIG. 120 is a side, left isometric view of the embodiment of the accessory with the first electronic device shown in FIG. 117, illustrating the keyboard and kickstand in open positions.

FIG. 121 is a rear, right isometric view of the embodiment of the accessory with the first electronic device shown in FIG. 117, illustrating the keyboard and kickstand in open positions.

FIG. 122 is a rear, right isometric view of the embodiment of the accessory with the first electronic device shown in FIG. 117, illustrating the keyboard in an open position and the kickstand in a closed position.

FIG. 123 is a rear, left isometric view of the embodiment of the accessory with the first electronic device shown in FIG. 117, illustrating the keyboard and kickstand in open positions.

FIG. 124 is a rear isometric view of the embodiment of the accessory with the first electronic device shown in FIG. 117.

FIG. 125 is a bottom, right isometric view of the embodiment of the accessory with the first electronic device shown in FIG. 117, illustrating the keyboard and kickstand in open positions.

FIG. 126 is a bottom isometric view of the embodiment of the accessory with the first electronic device shown in FIG. 117, illustrating the keyboard and kickstand in open positions.

FIG. 127 is a front, right isometric view of the embodiment of the accessory shown in FIG. 117, illustrated without the keyboard holder.

FIG. 128 is a front, left isometric view of the embodiment of the accessory shown in FIG. 117, illustrated without the keyboard holder.

FIG. 129 is a rear isometric view of the embodiment of the accessory shown in FIG. 117, illustrated without the security covers and without the keyboard holder.

FIG. 130 is an enlarged, rear view of one embodiment of the backside of the accessory.

FIG. 131 is a fragmentary, front isometric view of one embodiment of the accessory, illustrating the keyboard holder in one open position.

Figure 132:
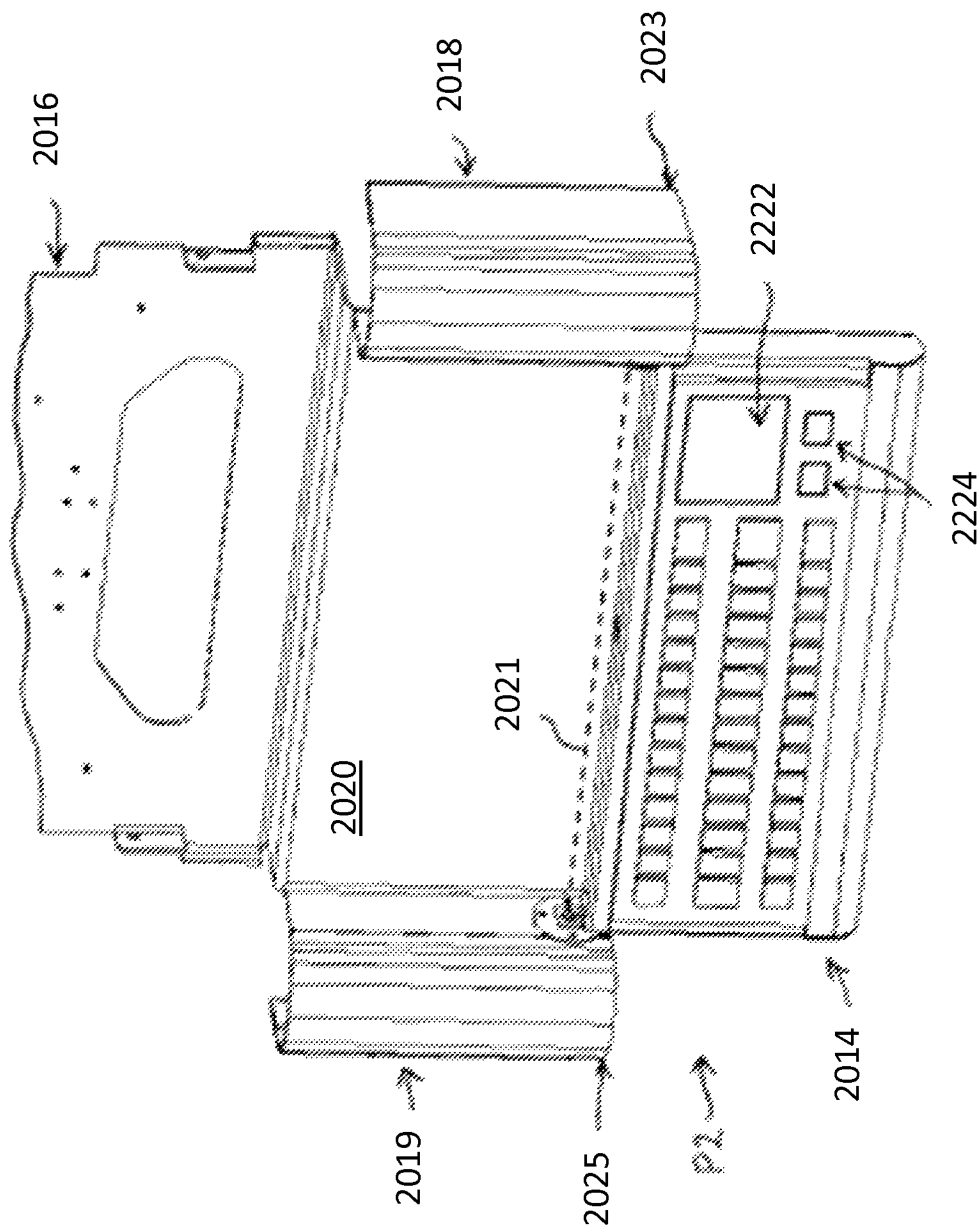

FIG. 132 is a fragmentary, front isometric view of one embodiment of the accessory, illustrating the keyboard holder in a different open position.

Figure 133:
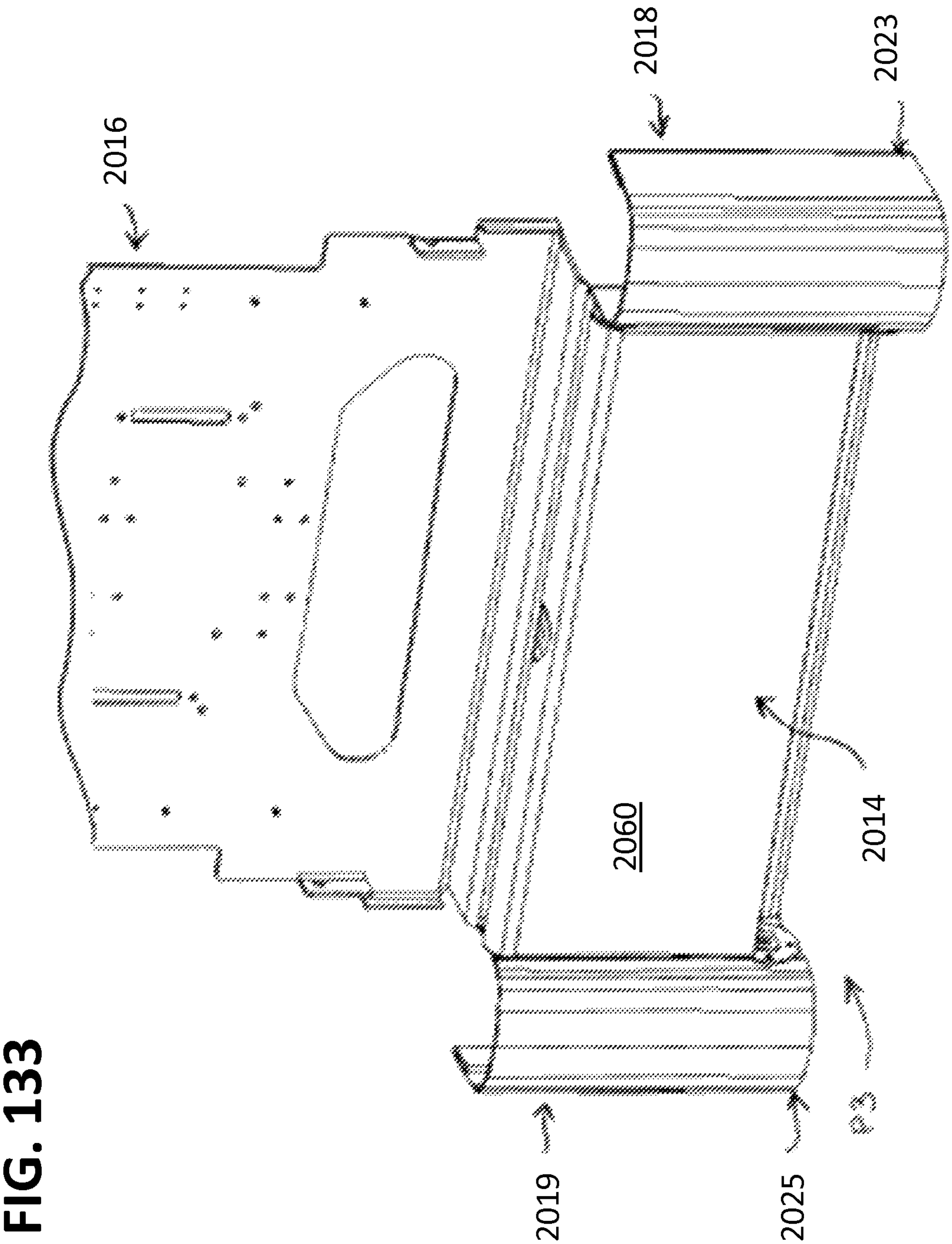

FIG. 133 is a fragmentary, front isometric view of one embodiment of the accessory, illustrating the keyboard holder in a closed position.

Figure 134:
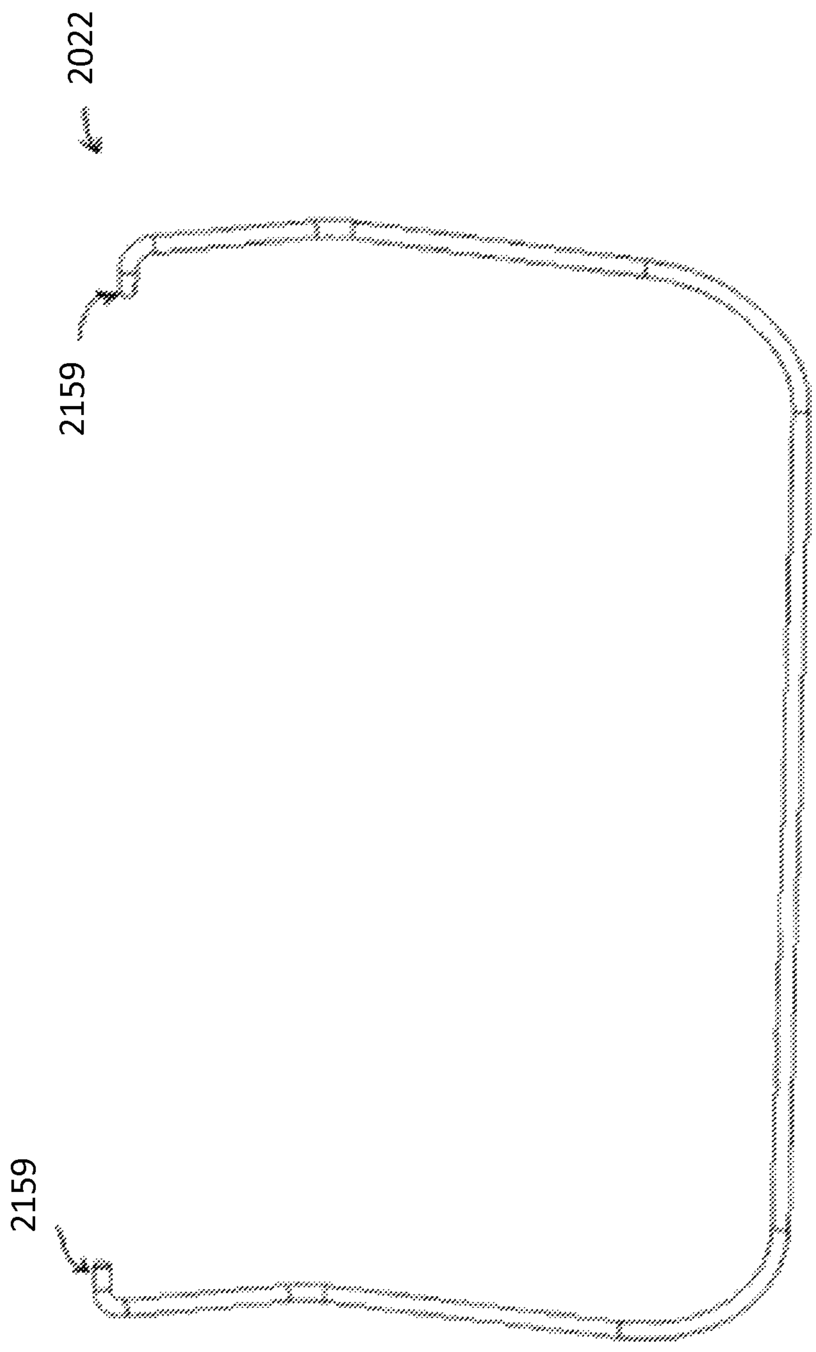

FIG. 134 is a front isometric view of one embodiment of the kickstand of the accessory.

Figure 135:
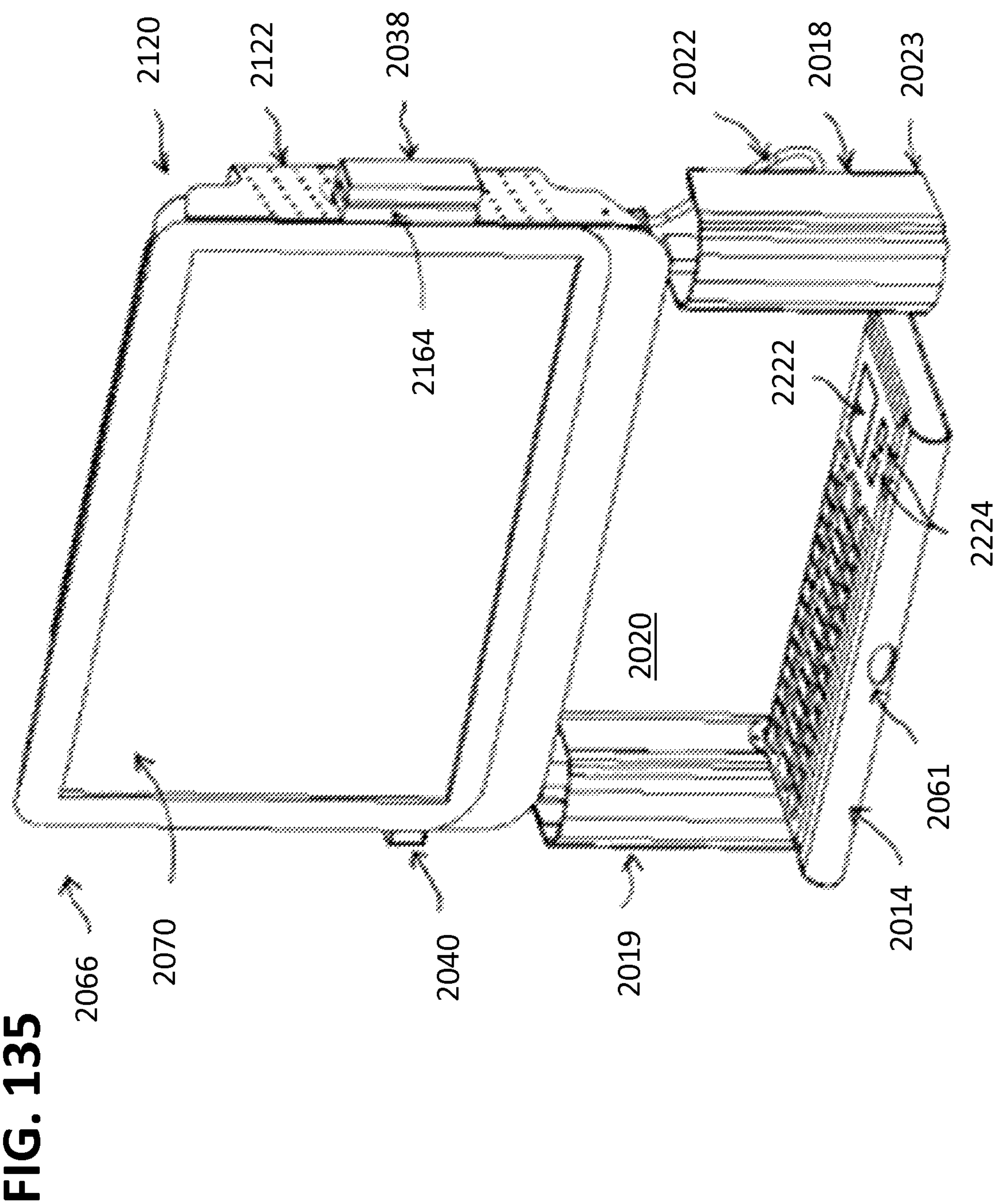

FIG. 135 is a front, right isometric view of one embodiment of the accessory with a second electronic device, illustrating the keyboard in an open position.

Figure 136:
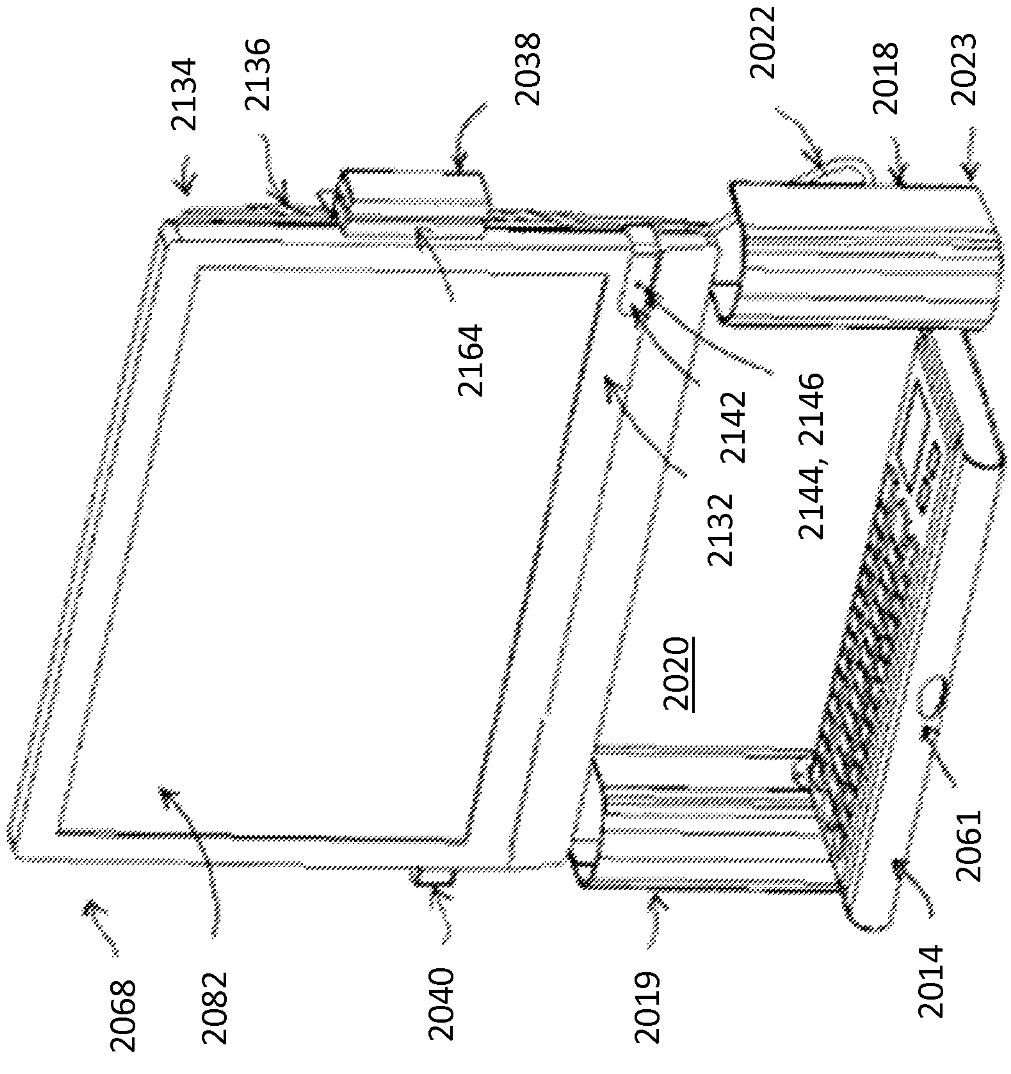

FIG. 136 is a front, right isometric view of one embodiment of the accessory with a third electronic device, illustrating the keyboard in an open position.

Figure 137:
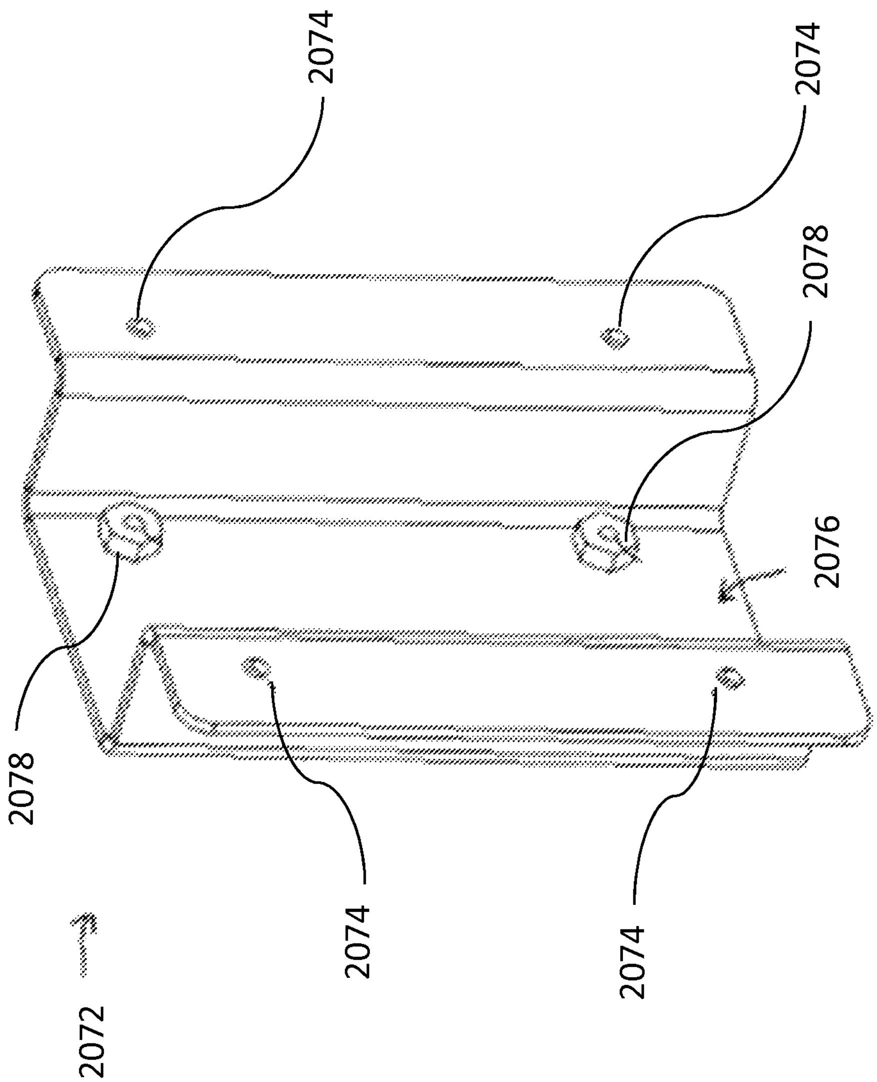

FIG. 137 is a front isometric view of one embodiment of the spacer or adapter for the second electronic device shown in FIG. 135.

Figure 138:
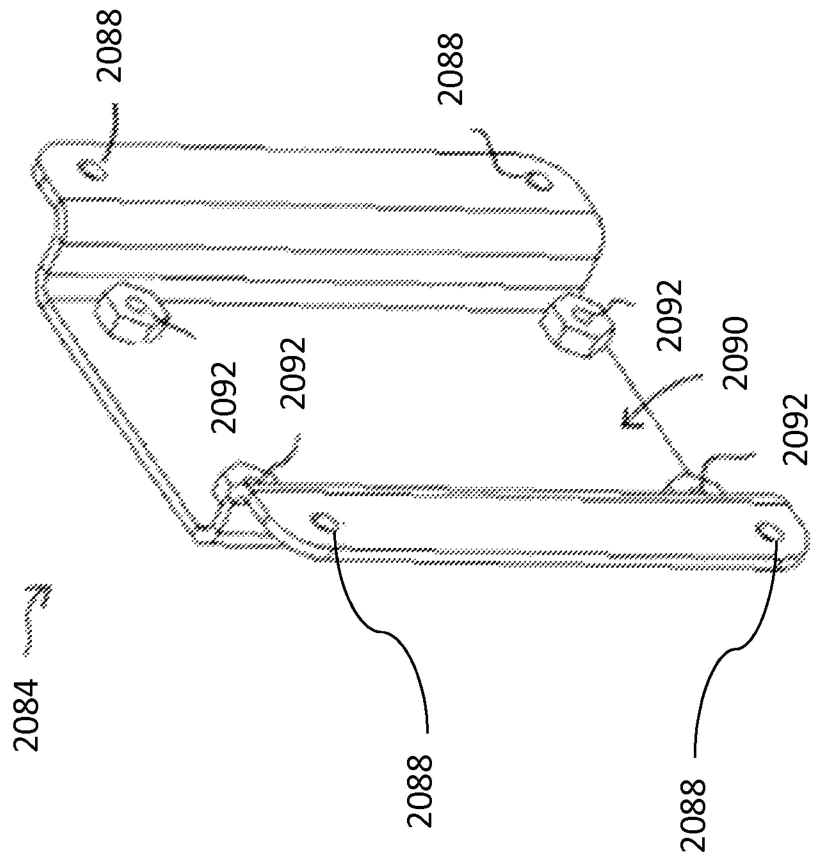

FIG. 138 is a front isometric view of one embodiment of the spacer or adapter for the third electronic device shown in FIG. 236.

Figure 117:
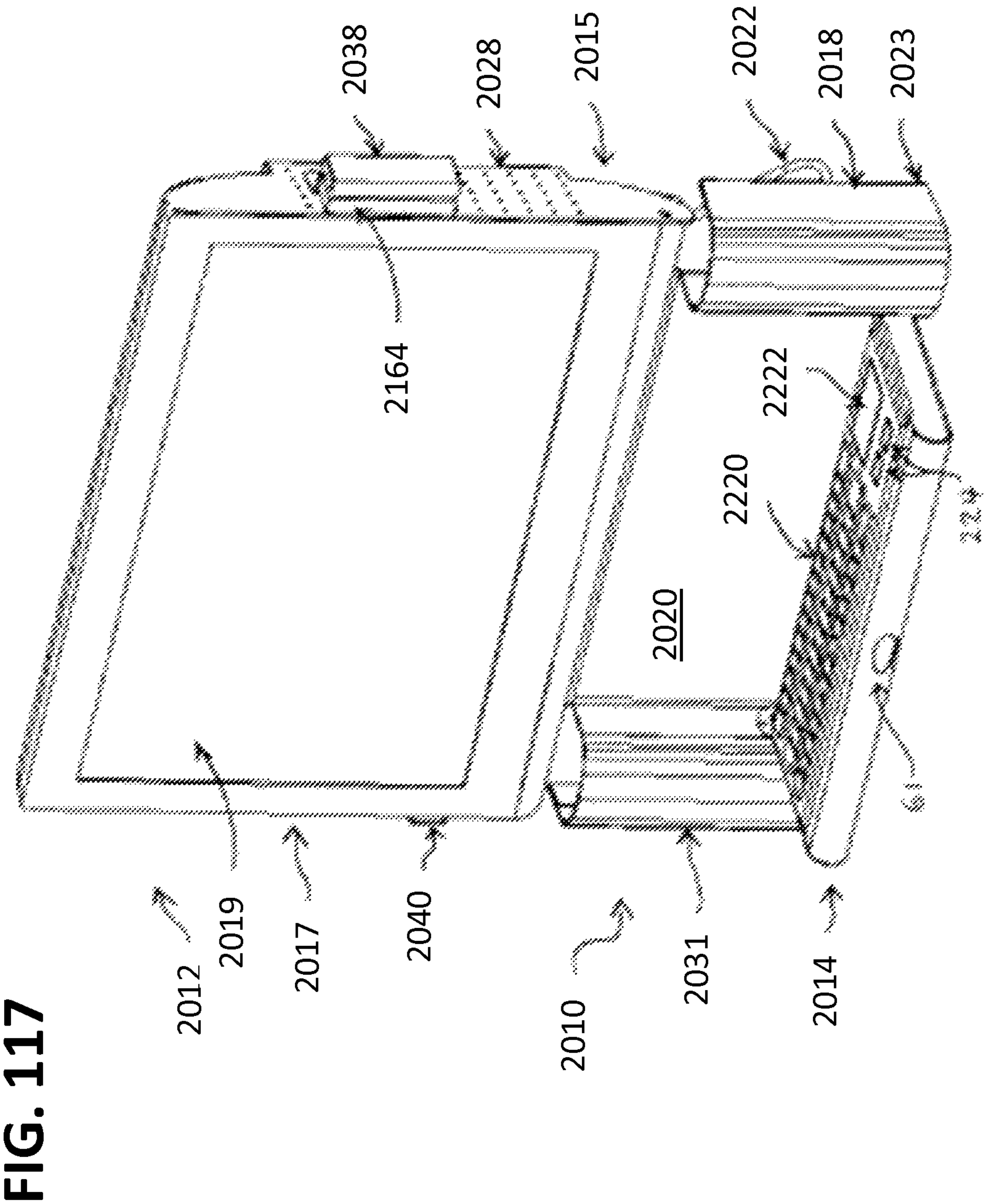
FIG. 117 is a front, right isometric view of one embodiment of the accessory with a first electronic device, illustrating the keyboard in an open position.
Figure 139:
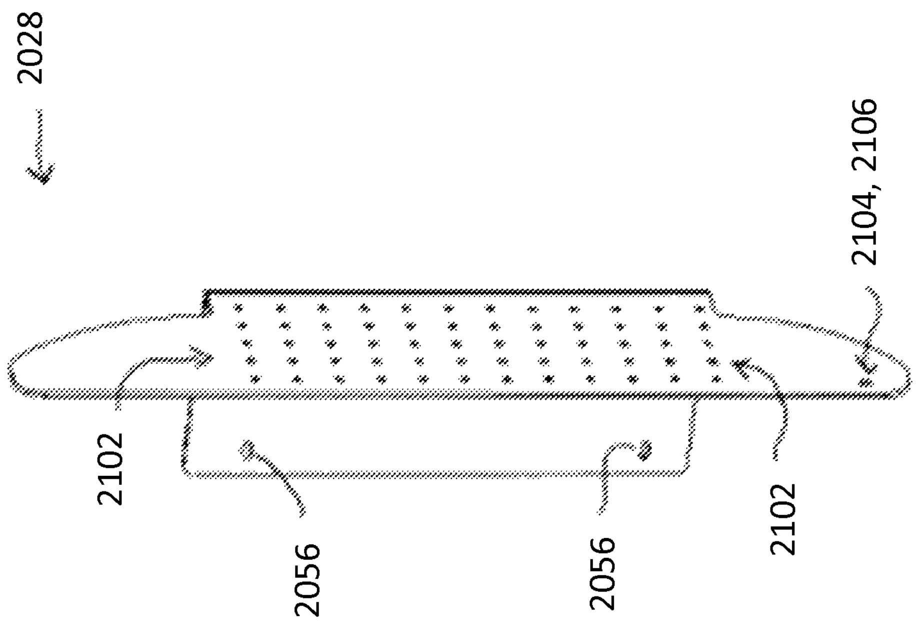

FIG. 139 is a right, isometric view of one embodiment of the right security cover for the first electronic device shown in FIG. 117.

Figure 140:
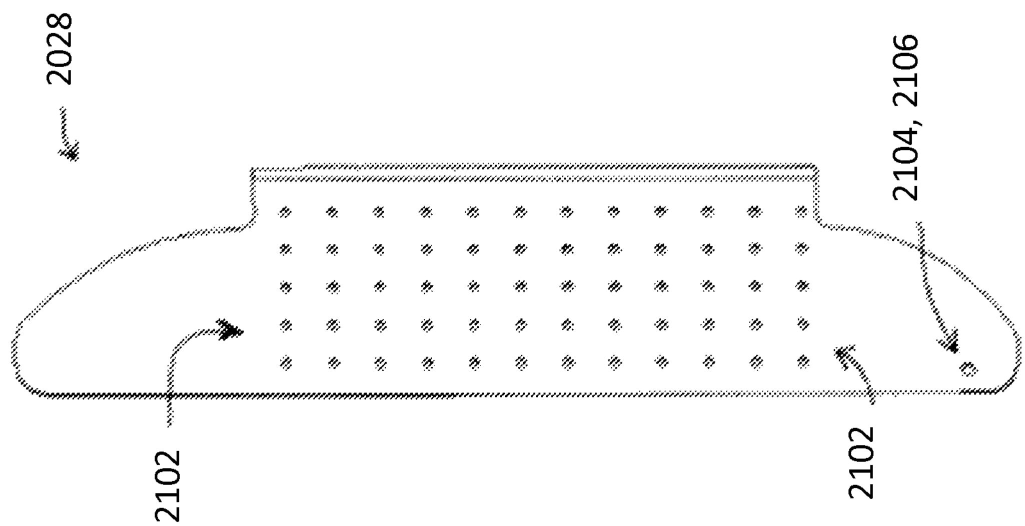

FIG. 140 is a front, isometric view of one embodiment of the right security cover for the first electronic device shown in FIG. 117.

Figure 141:
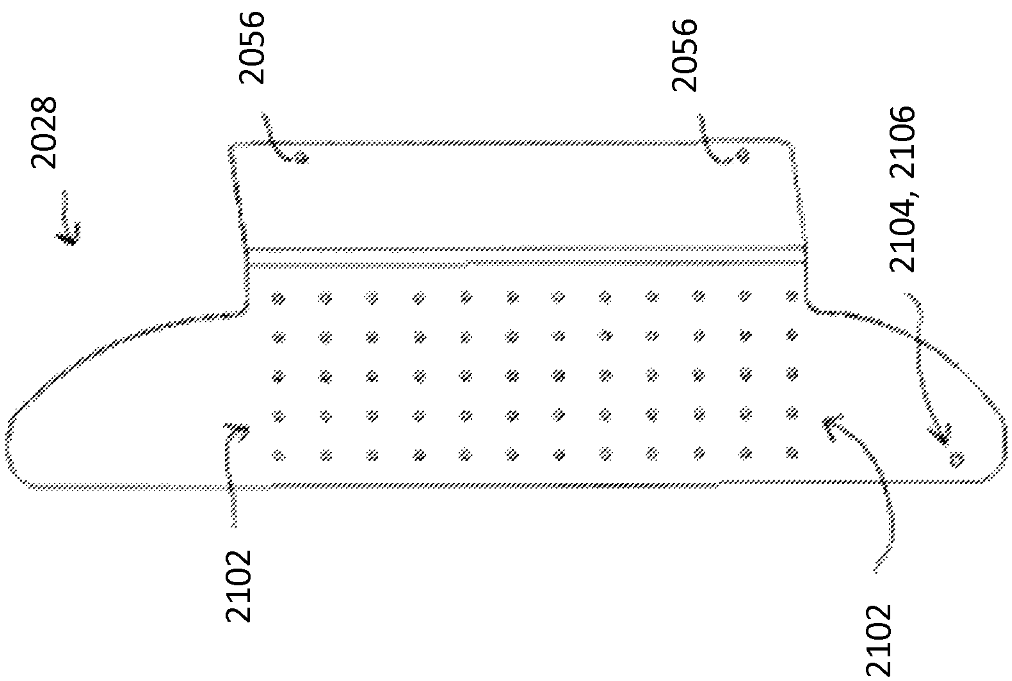

FIG. 141 is a left, isometric view of one embodiment of the right security cover for the first electronic device shown in FIG. 117.

Figure 142:
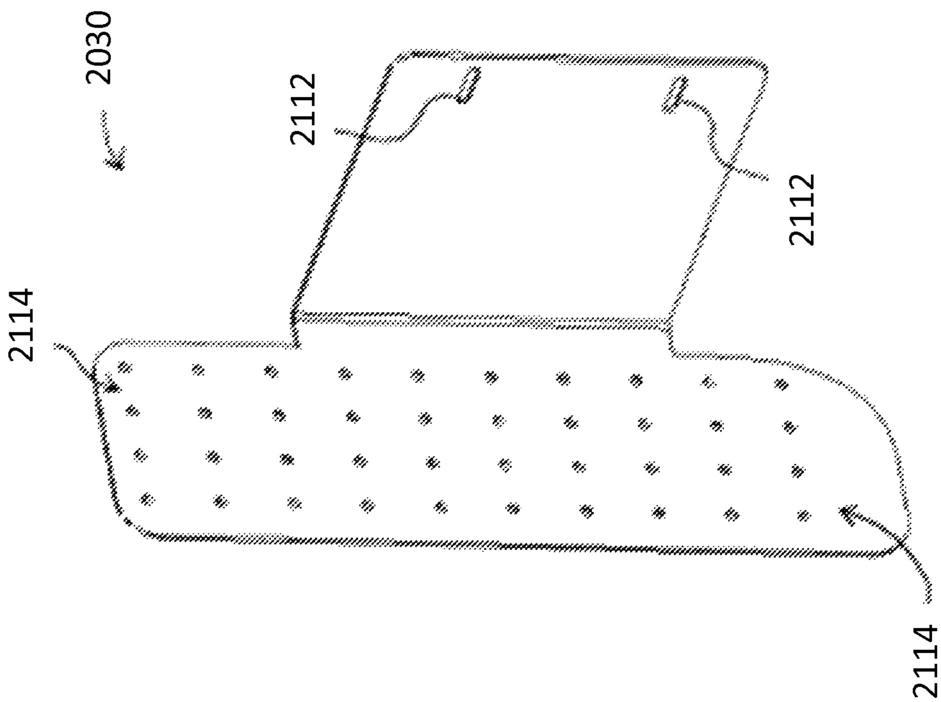

FIG. 142 is a right, isometric view of one embodiment of the left security cover.

Figure 143:
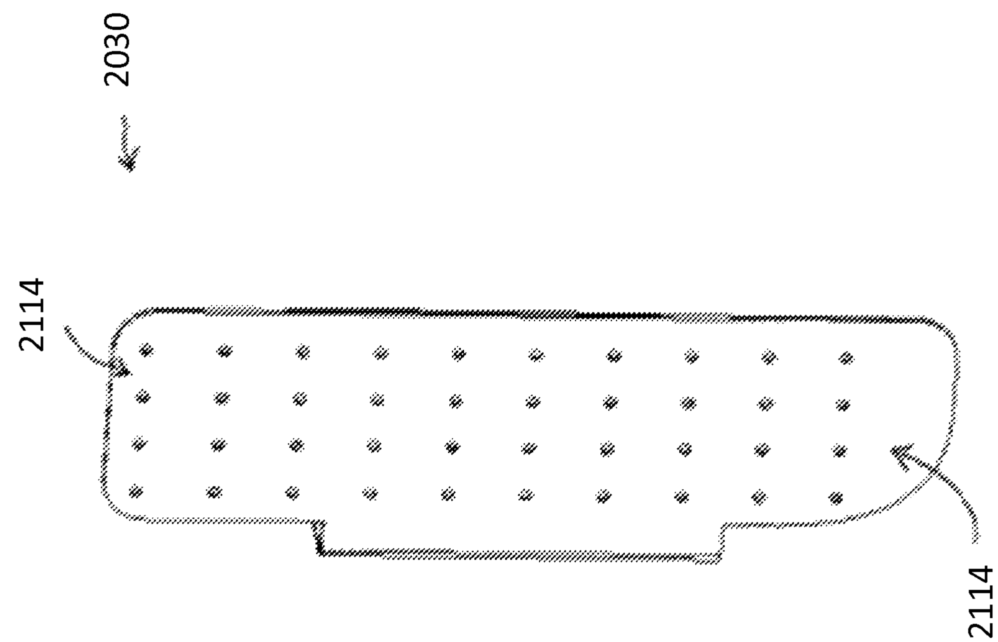

FIG. 143 is a front, isometric view of one embodiment of the left security cover.

Figure 144:
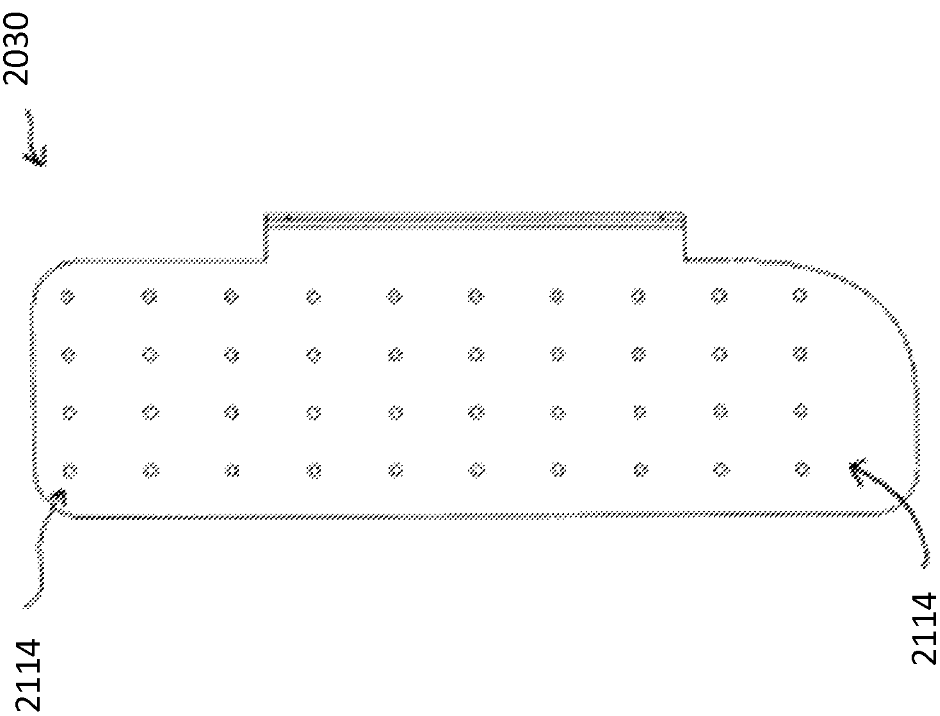

FIG. 144 is a front view of one embodiment of the left security cover.

Figure 145:
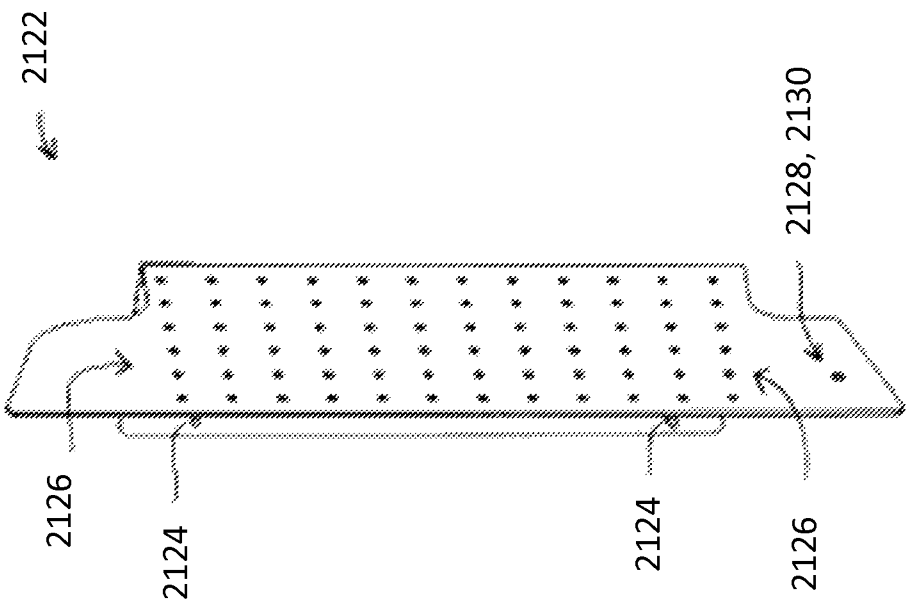

FIG. 145 is a right, isometric view of one embodiment of the right security cover for the second electronic device shown in FIG. 135.

Figure 146:
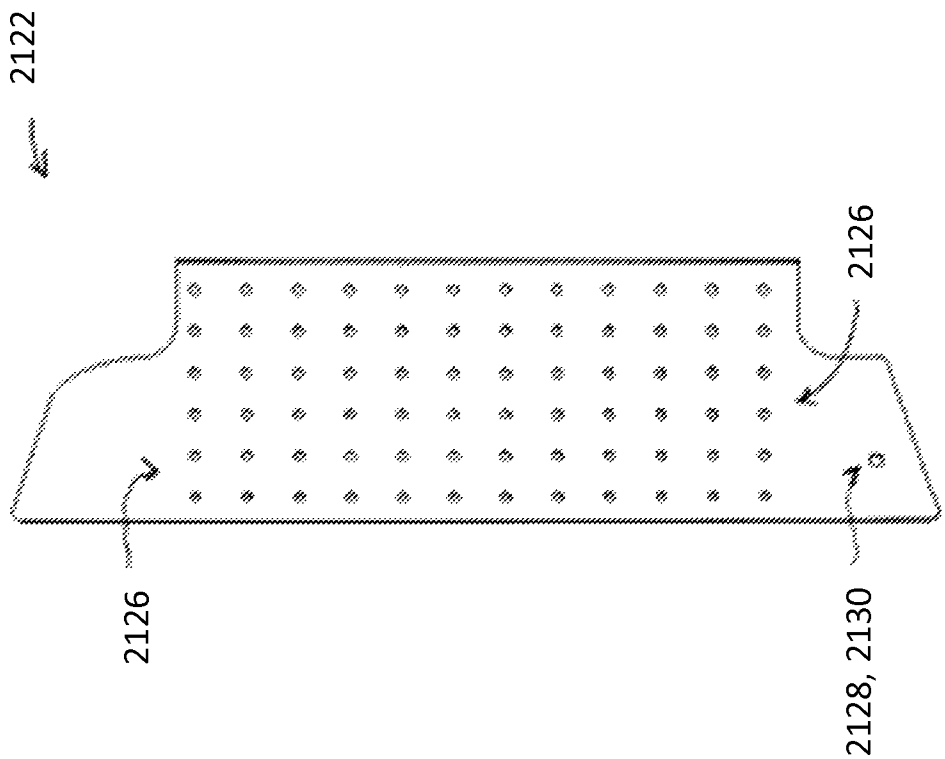

FIG. 146 is a front view of one embodiment of the right security cover for the second electronic device shown in FIG. 135.

Figure 147:
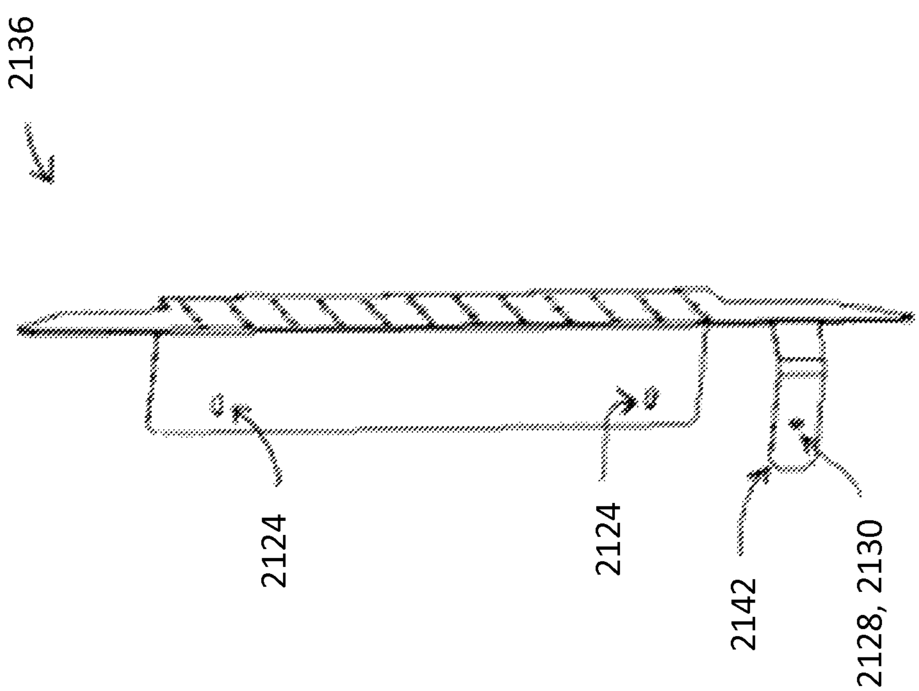

FIG. 147 is a side, isometric view of one embodiment of the right security cover for the third electronic device shown in FIG. 236.

Figure 148:
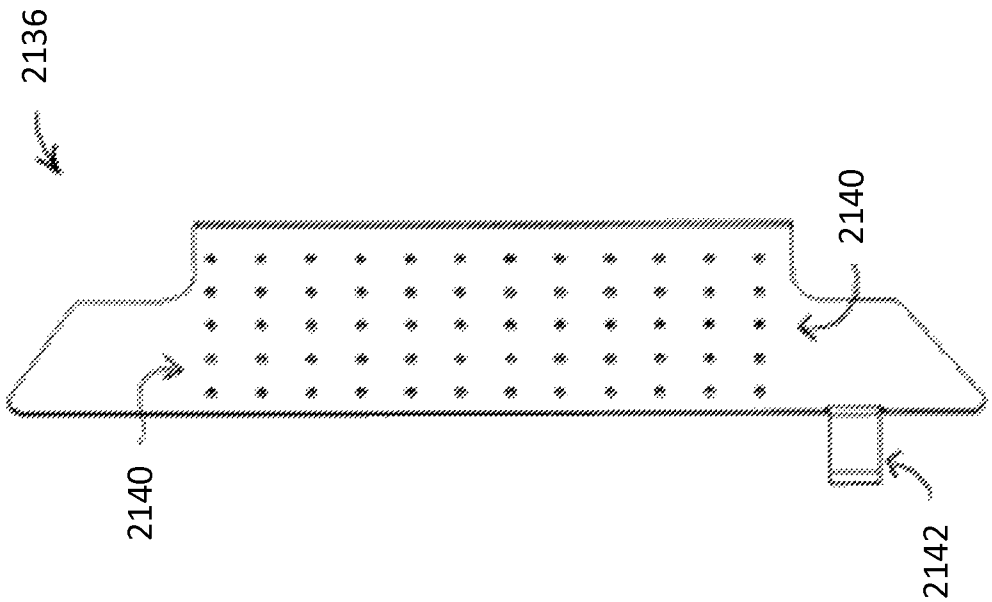

FIG. 148 is a front, isometric view of one embodiment of the right security cover for the third electronic device shown in FIG. 236.

Figure 149:
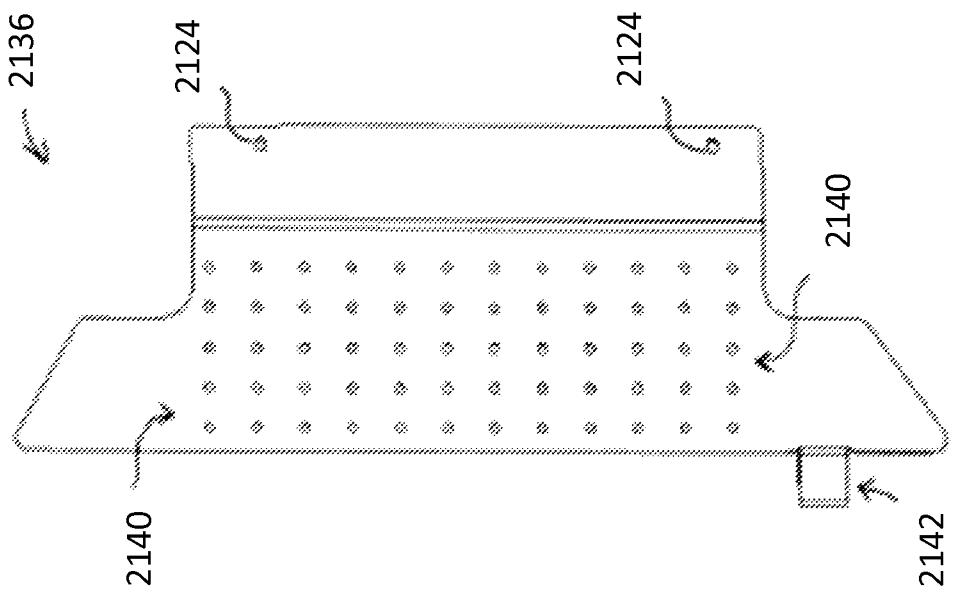

FIG. 149 is a front view of one embodiment of the right security cover for the third electronic device shown in FIG. 236.

Figure 150:
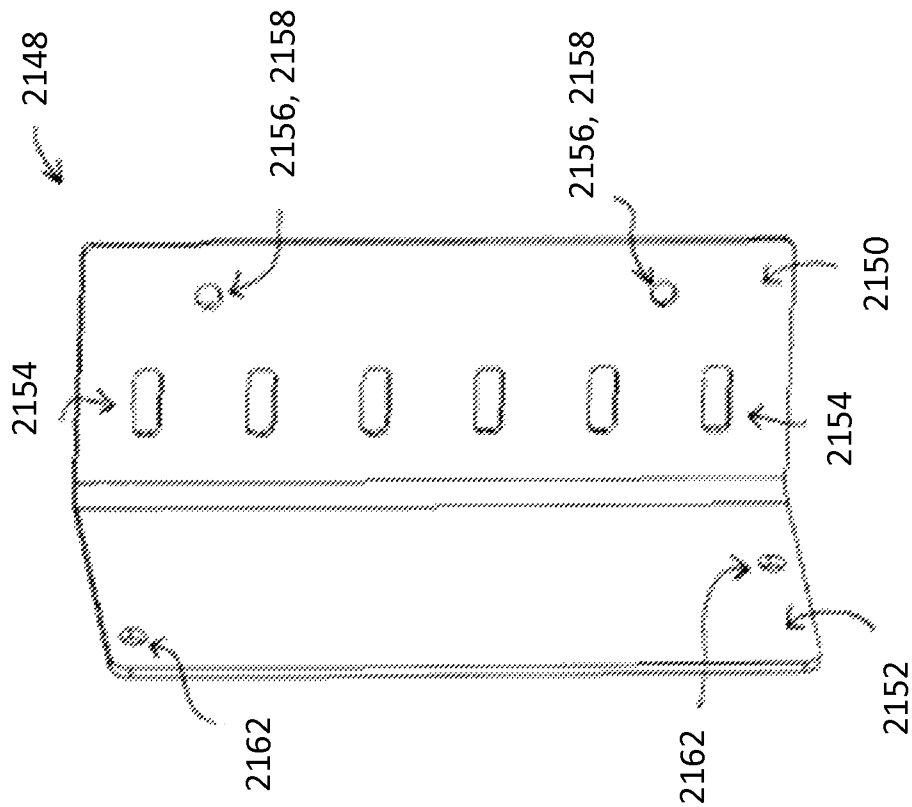

FIG. 150 is a side, isometric view of one embodiment of the card reader holder.

Figure 151:
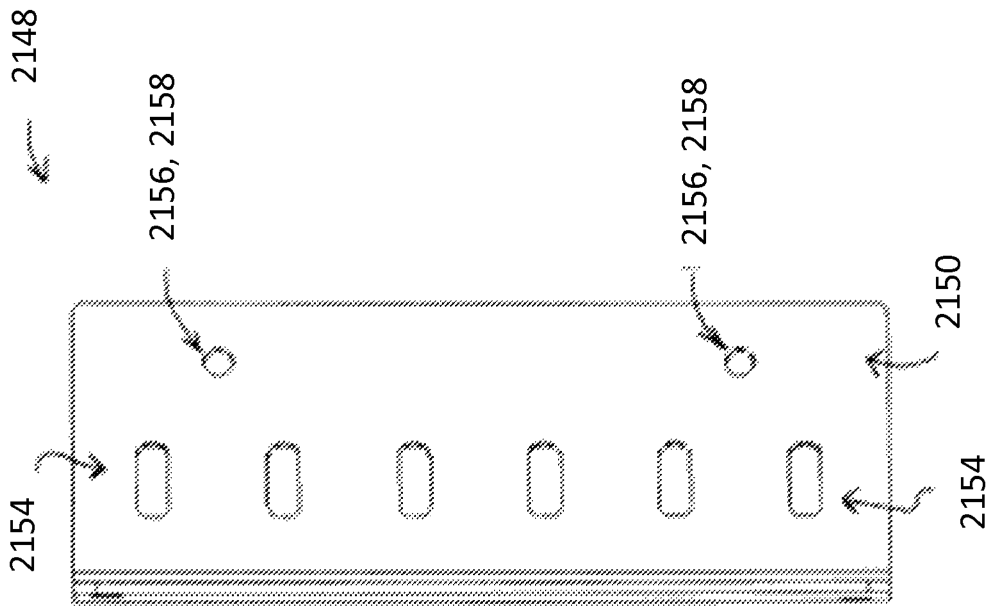

FIG. 151 is a side view of one embodiment of the card reader holder.

Figure 152:
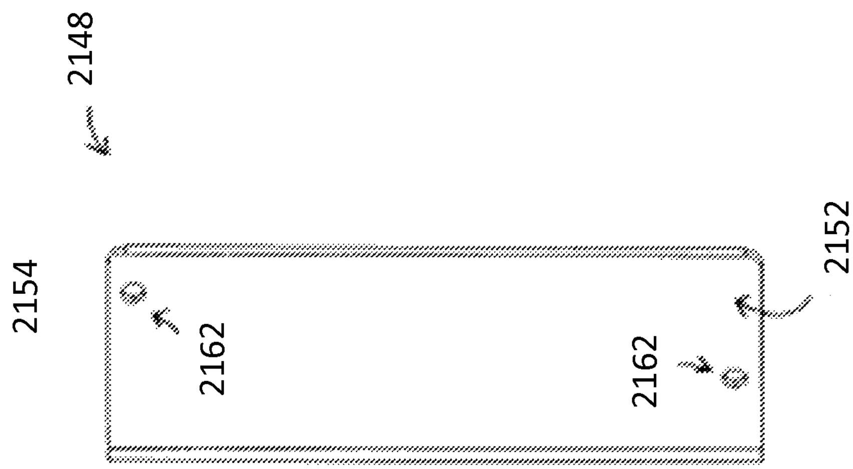

FIG. 152 is a front view of one embodiment of the card reader holder.

Figure 153:
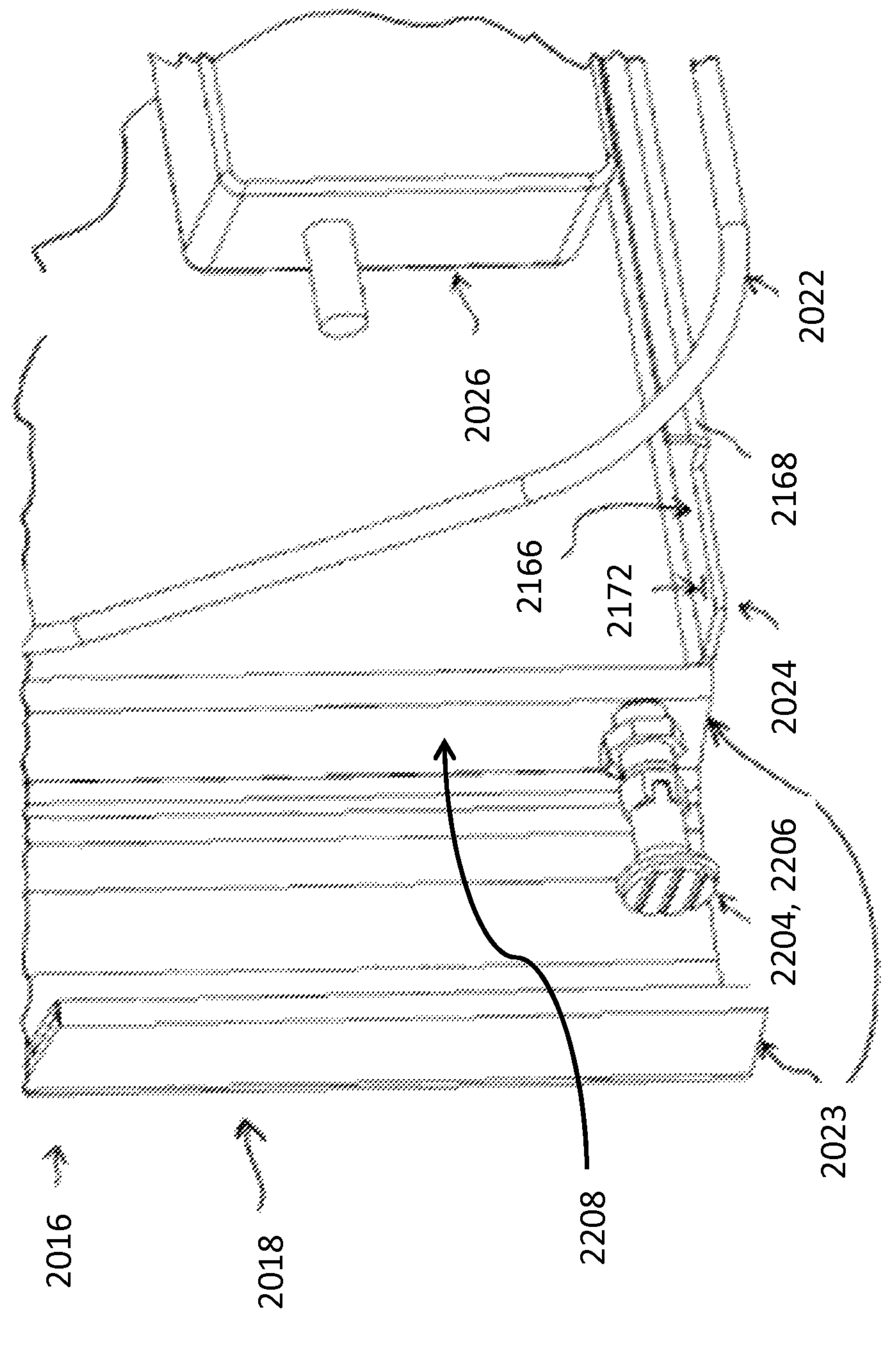

FIG. 153 is an enlarged, fragmentary isometric view of one embodiment of the right leg of the accessory.

Figure 154:
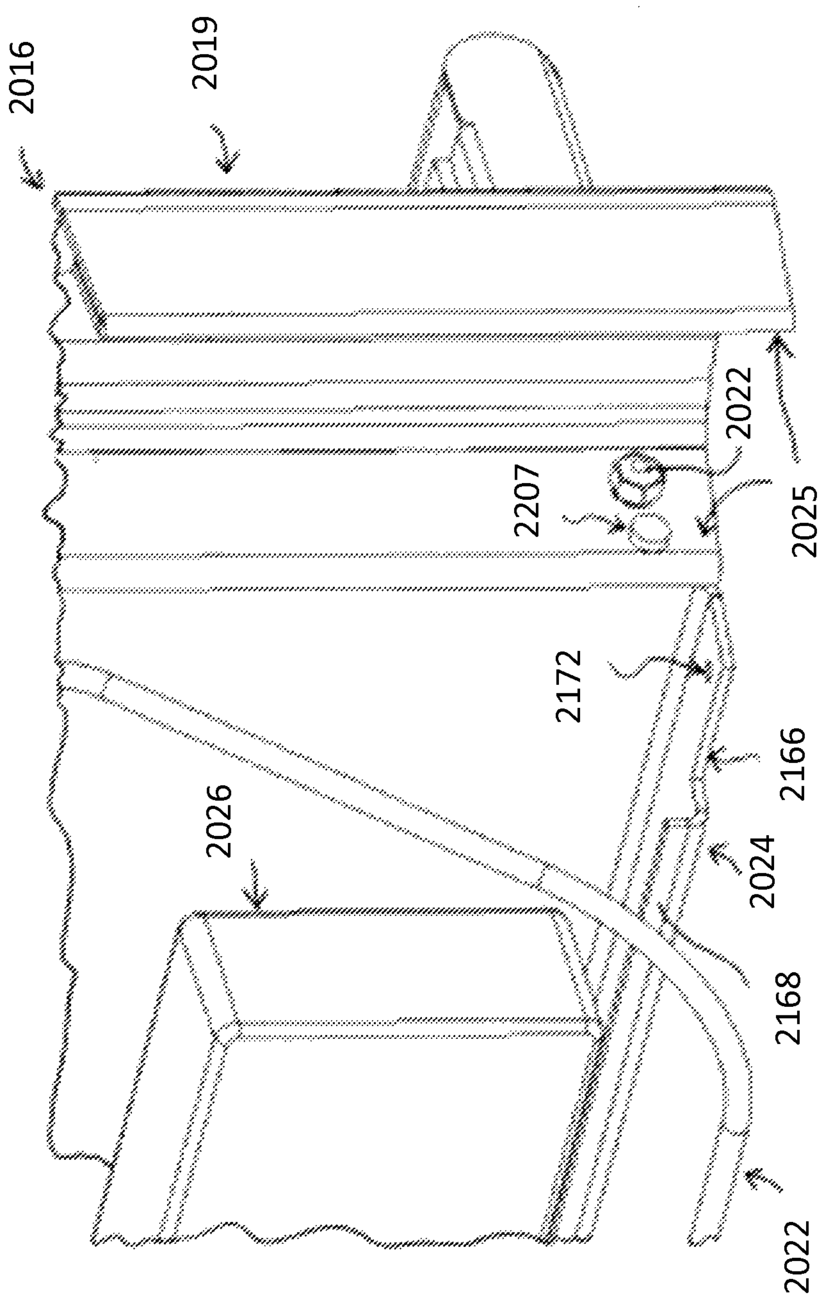

FIG. 154 is an enlarged, fragmentary isometric view of one embodiment of the left leg of the accessory.

Figure 155:
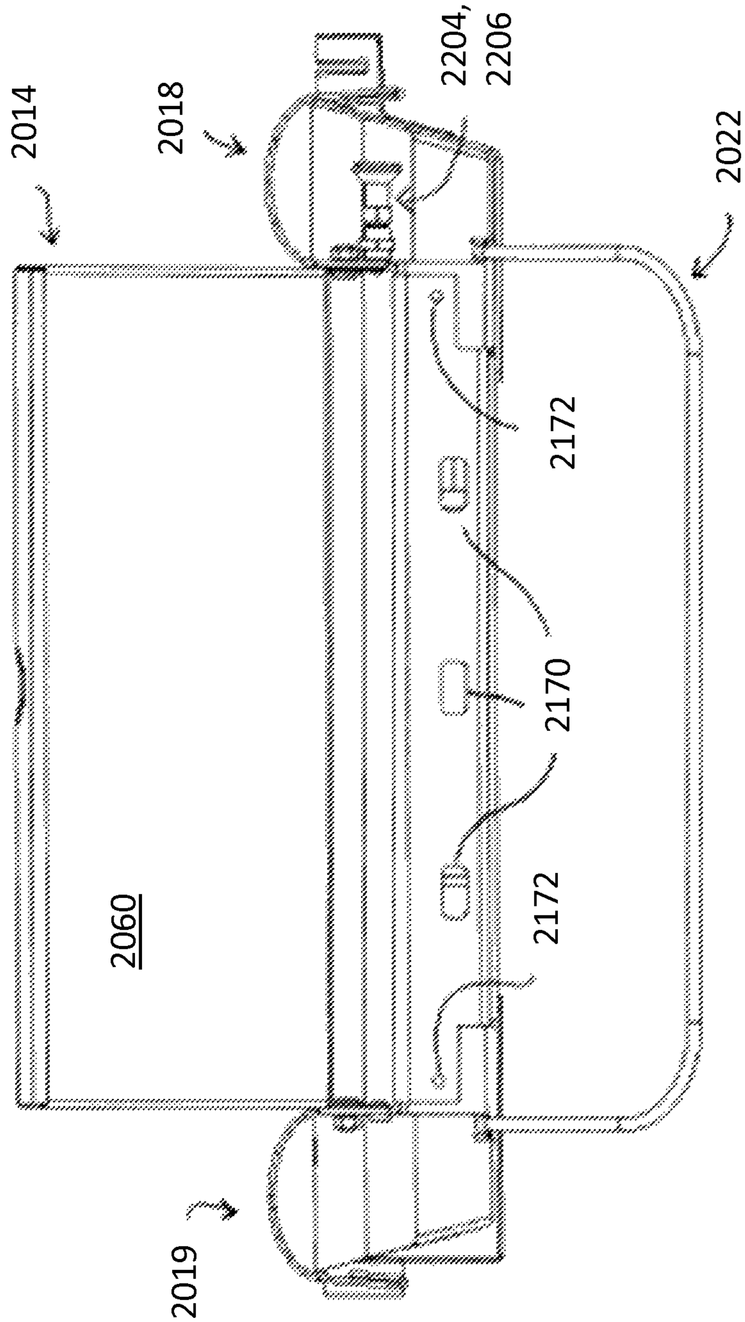

FIG. 155 is a bottom view of the embodiment of the accessory with the first electronic device shown in FIG. 117, illustrating the keyboard and kickstand in open positions.

Figure 156:
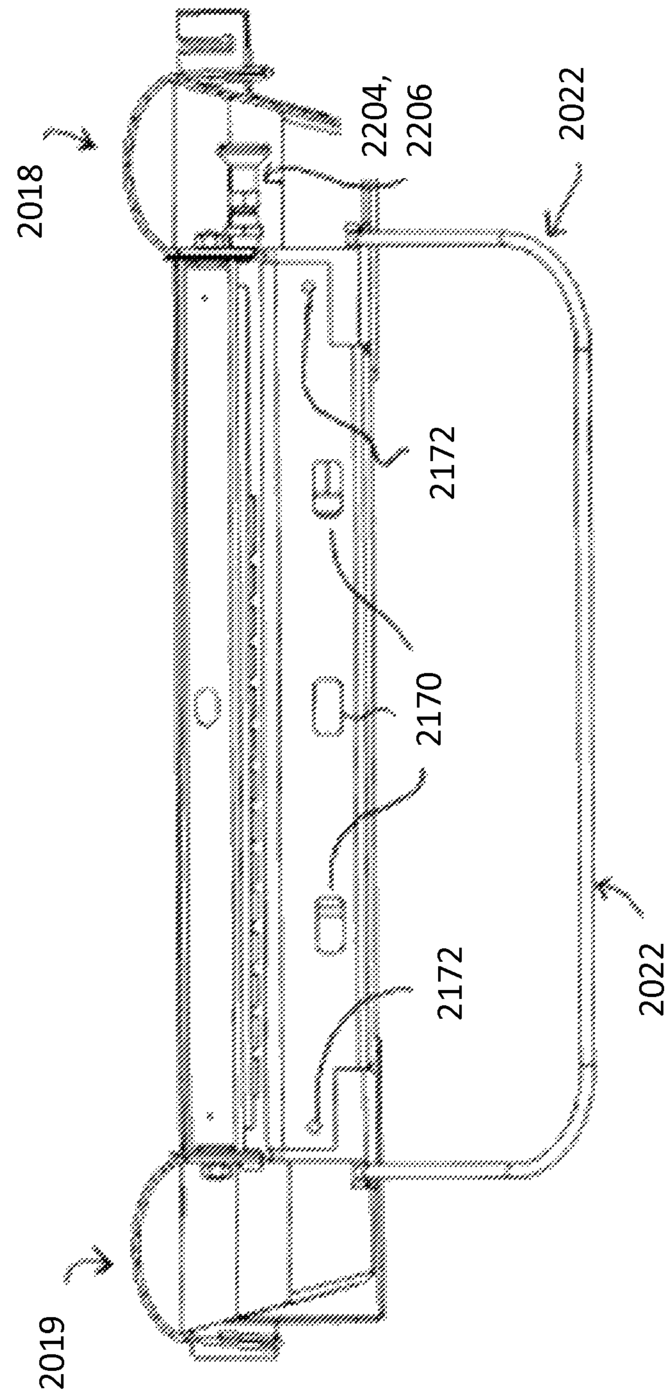

FIG. 156 is a bottom view of the embodiment of the accessory with the first electronic device shown in FIG. 117, illustrating the keyboard in a closed position and the kickstand in an open position.

Figure 157:
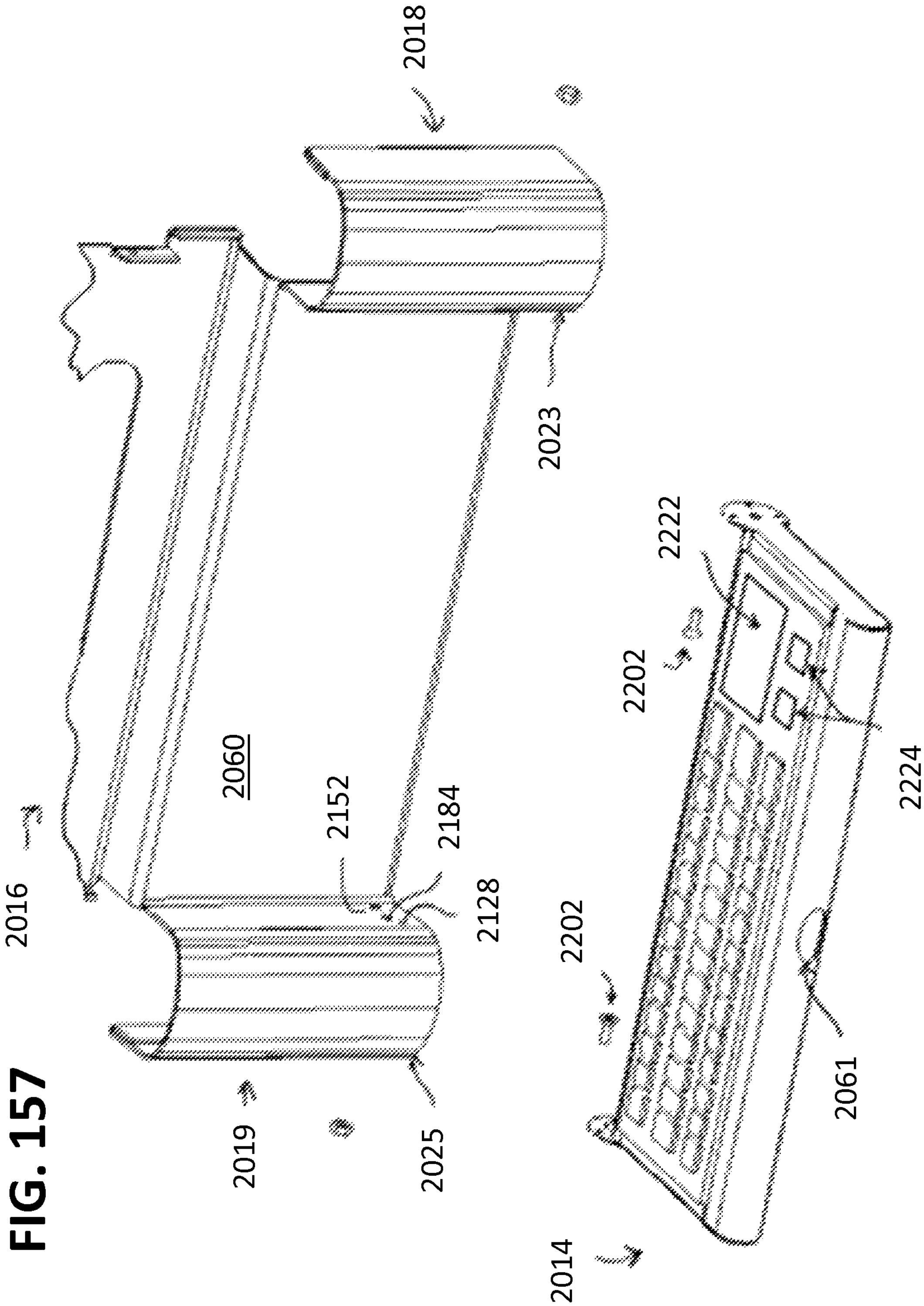

FIG. 157 is an exploded, front isometric view of one embodiment of the accessory, illustrating the keyboard holder separated from the frame.

Figure 158:
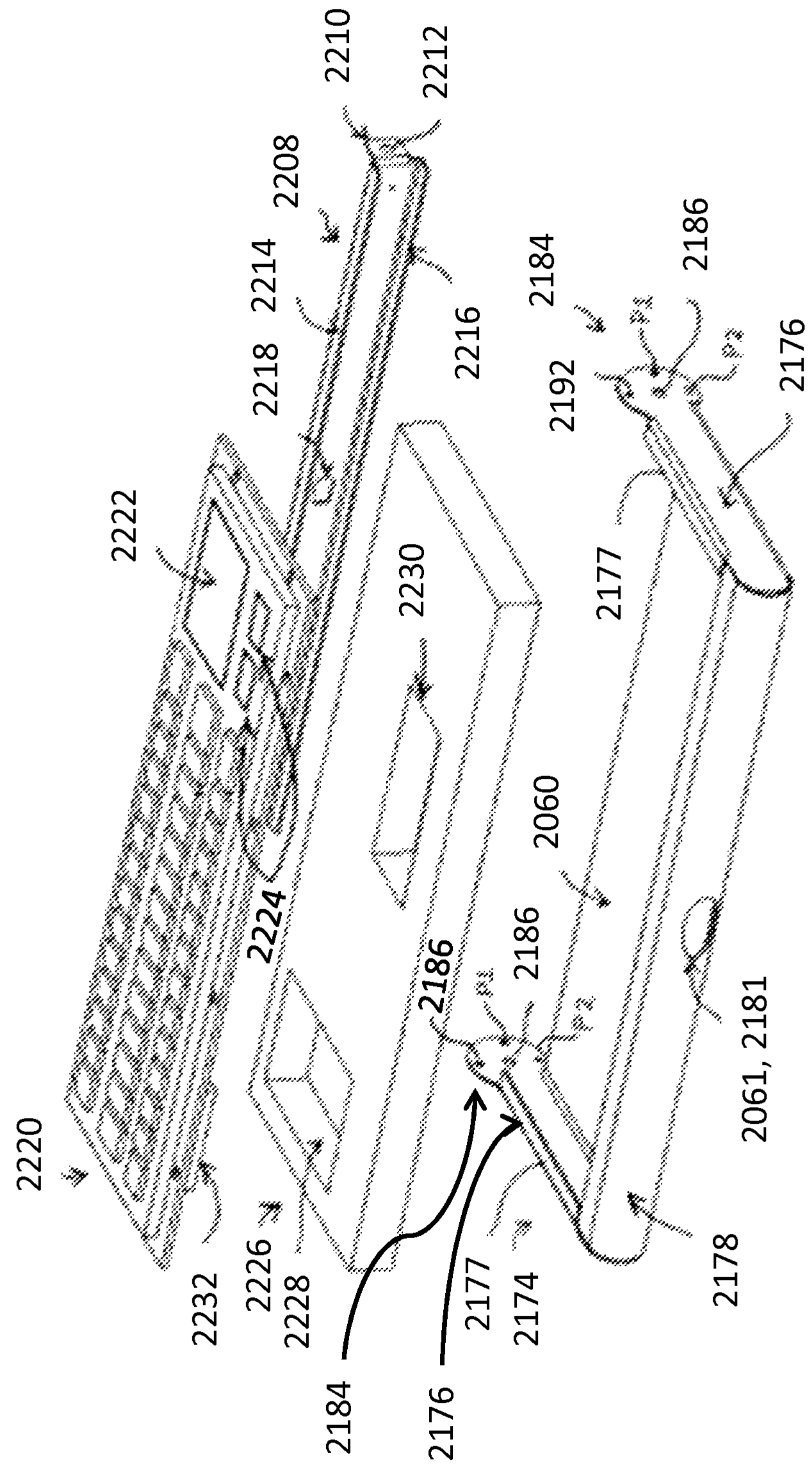

FIG. 158 is an exploded, top isometric view of one embodiment of the accessory, illustrating the keyboard case, keyboard spacer, metal keyboard module, and keyboard access panel.

Figure 159:
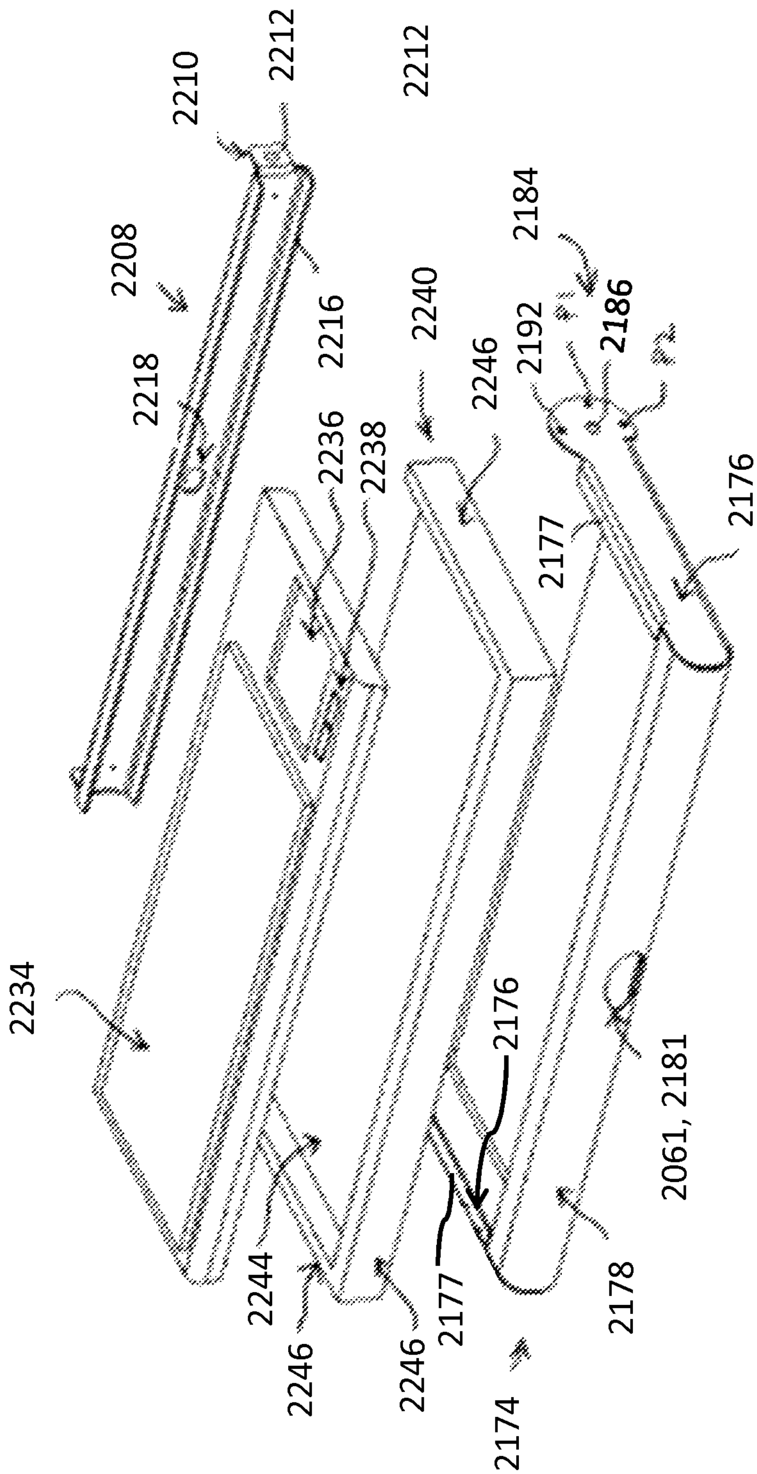

FIG. 159 is an exploded, top isometric view of one embodiment of the accessory, illustrating the keyboard case, keyboard spacer, plastic keyboard module, and keyboard access panel.

Figure 160:
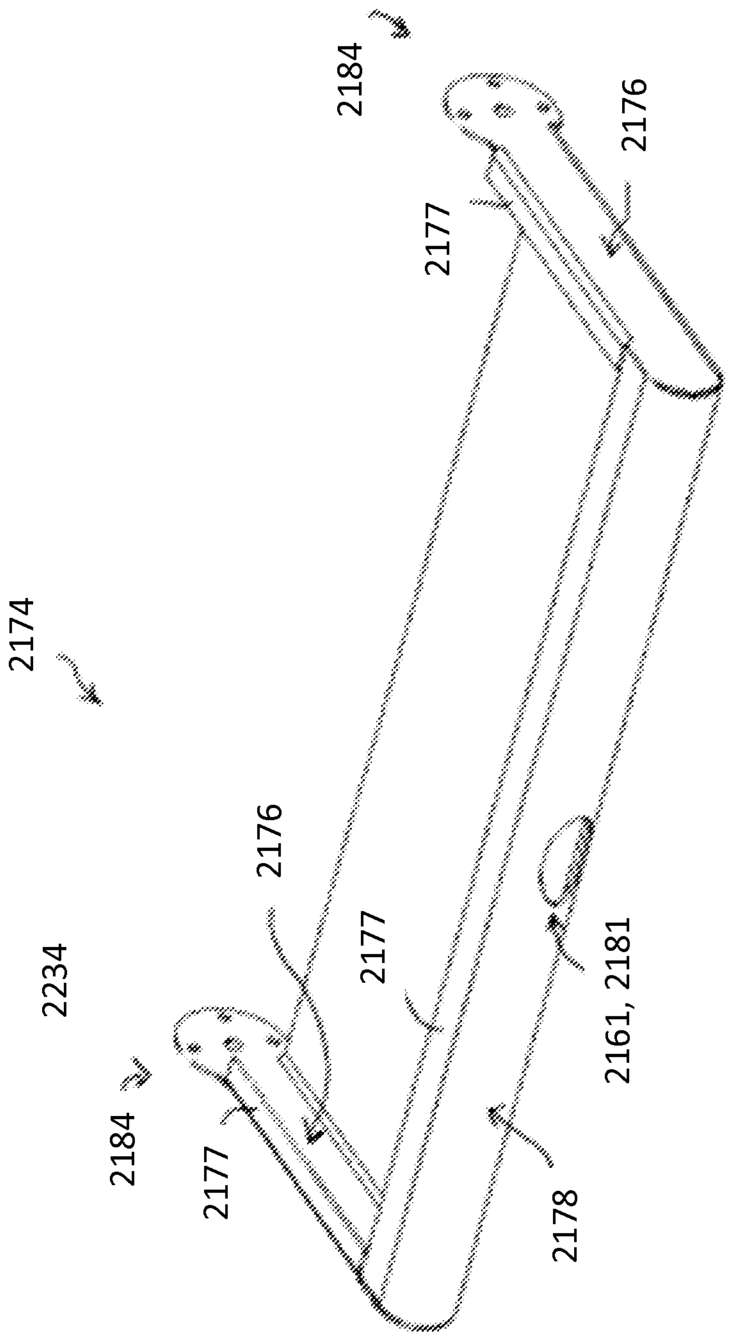

FIG. 160 is a top isometric view of one embodiment of the keyboard case of the accessory.

Figure 161:
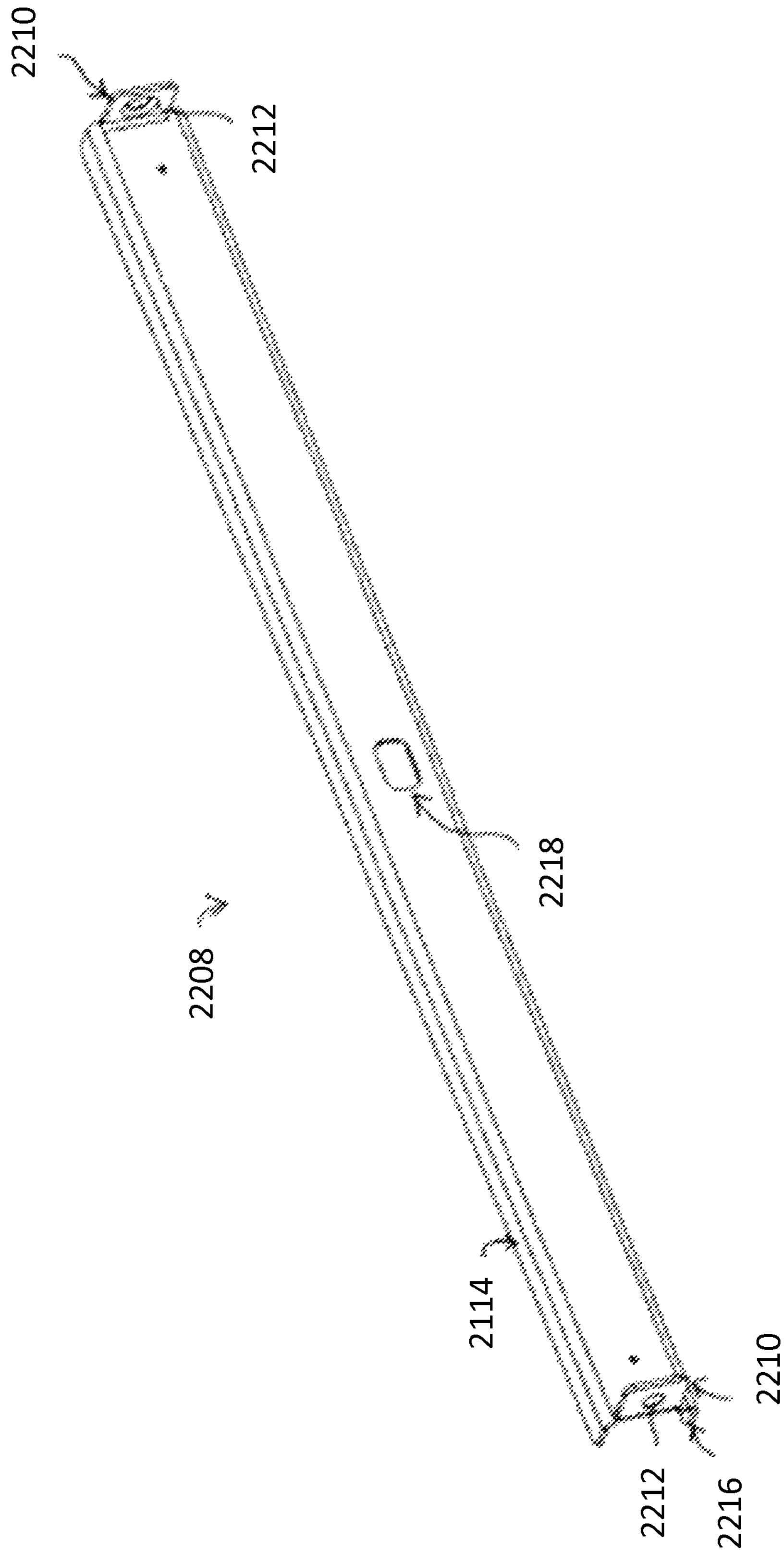

FIG. 161 is a front isometric view of one embodiment of the keyboard access panel of the accessory.

Figure 162:
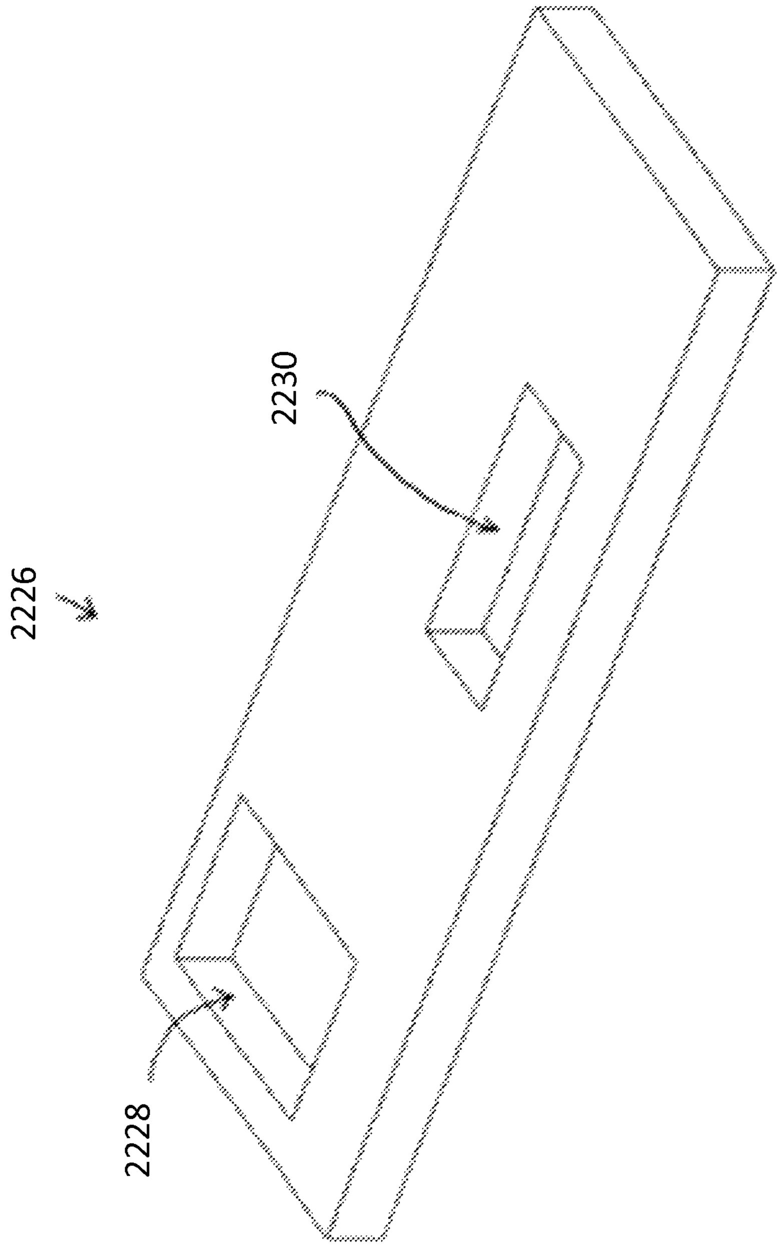

FIG. 162 is a top isometric view of one embodiment of the keyboard spacer for the metal keyboard module of the accessory.

Figure 163:
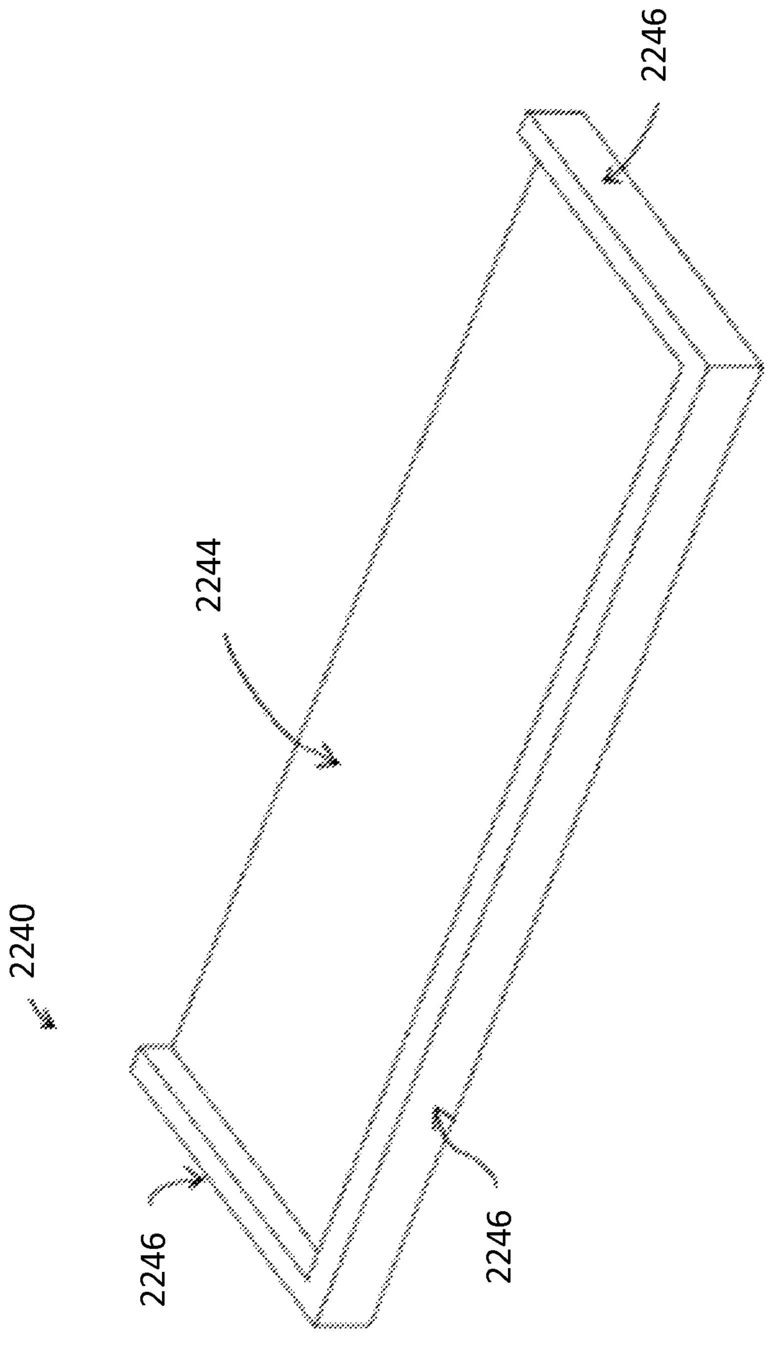

FIG. 163 is a top isometric view of one embodiment of the keyboard spacer for the plastic keyboard module of the accessory.

Figure 164:
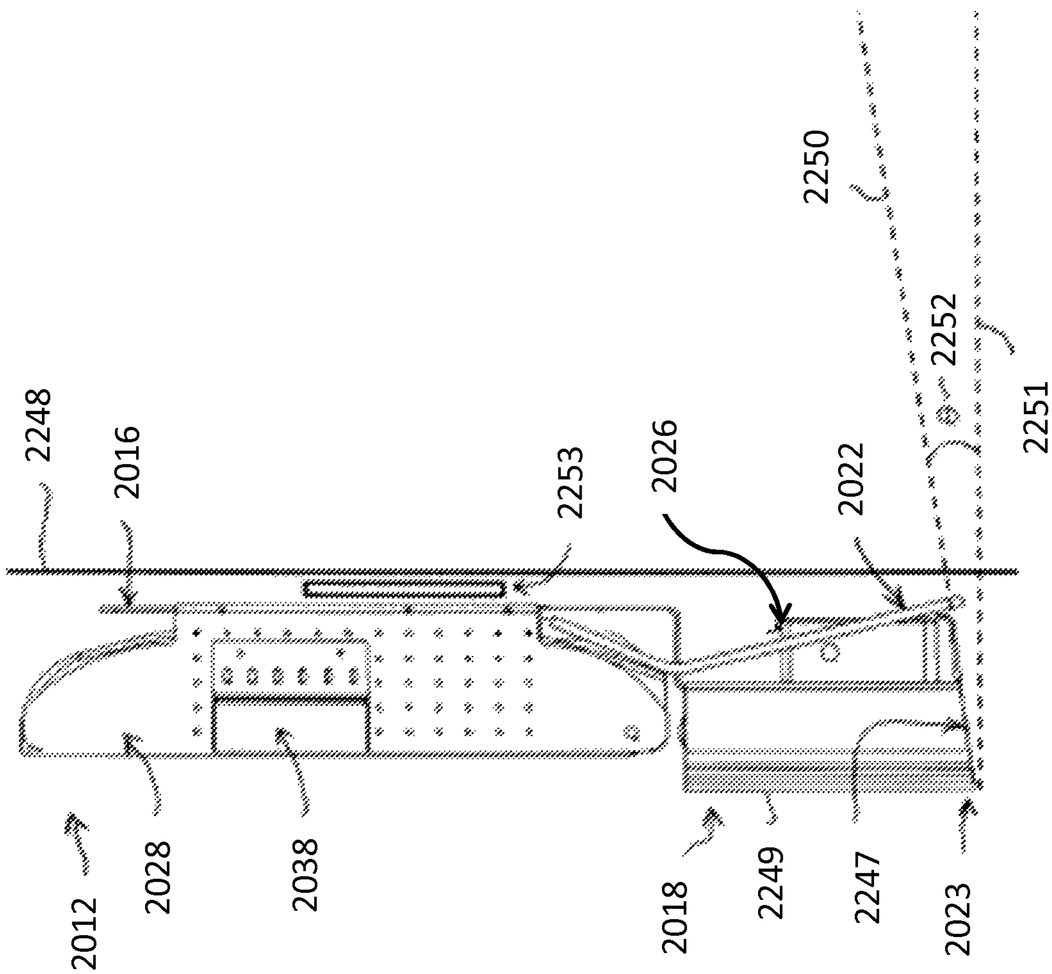

FIG. 164 is a right side elevation view of the embodiment of the accessory with the first electronic device shown in FIG. 117, illustrating the keyboard in a closed position and the kickstand in a closed position.

Figure 165:
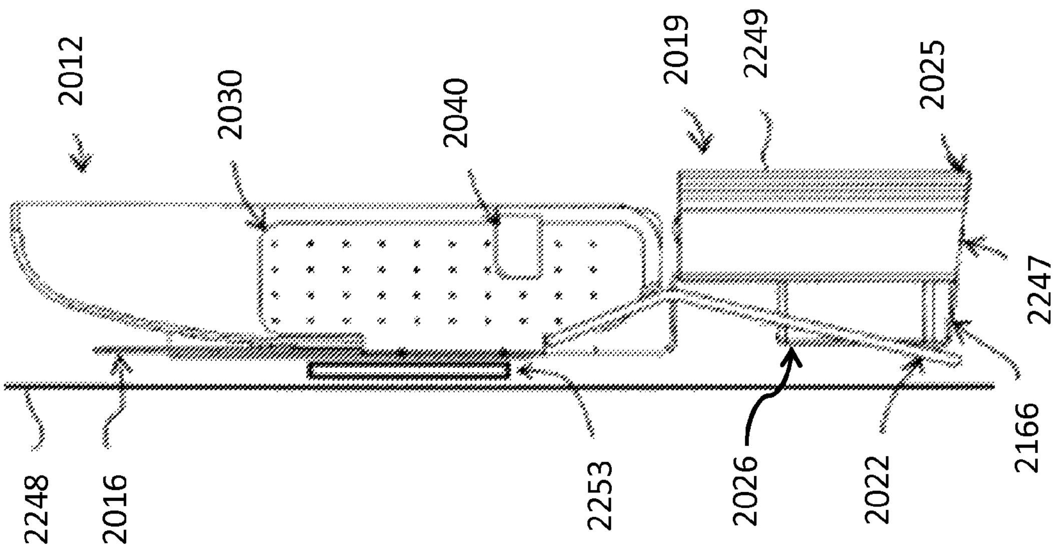

FIG. 165 is a left side elevation view of the embodiment of the accessory with the first electronic device shown in FIG. 117, illustrating the keyboard in a closed position and the kickstand in a closed position.

Figure 166:
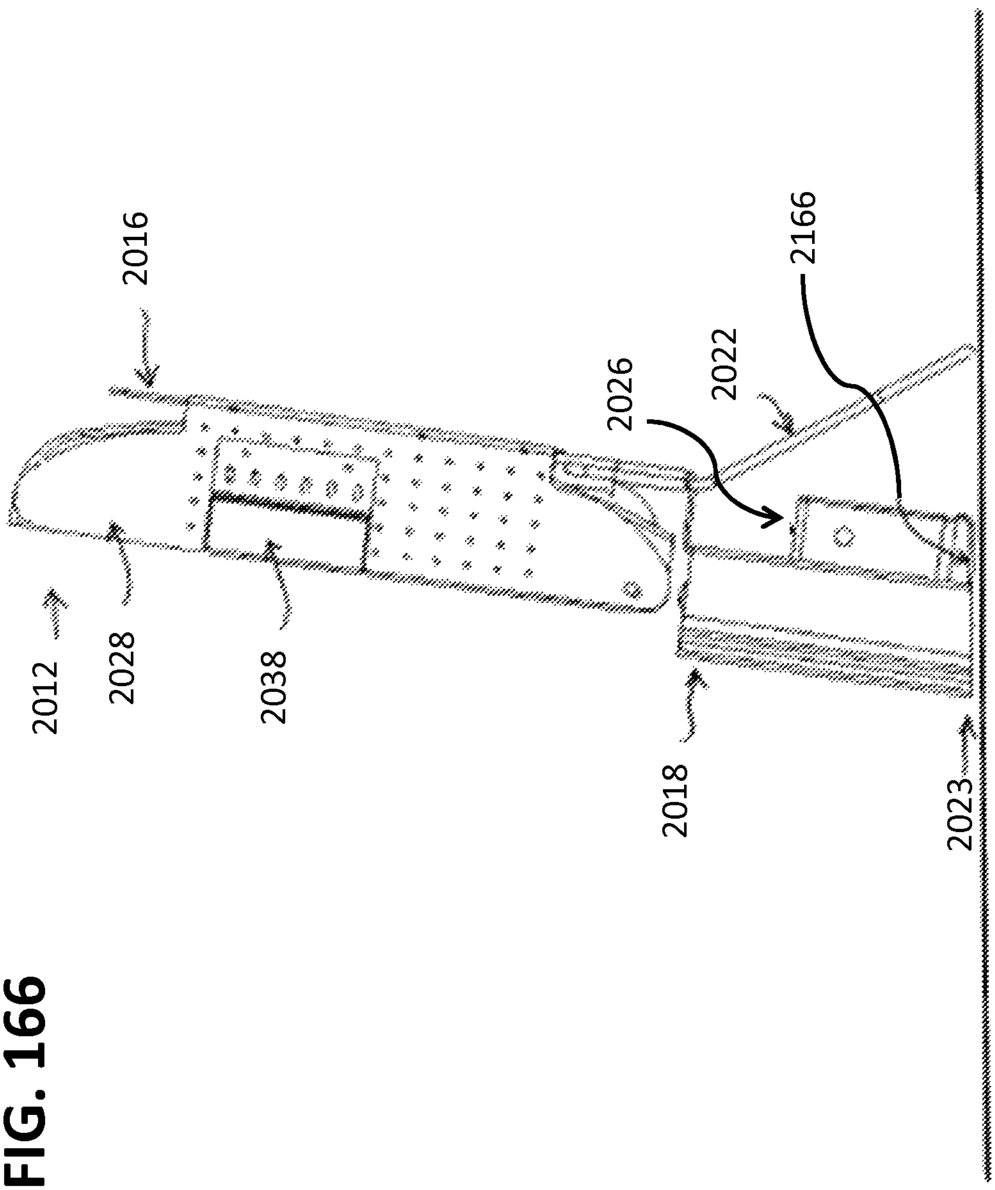

FIG. 166 is a right side elevation view of the embodiment of the accessory with the first electronic device shown in FIG. 117, illustrating the keyboard in a closed position and the kickstand in an open position.

Figure 167:
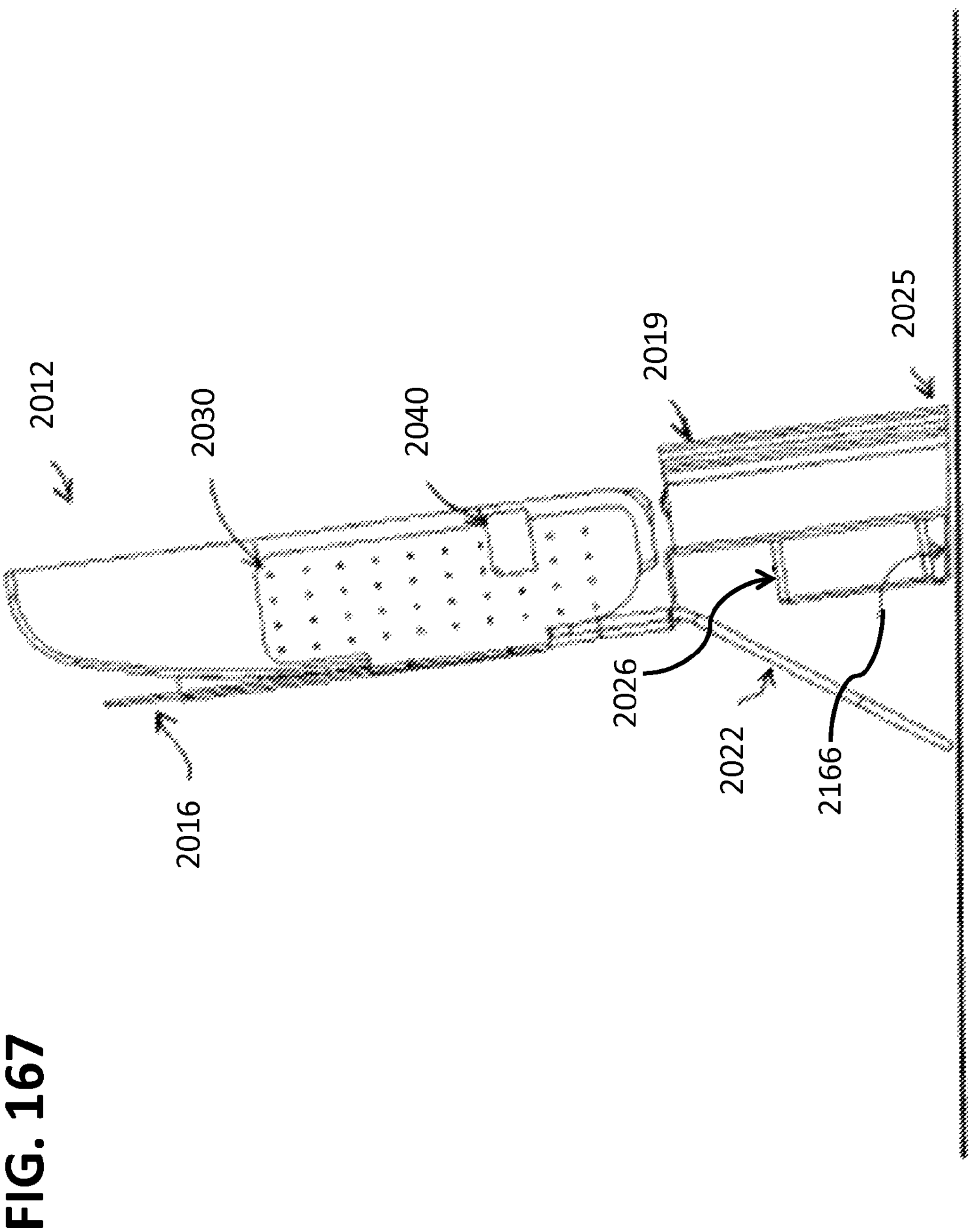

FIG. 167 is a left side elevation view of the embodiment of the accessory with the first electronic device shown in FIG. 117, illustrating the keyboard in a closed position and the kickstand in an open position.

DETAILED DESCRIPTION

Part A

1. Electronic Device Mountable to Upright Structures

Referring to FIGS. 1 through 15, the wall-mountable computer or electronic device 10 is attachable to or hangeable on a room wall 11, and the magnetically-mountable electronic device 100 is attachable to a refrigerator 101. The computers or electronic devices 10 and 100 each include the chasses or housings 12 and 102, respectively. Each of the housings 12 and 102, in one embodiment, houses or otherwise supports suitable circuitry components, hardware and software, such as the electronic system 152 described below with respect to FIG. 15. In one embodiment, each of the electronic devices 10 and 100 includes: (a) a monitor, screen or display device 14 supported by the housing of such electronic device, such as the substantially flat Liquid Crystal Diode (LCD) screen illustrated in the figures; (b) an input assembly 16 rotatably coupled to the housing 12; (c) a position control device 18 operatively coupled to the input assembly 16; (d) a compact disk drive 20 and a floppy disk drive 22; (e) a power button 24 and a plurality of different status indicators 26, such as Light Emitting Diodes (LEDs), operable to visually indicate the status of various operational parameters of the electronic device 10 or 100, in each case; (f) a plurality of data exchange devices or data ports 28 operable to couple external devices (such as flash memory sticks or removably data storage devices, printers, scanners and Personal Digital Assistants (PDAs)) to the electronic device 10 or 100 (in each case) through use of a data cable, cord or connector; (g) a slidable door 29 operable to cover the ports 28; (h) a plurality of control buttons 30 operable to provide inputs for controlling settings for the display device 14 and performance settings for the electronic device 10 or 100 (in each case); (i) a plurality of sound output devices or speakers 32 operable to output music and other sounds; and (j) a signal receiving and transmitting device 34, such as a radio frequency (RF) transceiver, which wirelessly couples the processor 154 (shown in FIG. 15) to a data network, such as the Internet.

In one embodiment, the input assembly 16 of each electronic device 10 and 100 has: (a) a plurality of ends or end regions 36 and 37, each of which has a midpoint 39; (b) a plurality of sides or side regions 38; (c) a support or body 40 having a substantially flat data entry side 42 and a substantially flat input side 44; and (d) a plurality of spindles or shafts 46 and 48 which are rotatably coupled to the housing of such electronic device. The input assembly 16 is rotatable about axis 49, and, in one embodiment, the axis 49 passes through the midpoints 39.

In one embodiment, each of the lengths of the ends 36 and 37 has a length which is less than or equal to the width 50 of the housing 12 and 102, in each case. As such, the input assembly 16 is spinnable or rotatable about three hundred sixty degrees while the devices 10 and 100 are mounted to the wall 11 and refrigerator 13, respectively. In another embodiment, the ends 36 are greater than the width 50. Here, the user removes the devices 10 and 100 from the wall 11 and refrigerator 13, respectively, in order to spin or rotate the input assembly 16 through three hundred sixty degrees.

The data entry side 42 supports a data entry input device or keyboard 52, and the input side 44 supports a control panel, a plurality of control buttons, touch actuable areas or supplementary input devices 54. The input side 44 also supports a relatively small visual output device or supplementary display device 56, such as a miniature LCD screen.

The keyboard 52, in one embodiment, includes: (a) a plurality of touch actuatable areas or movable keys 58 suitable for entering data; and (b) a keyboard processor 79 (illustrated in FIG. 11) operatively coupled to the keys 58 and to the processor 154 of the device 10 or 100, in each case. In one embodiment, the keyboard 52 includes a QWERTY keyboard having all of the alphabetic keys and one or more special keys, such as arrow keys, text editing keys, modifier keys and other suitable keys. In another embodiment, the keyboard 52 also includes a set of numeric keys. The keyboard 52 can have any suitable number and types of keys, and the keys can be full-sized keys or reduced-sized keys.

Though not illustrated, it should be understood that the keyboard 52 can include one or more of the numeric keys, function keys or any other keys of a commercially available enhanced keyboard having one hundred and one keys or one hundred and four keys. The keyboard 52 also includes a finger-steerable curser mover, such as touch pad 60. In another embodiment, the keyboard 52 includes a built-in mouse or track ball mouse. The size of the keyboard 52 can vary with the size of the body 40 which, in turn, can vary with the size of the electronic device 10 or 100, in each case.

The supplementary input device 54 of the input side 44 are associated with any suitable input or output of the electronic device 10 or 100, in each case. In the example illustrated in FIGS. 4 and 8 the supplementary input device 54 are associated with controlling the output and performance of the audio system and video system of the electronic system 152. The supplementary input device 54 include audio-video buttons and indicators for controlling and monitoring play, pause, skip forward, skip backward, repeat, random play, disk selection, sound track selection and other audio or visual functions. The supplementary display device 56 displays images related to the performance of the audio or video system of the electronic device 10 or 100, in each case. In the example illustrated, the supplementary display device 56 displays the play mode of the DVD video system.

Figure 1:
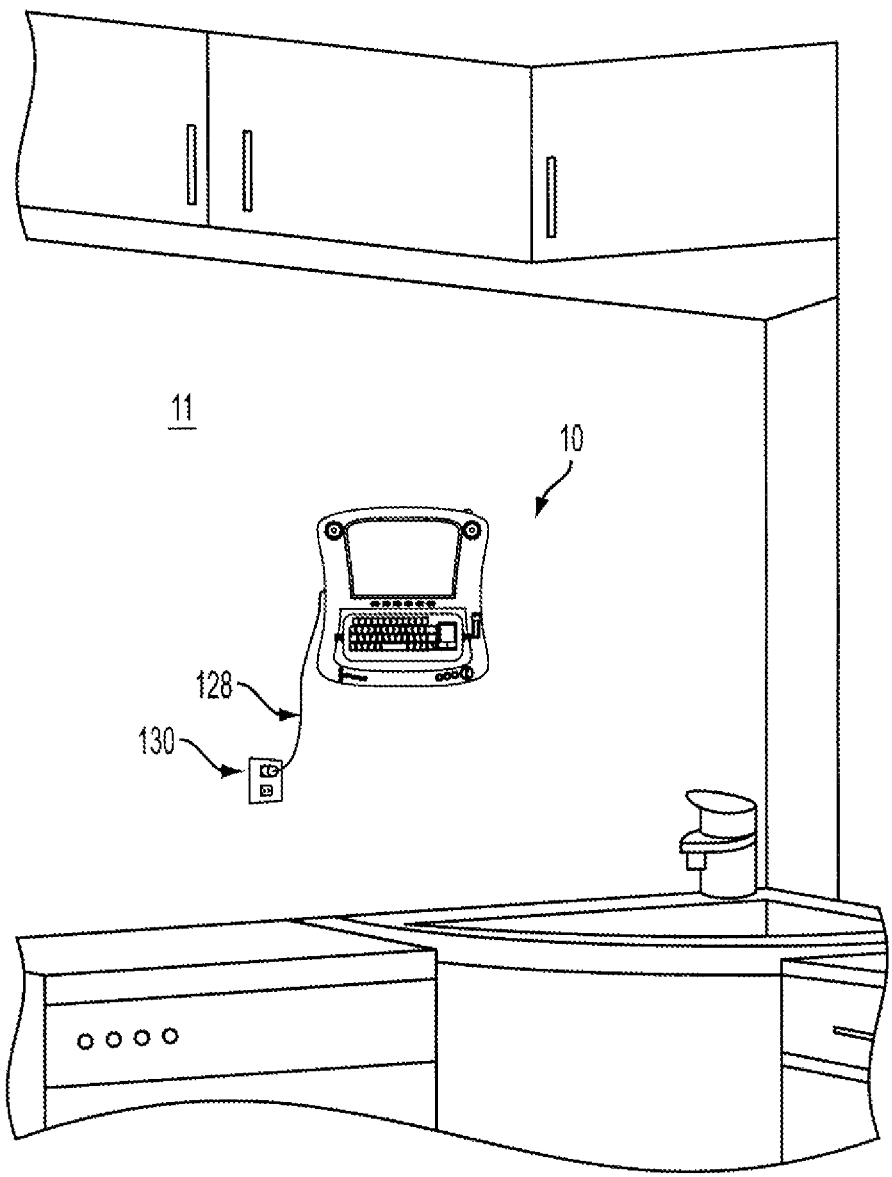
FIG. 1 is a front elevation view of the hangeable or mountable electronic device hung on a wall in one embodiment.
Figure 2:
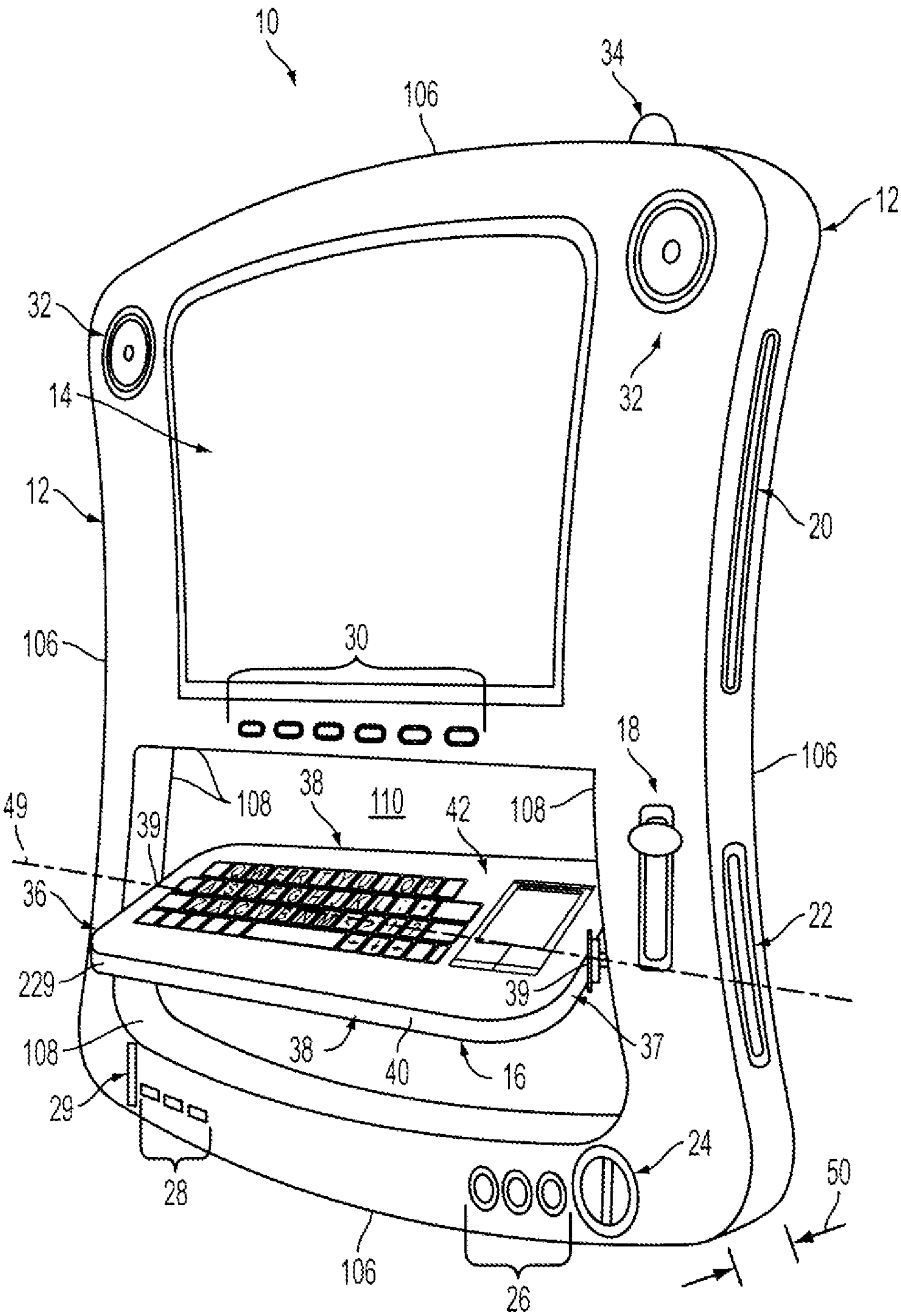
FIG. 2 is a front perspective view of the hangeable or mountable electronic device of FIG. 1.
Figure 3:
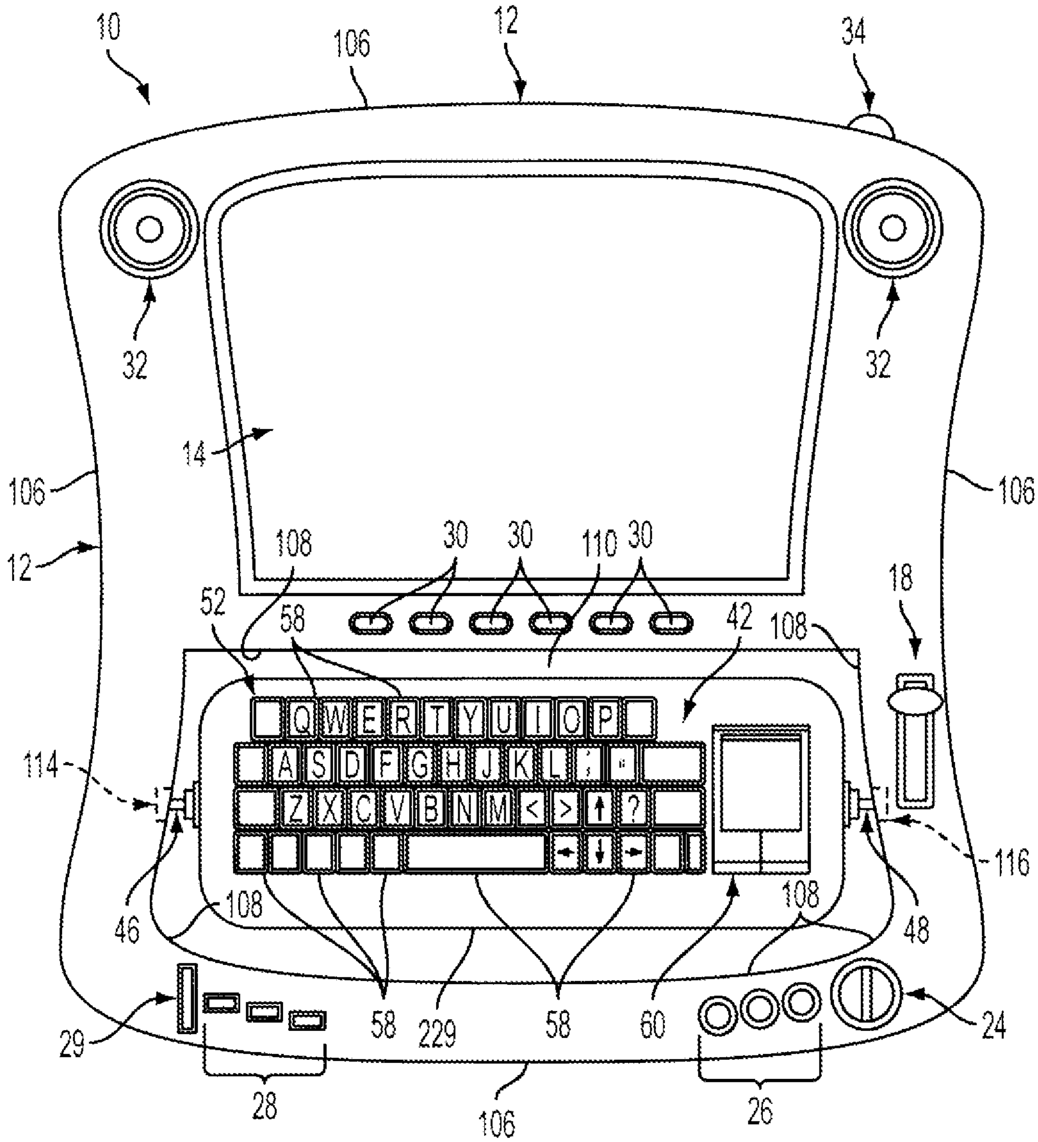
FIG. 3 is a front elevation view of the hangeable or mountable electronic device of FIG. 1, illustrating the data entry side of the input assembly.
Figure 4:
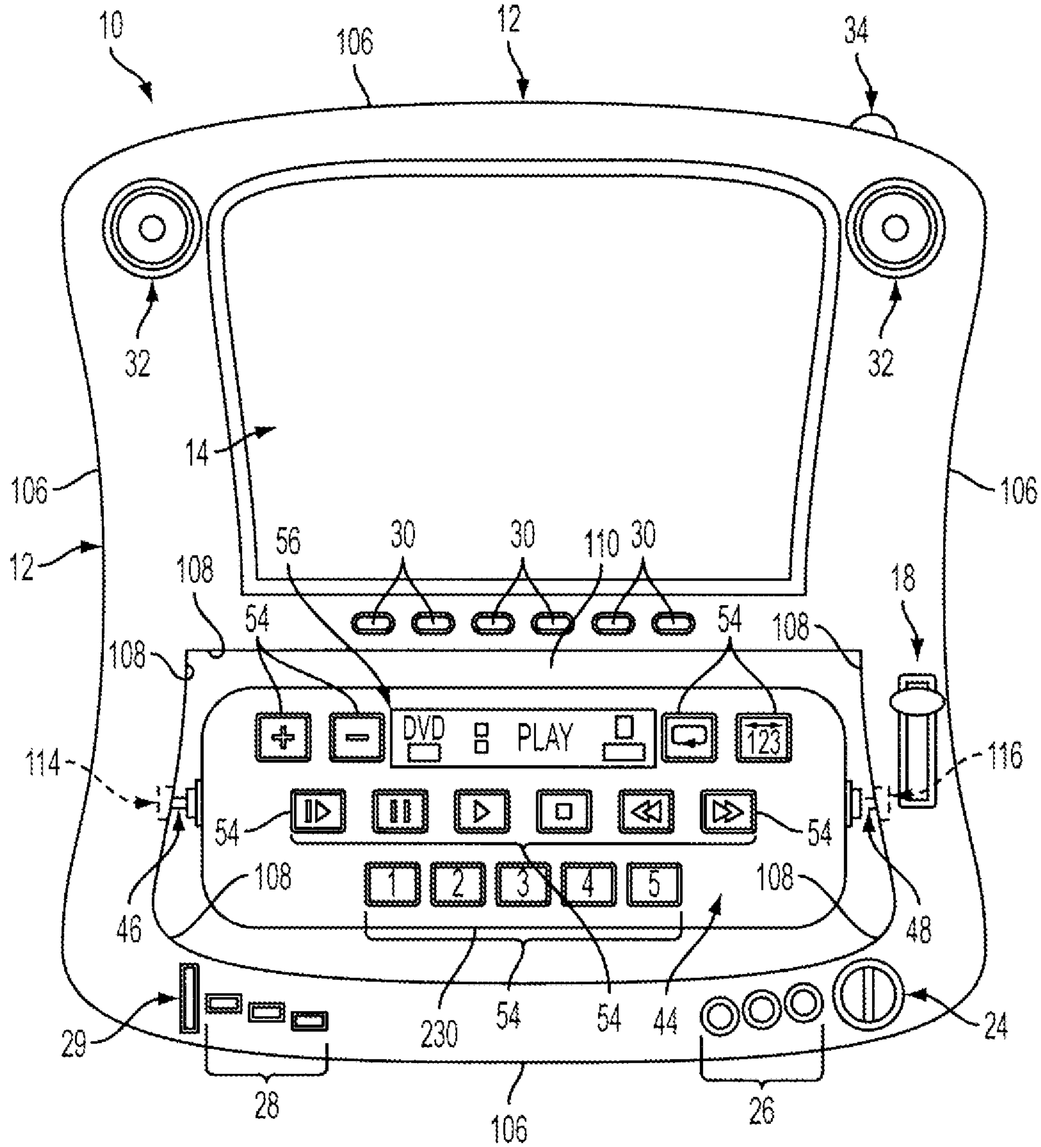
FIG. 4 is a front elevation view of the hangeable or mountable electronic device of FIG. 1, illustrating the input side of the input assembly.
Figure 5:
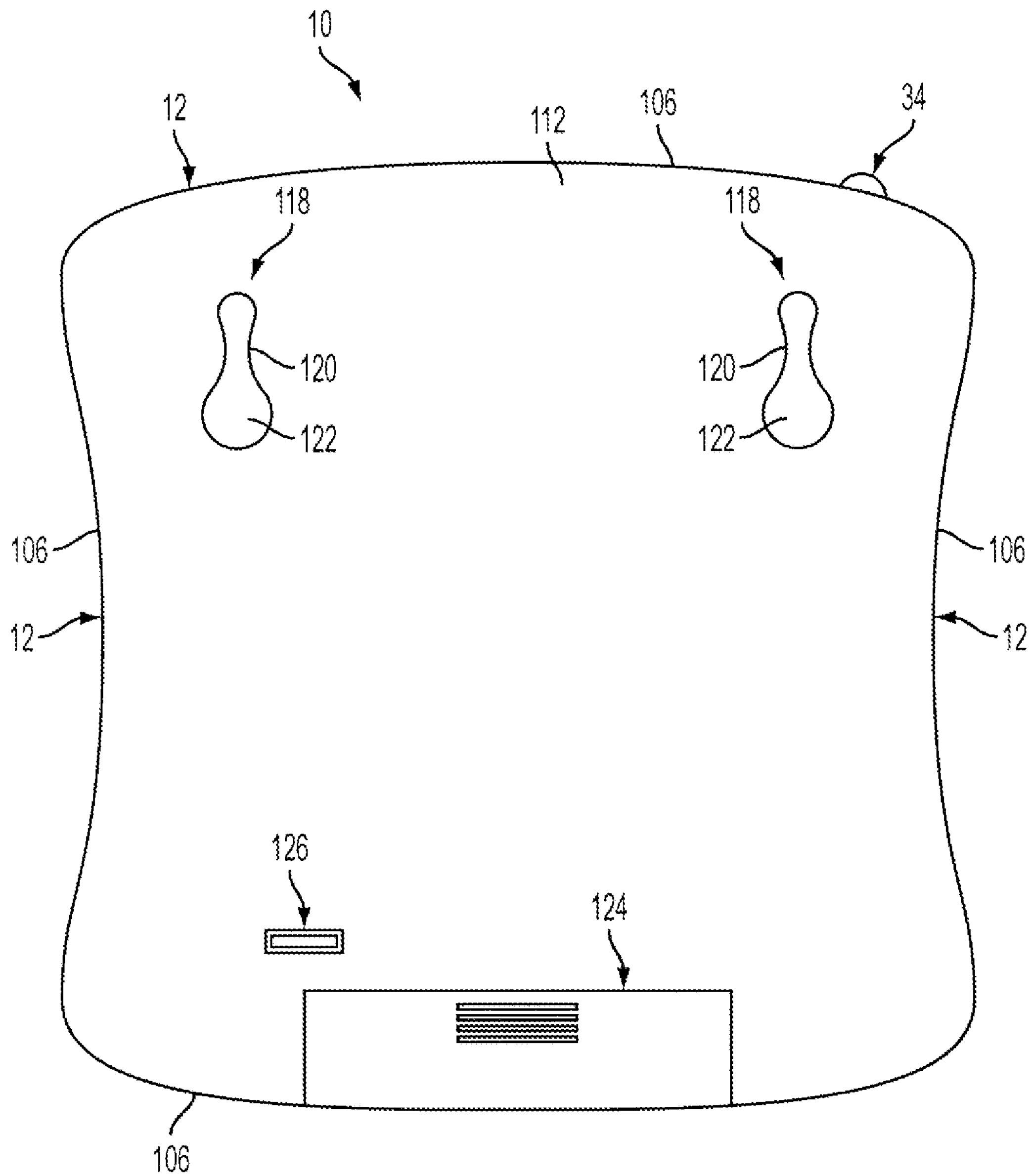
FIG. 5 is a rear elevation view of the hangeable or mountable electronic device of FIG. 1.
Figure 6:
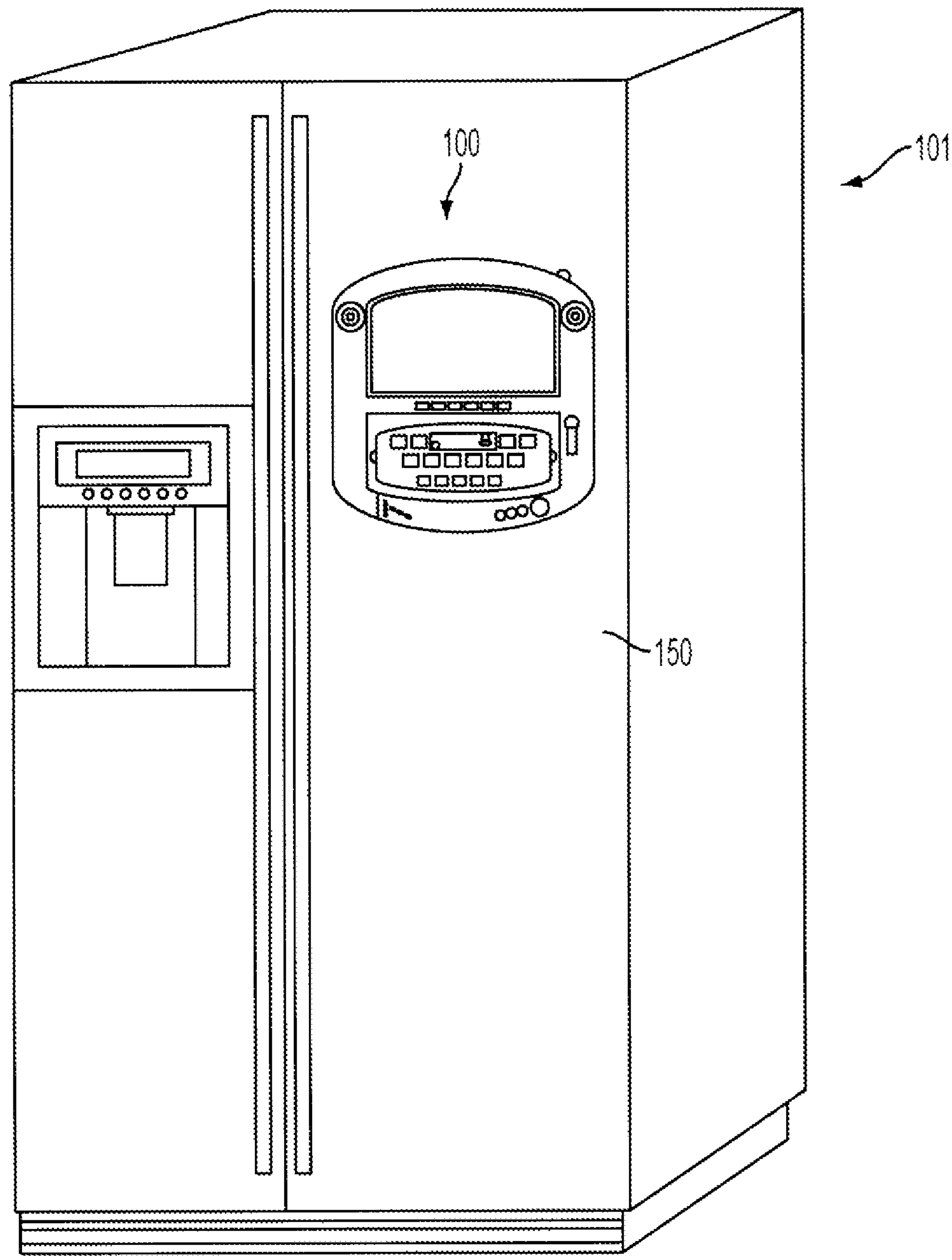
FIG. 6 is a front elevation view of the magnetically-mountable electronic device attached to a refrigerator in one embodiment.
Figure 7:
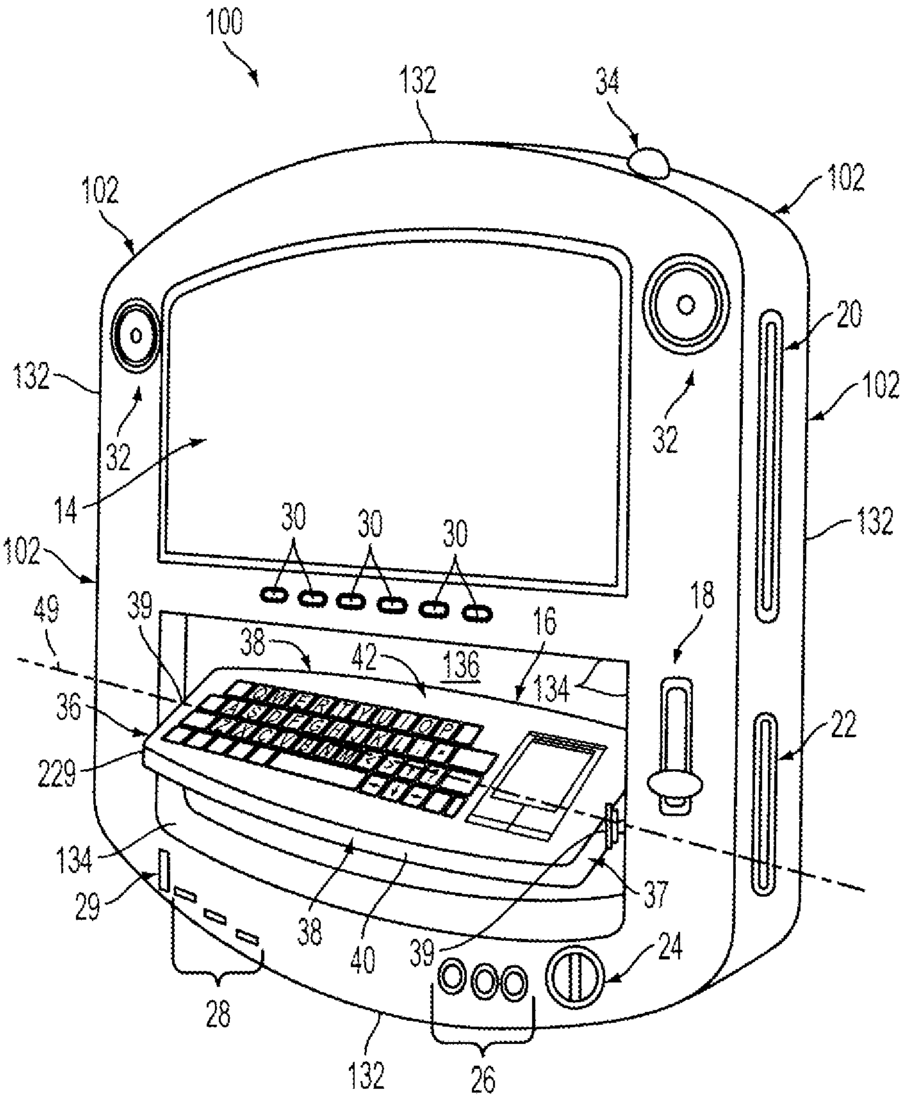
FIG. 7 is a front perspective view of the magnetically-mountable electronic device of FIG. 6.
Figure 8:
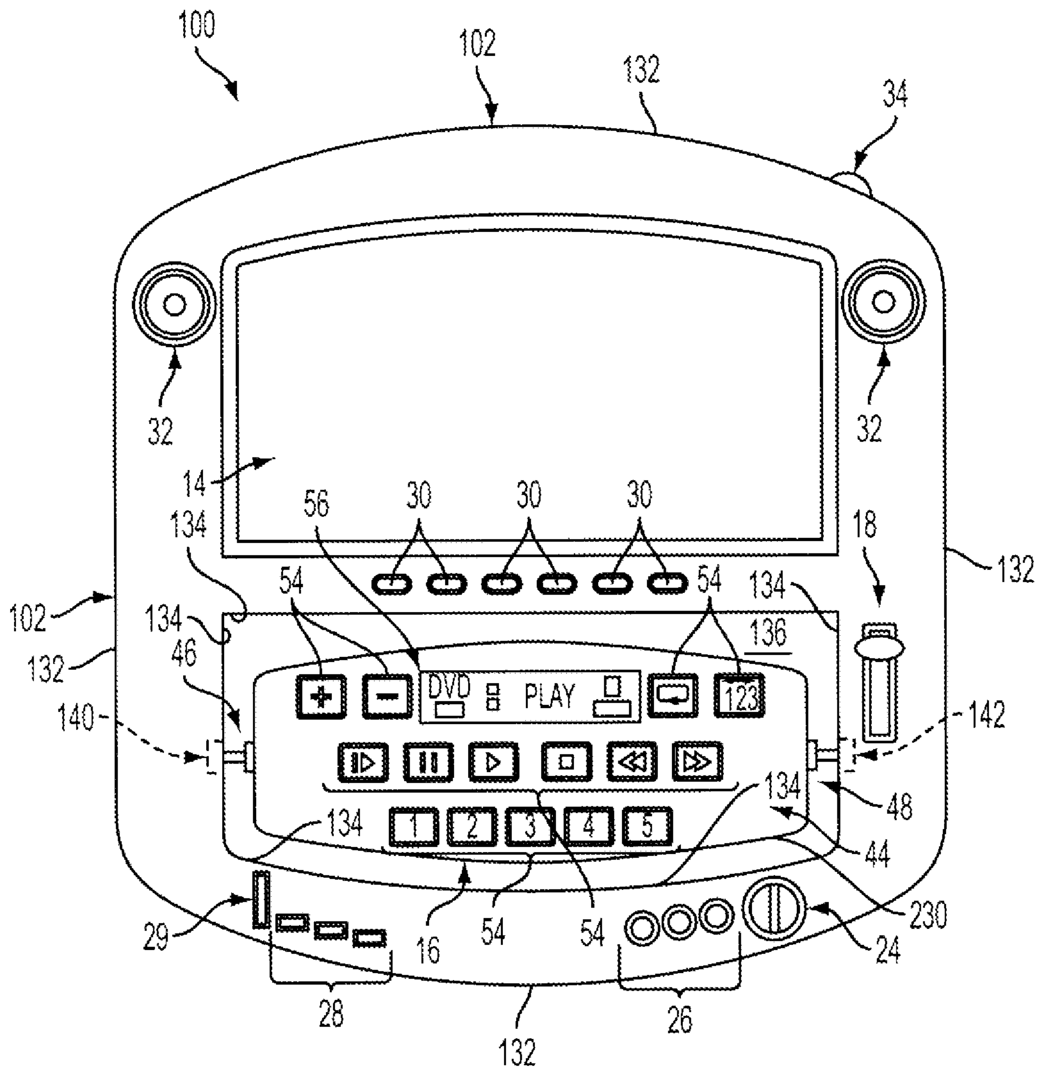
FIG. 8 is a front elevation view of the magnetically-mountable device of FIG. 6, illustrating the input side of the input assembly.
Figure 9:
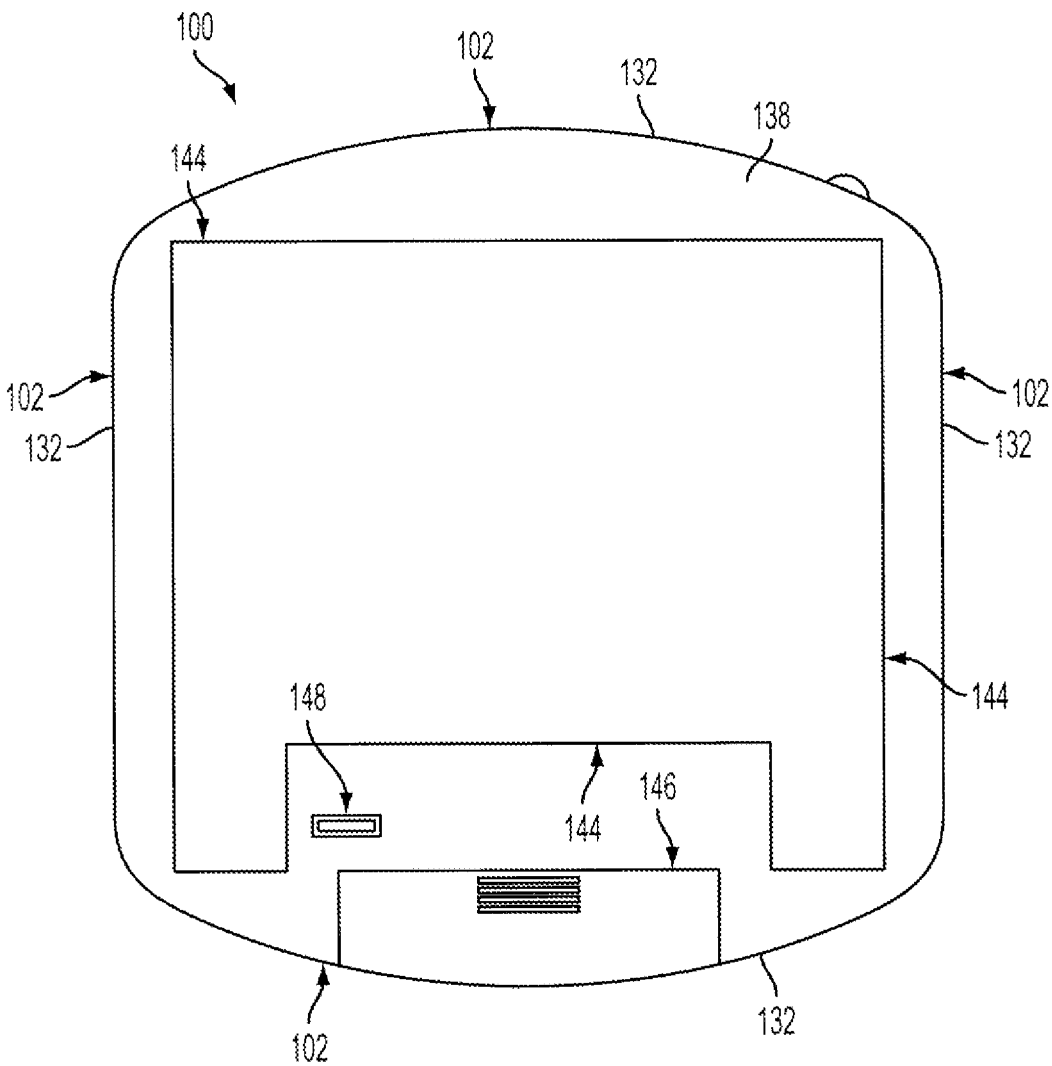
FIG. 9 is a rear elevation view of the magnetically-mountable electronic device of FIG. 6.
Figure 10:
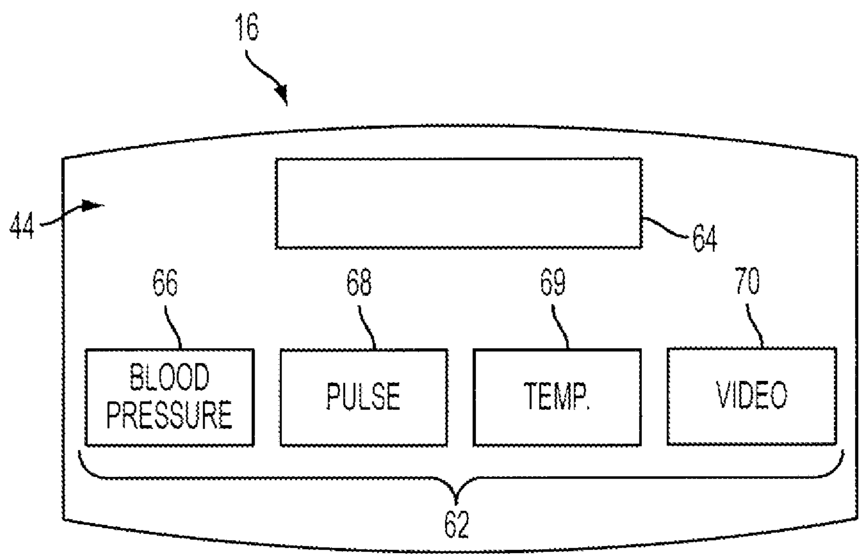
FIG. 10 is a top plan view of the input side of the input assembly in one embodiment.

In another example illustrated in FIG. 10, the input side 44 has supplementary buttons or input devices 62 and supplementary display device 64. The supplementary input devices 62 and supplementary display device 64 have functions related to the control of and monitoring of one or more medical devices in a health care facility, such as a hospital. In this example, the device 10 is hung on or otherwise secured to the wall of a hospital hallway or patient room. The device 10 is electronically coupled to one or more patient monitoring devices over an electronic health or hospital data network. In this embodiment, the electronic system 152 of the device 10 includes a plurality of medical-related software programs or computer code stored within ROM 162, described below with respect to FIG. 15. The functionality of the supplementary input devices 62, as determined by the electronic system 152, can have various patient monitoring functions. For example, by activating blood pressure button 66, the display device 14 or 64 indicates the blood pressure of a patient; by activating pulse button 68, the display device 14 or 64 displays a graph of the patient's pulse; by activating temperature button 69, the display device 14 or 64 indicates the temperature of a patient; and by activating video button 70, the display device 14 or 64 displays a live video of the patient.

It should be appreciated that, in other embodiments, the ROM 162 (described below) can store task-specific or industry-specific operating systems, applications and software suitable for use of the devices 10 and 100 in any suitable environment, including, but not limited, to health care facilities, factories, plants, restaurants, stores, retail enterprises, public facilities (such as airports, train stations, bus stations, road-side rest facilities and museums), police stations, prisons, military-related facilities, administrative buildings, municipal, state and federal buildings, court buildings, hotels, resorts, amusement parks, game rooms, stadiums and other facilities with a relatively high occupancy or flow of traffic. In each such case, the ROM 162 can store an operating system, software and programs which are specifically related to the purpose and function of such environments.

Figure 11:
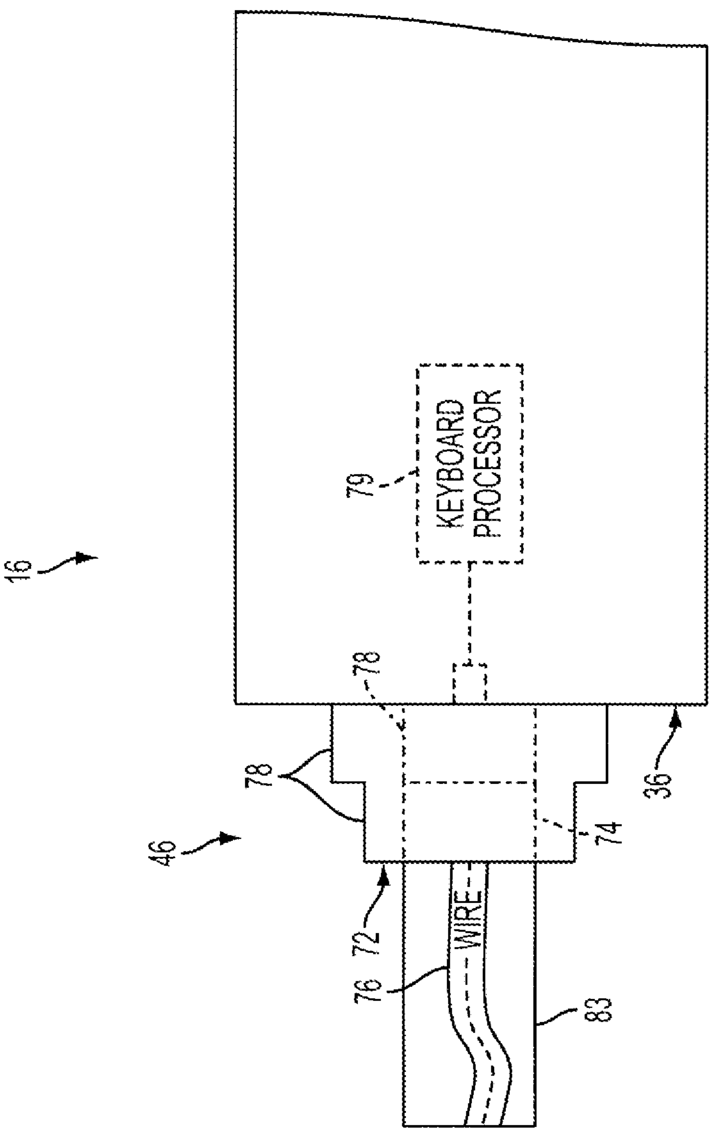
FIG. 11 is an enlarged side elevation view of one shaft of the input assembly in one embodiment.

As illustrated in FIG. 11, in one embodiment, at least one of the shafts 46 and 48 includes an electrical rotary connector 72 which electrically or electronically couples the input assembly 16 to the processor 154 of the electronic system 152. In the illustrated example, the rotary connector 72 is a suitable slip ring assembly which includes: (a) a rotatable conductive contact member or rotor 74 connected to an electrical or data cord, cable, wire or wire assembly 76 which, in turn, is coupled to the processor 154; (b) a conductive contact member 78 coupled to the keyboard processor 79; (c) a holder or housing 80 which holds the rotor 74 and contact member 78 in contact with each other; and (d) a shaft member 83 which houses or receives part of the wire 81. In one embodiment, the rotor 74 includes a conductive brush which is engaged with the contact member 78. In operation, as the input assembly 16 is rotated or spun, the rotor 74 rotates relative to the contact member 78. Because the rotor 74 is in contact with the contact member 78, electricity and electronic signals can travel between the rotor 74 and contact member 78 while the input assembly 16 is rotating through a suitable angle or spinning through an angle of three hundred and sixty degrees.

Figure 12:
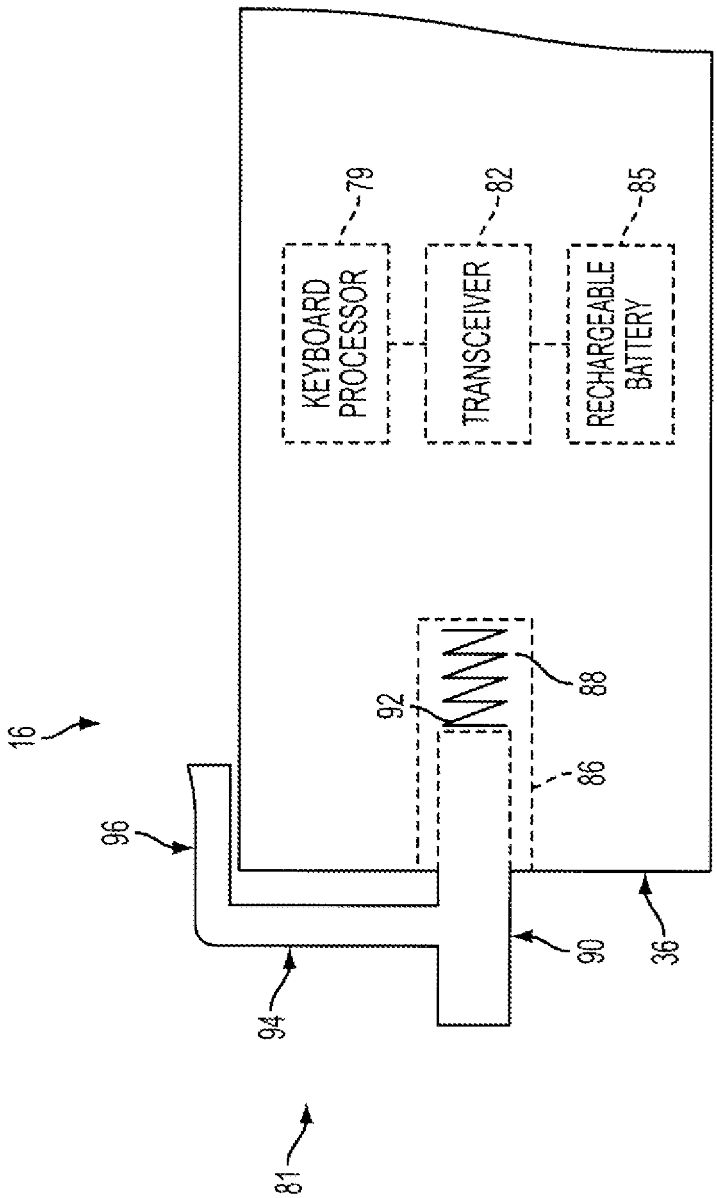
FIG. 12 is an enlarged side elevation view of the detachment assembly of the input assembly in one embodiment.

In another embodiment illustrated in FIG. 12, the input assembly 16 is detachable from the housing 10 or 100, in each case. Here, the input assembly 16 includes: (a) a detachment assembly 81; (b) a receiving and transmitting device or transceiver 82 which wirelessly couples the input assembly 16 to the processor 154 of the electronic device 10 or 100, in each case; and (c) a rechargeable battery 85. The detachment assembly 81 is described herein only with respect to the left end 36 of the input assembly 16 because, in one embodiment, the left end 36 and right end 37 of the input assembly 16 each have the same structure, components and detachment assembly 81. The detachment assembly 81 includes: (a) a cavity wall 86 defining a cavity 88; (b) a shaft member 90 movably positioned within the cavity 88; (c) a biasing member or spring 92 housed within the cavity 88; (d) an arm 94 connected to the shaft member 90; and (e) a hand or finger grip 96 connected to the arm 94.

Figure 13:
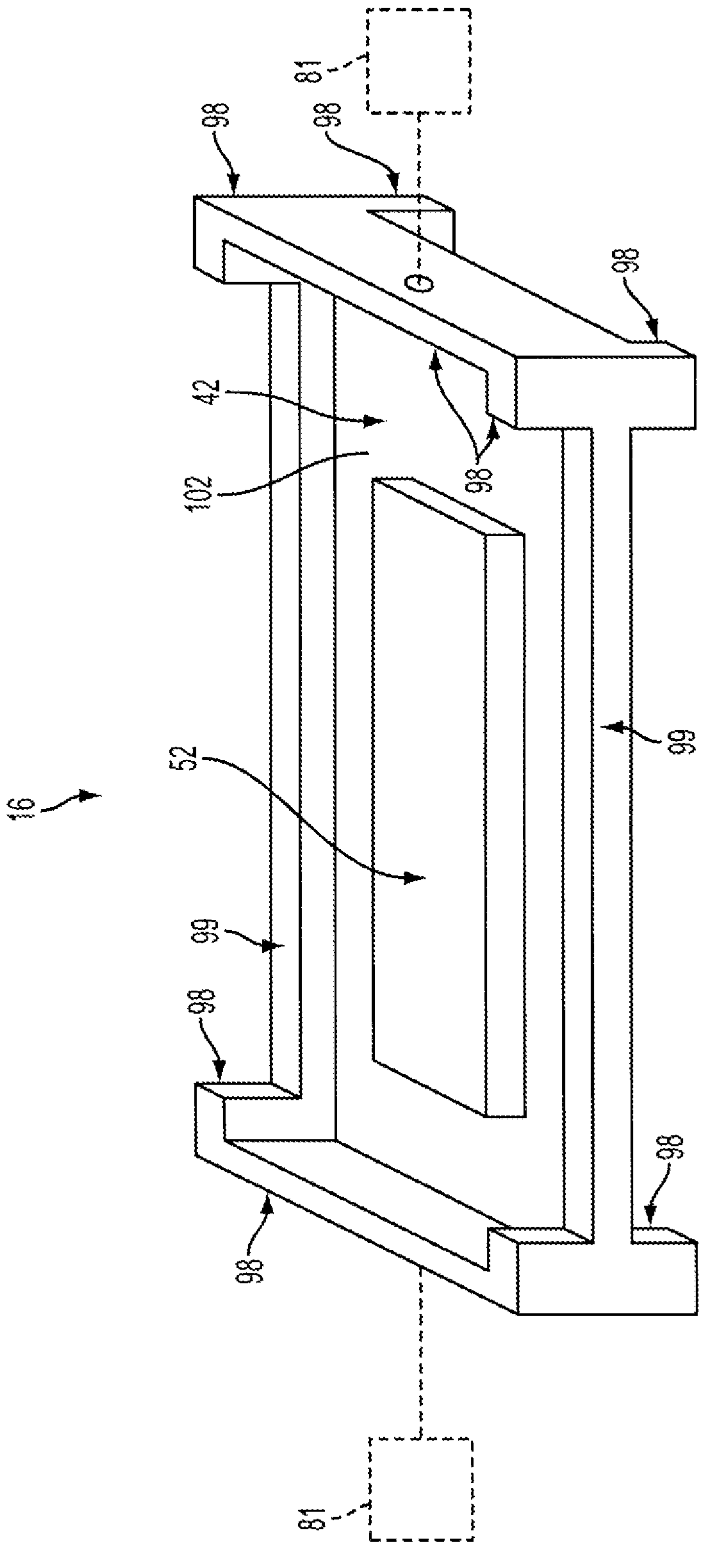
FIG. 13 is top perspective view of the data entry side of the detachable input assembly with guard walls in one embodiment.
Figure 14:
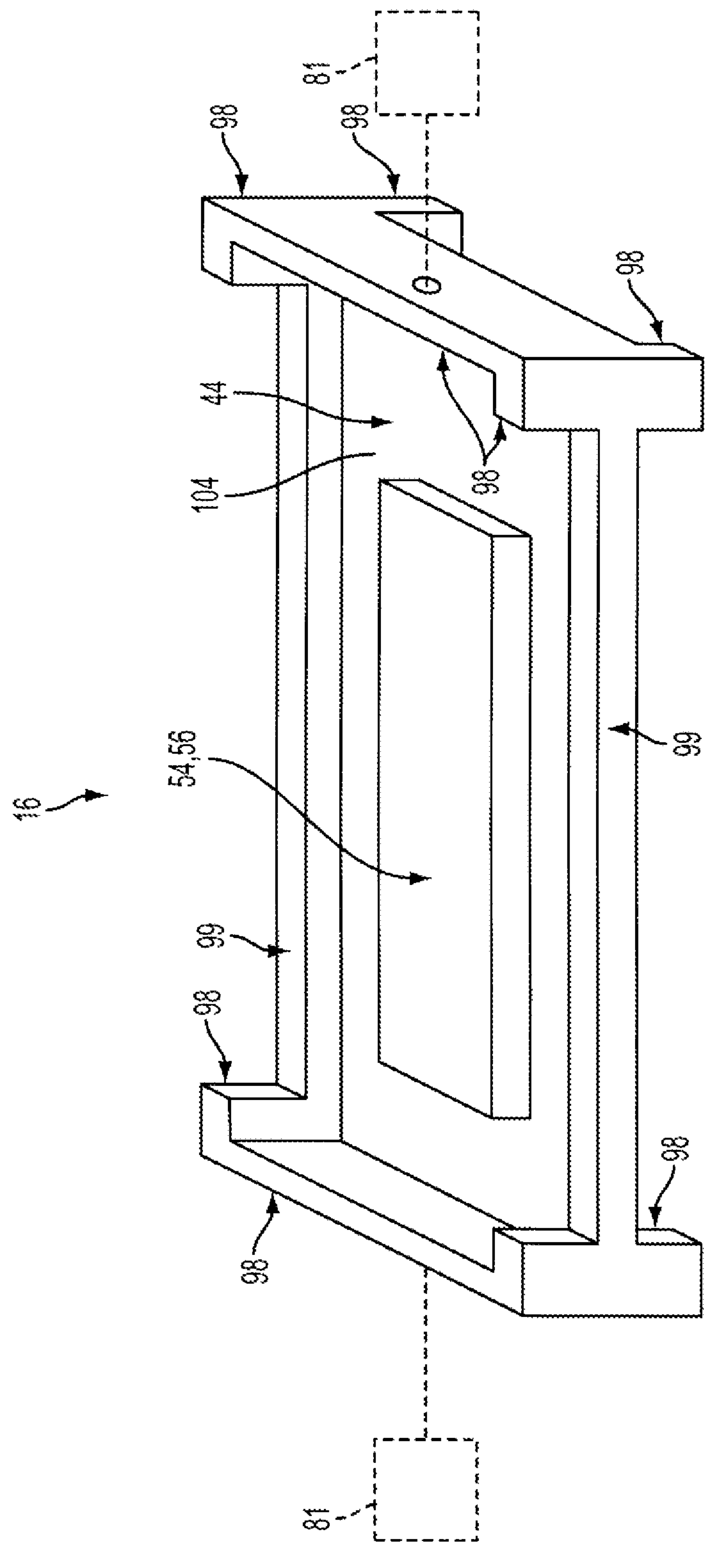
FIG. 14 is top perspective view of the input side of the detachable input assembly of FIG. 13.

In this embodiment, the data entry side 42 and the input side 44 each include one or more feet, guard members or guard walls 98, as illustrated in FIGS. 13 and 14. The guard walls 98 extend from the surfaces 102 and 104 of the data entry side 42 and input side 44, respectively. The guard wall 98 has a lowered wall 99 which extends a length equal to or greater than the area of the keys 58 and supplementary input device 54.

To detach the input assembly 16 in this embodiment, the user slides the grip 96 toward the center of the input assembly 16, causing the shafts 46 and 48 to disengage from the housing of the electronic device 10 or 100, in each case. The user then detaches and removes the entire input assembly 16 from the housing of the device 10 or 100, as the case may be. The user then places the input side 44 face down on a table or on the user's lap. The data entry side 42 is then facing upward. The user types and enters data using the keyboard 56 of the data entry side 42 while the guard walls 98 and 99 protect and guard the supplementary display device 56 and supplementary input devices 54 of the input side 44. When ready to use the input side 44, the user flips the input assembly 16 over and positions the input side 44 facing upward. In this position, the data entry side 42 can lie face down on a table or on the user's lap. The user operates the supplementary input device 54 while the guard walls 98 and 99 protect and guard the keys 58 of the keyboard 52.

In one embodiment, the electronic devices 10 and 100 each include: (a) at least one electric motor; (b) a drive assembly which couples the motor to the input assembly 16, enabling the motor to power the rotational movement of the input assembly 16; and (c) a damper or speed control device coupled to the input assembly 16. The speed control device produces a drag force on the input assembly 16, which provides the input assembly 16 with a relatively smooth and steady rate of rotational movement.

1.1. Wall Mount Housing

For the wall-mountable computer or electronic device 10 illustrated in FIGS. 1 through 5, the housing 12 has: (a) a perimeter wall 106 substantially lying in a single plane, providing the electronic device 10 with a relatively flat notebook-type configuration; (b) a front inner wall 108 defining a window, opening or input assembly space 110; (c) a rear side 112; and (d) a plurality of shaft supports 114 and 116. The input assembly space 110 provides an open area for the rotational movement of the input assembly 16. In one embodiment, the space 110 is a recess rather than an opening that passes entirely through the electronic device 10. In another embodiment, the space 110 is an opening that passes entirely through the electronic device 10. In either embodiment, the rear side 112 of the housing 12 has one or more hang mount devices 118. Each hang mount device 118 has a mount wall 120 that defines a mount opening 122 to receive a head or other portion of a fastener, such as the head of a screw. The rear side 112 also has a battery door or cover 124 and a battery cover release device 126. In one embodiment, the shaft supports 114 and 116 define shoulders or openings which receive or otherwise rotatably support shafts 46 and 48, respectively, of the input assembly 16.

In operation of one example, the user screws a plurality of mounting screws (not illustrated) into a room wall 11, such as a kitchen or hospital wall. The user then engages the hang mount devices 118 by inserting the heads of the screws into the mount openings 122. In doing so, the user mounts the electronic device 10 to the room wall 11. If the rechargeable battery unit 163 (described below with respect to FIG. 15) is charged, the user can operate the electronic device 10 at this point. Alternatively, the user can obtain power for the electronic device 10 (and charge the battery unit) by connecting the power cord 128 to a nearby electrical outlet 130. In either case, the user connects the electronic device 10 to the Internet using the built-in transceiver 34 or using a data cable (not show) connected to a data outlet.

In one embodiment, the electronic device 10 is a kiosk-type machine mounted to the wall of a public facility, such as an airport or train station. Here, the electronic device 10 includes a data card reader and a payment acceptor, such as a coin slot or bill receiver. The user can operate the device 10 for a designated amount of time after funding the device 10.

1.2 Magnetic Mount Housing

For the magnetic computer or electronic device 100 illustrated in FIGS. 6 through 9, the housing 102 has: (a) a perimeter wall 132 substantially lying in a single plane, providing the electronic device 100 with a relatively flat notebook-type configuration; (b) a front inner wall 134 defining a window, opening or input assembly space 136; (c) a rear side 138; and (d) a plurality of shaft supports 140 and 142. The input assembly space 136 provides an open area for the rotational movement of the input assembly 16. In one embodiment, the space 136 is a recess rather than an opening that passes entirely through the electronic device 100. In another embodiment, the space 136 is an opening that passes entirely through the electronic device 100. In either embodiment, the rear side 138 of the housing 102 has one or more magnets, magnetic layers or magnetic members, such as the substantially flat magnet 144. The magnet 144 is integrated with or fastened to the surface of the rear side 132. In one embodiment, the magnet 144 is adhered to the surface of the rear side 132 using a suitable adhesive. The rear side 132 also has a battery door or cover 146 and a battery cover release device 148. In one embodiment, the shaft supports 140 and 142 define shoulders or openings which receive or otherwise rotatably support shafts 46 and 48, respectively, of the input assembly 16.

In operation of one example, the user removably attaches and mounts the magnetic electronic device 100 to a metallic surface, such as a refrigerator 101, by bringing the rear side 138 into contact with the metallic door 150 of the refrigerator 101. If the rechargeable battery unit 163 (described below with respect to FIG. 15) is charged, the user can operate the electronic device 100 at this point. Alternatively, the user can obtain power for the electronic device 10 (and charge the battery unit) by connecting a power cord (not illustrated) of the electronic device 100 to a nearby electrical outlet or to a refrigerator electrical source. In either case, the user can connect the electronic device 100 to the Internet using the built-in transceiver 34 or using a data cable (not show) connected to a data outlet.

1.3 Electronic System

Figure 15:
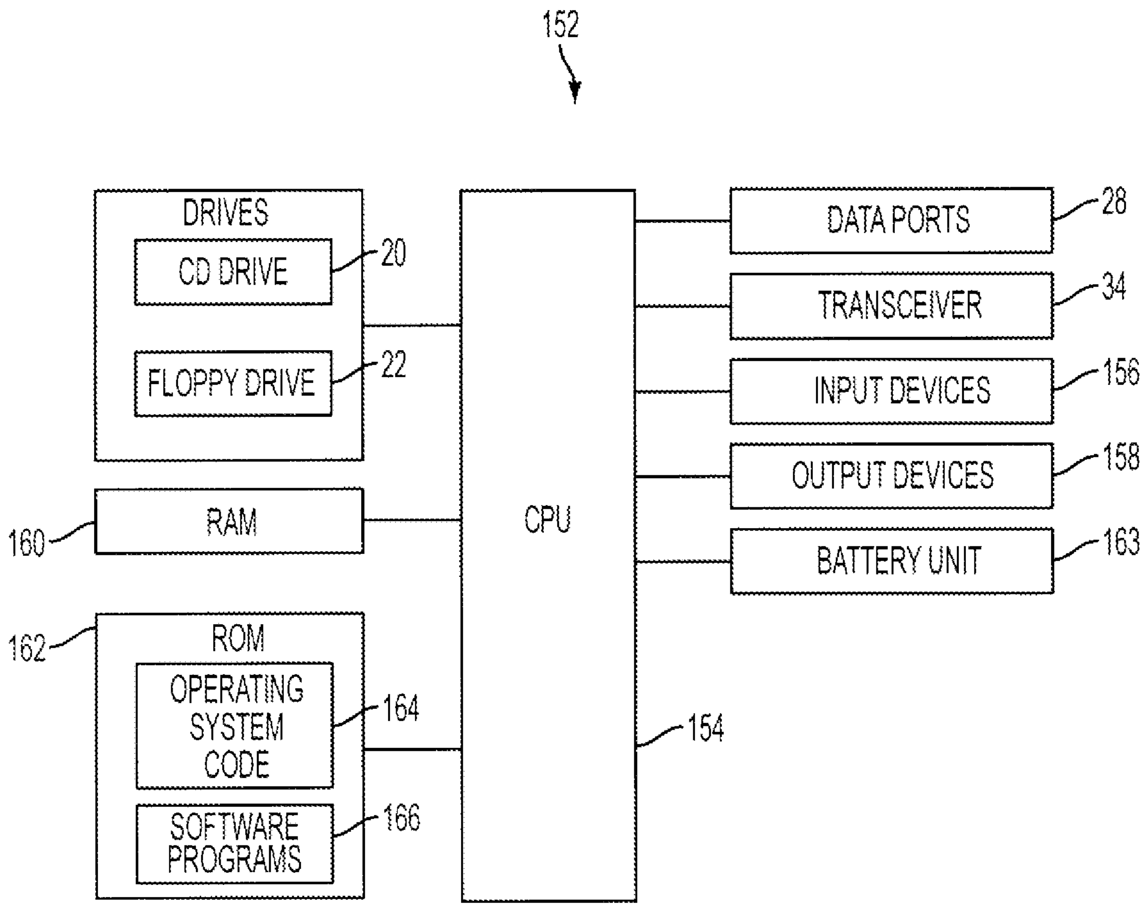
FIG. 15 is a schematic block diagram illustrating the electronic configuration or electronic system in one embodiment.

In one embodiment, the computers or devices 10 and 100 each have the computer system or electronic system 152 illustrated in FIG. 15. The electronic system 152 includes: (a) a central processing unit or processor 154 which is electronically coupled to the CD drive 20, floppy device 22, data ports 28, transceiver 34, input devices 156 and output device 158; (b) Random Access Memory (RAM) 160 electronically coupled to the processor 154; (c) Read Only Memory (ROM) 162 electronically coupled to the processor 154; and (d) a rechargeable battery unit 163 operatively coupled to the processor 154. The input devices 156 include the input assembly 16, power button 24 and control buttons 30. The output devices 158 include the display device 14, supplementary display device 56, status indicators 26 and speakers 32.

The ROM 162 includes computer-readable instructions which determine the operational activities of the processor 154. In one embodiment, the ROM 162 includes operating system code 164 associated with a suitable operating system. The ROM 162 also includes a plurality of software programs 166 usable by the processor 154 to run various applications, such as word processing applications, Internet browser applications, finance applications, business applications and entertainment applications.

2. In-Console Electronic Device

Figure 16:
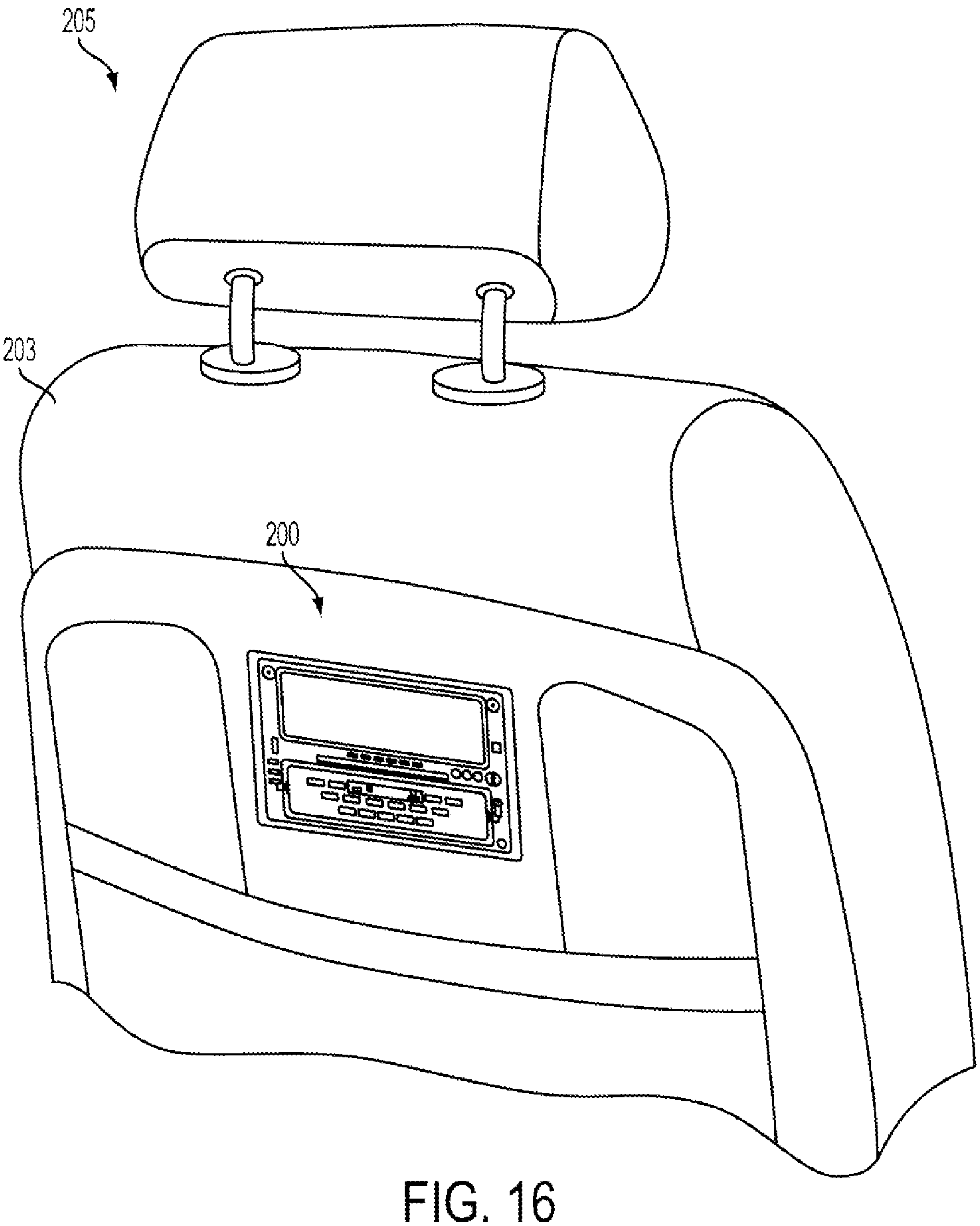
FIG. 16 is a perspective view of the in-console electronic device mounted within a vehicle seat in one embodiment.
Figure 17:
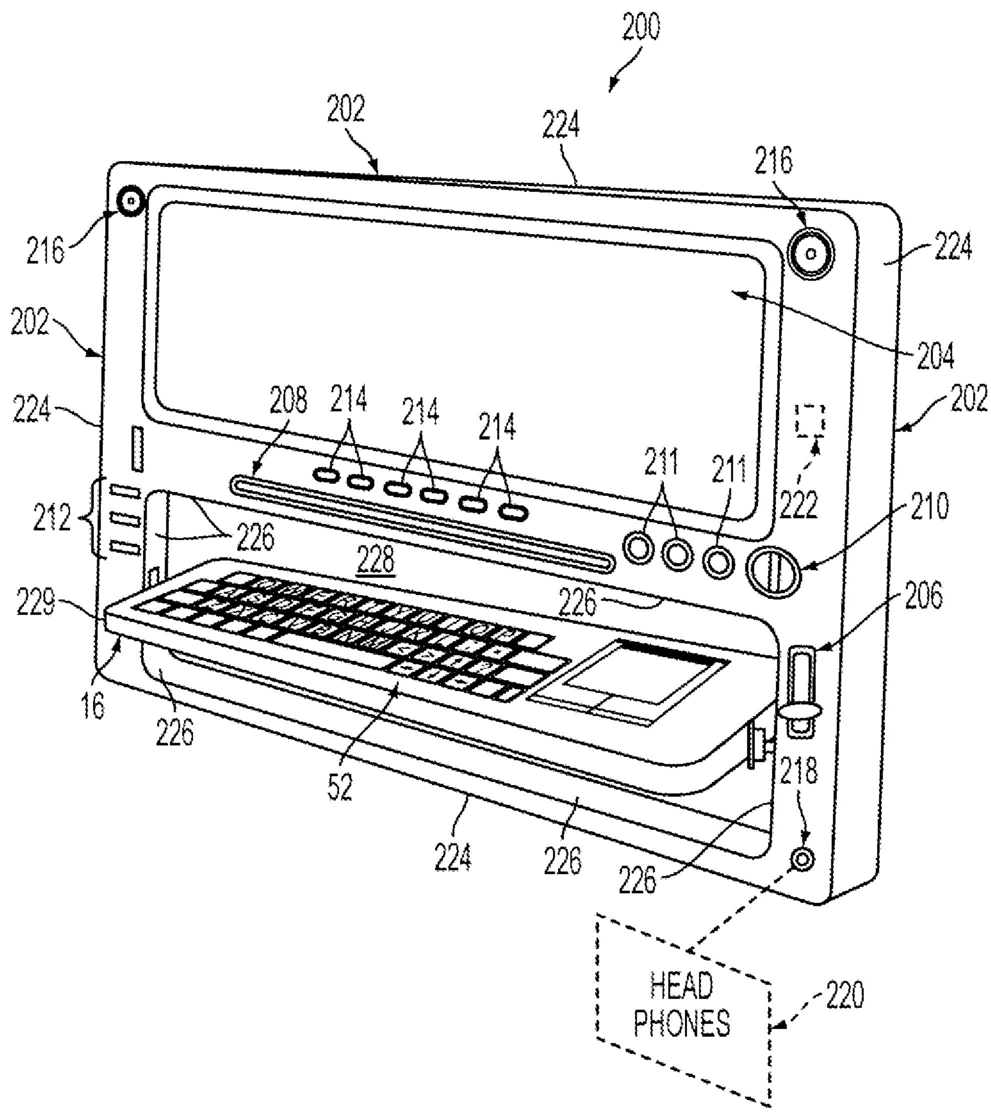
FIG. 17 is a front perspective view of the in-console electronic device of FIG. 16.
Figure 18:
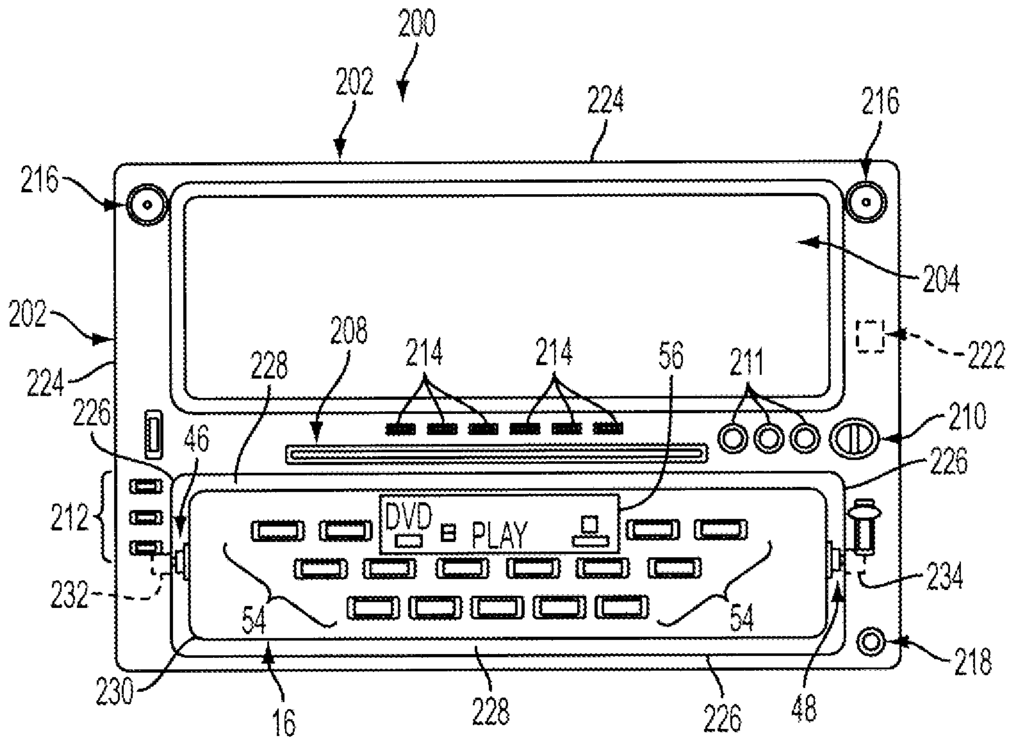
FIG. 18 is a front elevation view of the in-console electronic device of FIG. 16, illustrating the input side of the input assembly.
Figure 19:
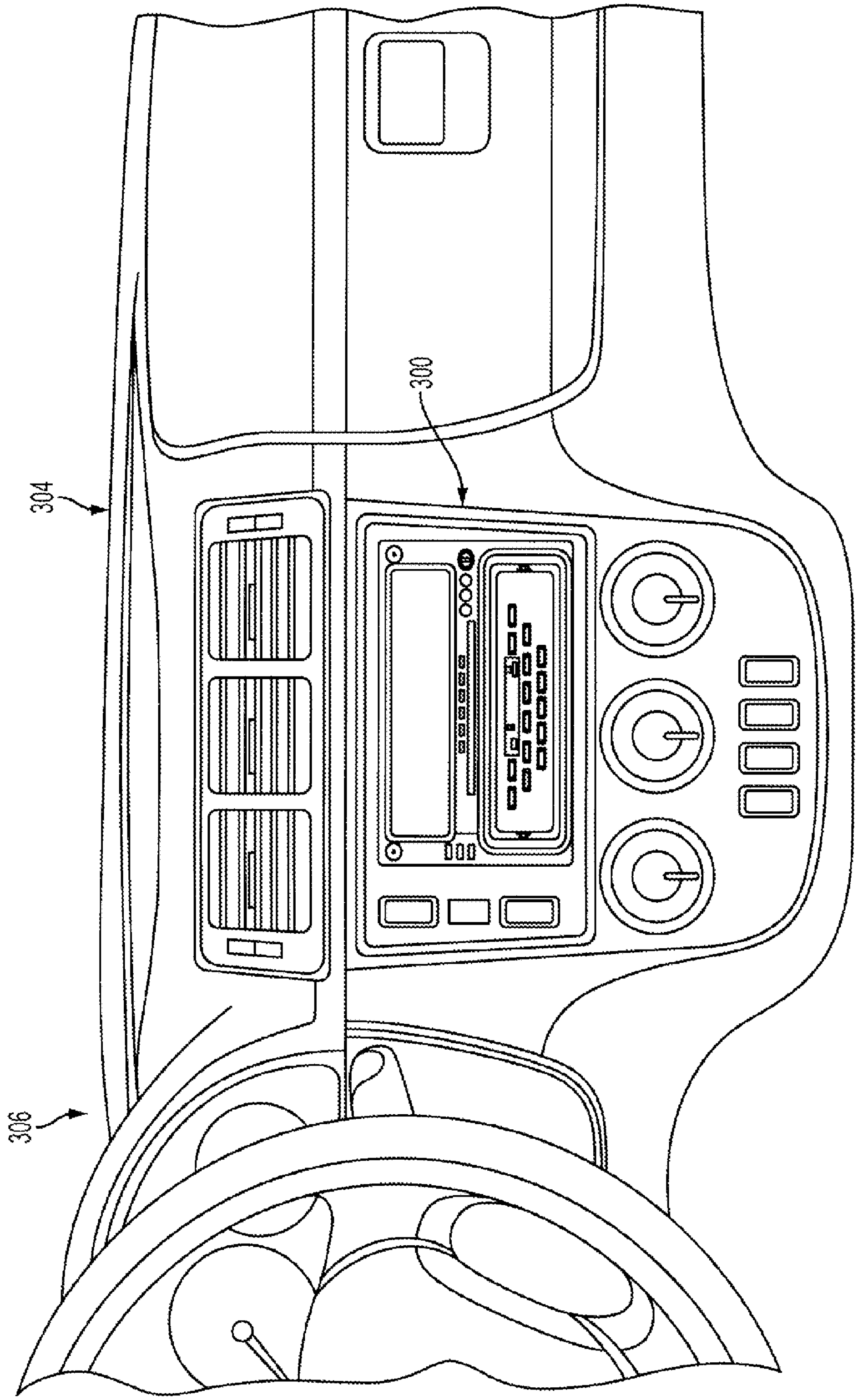
FIG. 19 is a front perspective view of the in-vehicle electronic device mounted within a dashboard of a vehicle in one embodiment.
Figure 20:
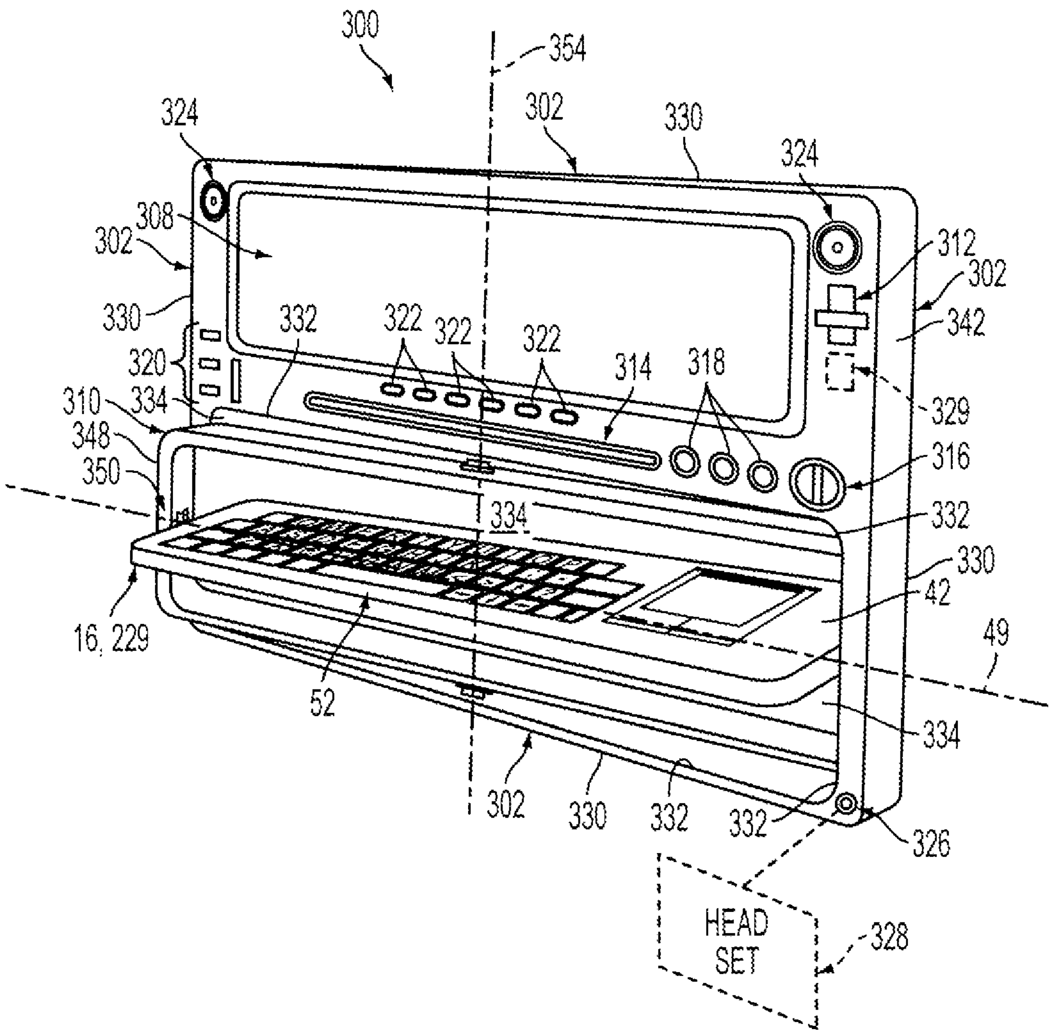
FIG. 20 is a front perspective view of the in-vehicle electronic device of FIG. 19, illustrating the multi-axis rotational functionality of the input assembly.
Figure 21:
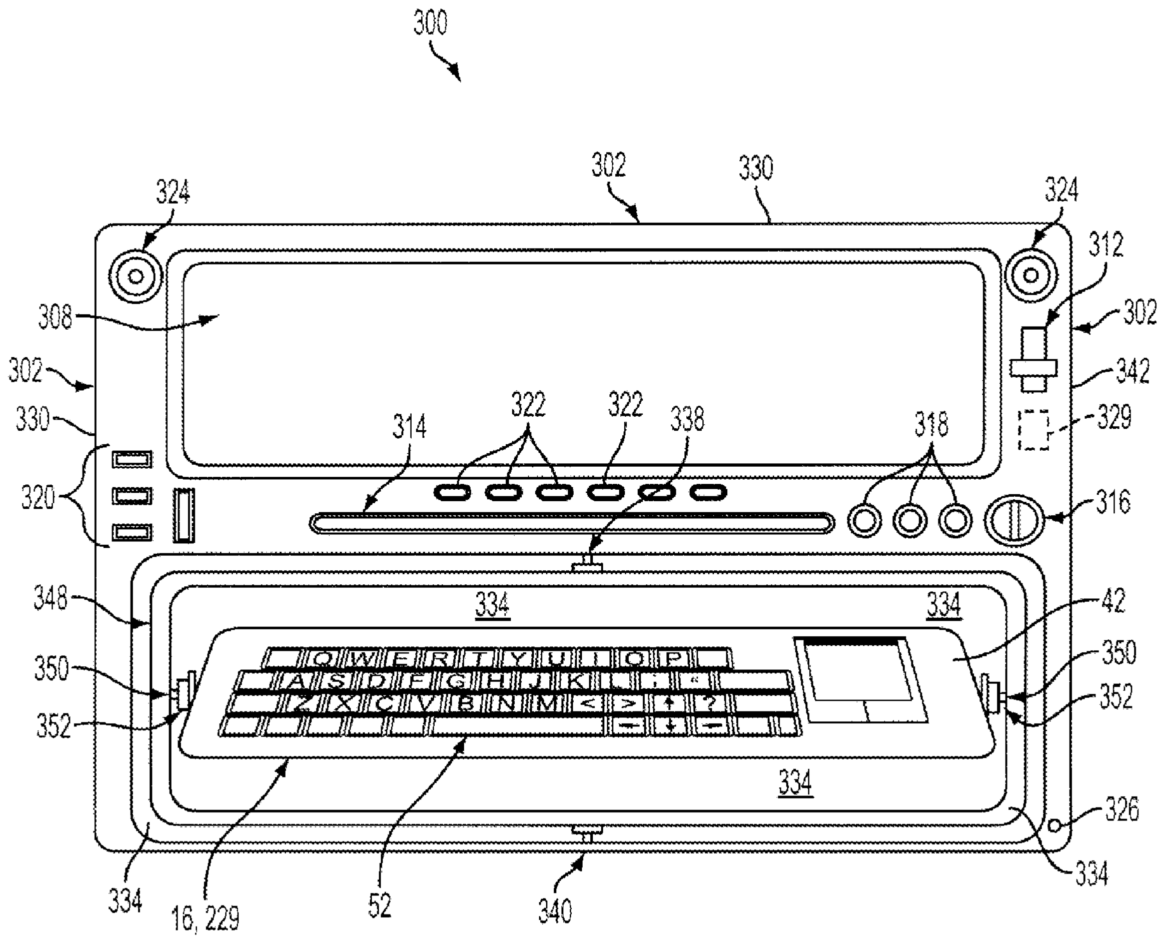
FIG. 21 is a front elevation view of the in-vehicle electronic device of FIG. 19, illustrating the data entry side of the input assembly.
Figure 22:
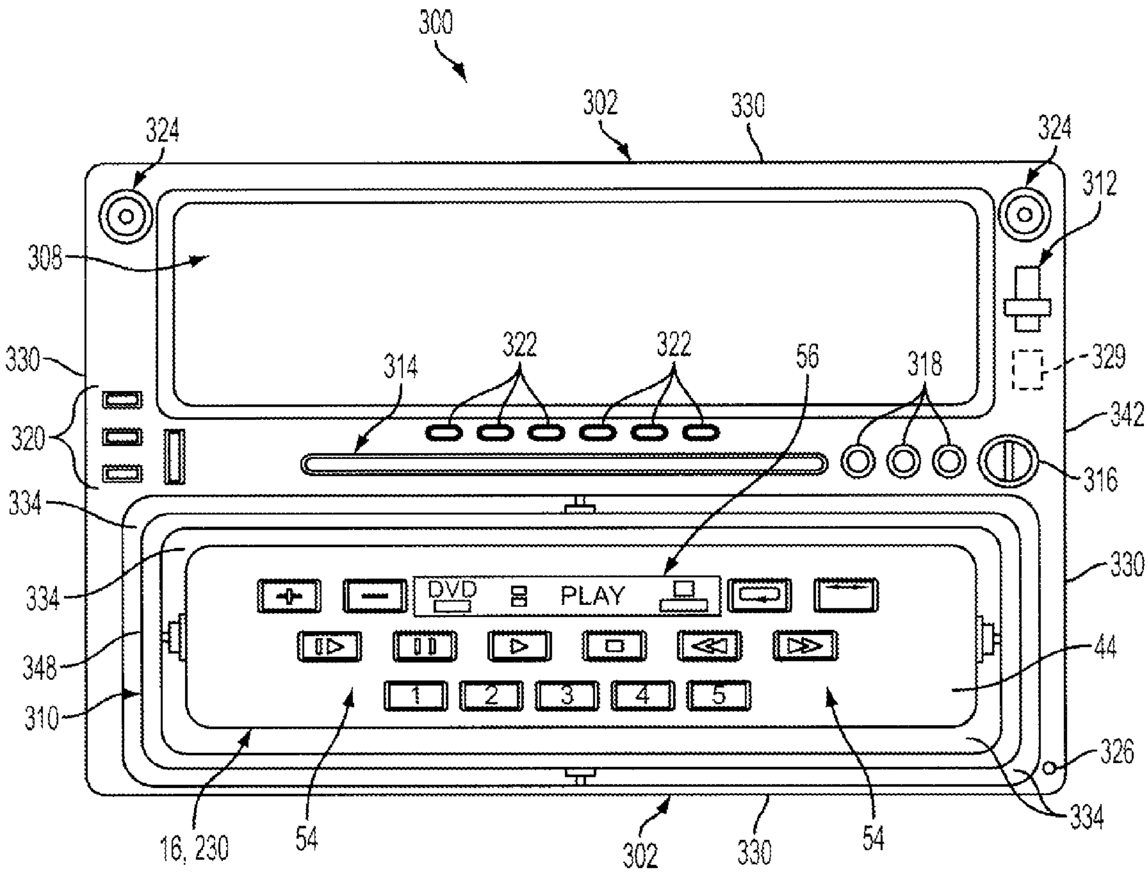
FIG. 22 is a front elevation view of the in-vehicle electronic device of FIG. 19, illustrating the input side of the input assembly.

Referring to FIG. 16 through 18, the in-console computer or electronic device 200, in one embodiment, includes: (a) a chassis or housing 202 mounted, in the illustrated example, within the backside 203 of a vehicle seat 205; (b) a monitor, screen or display device 204 supported by the housing 202, such as the substantially flat Liquid Crystal Diode (LCD) screen illustrated in the figures; (c) the input assembly 16 (described above) rotatably coupled to the housing 202; (d) a position control device 206 operatively coupled to the input assembly 16; (e) a compact disk drive 208; (f) a power button 210 and a plurality of different status indicators 211, such as Light Emitting Diodes (LEDs), operable to visually indicate the status of various operational parameters of the electronic device 200; (f) a plurality of data exchange devices or data ports 212 operable to couple external devices (such as flash memory sticks or removably data storage devices, printers, scanners and Personal Digital Assistants (PDAs)) to the electronic device 200 through use of a data cable, cord or connector; (g) a plurality of control buttons 214 operable to provide inputs for controlling settings for the display device 204 and performance settings for the electronic device 200; (h) a plurality of sound output devices or speakers 216 operable to output music and other sounds; (i) at least one phone or headset audio output port 218 which enables a user to connect speakers or head phones 220 to the electronic device 200; and (j) a signal receiving and transmitting device 222, such as a radio frequency (RF) transceiver, which wirelessly couples the processor 154 of the electronic system 152 to a data network, such as the Internet.

The housing 202 houses or otherwise supports suitable circuitry components, hardware and software, such as the electronic system 152 described above with respect to FIG. 15. The housing 202 has: (a) a perimeter wall 224 substantially lying in a single plane, providing the electronic device 200 with a relatively flat configuration; (b) a front inner wall 226 defining a window, opening or input assembly space 228; (c) a rear side 230; and (d) a plurality of shaft supports 232 and 234. The perimeter wall 224 has a console or seat engagement surface 226 which engages an inner portion of the seat 205. The input assembly space 228 provides an open area for the rotational movement of the input assembly 16. In one embodiment, the space 228 is a recess rather than an opening that passes entirely through the electronic device 200. In another embodiment, the space 228 is an opening that passes entirely through the electronic device 200. In either embodiment, the rear side of the housing 102 has one or more mount devices (not illustrated) which are operable to mount the housing 202 within a console or structure, such as the vehicle seat 205. In one embodiment, at least one of these mount devices includes a mount bracket or mount plate which defines a plurality of mount holes (not illustrated). The mount plate can be attached to the inner portion of the seat 205 with fasteners, bolts or screws that extend through the mount holes. This mount device also includes a coupling member which secures the housing 202 to the mount plate through a slidable, press-fit, rotary or fastener connection.

In one embodiment, the rear side (not illustrated) defines one or more wire holes or wire openings which enable electrical cords, wires or data cables to extend from the inside of the housing 202 to an electrical or computer system reachable within the seat 205. In another embodiment, the housing 202 includes a plurality of electrical or electronic contact devices, such as electrical harnesses, connected to the rear side 230. These contact devices are configured to removably mate with electrical or electronic contact devices or harnesses located within the seat 205. In one embodiment, the shaft supports 232 and 234 define shoulders or openings which receive or otherwise rotatably support shafts 46 and 48, respectively, of the input assembly 16. In one embodiment, the in-console electronic device 200 has the electronic system 152 having the audio output port 218 coupled to the processor 154.

In operation of one example, for each of the devices 10, 100, and 200, the user can operate the keyboard 52 for data entry purposes. The user can use the keyboard 52 to perform any personal computer activity or task, such as writing a letter, balancing a checkbook, composing and sending an email, paying bills online or surfing the World Wide Web portion of the Internet. To use the keyboard 52, the user unlocks the input assembly 16 using the position control device 18. Next, the user rotates the input assembly 16 from one position 229 to another position 230 where the keyboard 52 can be operated. In each of the positions 229 and 230, the input assembly 16 is parallel to or substantially parallel to the screen of the display device. The user can rotatably adjust the input assembly 16 until reaching a typing angle which is comfortable and ergonomically suitable to the user. When finished typing, the user can rotate the input assembly 16 back to the position 229 where the input side 44 faces outward. At this point, the user an perform a variety of functions by monitoring the supplementary display device 56 and activating the supplementary input devices or supplementary input devices 54, as described above. In one embodiment, the input assembly 16 is rotatable or spinnable in a drum-like fashion through three-hundred sixty degrees.

3. In-Vehicle Electronic Device

Referring to FIG. 19 through 23, the in-vehicle computer or electronic device 300, in one embodiment, includes: (a) a chassis or housing 302 mounted, in the illustrated example, within the dashboard 304 of a vehicle 306; (b) a monitor, screen or display device 308 supported by the housing 302, such as the substantially flat Liquid Crystal Diode (LCD) screen illustrated in the figures; (c) the input assembly 16 described above; (d) an input assembly holder 310 rotatably coupled to the housing 302; (e) a position control device 312 operatively coupled to the input assembly 16; (f) a compact disk drive 314; (g) a power button 316 and a plurality of different status indicators 318, such as Light Emitting Diodes (LEDs), operable to visually indicate the status of various operational parameters of the electronic device 300; (h) a plurality of data exchange devices or data ports 320 operable to couple external devices (such as flash memory sticks or removably data storage devices, printers, scanners and Personal Digital Assistants (PDAs)) to the electronic device 300 through use of a data cable, cord or connector; (i) a plurality of control buttons 322 operable to provide inputs for controlling settings for the display device 308 and performance settings for the electronic device 300; (j) a plurality of sound output devices or speakers 324 operable to output music and other sounds; (k) at least one phone or headset audio output port 326 which enables a user to connect an audio input-output headset 328 (such as a microphone and ear speaker assembly) to the electronic device 300; (l) a signal receiving and transmitting device (not illustrated), such as a radio frequency (RF) transceiver, which wirelessly couples the processor of the electronic system 152 to a data network, such as the Internet; and (m) computer programmed safety module or an electronic safety device 329 which operatively couples the electronic device 300 to the vehicle ignition or a designated vehicle drive mode, thereby causing the electronic device 300 or the input assembly 16 to be in off mode or inoperable when the vehicle 306 is on or in a designated mode of operation. In one embodiment, this safety device 329 causes the electronic device 200 to shut down when the user pivots the input assembly 16 toward the driver's seat while the vehicle 306 is in a designated mode of operation.

Figure 23:
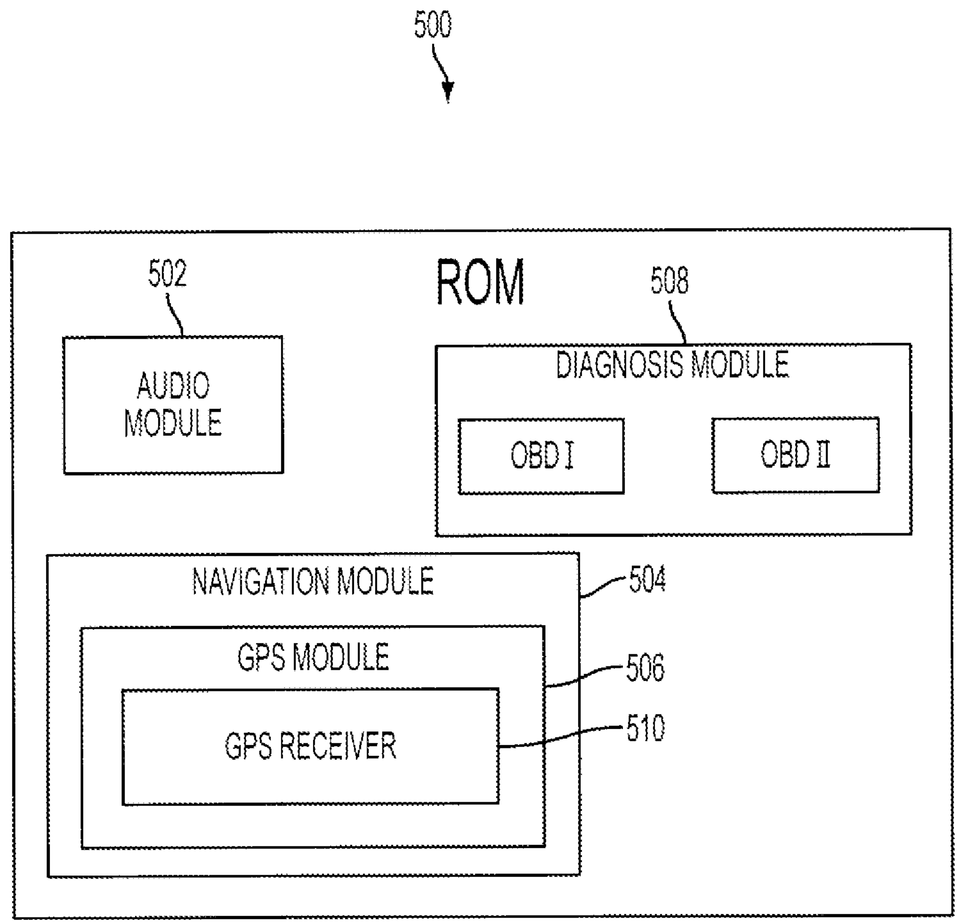
FIG. 23 is a schematic block diagram of the Read Only Memory (ROM) of the electronic device of FIG. 19 in one embodiment.

The housing 302 houses or otherwise supports suitable circuitry components, hardware and software, such as the electronic system 152 except that the ROM 162 is replaced with ROM 500 illustrated in FIG. 23. ROM 500 includes a plurality of vehicle-related software programs or computer code, including, without limitation: (a) vehicle or car audio code or module 502 which directs the processor 152 to control the audio system of the vehicle 306; (b) navigation code or navigation module 504 which includes global positioning satellite (GPS) code or a GPS module 506; and (c) car or vehicle diagnosis code or diagnosis module 508 enabling technicians to diagnosis and trouble shoot problems with the vehicle 306 through use of the electronic device 300.

The GPS module 506 includes a GPS receiver 510. The GPS receiver 510 has an antenna (not illustrated) to receive signals from a satellite network and obtain the longitude, latitude and altitude of the vehicle 306. The processor 154 causes the display device 308 to display a graphical map. The map is usable to provide positioning and navigational functions for the vehicle 306.

The diagnosis module 506 includes an on-board diagnostics (OBD) module 508, such as OBD I and OBD II of the U.S., for analyzing performance of the vehicle's engine, transmission, fuel system and other components. In one embodiment, the electronic device 300 is programmed to enable technicians, drivers and other users to diagnose the vehicle 306 using the input assembly 16 and display device 308.

Referring back to FIGS. 20 through 22, the housing 302 of the electronic device 300 has: (a) a perimeter wall 330 substantially lying in a single plane, providing the electronic device 330 with a relatively flat configuration; (b) a front inner wall 332 defining a window, opening or input assembly space 334; (c) a rear side (not illustrated); and (d) a plurality of shaft supports 338 and 340. The perimeter wall 330 has a console or dashboard engagement surface 342 which engages an inner portion of the dashboard 304. The input assembly space 334 provides an open area for the rotational movement of the input assembly holder 310. In one embodiment, the space 334 is a recess rather than an opening that passes entirely through the electronic device 300. In another embodiment, the space 334 is an opening that passes entirely through the electronic device 300.

In either embodiment, the rear side of the housing 302 has one or more mount devices (not illustrated) which are operable to mount the housing 302 within the dashboard 304 of the vehicle 306. In one embodiment, at least one of these mount devices includes a mount bracket or mount plate which defines a plurality of mount holes (not illustrated). The mount plate can be attached to the inner portion of the dashboard 304 with fasteners, bolts or screws that extend through the mount holes. This mount device also includes a coupling member which secures the housing 302 to the mount plate through a slidable, press-fit, rotary or fastener connection.

In one embodiment, the rear side defines one or more wire holes or wire openings which enable electrical cords, wires or data cables to extend from the inside of the housing 302 to an electrical or computer system reachable within the dashboard 304. In another embodiment, the housing 302 includes a plurality of electrical or electronic contact devices, such as electrical harnesses, connected to the rear side 336. These contact devices are configured to removably mate with electrical or electronic contact devices or harnesses located within the dashboard 304. In one embodiment, the shaft supports 338 and 340 define shoulders or openings which receive or otherwise rotatably support shafts 344 and 346, respectively, of the input assembly holder 310.

The input assembly holder 310 includes: (a) a support or frame 348 sized to surround the input assembly 16; (b) a plurality of side coupler supports of shaft supports 350 which rotatably couple the input assembly 16 to the frame 348; (c) and a plurality of couplers or shafts 352 which pivotably or rotatably couple the frame 348 to the inner wall 332 of the housing 302. In operation, the input assembly 16 is rotatable about a horizontal axis 49 through a designated angle or through three hundred sixty degrees. In addition, the input assembly holder 310 is pivotable or rotatable about vertical axis 354 which intersects with and, in the illustrated embodiment, is perpendicular to the axis 49. The input assembly holder 310 is pivotable or rotatable about the vertical axis 354 through a designated angle or through three hundred sixty degrees. In the illustrated embodiment, the driver can pivot the input assembly 16 (about vertical axis 354) toward his/her seat, and then the driver can rotate the input assembly 16 (about the horizontal axis 49) to a desired position for typing on the keyboard 52 or using the supplementary control input devices 54. Likewise, the front seat passenger can pivot the input assembly 16 (about vertical axis 354) toward his/her seat, and then the front seat passenger can rotate the input assembly 16 (about axis 49) to a desired position for typing on the keyboard 52 or using the supplementary control input devices 54. As such, the input assembly holder 310 provides the input assembly 16 with at least two degrees of pivotal or rotational freedom—side to side rotational freedom and upward/downward rotational freedom.

4. Electronic Notebook

Figure 24:
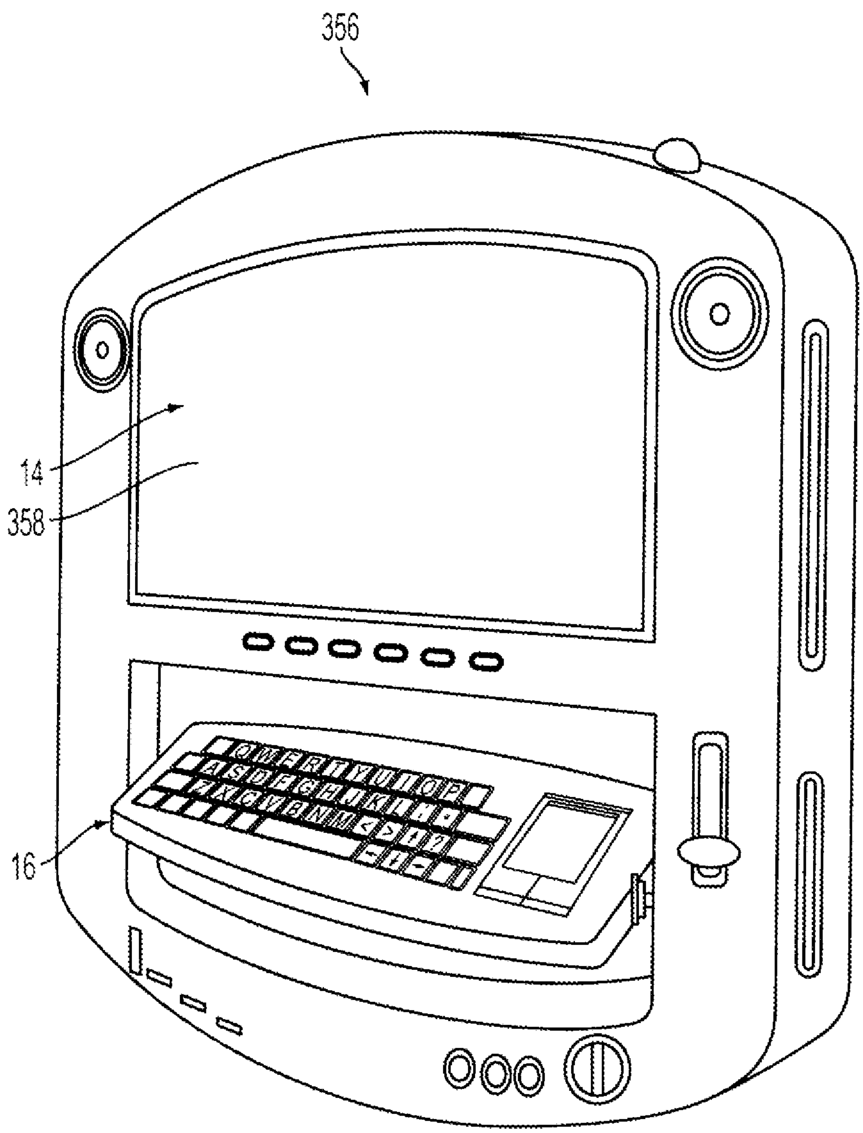
FIG. 24 is a front perspective view of the electronic notebook in one embodiment.

Referring to FIG. 24, the computer notebook or electronic notebook 356, in one embodiment, includes the structure, components and functionality of the electronic device 100 except the electronic notebook: (a) does not include the magnetic member 144; and (b) includes a touch screen module or device 358 within the display device 14. As such, the electronic notebook 356 is a portable and mobile personal computer with a substantially integral and flat configuration. While supporting the notebook 356 on a table or other support surface, the user can use the input device 16 to enter data or make other inputs. Optionally, the user can use the display device 14 to enter data and provide inputs to the notebook 356.

5. Hand-Held Mobile Devices 5.1 Phone/PDA Module

Referring to FIGS. 25 through 32, the mobile phone, PDA or communication device 600, in one embodiment, includes: (a) a chassis or housing 602; (b) a display device 604, such as an LCD screen, supported by the housing 602; (c) a touch actuation device (not illustrated) coupled to the display device 604; (d) the input assembly 16 having a size suitable for being positioned within the space 605 defined by the inner wall 606 of the housing 602; (e) an audio input device or microphone 608; (f) an ear audio output device or ear speaker 610; (g) an audio output device or loud speaker 612; (h) an audio input/output jack or audio port 614 connectable to a headset wire or cord; (i) data port 613; (j) a light source (not illustrated) coupled to the input assembly 16 and operable to illuminate the input assembly 16; (k) a receiving and transmitting device or transceiver which wirelessly couples the communication device 600 to a data network, enabling the communication device 600 to wirelessly exchange communication signals and data with other devices operating on such network; (l) a removable rechargeable battery which is operable to power the communication device 600; (m) a processor and memory device coupled to the processor; and (n) a communication and data processing module or code stored by the memory device.

Figure 25:
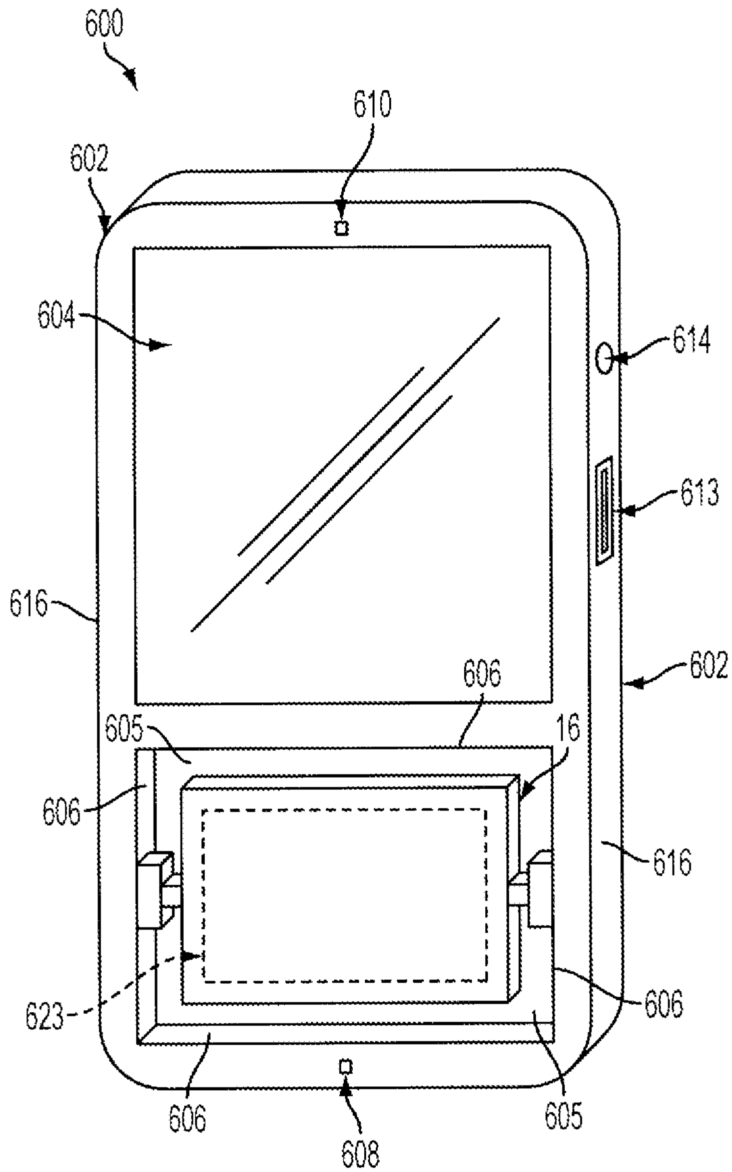
FIG. 25 is a front perspective view of the communication device in one embodiment.
Figure 26:
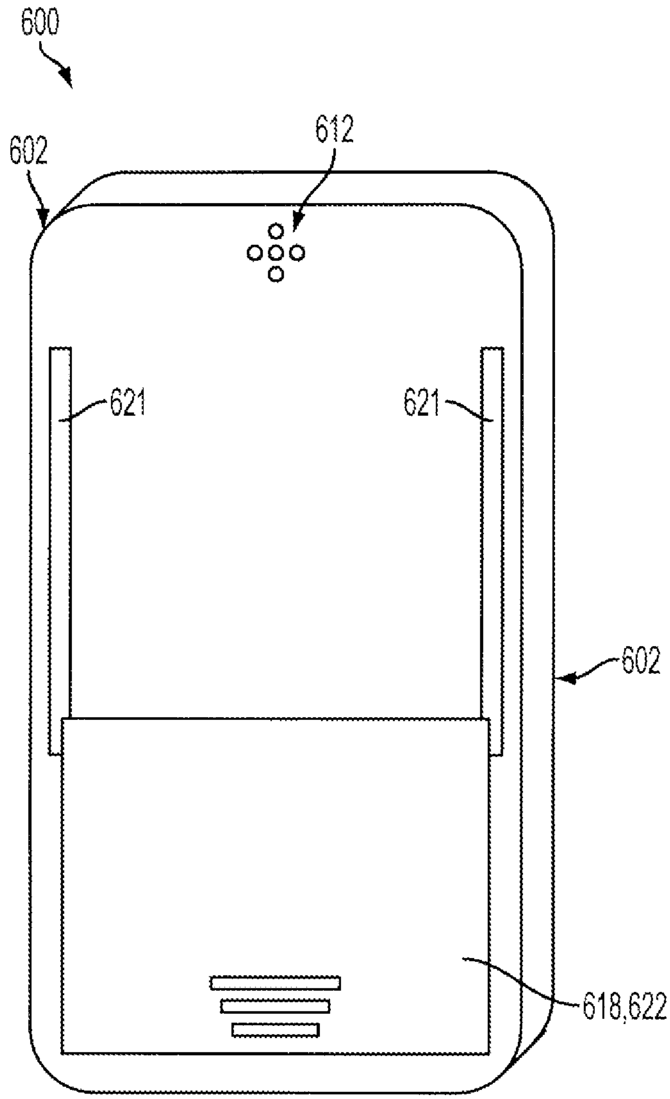
FIG. 26 is a rear perspective view of the communication device of FIG. 25, illustrating the rear cover in a closed position.
Figure 27:
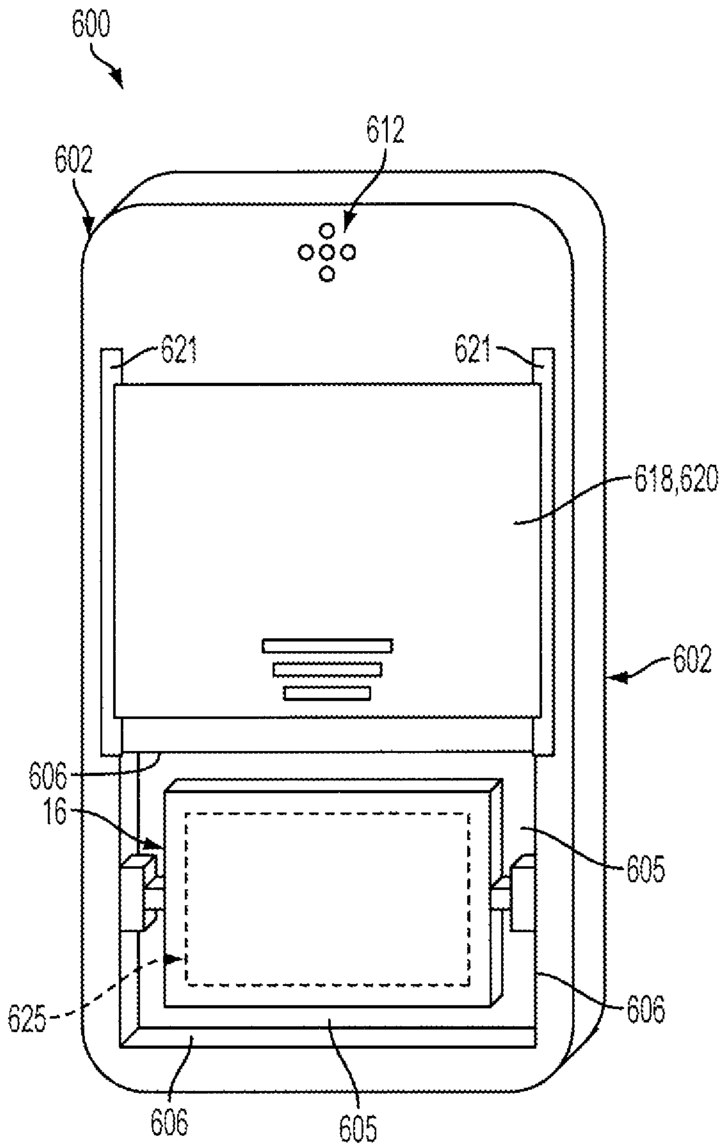
FIG. 27 is a rear perspective view of the communication device of FIG. 25, illustrating the rear cover in an open position.
Figure 28:
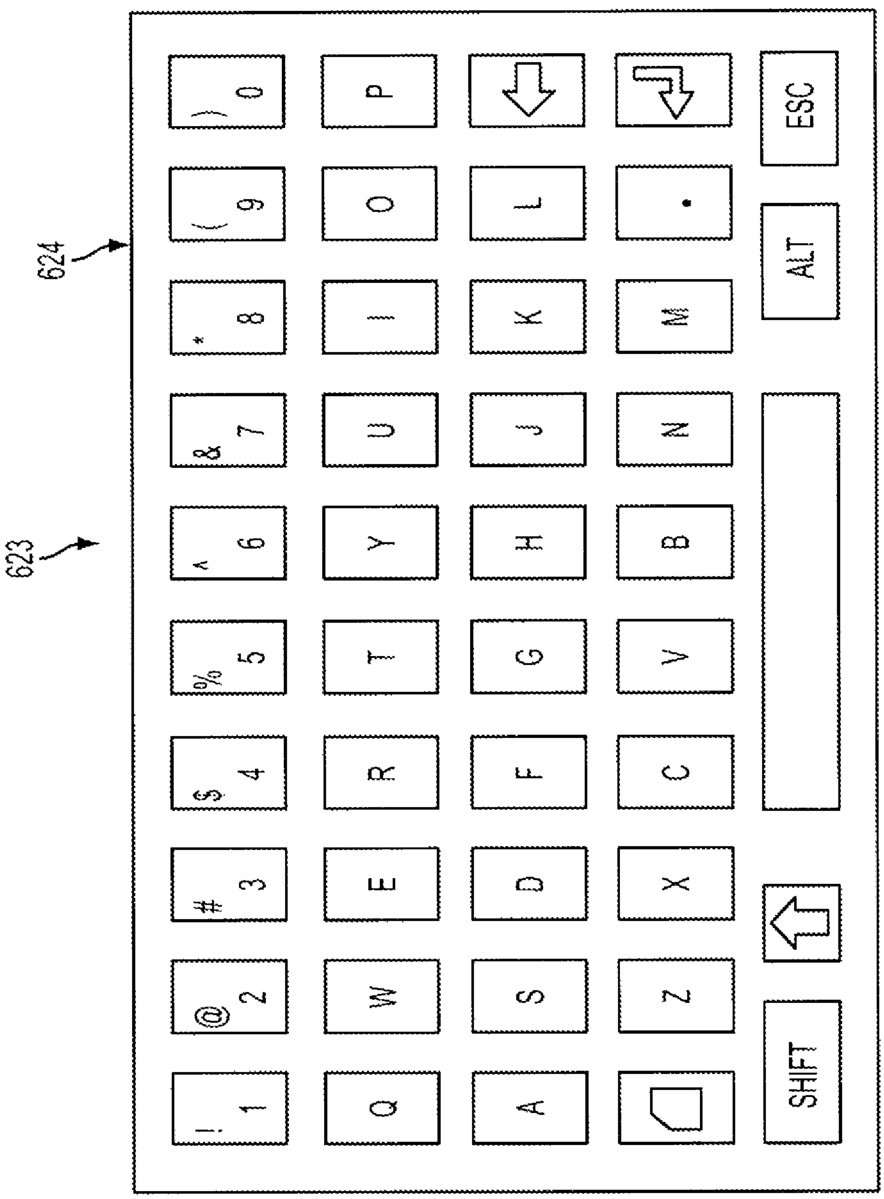
FIG. 28 is a top plan view of the data entry side of the communication device of FIG. 25 in one embodiment.
Figure 29:
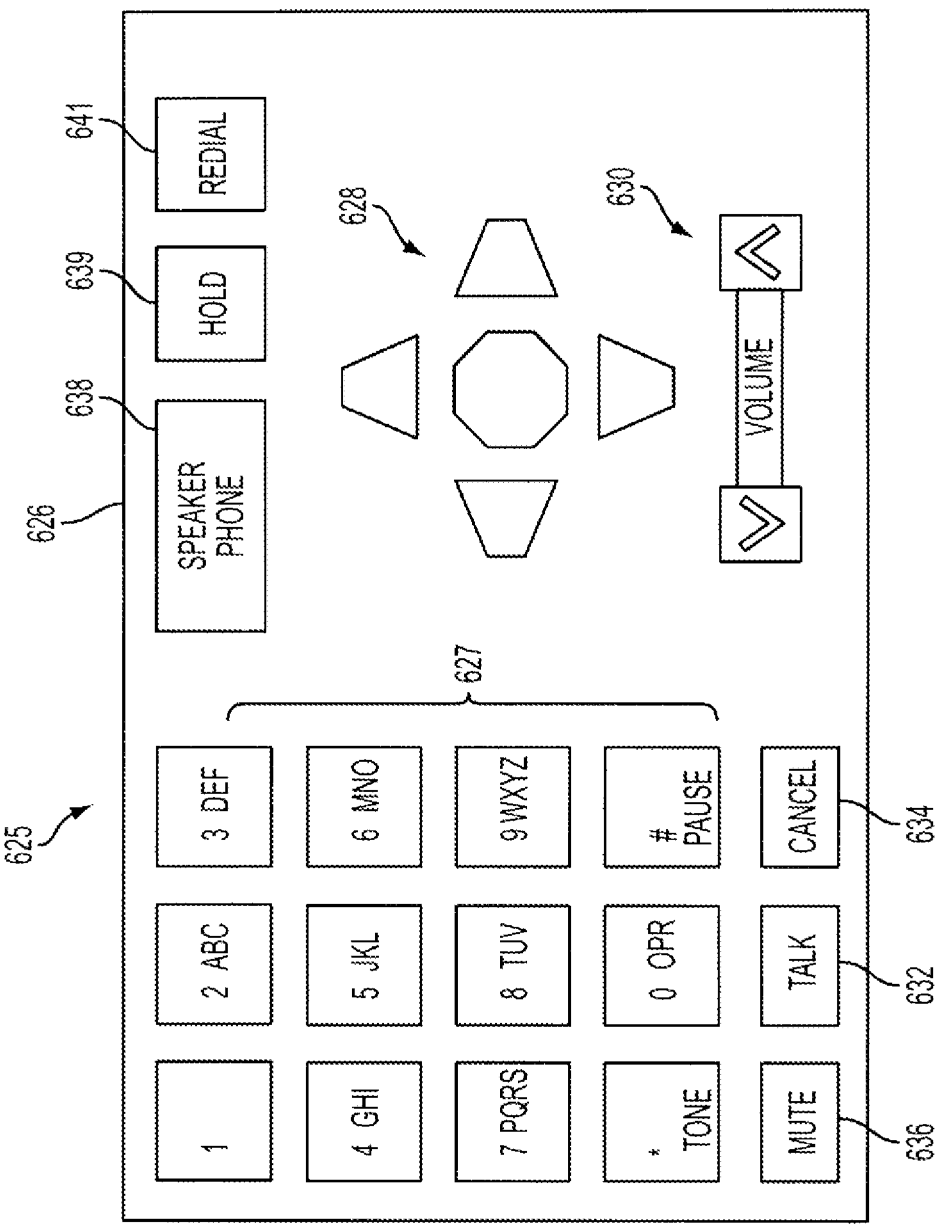
FIG. 29 is a top plan view of the telephone side of the communication device of FIG. 25 in one embodiment.

In the illustrated embodiment, the space 605 passes entirely through the housing walls 616. The movable rear panel, door or cover 618 is slidable between an open position 620 and a closed position 622 through slots 621. As illustrated in FIGS. 25 and 28, the data entry side 623 of the input assembly 16 supports or carries a keyboard 624. The telephone side 625 of the input assembly 16 supports or carries a telephone control panel 626, as illustrated in FIGS. 27 and 29. The telephone control panel 626 includes: (a) a standard telephone keypad 627 having the standard telephonic alphanumeric convention or system; (b) a multi-directional curser mover 628; (c) a volume control device 630; and (d) a plurality of telephone control-related buttons including a connect button 632, disconnect button 634, mute button 636, speaker phone button 638, hold button 639 and redial button 641.

Figure 30:
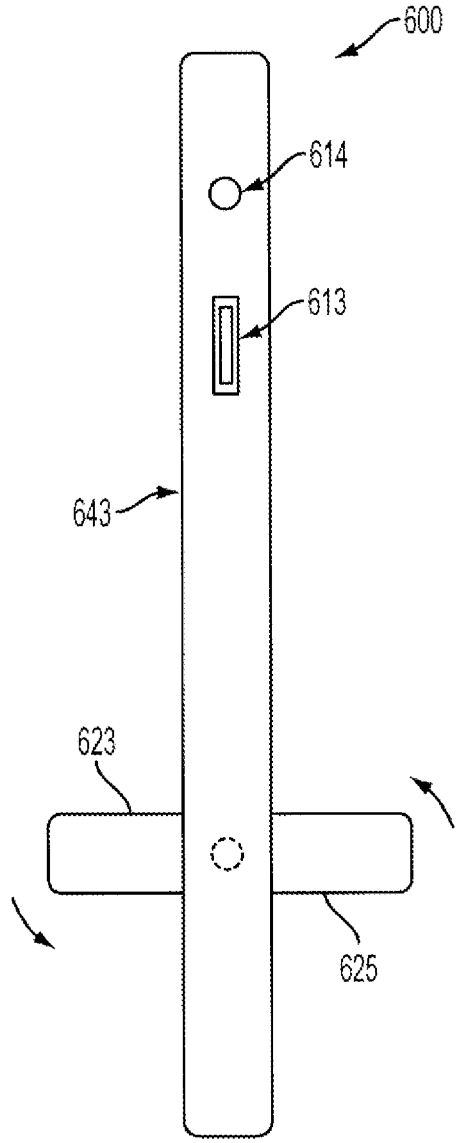
FIG. 30 is a side elevation view of the communication device of FIG. 25, illustrating the rotatable function of the input assembly.

As illustrated in FIG. 30, the user can rotate the input assembly 16 to switch between using the phone functionality and data processing functionality of the communication device 600. In one example, the user first slides the cover 618 upward to its open position 620. Opening the cover 618 provides room or openness for the input assembly 16 to freely rotate. This enables the user to rotate the input assembly 16 through one hundred eighty or three hundred sixty degrees, as illustrated in FIG. 30. When the user has positioned the desired side 623 or 625 at the front 643 of the communication device 600, the user closes the cover 618. The closing of cover 618 guards the space 605 from debris and also guards the input assembly 16 against damage by foreign objects.

5.2 Game Play Module

Figure 31:
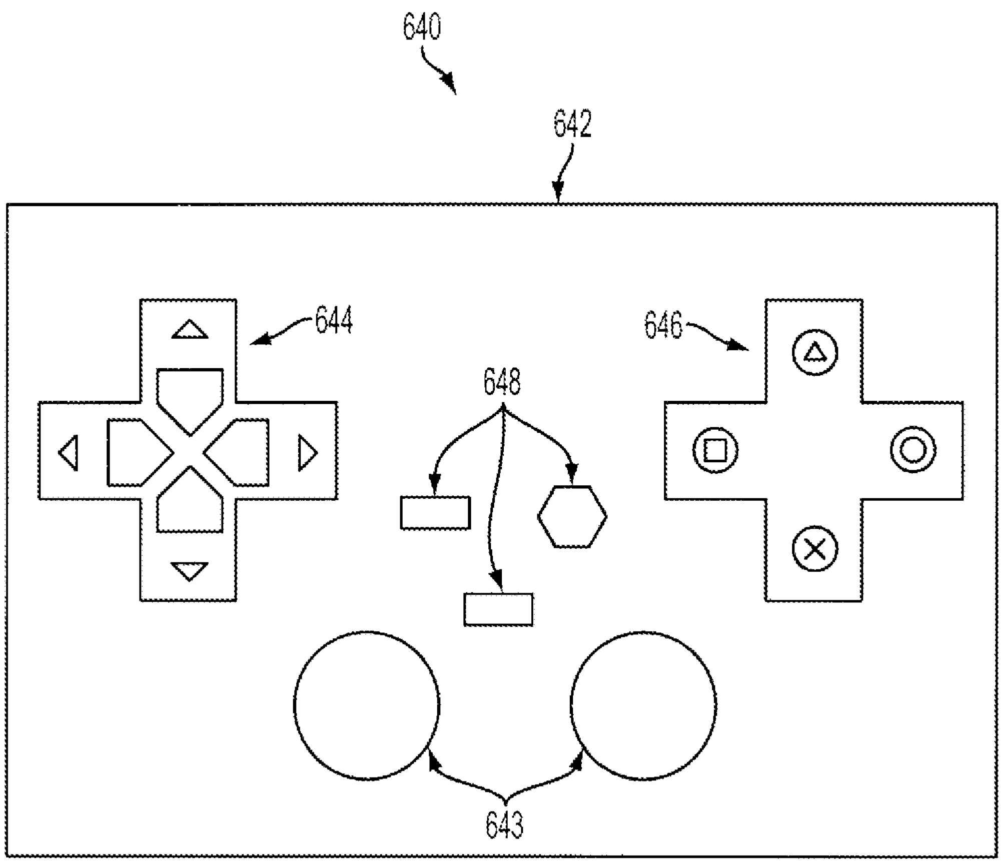
FIG. 31 is a top plan view of the game side of the communication device of FIG. 25 in one embodiment.

Referring to FIG. 31, in one embodiment, the communication device 600 has a game play module used by the processor of the communication device 600. Here, the communication device 600 stores or accesses a plurality of game programs which are accessible to the device 600 through a wire-based or wireless connection to an electronic game program source, such as a personal computer or webserver. In this embodiment, one side (not illustrated) of the input assembly 16 supports or carries keyboard 626, keypad 626, telephone control panel 626 or any suitable combination thereof.

The opposite, game side 640 supports or carries a game control panel 642. The game control panel 642 includes: (a) a plurality of relatively flat-configured joysticks 643; (b) a multi-directional pad 644 enabling the user to control the upward, downward, left and right movement or travel of a character or game-related image displayed by the display device 604; (c) a command pad 646 having a plurality of command buttons associated with different game commands, for example, jump, shoot, fly or run; and (d) a plurality of general game play buttons 648, for example, a start button, mode button, pause button, repeat button or select button. The user can use one side of the input assembly 16 to operate keyboard 624, telephone control panel 626, keypad 627 or any suitable combination thereof. When ready for games, the user can rotate the input assembly 16 one hundred eighty degrees and use the game side 640 to operate the game control panel 642.

5.3 Entertainment Module

Figure 32:
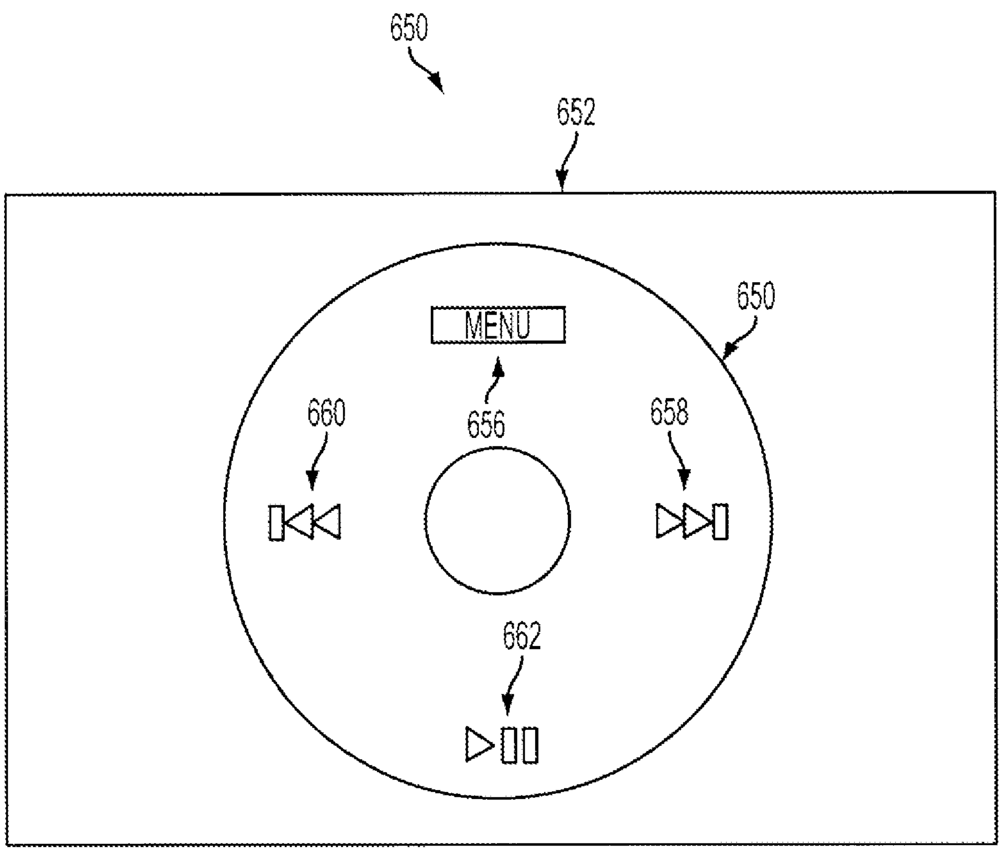
FIG. 32 is a top plan view of the entertainment side or entertainment panel of the communication device of FIG. 25 in one embodiment.
Figure 33:
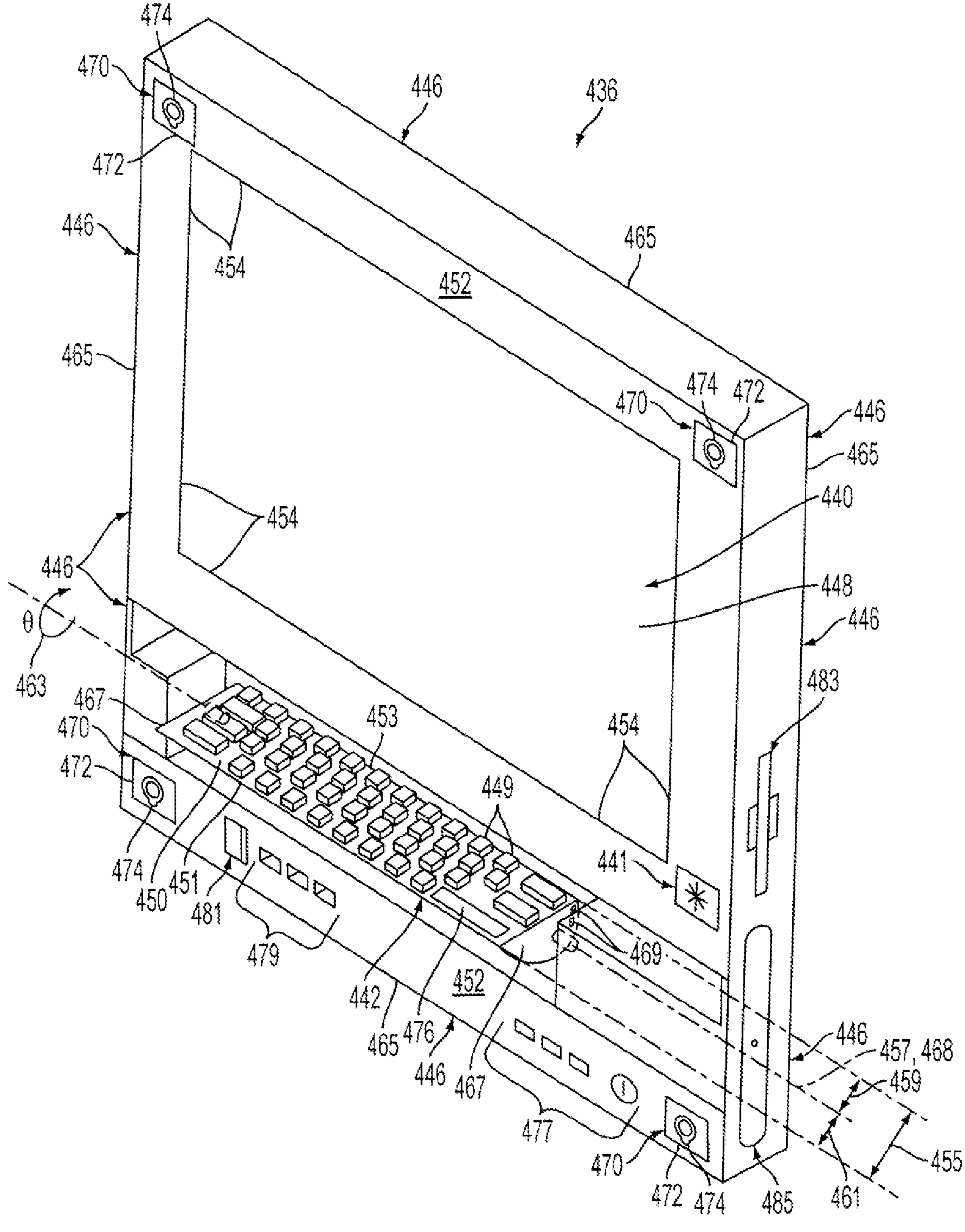
FIG. 33 is a front perspective view of the mountable computer in one embodiment.
Figure 34:
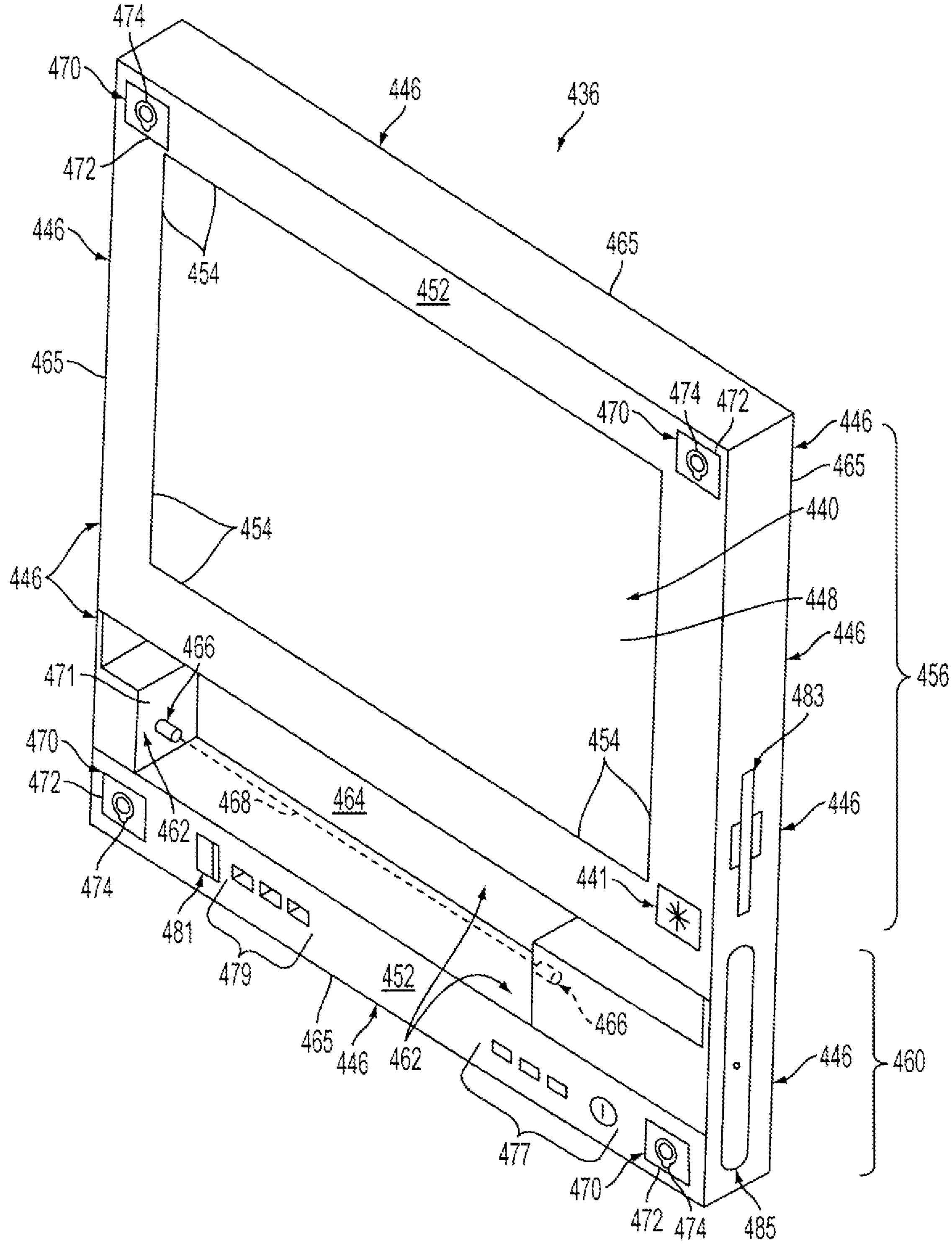
FIG. 34 is a front perspective view of the mountable computer of FIG. 33, illustrated with the keyboard removed.

Referring to FIG. 32, in one embodiment, the communication device 600 has an entertainment module having entertainment-related code used by the processor of the device 300 to provide music, video and photo display functionality. Here, the communication device 600 stores or accesses a plurality of songs, videos and photos which are accessible to the device 600 through a wire-based or wireless connection to song, video and photo sources, such as personal computers or webservers. In this embodiment, one side (not illustrated) of the input assembly 16 supports or carries keyboard 624, telephone control panel 626, keypad 627 or any suitable combination thereof The opposite side 650 supports or carries an entertainment panel 652. The entertainment panel 652 includes a relatively flat-configured joystick, input device or touch pad 654. The touch pad 654 has: (a) a menu input 656 enabling the user to access a menu of a plurality of songs, videos or photos and also enabling the user to select a desired song, video or photo to play or view; (b) a forward input 658 enabling the user to advance forward in a song, compilation of songs, video, compilation of videos or photo set; (c) a backward or reverse input 660 enabling the user to move backward or reverse in a song, compilation of songs, video, compilation of videos or photo set; and (d) a dual functional play/pause input 662 with play and pause functionality, enabling the user to activate play of a song or video or to pause play of a song or video. The user can use one side of the input assembly 16 to operate keyboard 624, telephone control panel 626, keypad 627 or any suitable combination thereof. When ready for entertainment, the user can rotate the input assembly 16 one hundred eighty degrees and use the opposite side 650 to operate the entertainment panel 652.

5.4 Camera & Video Recording Module

In one embodiment, the communication device 600 includes a digital camera device (not illustrated) and a video recorder (not illustrated), each of which is controlled by the processor of the device 600. One or more of the sides of the input assembly 16 can carry camera input devices and video recorder input devices.

5.5 Vibration Device

In one embodiment, the communication device 600 includes an electro-mechanical vibration device (not illustrated). The vibration device produces a vibration within the device 600 when a designated event occurs. The designated event can be a telephone call transmitted when the device 600 is placed in silent or vibrate mode. The designated event can also be a designated game event, such as a danger event, point losing event or other event associated with a loss in game success.

6. Mountable Computer

Referring to FIGS. 33 through 37, the mountable computer 436 is securable to an upstanding structure (not illustrated), such as a wall, seat or dashboard. It should be understood that the upstanding structure need not be perpendicular to a horizontal plane. The computer 436 includes: (a) a central processing unit (CPU) or processor 438 which controls a display device 440; (b) a keyboard 442 which enables a user to provide inputs to the processor 438; (c) a memory device 444 used by the processor 438 to perform a plurality of computer functions; (d) one or more speakers 441 for outputting sound; and (e) a housing 446 which houses the processor 438 and memory device 444 and which also supports the display device 440 and the keyboard 442.

The display device 440 has a screen 448 which is flat or substantially flat. Therefore, the screen 448 is substantially positionable in a plane. The keyboard 442 has: (a) a top surface 450; (b) a plurality of key input devices or keys 449 on the top surface 450; (c) a front side region or front side 451; (d) a back side region or back side 453; and (e) a plurality of end regions or ends 467, each of which has a length 455, midpoint 457 and portions 459 and 461. The top surface 450 is also substantially flat and therefore substantially positionable in a plane. In addition, the keyboard 442 has a cylindrical-shaped or semi-cylindrical shaped bottom surface. As described below, the user can adjust the position of the keyboard 442, through an angle 463, so that the top 450 of the keyboard 442 and the screen 448 substantially lie in the same plane.

The housing 446 has a back surface (not illustrated) which is engageable with the upstanding structure, and the housing 446 has a front surface 452 and a plurality of outer walls 465. In one embodiment, the front surface 452 is an integral, one-piece member constructed of a single mold. The front surface 452 has a plurality of walls 454 that define a screen opening (not illustrated) or a screen region 456. The screen opening is positioned in line with the screen 448 of the display device 440. The walls 454 surround the screen 448, enabling the user to view the screen 448 through the screen opening.

In addition, the front surface 452 has a keyboard region 460 located below the screen region 456. The front surface 452 has a plurality of inner walls or walls 462 defining a cut-away, space or cavity 464 within the keyboard region 460; and (b) at least one, and preferably a plurality of spaced apart coupling members 466 positioned within the keyboard region 460. The coupling members 466 are positioned along a common axis 468. In the embodiment illustrated in FIGS. 35 through 37, the coupling members 466 are rods or shafts which function as pivot points for the ends 467 of the keyboard 442. Here, the walls 462 function, in part, as guard members that protect the keyboard 442 from impact from people and objects.

The keyboard 442 is pivotable or rotatable between a first or closed position and a second or open position. In the closed position, the keyboard 442 is upwardly rotated or pivoted until the plane of the top surface 450 of the keyboard 442 is substantially parallel with the plane of the screen 448. In this position, the keyboard 442 is least likely to be damaged caused by contact with a person or an object passing by the computer 436. In addition, the closed keyboard 442 causes the computer 436 to occupy less space. In the open position, keyboard 442 is downwardly rotated or pivoted until the plane of the top surface 450 of the keyboard 442 is substantially perpendicular to or otherwise intersects with the plane of the screen 448. In this open position, illustrated in FIG. 33, the keyboard 442 has a conventional horizontal operating position even though the screen 448 has a vertical position. This makes is convenient for users to operate the keyboard 442 while standing, for example, in a kitchen.

In one embodiment, the housing 446 includes a keyboard position control device 469. In the illustrated embodiment, the position control device 469 includes a plurality of equally spaced-apart protrusions. The protrusions are positioned on the ends 467 of the keyboard 442. These protrusions removably mate with a plurality of slots (not illustrated) defined by each of the end walls 471 of the keyboard region 460. In operation, the user applies a certain degree of force in order to unseat the protrusions from the slots to reposition the keyboard 442.

In addition, the computer 436 has a plurality of securing members 470. Each securing member 470 includes a wall 472 which extends from the front surface 452 through the back surface of the computer 436. The wall 472 defines a fastener opening that is sized and shaped so as to receive a suitable screw, bolt or other fastener (not illustrated). The user can affix or secure the computer 436 to an upstanding structure, such as a kitchen wall, by inserting such fasteners through such fastener openings and securing the fasteners to the upstanding structure. Also, the securing members 470 include lock members or devices 474. The lock devices 474, in one embodiment, include a keyhole which enable only a user with a key to access such fasteners.

In one embodiment, the computer 436 has at least one hand-controlled input device other than the keyboard 442. In the illustrated example, the computer 436 has a touch pad 476 positioned on the keyboard 442. In other embodiments, the computer 436 has a mouse, a trackball and/or a stylus. The computer 436 also has plurality of standard input or control buttons 477 which enable the user to control certain settings of the computer 436 as well as the power of the computer 436.

The computer 436 also has a plurality of ports or connection devices 479 located on the front surface 452 of the housing 446 for convenient access. Here, a sliding door 481 is movable to cover and expose the connection devices 479. In one embodiment, a personal digital assistant (PDA) is connectable to one of these ports 479, and the computer 436 includes a PDA holder, PDA arm or another type of PDA support member adapted to support one or more PDA's. In addition, the computer 436 includes a hard disk drive 483 and a drive 485 which functions as a CDROM (Compact Disk-Read-Only Memory) drive and a DVD (Digital Video Disk) drive.

Figure 35:
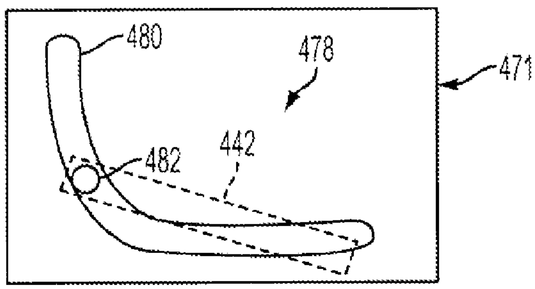
FIG. 35 is a side elevation view of a slot and groove device used to couple a keyboard to a computer housing of a mountable computer in one embodiment.

Referring to FIG. 35, in one embodiment, the housing 446 of the computer 436 includes a sliding coupling device 478 which slidably couples the keyboard 442 to the housing 446. The coupling device 478 includes an arc-shaped slot wall 480 positioned on each of the end walls 471 of the housing 446. Also, the coupling device 478 includes a protrusion member 482 connected to each end 467 of the keyboard 442. The protrusion member 482 is received by and mates with the slot wall 480. This enables the user to adjust the keyboard 442 by sliding the keyboard 442 along the arc-shaped slot wall 480.

Figure 36:
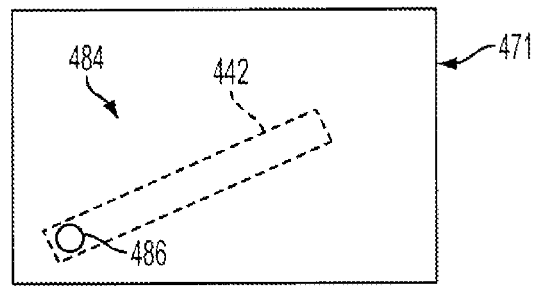
FIG. 36 is a side elevation view of a pivot or hinge device used to couple a keyboard to a computer housing of a mountable computer in one embodiment.

As illustrated in FIG. 36, in one embodiment, the housing 446 of the computer 436 includes a pivoting coupling device 484 which pivotally couples the keyboard 442 to the housing 446. The coupling device 484 includes a hinge, pin, or shaft 486 coupled to each of the wall ends 471 of the keyboard region 460. Each of the shafts 486 is engaged with one of the ends 467 of the keyboard 442. This enables users to pivot the keyboard 442 upward and downward.

Figure 37:
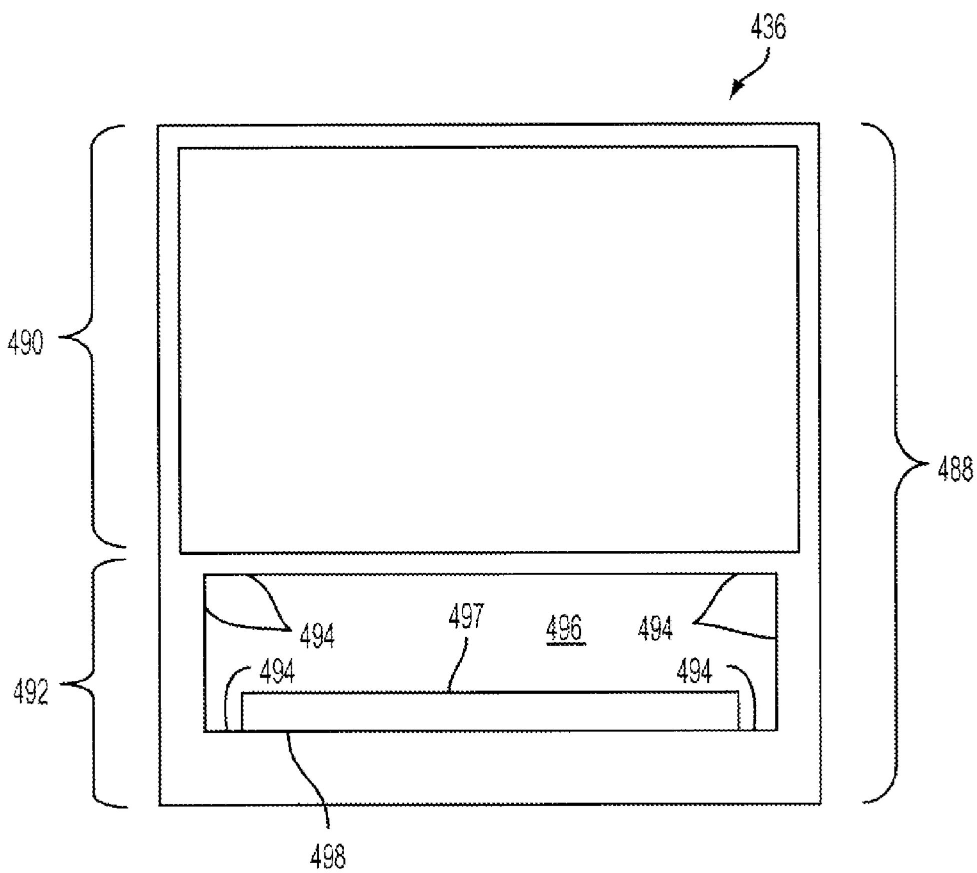
FIG. 37 is a front elevation view of a computer having an opening below the display device for positioning of the hands while the user is operating a keyboard, wherein the keyboard is connected to the lower portion of the computer housing in one embodiment.

In another embodiment illustrated in FIG. 37, the computer 436 has a housing 488 which includes a screen region 490 and a keyboard region 492 located below the screen region 490. The housing 488 has a plurality of walls 494 that define a cavity 496. The cavity 496 extends from the front through the backside of the computer 436. The cavity 496 is sufficiently sized and shaped so as to receive the user's hands while the user is operating the keyboard 497. In this embodiment, the keyboard 497 is non-movably or rigidly connected to the lower wall 498 of the housing 488. It should be appreciated, however, that in other embodiments, the keyboard 497 can be adapted to have a designated incline or an angle adjustment device.

In another embodiment, the computer 436 has an electronic configuration including a processor, a system controller, a cache, and a data-path chip, each coupled to a host bus. The processor is a microprocessor such as a 486-type chip, a Pentium®, Pentium®II, Pentium®III, Pentium®4, or other suitable microprocessor. The cache provides high-speed local-memory data (in one embodiment, for example, 512 kB of data) for the processor, and is controlled by the system controller, which loads the cache with data that is expected to be used soon after the data is placed in the cache (i.e., in the near future).

The main memory is coupled between the system controller and data-path chip, and in one embodiment, provides random-access memory of between 16 MB and 256 MB or more of data. In one embodiment, the main memory is provided on SIMMs (Single In-line Memory Modules), while in another embodiment, the main memory is provided on DIMMs (Dual In-line Memory Modules), each of which plugs into suitable sockets provided on a motherboard holding other components. The main memory includes standard DRAM (Dynamic Random-Access Memory), EDO (Extended Data Out) DRAM, SDRAM (Synchronous DRAM), or other suitable memory technology. The system controller controls PCI (Peripheral Component Interconnect) bus, a local bus that provides a high-speed data path between the processor and various peripheral devices, such as graphics devices, storage drives and network cabling.

A data-path chip is also controlled by the system controller to assist in routing data between the main memory, the host bus, and the PCI bus. In one embodiment, the PCI bus provides a 32-bit-wide data path that runs at 33 MHz. In another embodiment, the PCI bus provides a 64-bit-wide data path that runs at 33 MHz. In yet other embodiments, the PCI bus provides 32-bit-wide or 64-bit-wide data paths that run at higher speeds. In one embodiment, PCI bus provides connectivity to an I/O bridge, a graphics controller, and one or more PCI connectors (i.e., sockets into which a card edge may be inserted), each of which accepts a standard PCI card. In one embodiment, the I/O bridge and the graphics controller are each integrated on the motherboard along with the system controller, in order to avoid a board-connector-board signal-crossing interface and thus provide better speed and reliability.

In this embodiment, the graphics controller is coupled to a video memory (that includes memory such as DRAM, EDO DRAM, SDRAM, or VRAM (Video Random-Access Memory)), and drives a VGA (Video Graphics Adaptor) port. The VGA port can connect to industry-standard monitors such as a VGA-type, SVGA (Super VGA)-type, XGA-type (eXtended Graphics Adaptor) or SXGA-type (Super XGA) display devices.

Other input/output (I/O) cards having a PCI interface can be plugged into the PCI connectors. The network connections providing video input are also represented by the PCI connectors, and include Ethernet devices and cable modems for coupling to a high speed Ethernet network or cable network which is further coupled to the Internet.

In one embodiment, the I/O bridge is a chip that provides connection and control to one or more independent IDE or SCSI connectors, to a USB (Universal Serial Bus) port, and to an ISA (Industry Standard Architecture) bus. In this embodiment, the IDE connector provides connectivity for up to two standard IDE-type devices such as hard disk drives, CDROM (Compact Disk-Read-Only Memory) drives, DVD (Digital Video Disk) drives, videocassette recorders, or TBU (Tape-Backup Unit) devices. In one similar embodiment, two IDE connectors are provided, and each provide the EIDE (Enhanced IDE) architecture. In the embodiment shown, a SCSI (Small Computer System Interface) connector provides connectivity for up to seven or fifteen SCSI-type devices (depending on the version of SCSI supported by the embodiment).

In one embodiment, the I/O bridge provides an ISA bus having one or more ISA connectors (in one embodiment, three connectors are provided). In one embodiment, the ISA bus is coupled to the I/O controller, which in turn provides connections to two serial ports, a parallel port, and a FDD (Floppy-Disk Drive) connector. At least one serial port is coupled to a modem for connection to a telephone system providing Internet access through an Internet service provider. In one embodiment, the ISA bus is connected to a buffer, which is connected to an X bus, which provides connections to a real-time clock, a keyboard/mouse controller and a keyboard BIOS ROM (Basic Input/Output System Read-Only Memory) 345, and to a system BIOS ROM.

The computer 436 performs several functions. Such functions are implemented in software in one embodiment, where the software comprises computer executable instructions stored on computer readable media such as disk drives coupled to connectors, and executed from the main memory and the cache. The term "computer readable medium" is also used to represent carrier waves on which the software is transmitted.

It should be appreciated that each of the computer 436 can have any size which is suitable for its application. In one embodiment, the screen of the computer is sized similar to that of a conventional personal computer. In another embodiment, the computer is miniaturized or relatively small so that the computer can be mounted within a dashboard of a vehicle.

The computer 436 has a built-in keyboard which is positioned or positionable for operation while the computer is secured to an upstanding structure, such as a wall. The wall-mountable computer brings the functionality of the personal office computer to those involved in carrying out household activities on a regular basis. The integrated keyboard enables the computer to be relatively thin which, in turn, safeguards the computer and enhances the aesthetics of the computer. This type of computer provides a relatively high degree of convenience to computer users.

Figure 38:
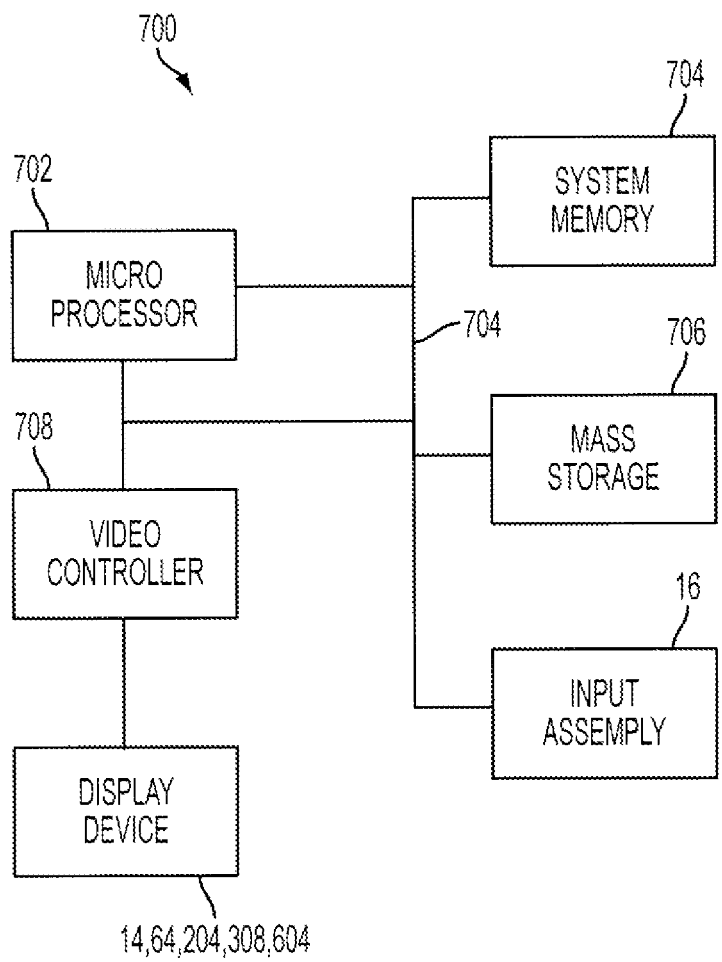
FIG. 38 is a schematic block diagram of the electronic configuration or computer system in one embodiment.
Figure 39:
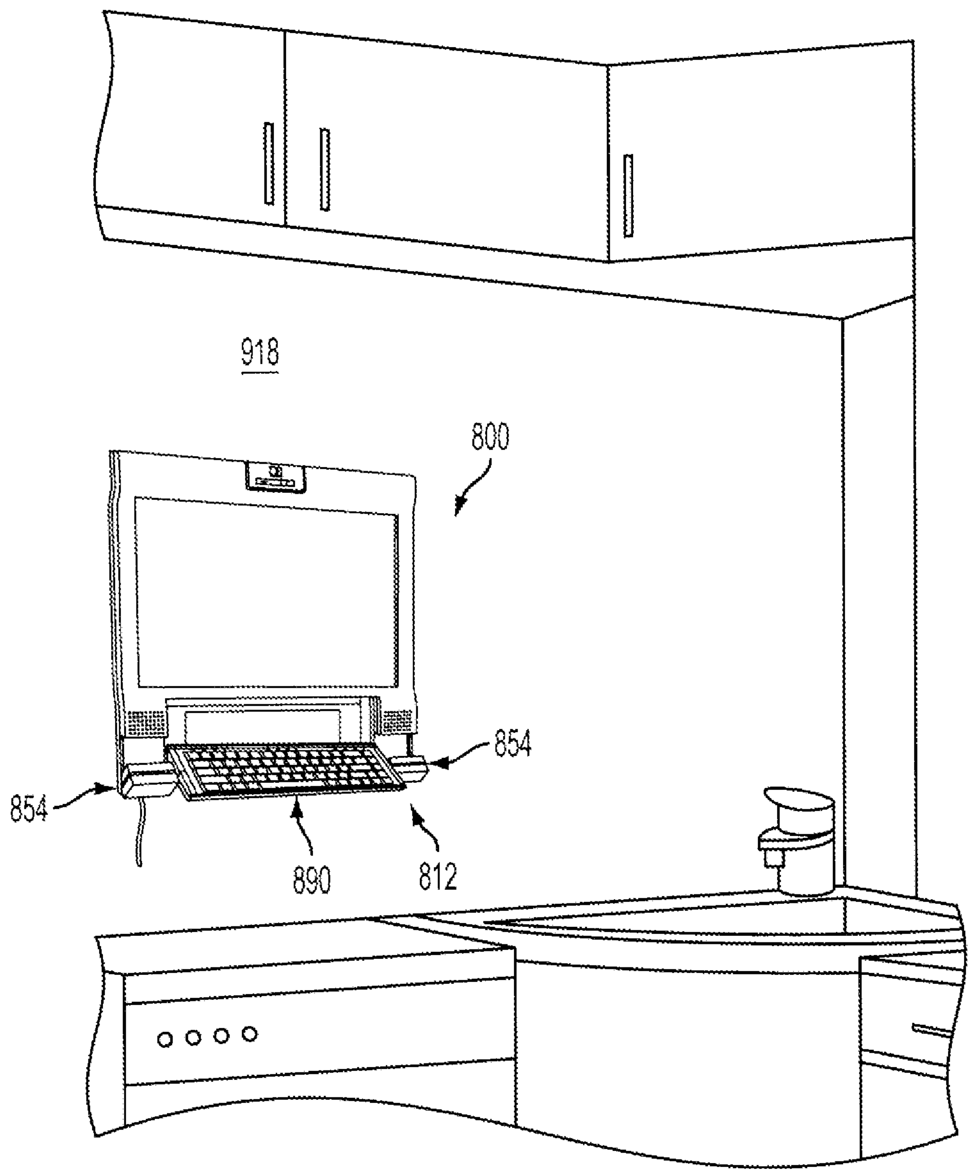
FIG. 39 is a front perspective view of one embodiment of an assembly of the main unit mounted to the mounting unit, which, in turn, is mounted to the wall of a room, where the input assembly is open and the keyboard is facing upward.

In one embodiment illustrated in FIG. 38, the electronic system 152 described above is replaced or integrated with the computer system 700. Computer system 700 includes a microprocessor 702 with access to a system memory device 704, each of which is connected to a bus 704. Bus 704 serves as a connection between microprocessor 702 and other components of computer system 700. The input assembly 16 is coupled to microprocessor 702 to provide input to microprocessor 702. Programs and data are stored on a mass storage device 706, which is coupled to microprocessor 702. Mass storage devices include such devices as hard disks, optical disks, magneto-optical drives, floppy drives and the like. Each display device 14, 64, 204, 308 and 604 is coupled to microprocessor 702 by a video controller 708. A system memory 710 is coupled to microprocessor 702 to provide the microprocessor 702 with relatively fast storage to facilitate execution of busses. Intermediate circuits can be deployed between the components described above and microprocessor 702 to facilitate interconnection between the components and the microprocessor 702.

It should be appreciated that the electronic devices and computers described herein can include any information handling system which, in turn, can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment or other purposes. For example, an information handling system may be a personal computer, a network storage device, or any other suitable device and may vary in size, shape, performance, functionality, and price. The information handling system may include RAM, one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as input assembly 16 and a video display. The information handling system may also include one or more buses operable to transmit communications between the various hardware components.

In one embodiment, the input assembly 16 (or the computer or electronic device attached thereto) includes one or more of the following elements: (a) a credit card or data card reader enabling data on a user's data card to be read by the processor of the input assembly 16 or the processor of the electronic device or computer on which the input assembly 16 is mounted; (b) an illuminated bezel, panel or cord bordering one or both of the sides of the input assembly 16; (c) one or more light sources coupled to or housed within such cord; (d) one or more supplementary pointing devices such as mouses, trackballs and trackpads; and (e) a remote control device having a laser or signal generator and a remote control panel with a plurality of buttons or other suitable input devices mounted on one side of the input assembly 16, including, but not limited to, a television remote control, DVD player remote control, stereo remote control and garage door opener or other remote opener.

7. Assembly of Main Unit and Mounting Unit 7.1 General

Referring now to FIGS. 39 through 80, in one embodiment, the assembly 800 includes a main unit 802 which is detachably connected to, or removably attached to, a mounting unit 804. The main unit 802 is operable in conjunction with and apart from the mounting unit 804. For example, the main unit 802 is mountable to the mounting unit 804 as illustrated in FIGS. 39-54, and the main unit 802 is demountable from the mounting unit 804 as illustrated in FIGS. 55-58 and 62-68.

7.2 Main Unit

In one embodiment, the main unit 802 is a computer, for example, a personal computer of the type referred to as an all-in-one computer. The main unit 802 has: (a) a housing 806; (b) a motherboard (not illustrated) supported by the housing; (c) a display device having a display screen 808 operatively coupled to the motherboard; (d) a recharcheable battery unit (not illustrated) operatively coupled to the motherboard; (e) one or more radio frequency (RF) transmitters and receivers or RF transceivers (not illustrated) operatively coupled to the motherboard; (f) a plurality of audio output devices, such as speakers 810 and at least one subwoofer speaker (not illustrated), each of which is operatively coupled to the motherboard; (g) an input assembly 812 configured to be removably or non-removably coupled to the arm assembly 814; (h) a camera-microphone apparatus 816 including a web camera unit, digital camera unit and a microphone unit, each of which is operatively coupled to the motherboard; (i) one or more control devices operatively coupled to the motherboard, such as power button 826; (j) a hard drive and at least one disk drive operatively coupled to the motherboard, such as compact disk/digital video disk (CD/DVD) drive 828; (k) a plurality of data ports operatively coupled to the motherboard, such as four Universal Serial Bus (USB) ports 830, one or more miniature USB ports (not illustrated), an audio port 832, a microphone-in port 834, and one or more network ports (not illustrated) for a wire-based connection to the Internet or another data network; (l) a television (TV) mode button 836 operatively coupled to a TV tuner which, in turn, is operatively coupled to the motherboard; (m) an electrical connector 838 operable for powering the main unit 802 and charging the battery of the main unit 802; and (n) an electrical chord 840, as illustrated in FIGS. 62-67, having one end connectable to the electrical connector 838, the other end connectable to an alternating current (AC) source, such as an electrical outlet of a building, and an adapter or transformer (not illustrated) operable to transform AC to direct current (DC), also known as an AC/DC transformer.

Depending upon the embodiment, the main unit 802 can have any suitable dimensions. In one embodiment illustrated in FIG. 64, the display screen 808 is a seventeen inch screen, and the main unit 802 has: (a) a height (H) of approximately 16.60 inches or 41.40 centimeters; (b) a width (W) of approximately 16.63 inches or 42.24 centimeters; and (c) a thickness (T) of approximately 2.94 inches or 7.47 centimeters.

In one embodiment, the motherboard of the main unit 802 is sized and shaped to fit within the housing 806, located partially or fully behind the display screen 808. The motherboard, in one embodiment, is a circuit board having part or all of the structure, components and functionality of the motherboard of a commercially available laptop personal computer.

It should be appreciated that the main unit 802 can have any suitable computer operating system, including, but not limited, to: (a) any operating system which is commercially available under the trademark, MICROSOFT™; or (b) any operating system which is commercially available under the trademark, MACINTOSH™.

In one embodiment, the camera-microphone apparatus 816 is movably coupled to the housing 806. The camera-microphone apparatus 816 includes a ball joint, hinge or other coupler which enables the user to adjust the pointing direction of the camera-microphone apparatus 816. For example, the user can tilt the camera-microphone apparatus 816 downward to take a digital photo of a child, and the user can tilt the camera-microphone apparatus 816 upward, to the left or to the right to take a digital photo of objects in various locations relative to the main unit 802.

In one embodiment, the main unit 802 has one or more parallel ports operatively coupled to the motherboard. In another embodiment, the main unit 802 has a plurality of different data ports, operatively coupled to the motherboard. Depending upon the embodiment, either such data port is sized and configured to be connected to a video game device, a camera, a camcorder, a mobile phone, a personal digital assistant (PDA), a musical instrument, a stereo system, a home theater system, a TV, a medical instrument, a medical apparatus, a medical machine, a cash register, a data card interface device (such as a credit card swiper), or any other electronic peripheral device.

In one embodiment, the TV tuner includes a circuit board or card which enables television and radio signals to be received by the main unit 802. In one embodiment, the TV tuner has a video capture card enabling the main unit 802 to record television programs onto the hard drive of the main unit 802. In one embodiment, the TV tuner includes a receiver, tuner, demodulator and an analog-to-digital converter for analog TV. In one embodiment, the TV tuner has flash memory large enough to hold the firmwares for decoding several different video formats, enabling the TV tuner to be operable in many countries. In one embodiment, the frequency tuner has a composite video input. In one embodiment, the TV tuner functions as a frequency modulation (FM) radio and also provides reception for satellite data signals. In one embodiment, the TV tuner is operable to enable the main unit 802 to play TV and radio programs in analog or digital format, whether broadcasted through cable, satellite, telephone, fibre optics other communication mediums.

In one embodiment, the housing 806 has a panel-shaped configuration including: (a) a plurality of spaced-apart legs or housing extensions 840, each of which has a movable or pivotable arm 842; and (b) a rear, backside or back 844. The area or space 845 between the housing extensions 840 is, in one embodiment, a passageway extending entirely through the main unit 802. Each housing extension 840 has an arm hinge 846 which pivotably couples such extension 840 to one of the arms 842. In one embodiment, the arms 842 collectively constitute the arm assembly 814.

Figure 63:
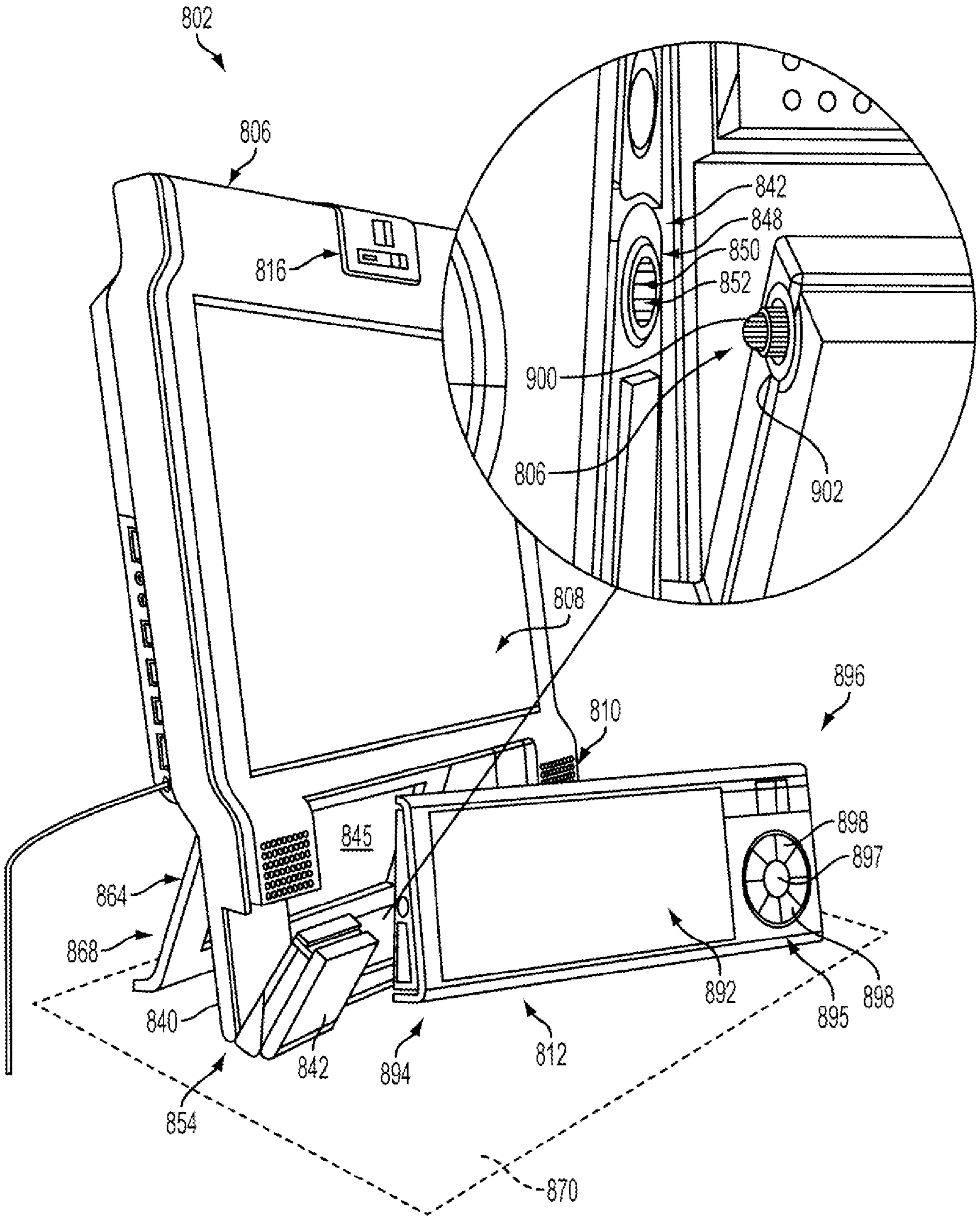
FIG. 63 is a front perspective view of one embodiment of the main unit standing on a support surface, illustrating the input assembly detached from the arm assembly and including an enlarged view of the rotary coupler and the input assembly coupler.

Referring to FIG. 63, each of the arms 842 has a rotary coupler 848. The rotary coupler 848 has: (a) a torque producer (not illustrated); (b) one torque connector (not illustrated) which attaches such torque producer to such arm 842; and (c) another torque connector 850 which is configured to attach the torque producer to one of the ends of the input assembly 812 as described below. In the embodiment illustrated, the torque connector 850 includes a gear having a plurality of teeth. The torque connector 850 defines a cylindrical-shaped opening 852 sized to receive, and mate with, the gear portion 902 of one of the input assembly couplers 898, as described further below.

Depending upon the embodiment, the torque producer of the rotary coupler 848 can include: (a) one or more bushings secured to a rod; (b) a spring secured to a rod; (c) a torsion bar or torsion device; or (d) any other suitable type of device which is operable to produce torque between two parts along an axis. In one embodiment, the rotary coupler 848 includes some or all of the components of a commercially available friction hinge used to pivotably attach the display screens of laptop computers to the housings of such laptop computers.

In one embodiment, the main unit 802 has an input assembly closer (not illustrated). The input assembly closer can have any suitable configuration, including, but not limited to: (a) one or more notches or recess members configured to engage with the arm assembly 814 as described below; (b) a latch mechanism having an actuator configured to engage with the arm assembly 814 as described below; (c) a lock mechanism having an actuator configured to engage with the arm assembly 814 as described below; and (d) any suitable fastener configured to engage with the arm assembly 814 as described below. The input assembly closer enables the user to lock or set the arm assembly 814 in the closed arm position 856 illustrated in FIGS. 44-47.

In one embodiment, each arm 842 of the arm assembly 814 is pivotable between: (a) an open arm position 854, as illustrated in FIGS. 39-43; and (b) a closed arm position 856 as illustrated in FIGS. 44-47. In one embodiment, the angle between the open arm position 854 and closed arm position 856 is between zero and ninety degrees. In other embodiments not illustrated, such angle is one hundred eighty degrees or an angle of any other suitable magnitude. In one embodiment, each arm 842 includes a stop (not illustrated) which limits the opening of such arm 842 to a designated angle. In one embodiment, one or each arm 842 has a position regulator (not illustrated) which enables the user to set the position of the arm 842 to a desired or designated angle or position. In one embodiment, one or each arm 842 has a closer engager (not illustrated) configured to engage with the input assembly closer of the main unit 802. The closer engager can have any suitable configuration, including, but not limited to: (a) one or more notches or recess members which co-act with the one or more notches or recess members of the input assembly closer of the main unit 802; and (b) an arm, rod, pin or other member configured to co-act with the input assembly closer of the main unit 802.

The back 844 of the housing 806 has: (a) a handle 858 usable to demount and carry the main unit 802 from one position to another; (b) a plurality of non-electrical mount engagers 860; (c) at least one electrical mount engager 862 operable for powering and charging the main unit 802; and (d) a movable stand 864. The movable stand 864 is movable between: (a) a closed stand position 866 as illustrated in FIGS. 53-58; and (b) an open stand position 868 as illustrated in FIGS. 62-68. A user can move the stand 864 to the closed stand position 866 for mounting the main unit 802 to the mounting unit 804. The user can later move the stand 864 to the open stand position 868 for standing the main unit 802 on a desk, tabletop, lap or other support surface 870. In the open stand position 868, the stand 864 increases the stability of the main unit 802 to facilitate standing the main unit 802 on the support surface 870.

In one embodiment, the handle 858 includes a grip 872. The back 844 of the housing 806 defines a handle cavity 874 sized to receive part of the user's fingers or hand. In operation, the user grasps the grip 872 while inserting his/her fingers into the handle cavity 874. In another embodiment not illustrated, the handle 858 includes a grip which is movably coupled to the back 844 of the housing 806. In such embodiment, the grip is movable between: (a) a recessed position where the grip fits within a cavity sized to receive part or all of the grip; and (b) a non-recessed or outward position where the grip extends outwardly to facilitate grasping by the user.

Referring to FIGS. 55-61, in one embodiment, each one of the non-electrical mount engagers 860 has a stud-shaped or cylindrical-shaped configuration including: (a) an inner retainer or disk-shaped base 876 spaced-apart from an outer retainer or disk-shaped head 878; and (b) a rod-shaped neck between the base 876 and head 878. The diameter of such neck is less than each of the diameters of the base 876 and head 878. As such, the base 876 and head 878 define a slot or cavity sized to receive a portion of the mounting unit 804, as described further below.

Referring to FIGS. 55-56 and 59-61, in one embodiment, the electrical mount engager 862 includes an electrical interface (not illustrated) which is operable to electrically connect the main unit 802 to the mounting unit 804. In one embodiment, the electrical interface includes a positive terminal or metal contact spaced part from a negative terminal or metal contact. In one embodiment, each such metal contact is electrically coupled to the motherboard and battery, and each such metal contact is dome-shaped or otherwise protrudes from the body of the electrical mount engager 862. When the electrical mount engager 862 is in contact with the electrical interface of the mounting unit 804, described below, the mounting unit 804 is operable to power the main unit 802 and charge the battery of the main unit 802.

Figure 56:
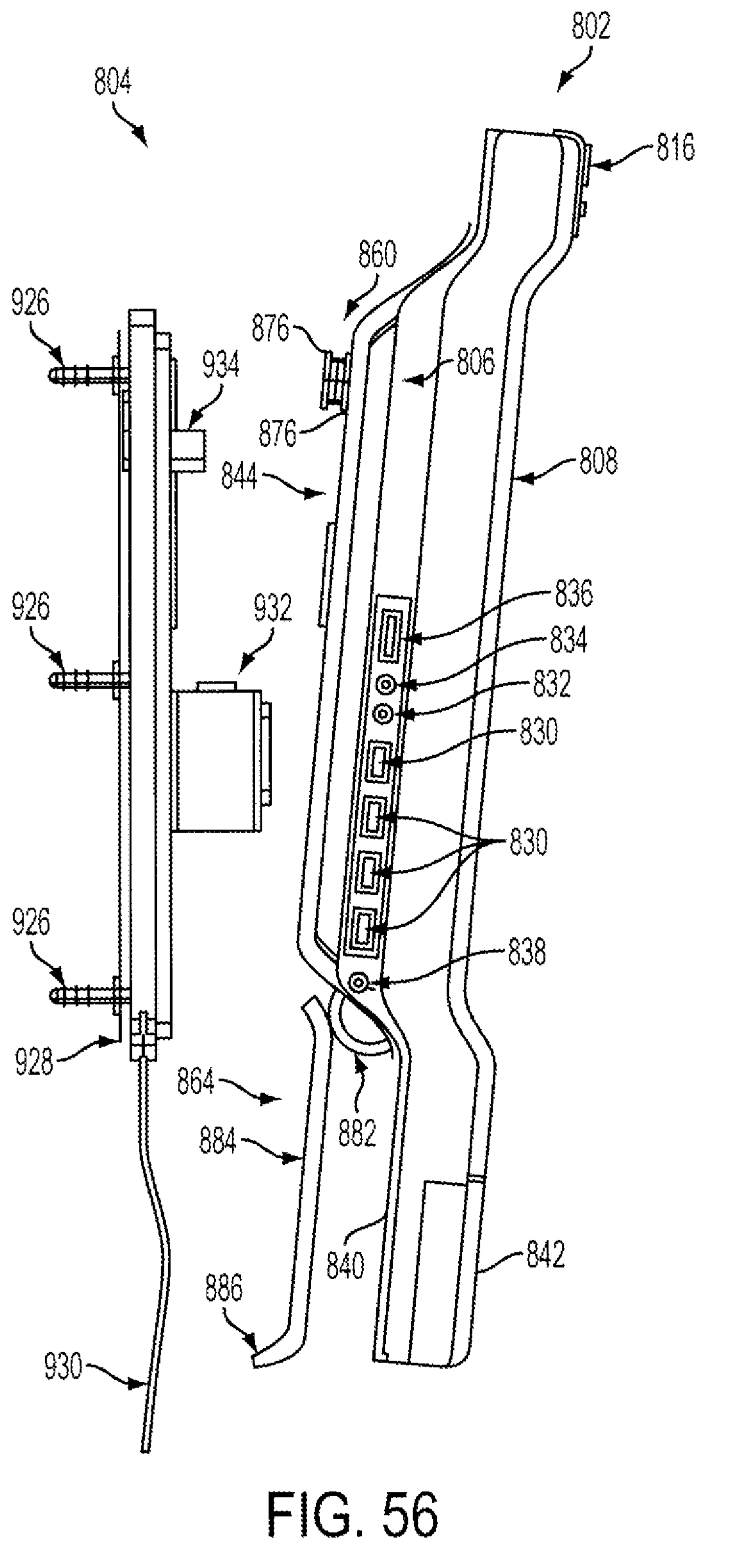
FIG. 56 is a left side elevation perspective view of one embodiment of the main unit after being dismounted and moved away from the mounting unit.
Figure 57:
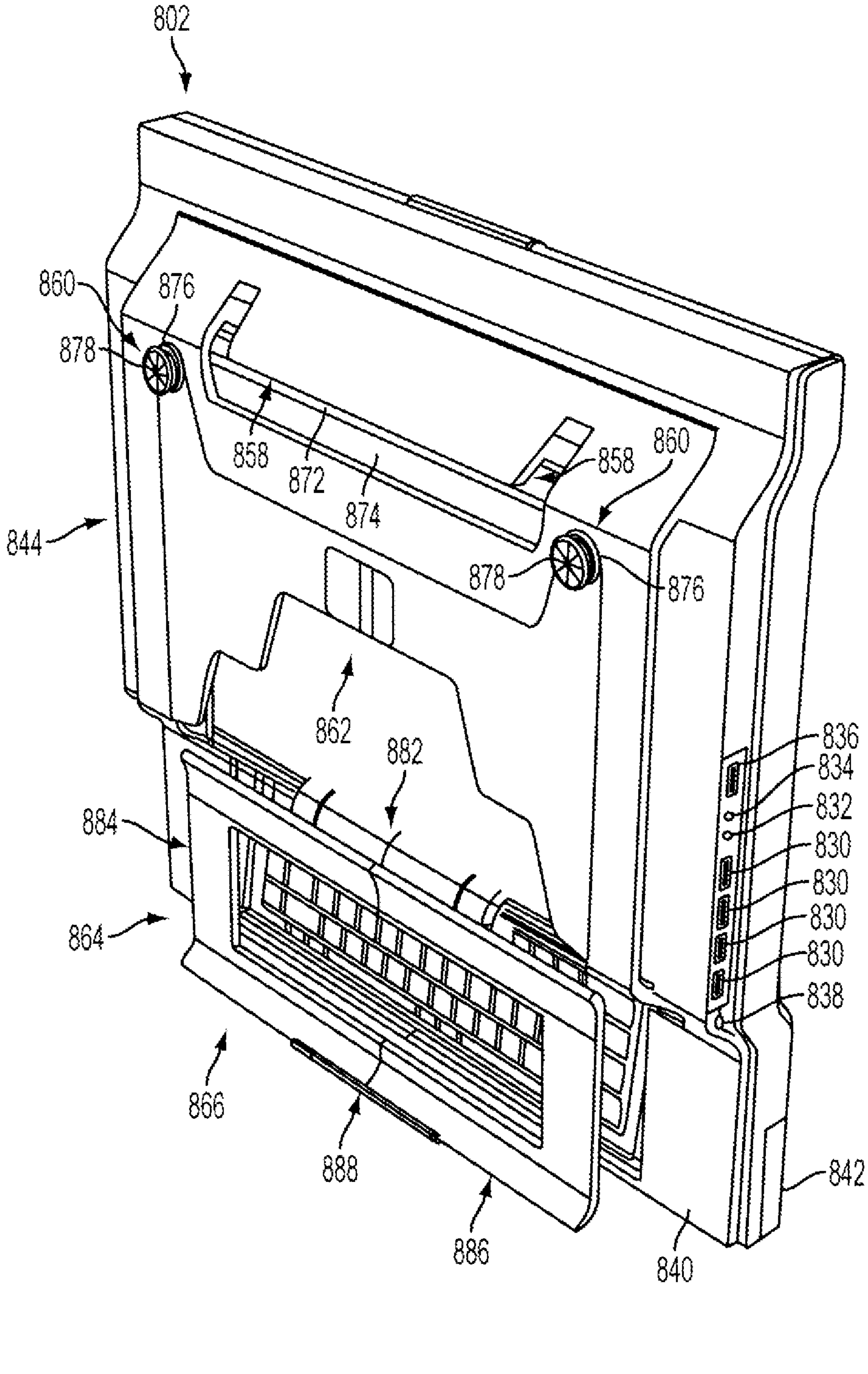
FIG. 57 is a left rear perspective view of one embodiment of the main unit, illustrating the stand closed.
Figure 58:
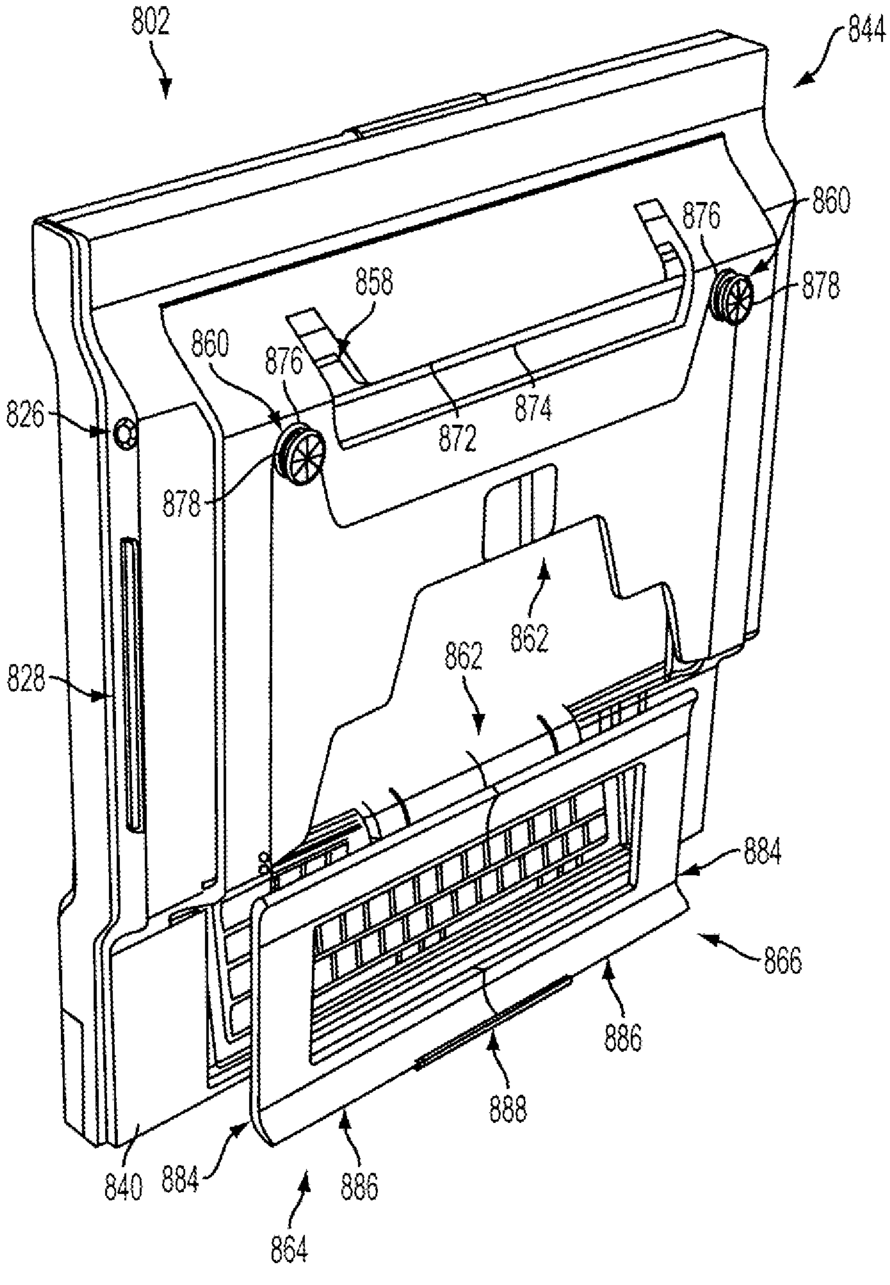
FIG. 58 is a right rear perspective view of one embodiment of the main unit, illustrating the stand closed.
Figure 64:
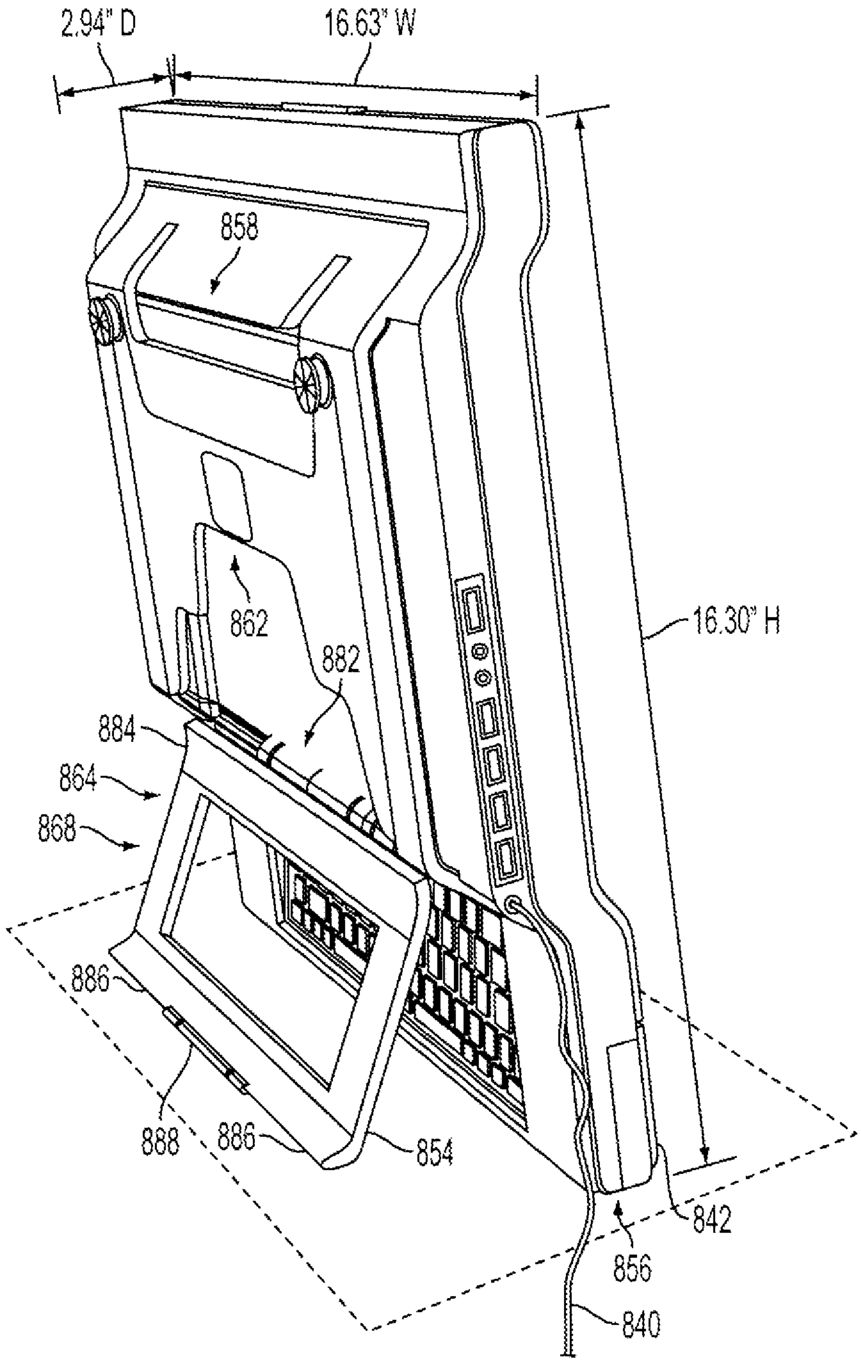
FIG. 64 is a rear perspective view of the main unit of FIG. 62.
Figure 65:
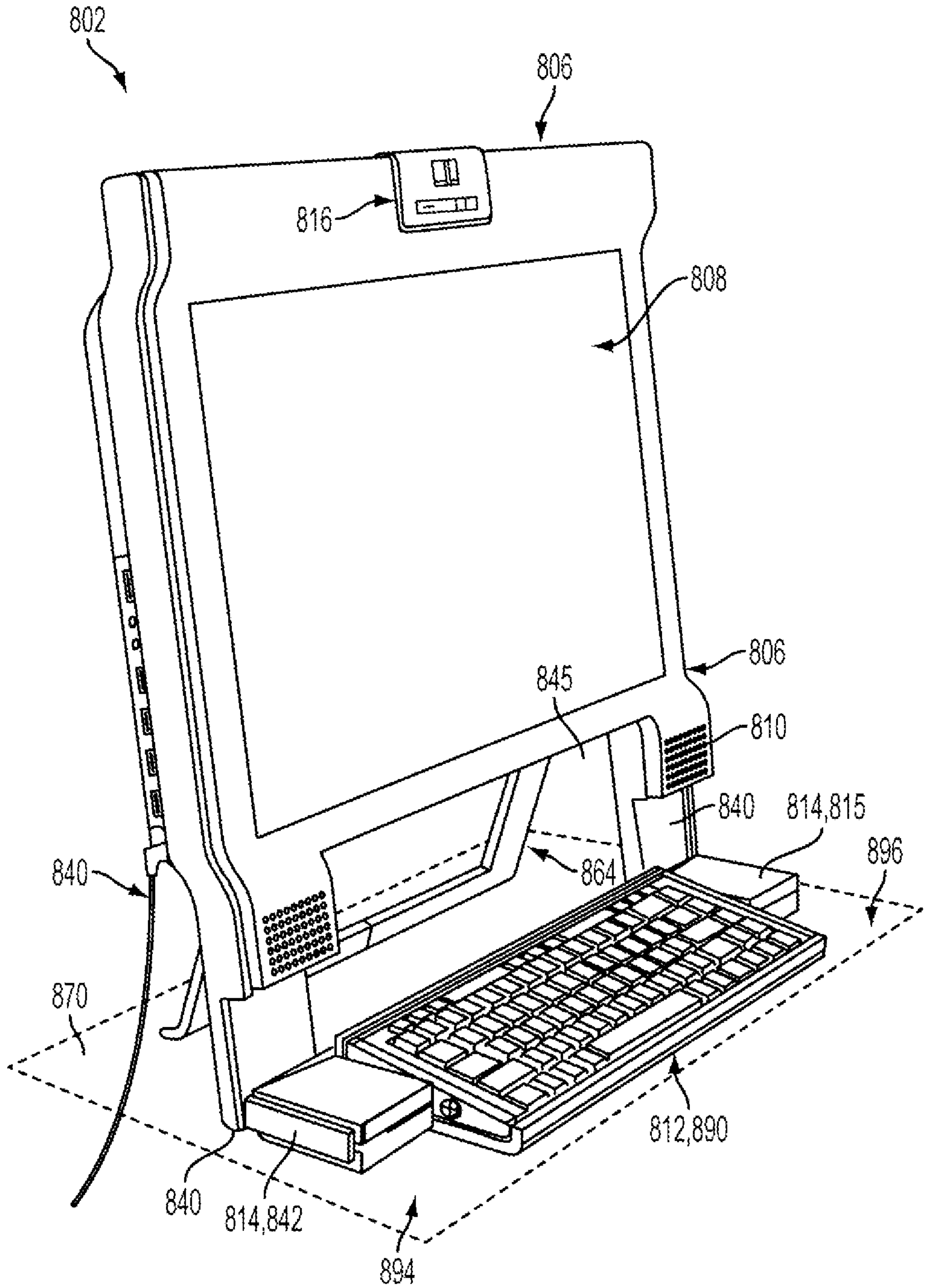
FIG. 65 is a front perspective view of the main unit standing on a support surface, illustrating the input assembly open with the keyboard upward.

Referring to FIGS. 56 and 64, in one embodiment, the movable stand 864 has: (a) a stand hinge 880 coupled to the back 844 of the housing; (b) a hinge connector 882 connected to the stand hinge 880; (c) a plurality of spaced-apart legs 884 connected to the hinge connector 882; and (d) a foot 886 connected to the legs 884. In one embodiment, the foot 886 has a friction increaser 888, such as a rubber pad or foam, operable to reduce slippage of the stand 864 relative to the support surface 870.

Depending upon the embodiment, the input assembly 812 can include a single input side or multiple input sides. In one embodiment, the input assembly 812 includes a rectangular-shaped support or housing 860 which has: (a) a keyboard 890; (b) a display panel 892 located on the opposite side of the housing 860; and (c) a left end 894 and a right end 896.

As illustrated in FIGS. 39-41, 43, 65 and 67, the keyboard 890 includes a set of keys for typing. If the user desires to use the display panel 892, the user can flip or rotate the input assembly 812 to access the display panel 892 at a desired angle, as illustrated in FIGS. 48-50, 52 and 66.

In one embodiment, the display panel 892 includes a touch screen 893 and a navigation input or navigation button 895. The touch screen 893 has a pressure sensitive device which recognizes inputs made by the force of a user's finger or a pointed object. The touch screen 893 produces different input signals when the user presses different areas of the touch screen 893.

The navigation button 895 includes a central button 897 surrounded by a plurality of directional buttons 899. The directional buttons 899 are arranged at different angles relative to the center of the circular navigation button 895. Each directional button 899 is associated with a direction of movement for a graphical curser, pointer, indicator or marker displayed by the touch screen 893. In operation, the user can use his/her finger or a pointed object to make inputs directly on the touch screen 893. Alternatively, if the user desires, the user can press the directional buttons 899 to move a graphical marker to a desired position on the touch screen 895, and the user can then press the central button 897 to make an input or selection.

In one embodiment, the entire housing of the input assembly 812, including the keys of the keyboard 890, is constructed of a material or composition which deters the growth or spread of harmful microorganisms, such as bacteria, viruses and fungi. In one embodiment, the keyboard 890 and its keys include an anti-microbial additive composition added to the resin of the polymeric material used to construct the keyboard 890 and its keys.

Referring to FIG. 63, the left end 894 and right end 896 of the input assembly 812 each include an input assembly coupler 898. The input assembly couplers 898 (only one of which is illustrated in FIG. 63) rotatably couple the input assembly 812 to the arm assembly 814. Referring to FIG. 63, in one embodiment, the input assembly coupler 898 includes a cylindrical-shaped member having an inner shaft portion 900 and an outer gear portion 902. The shaft portion 900 has a rounded or dome-shaped head sized to be received by the opening 852 of the rotary coupler 848. With the shaft portion 900 inserted into the opening 852, the gear portion 902 mates with the teeth of the torque connector 850.

Figure 67:
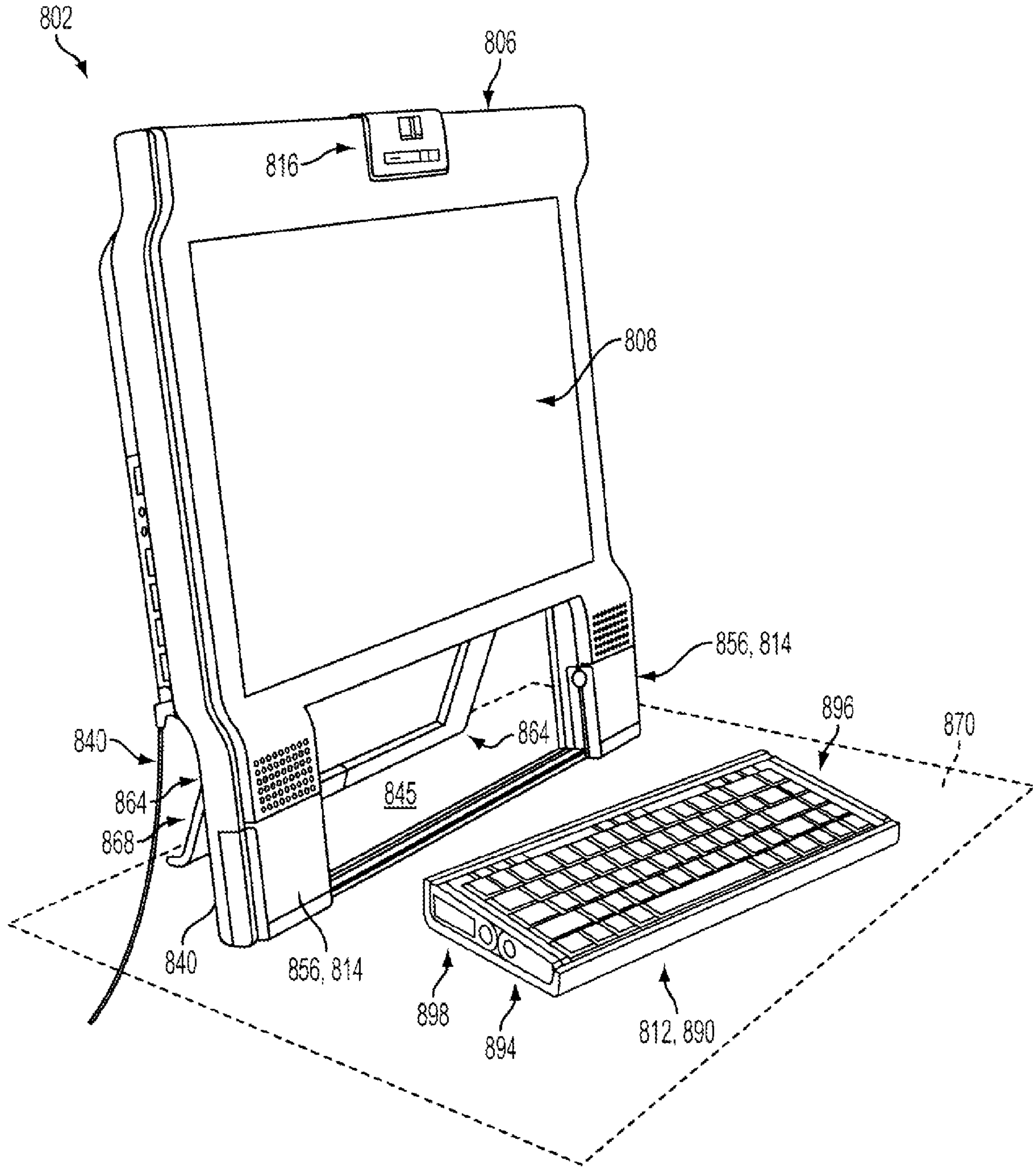
FIG. 67 is a front perspective view of the main unit standing on a support surface, illustrating the input assembly detached from the main unit with the keyboard facing upward.

In one embodiment, the input assembly couplers 898, left and right, are identical, and each such coupler 898 rotatably mates with one of the torque connectors 850. In another embodiment, one or each of the input assembly couplers 898 has a retraction device (not illustrated) which has a spring (not illustrated) coupled to a latch (not illustrated). By operating the latch, the user can retract the shaft portion 900 so that it moves in a direction toward the center of the input assembly 812. With the shaft portion 900 retracted, the user can detach, or otherwise remove, the input assembly 812 from the main unit 804, as illustrated in FIGS. 63, 67 and 68.

In one embodiment, the housing 860 of the input assembly 812 houses: (a) a keyboard circuit board (not illustrated) operatively coupled to the keyboard 890; (b) a control panel circuit board (not illustrated) operatively coupled to the display panel 892; (c) an RF receiver and RF transmitter or a RF transceiver (not illustrated) operable to electronically and wirelessly couple the input assembly 812 to the motherboard of the main unit 802; and (d) a battery operatively coupled to such keyboard circuit board and control panel circuit board. In operation, the RF transceiver of the input assembly 812 exchanges radio frequency signals with the RF transceiver of the main unit 802, and such radio wave communication couples the input assembly 812 to the main unit 802.

Depending upon the embodiment, the battery of the input assembly 812 can include: (a) one or more single use or non-recharcheable batteries (not illustrated); or (b) one or more rechargeable batteries (not illustrated). Referring to FIG. 63, in the embodiment with rechargeable batteries, each rotary coupler 848 has an electrical terminal electrically connected to the motherboard of the main unit 802. Likewise, each input assembly coupler 898 has an electrical terminal electrically connected to the rechargeable batteries of the input assembly 812. As such, when the input assembly 812 is connected to the main unit 802, the main unit 802 charges the batteries of the input assembly 812 until reaching a full charge state.

Figure 68:
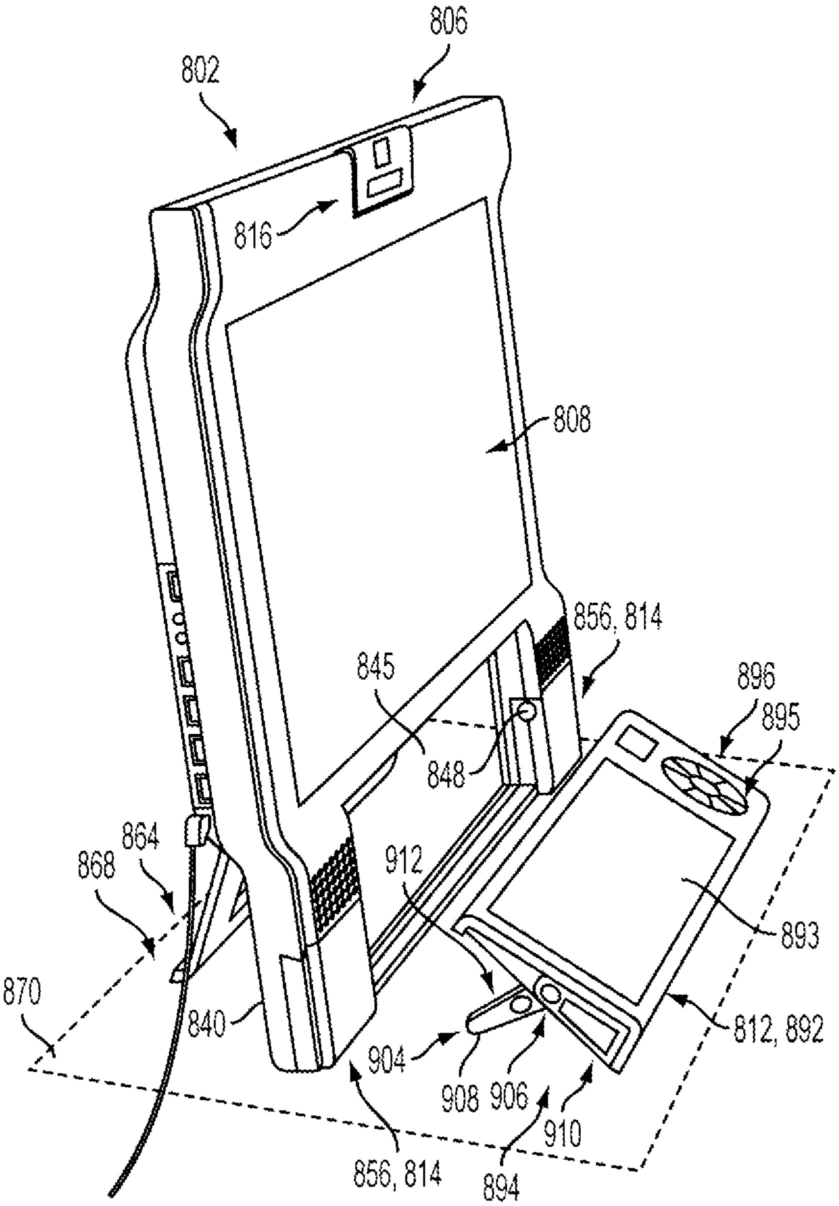
FIG. 68 is a front perspective view of the main unit standing on a support surface, illustrating the input assembly detached from the main unit and supported by its legs with the display panel facing upward.

Referring to FIG. 68, in one embodiment, the left and right ends 894 and 896 of the input assembly 812 each include an input assembly leg 904. It should be understood that only the left input assembly leg 904 is illustrated in FIG. 68. In one embodiment, each input assembly leg 904 has: (a) a coupler portion 906 which defines an opening (not illustrated); (b) a pin or other fastener which extends through such opening, rotatably connecting the coupler portion 906 to the input assembly 812; (c) a main portion 908 which is pivotable between a closed leg position 910 and an open leg position 912; (d) a position regulator (not illustrated) which is operable to maintain the input assembly leg 904 in the closed position 910, open position 910 or another designated open position until the user applies a threshold force to readjust the input assembly leg 904. The position regulator may have any suitable configuration, including, but not limited to, one or more notch and recess members which co-act with each other in a snap-fit fashion. Because, in one embodiment, each input assembly leg 904 is positioned adjacent to a side of the input assembly 812, the input assembly legs 904 do not cover or interfere with the viewing of, or accessibility to, the keyboard 890 or display panel 892. When the user detaches the input assembly 812 from the main unit 804, the user can open the input assembly legs 904 to provide a desired typing angle for the user, as illustrated in FIG. 68.

Figure 53:
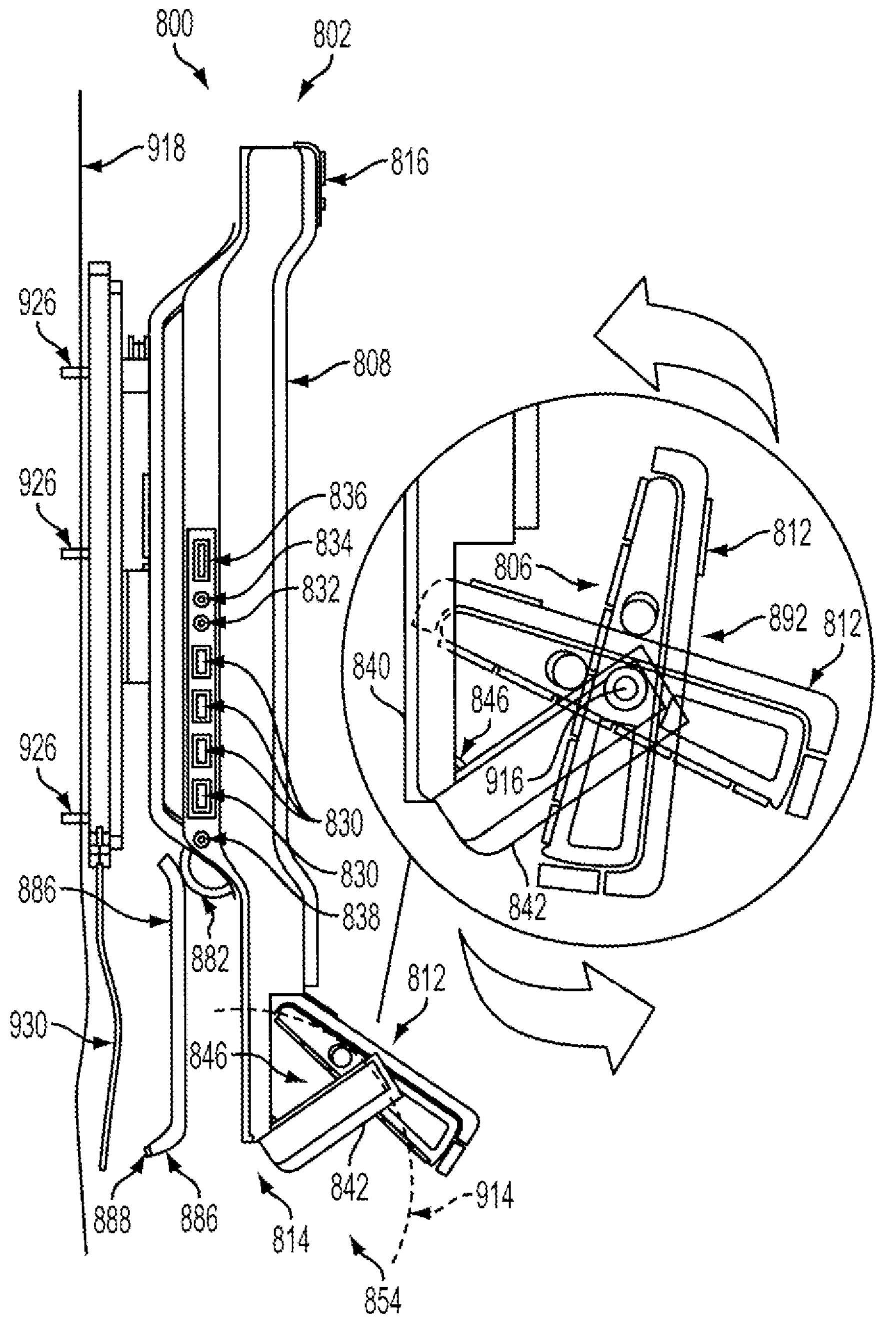
FIG. 53 is a left side elevation perspective view of one embodiment of an assembly of the main unit mounted to the mounting unit, which, in turn, is mounted to the wall of a room, illustrating input assembly being open and rotatable through three hundred sixty degrees.
Figure 54:
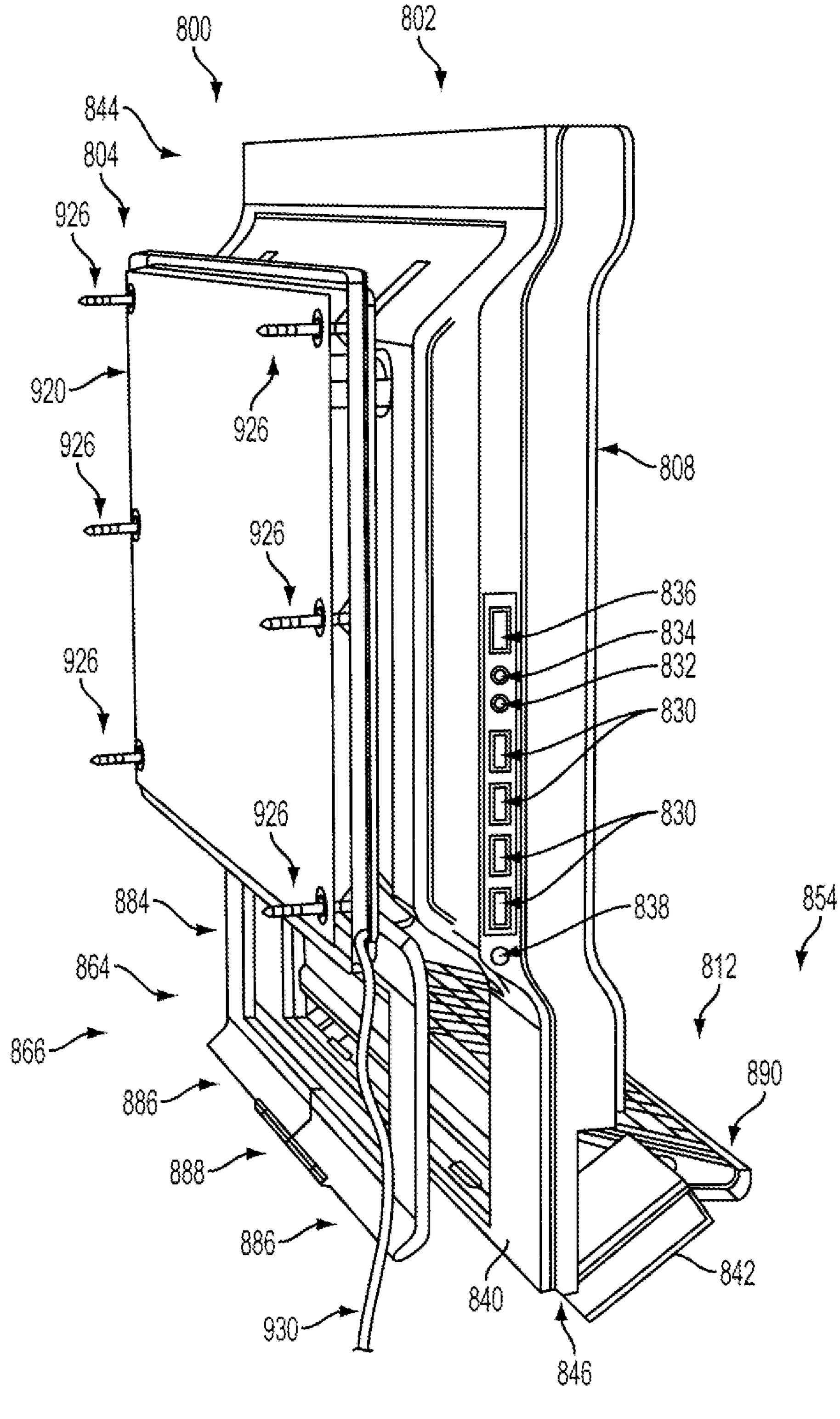
FIG. 54 is a back perspective view of one embodiment of an assembly of the main unit mounted to the mounting unit, which, in turn, is illustrated apart from a wall or support structure.

Referring to FIG. 53, when the input assembly 812 is attached to the main unit 804, the input assembly 812 is movable along an arc 914, and the input assembly 812 is also rotatable about a longitudinal axis 916 which extends between the two input assembly couplers 898. These multiple degrees of freedom are present while the main unit 804 is mounted to the mounting unit 804 as illustrated in FIG. 53, and these multiple degrees of freedom are also present while the main unit 804 is demounted.

Once the main unit 804 is mounted to the mounting unit 804, the main unit 804 can have several operational positions. In one example illustrated in FIGS. 39-43, the input assembly 812 is open, which causes the input assembly 812 to be moved away from the mounting unit 804 and the upstanding support structure 918 by a designated distance. Such distance and the space 845 enables the user to rotate the input assembly 812 to a desired typing position for use of the keyboard 890.

When finished typing, the user can close the input assembly 812, for example, as illustrated in FIGS. 44-47. To do so, the user pushes the input assembly 812 upward while rotating the input assembly 812 so that the display panel 892 or keyboard 890 is substantially parallel to the display screen 808. In the example illustrated in FIGS. 44-47, the display panel 892 faces outward when the input assembly 812 is closed. As such, the user can use the display panel 892 in such vertical position for basic or relatively quick operations as described below. It should be appreciated, however, that the user can alternatively rotate the input assembly 812 so that the keyboard 890 faces outward when the input assembly 812 is closed.

Figure 40:
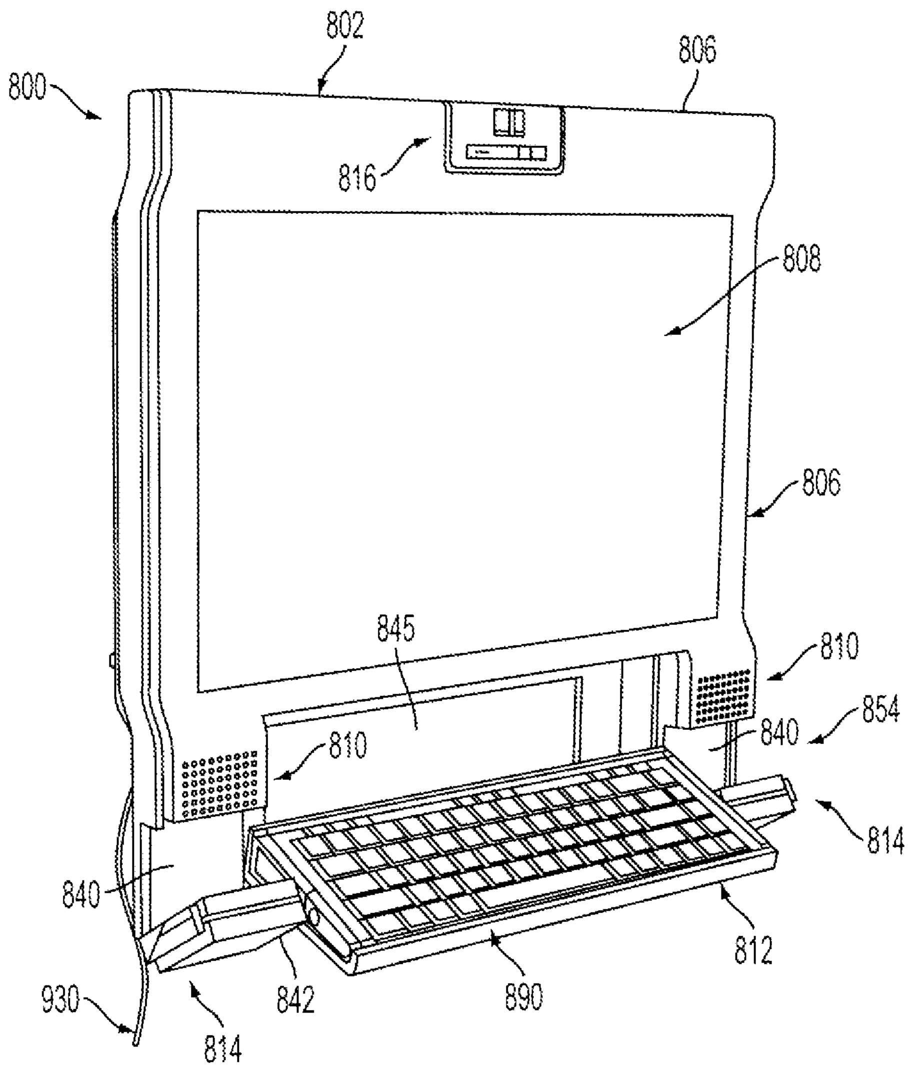
FIG. 40 is a front perspective view of one embodiment of the assembly of FIG. 39.
Figure 41:
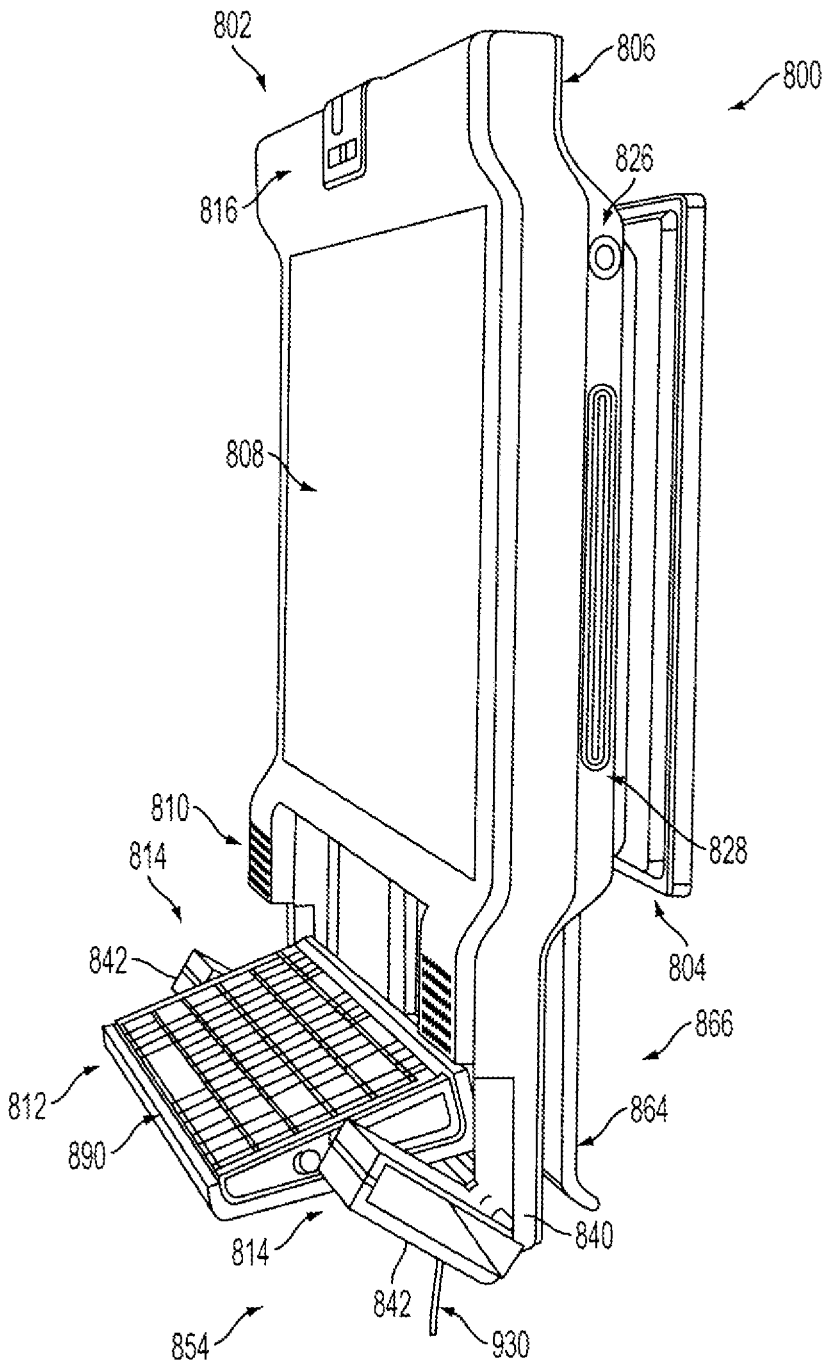
FIG. 41 is a right side elevation perspective view of the assembly of FIG. 39.
Figure 42:
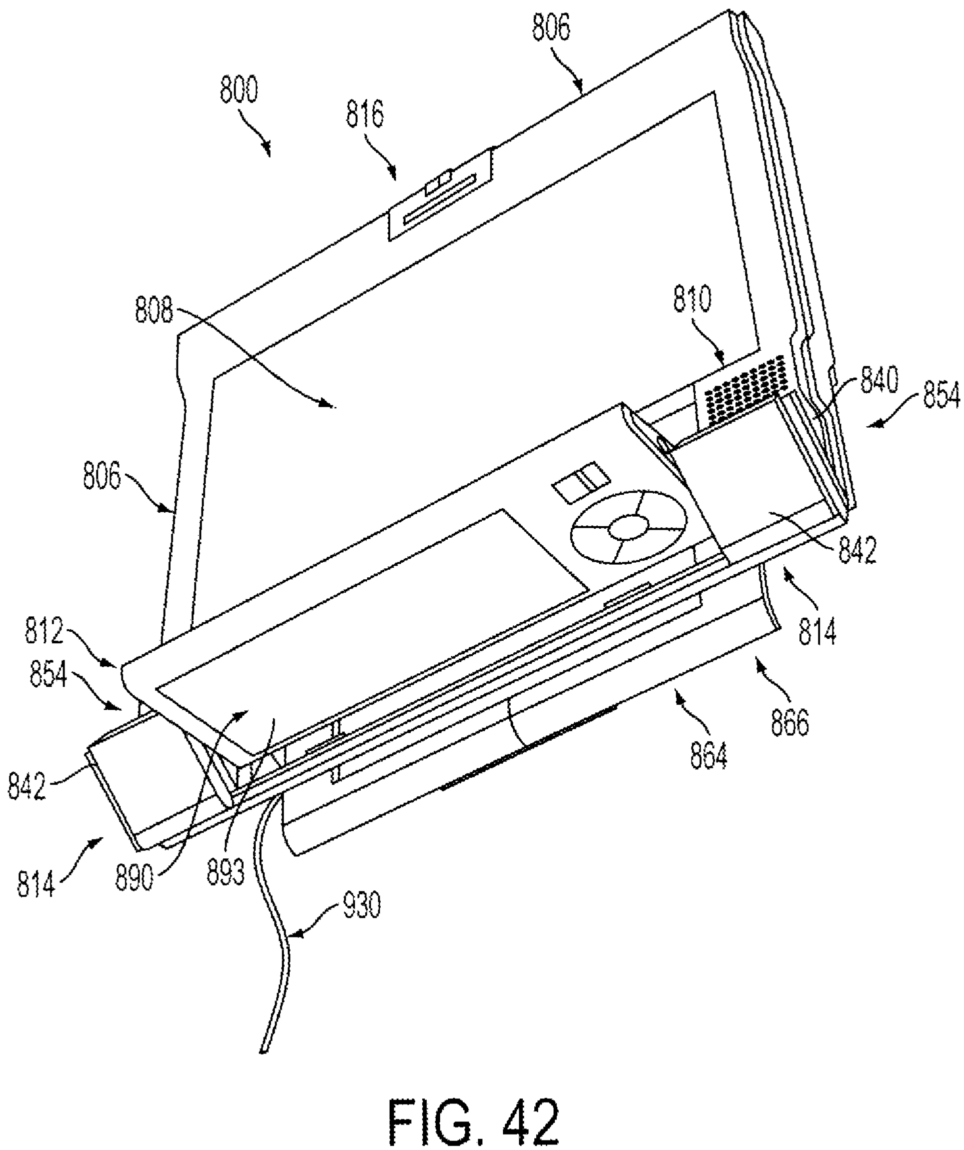
FIG. 42 is a bottom perspective view of the assembly of FIG. 39.
Figure 43:
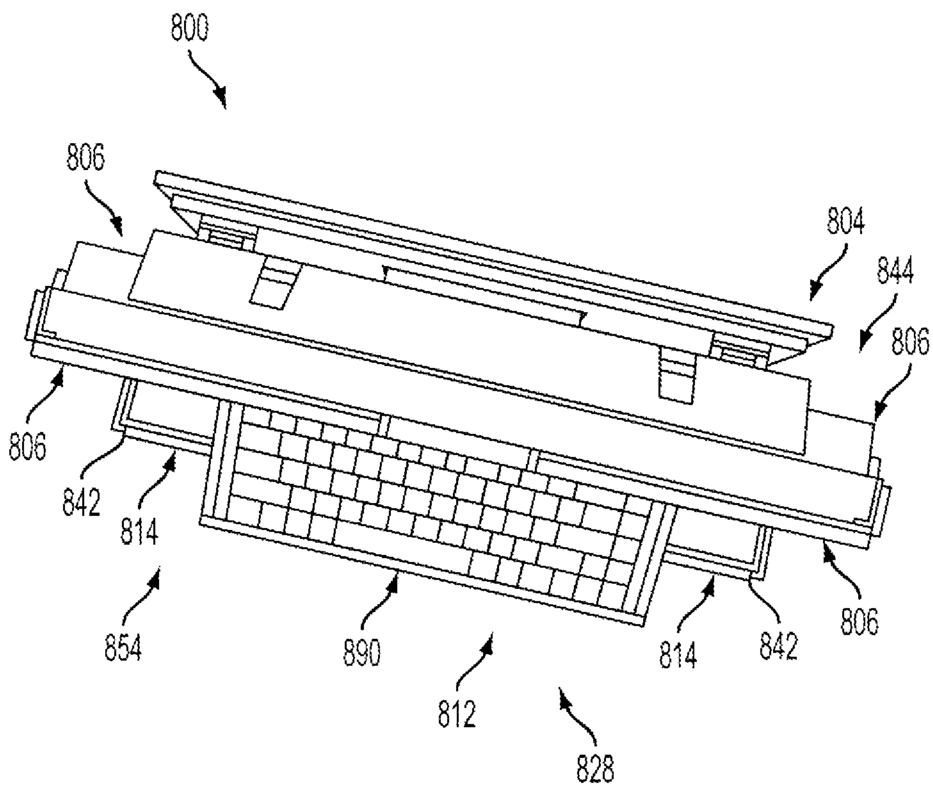
FIG. 43 is a top perspective view of the assembly of FIG. 39.
Figure 44:
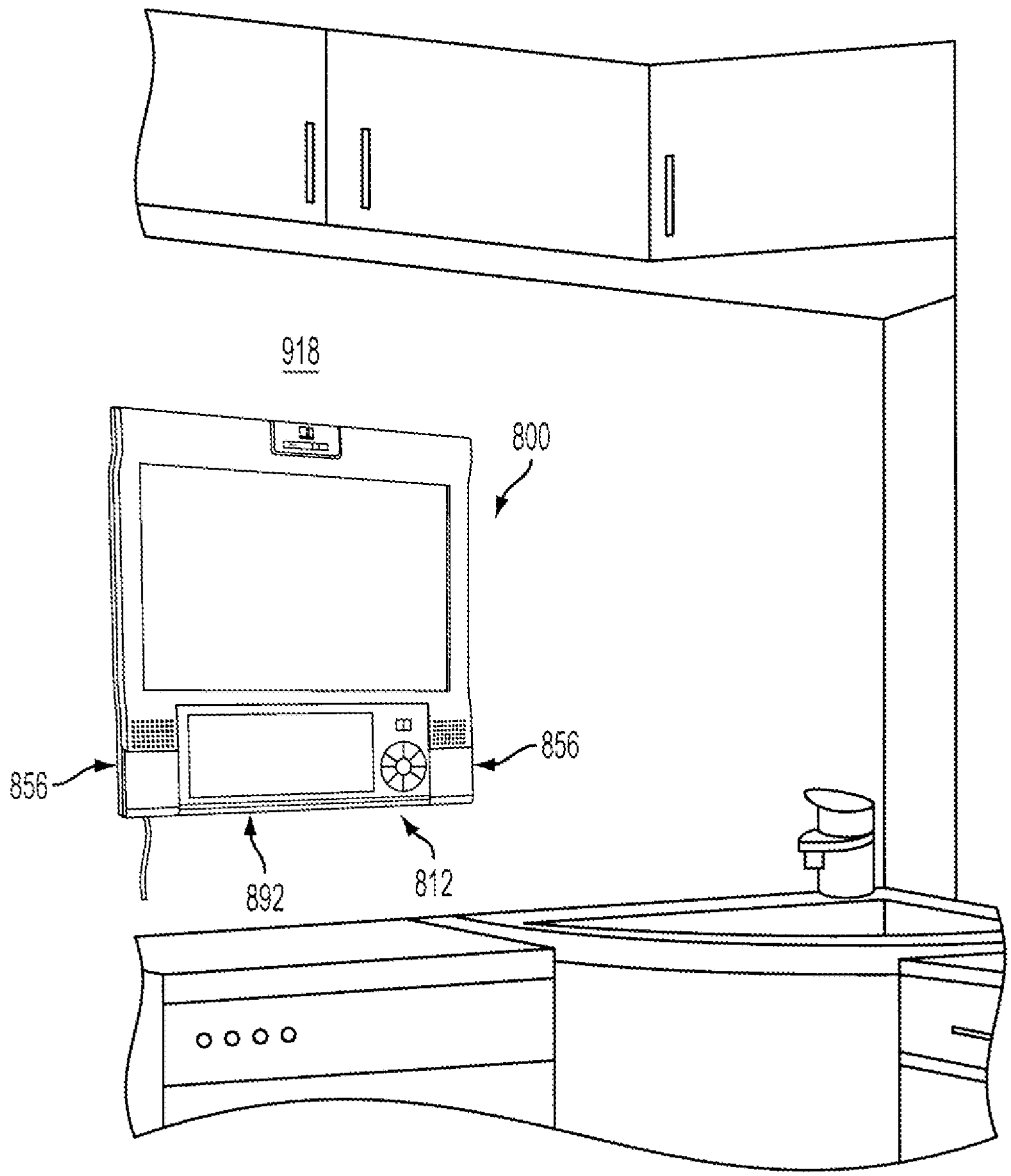
FIG. 44 is a front perspective view of one embodiment of an assembly of the main unit mounted to the mounting unit, which, in turn, is mounted to the wall of a room, where the input assembly is closed and the display panel of the input assembly is oriented in a vertical plane.
Figure 45:
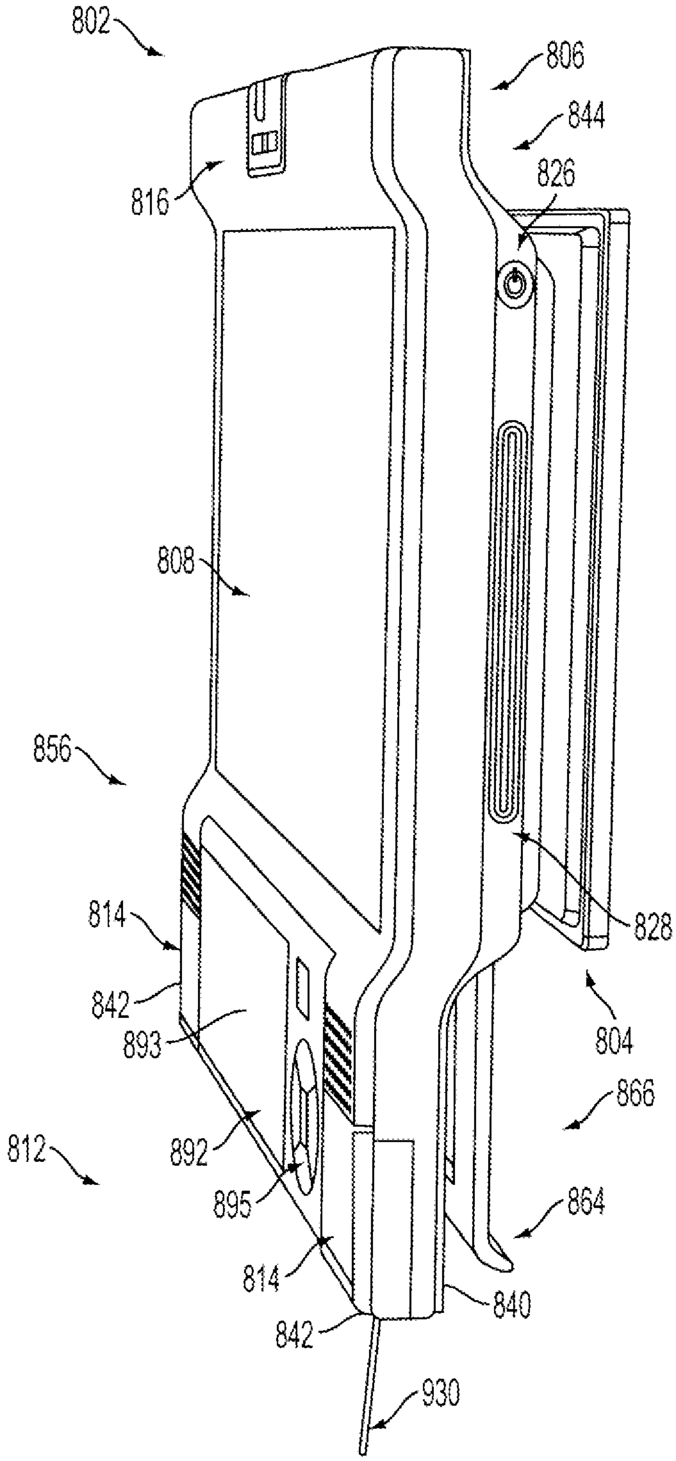
FIG. 45 is a right side elevation perspective view of the assembly of FIG. 44.
Figure 46:
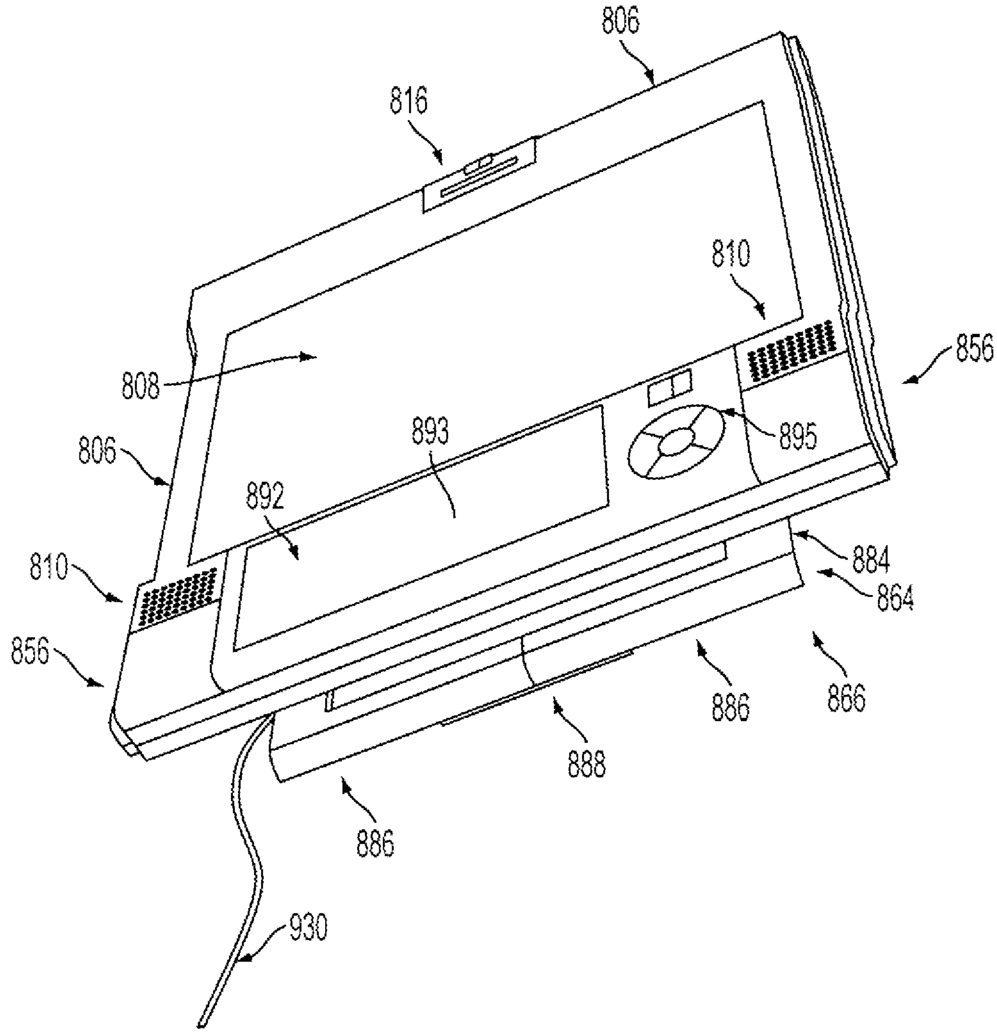
FIG. 46 is a bottom perspective view of the assembly of FIG. 44.
Figure 47:
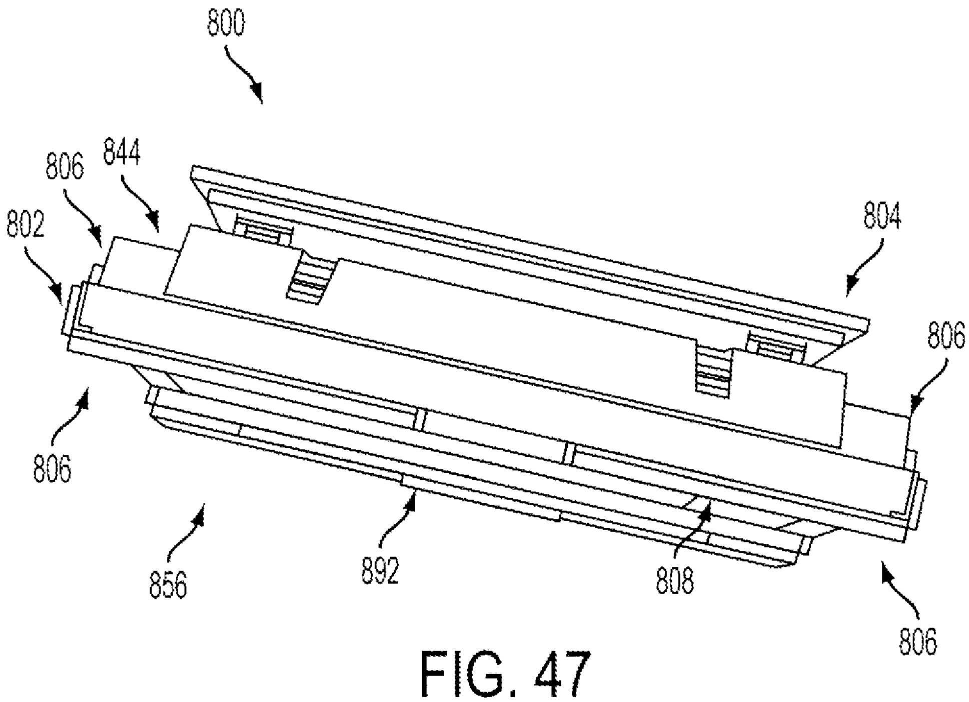
FIG. 47 is a top perspective view of the assembly of FIG. 44.
Figure 48:
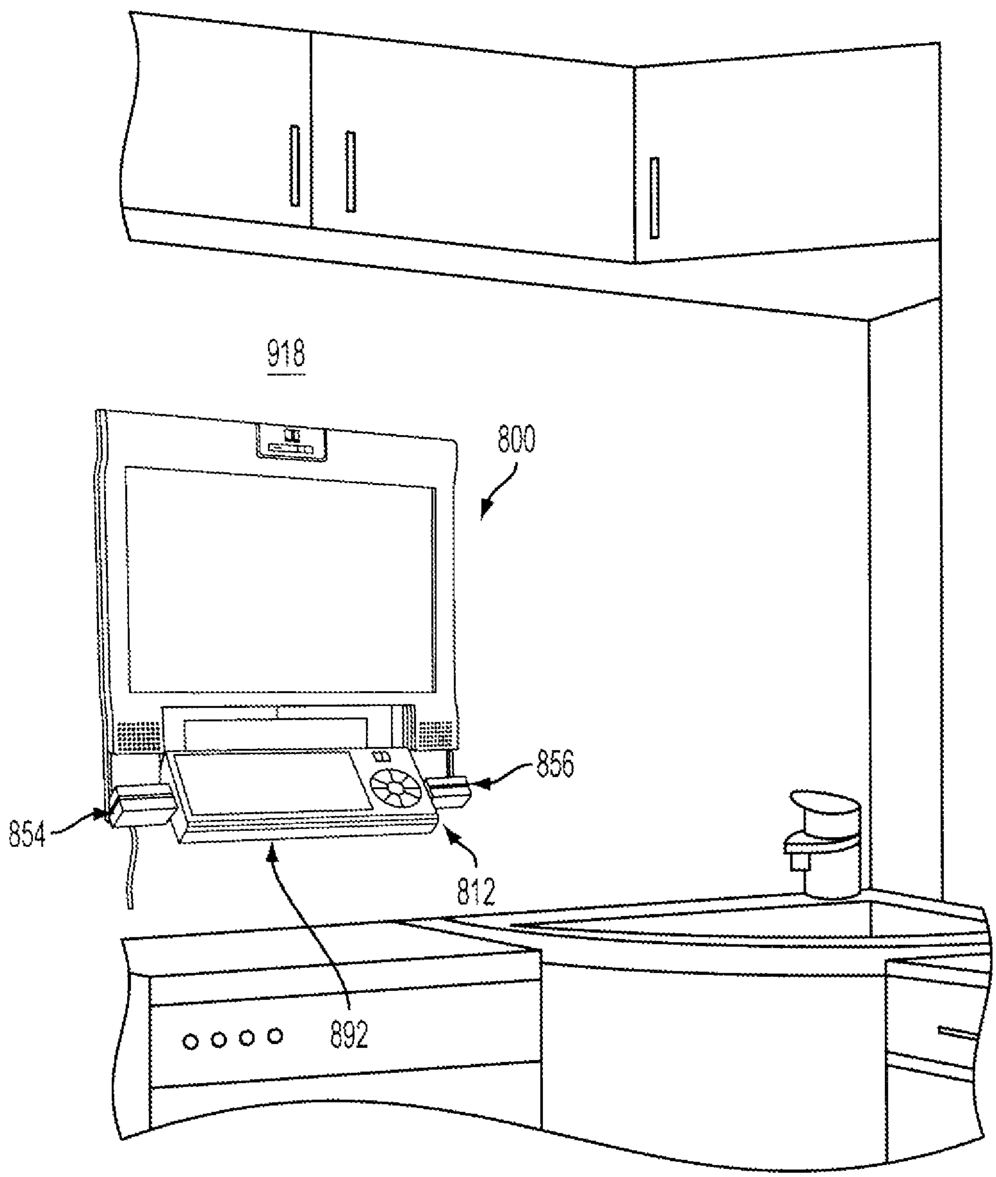
FIG. 48 is a front perspective view of one embodiment of an assembly of the main unit mounted to the mounting unit, which, in turn, is mounted to the wall of a room, where the input assembly is open and the display panel of the input assembly is facing upward.
Figure 49:
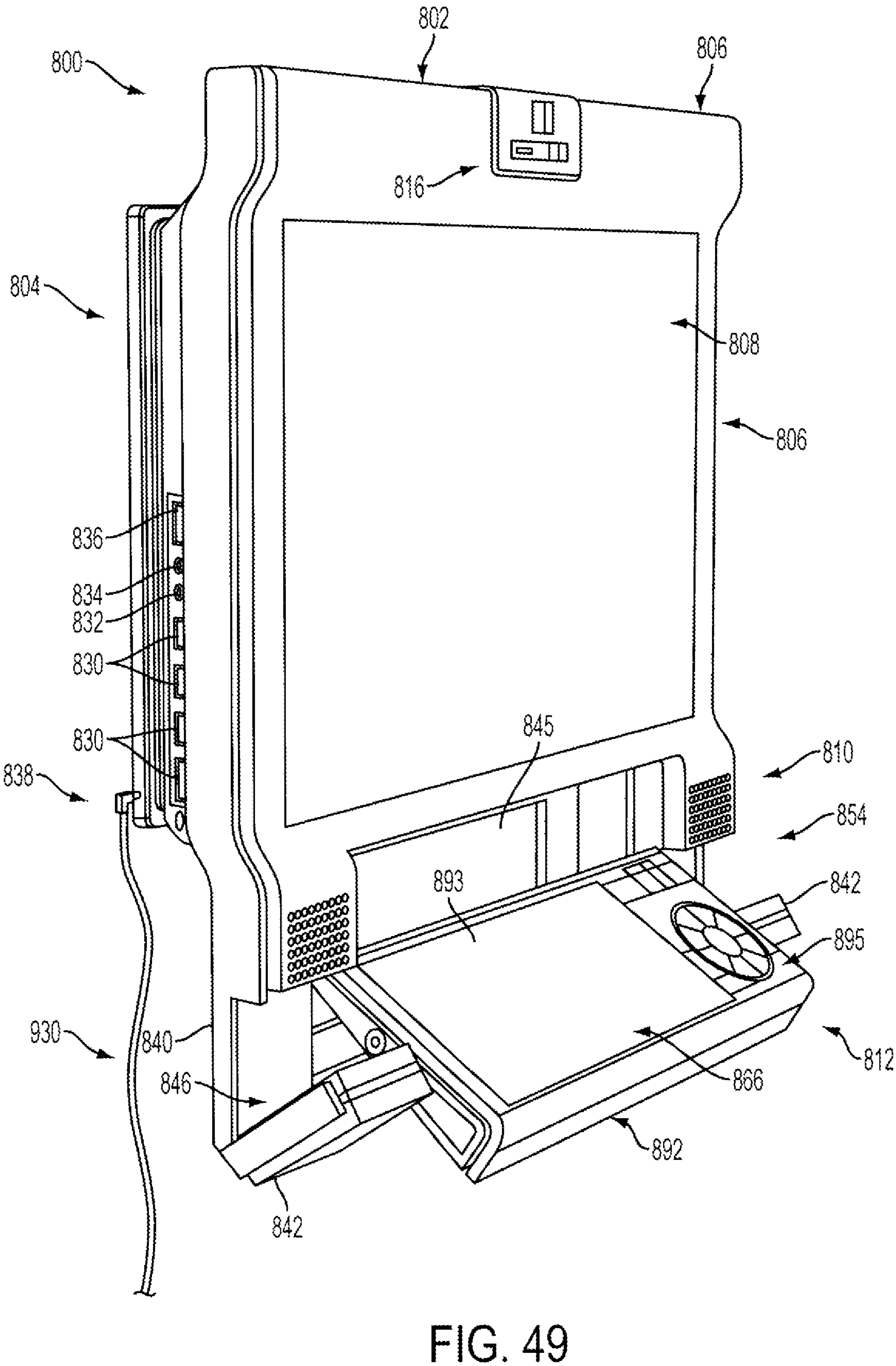
FIG. 49 is a left side elevation perspective view of the assembly of FIG. 48.
Figure 50:
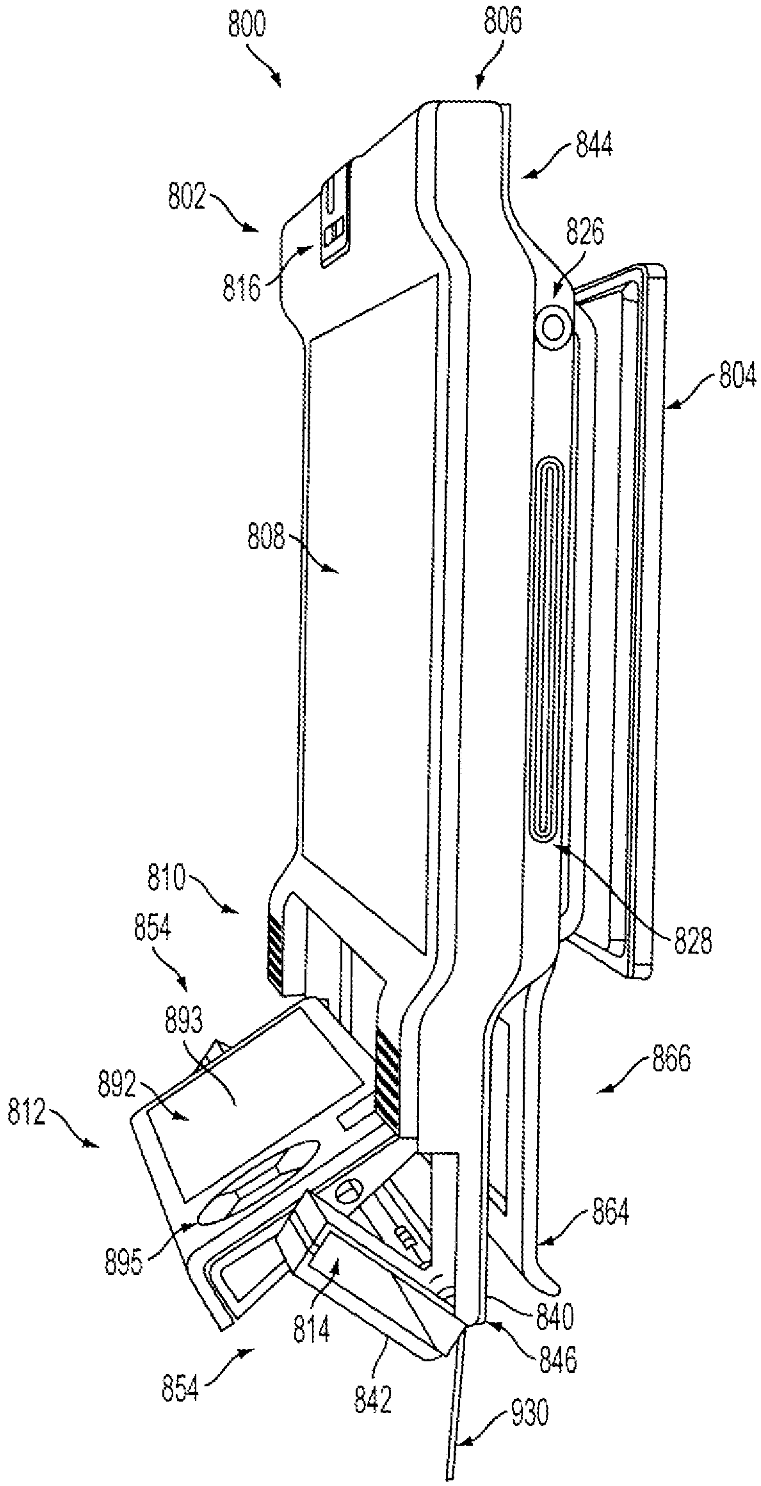
FIG. 50 is a right side elevation perspective view of the assembly of FIG. 48.
Figure 51:
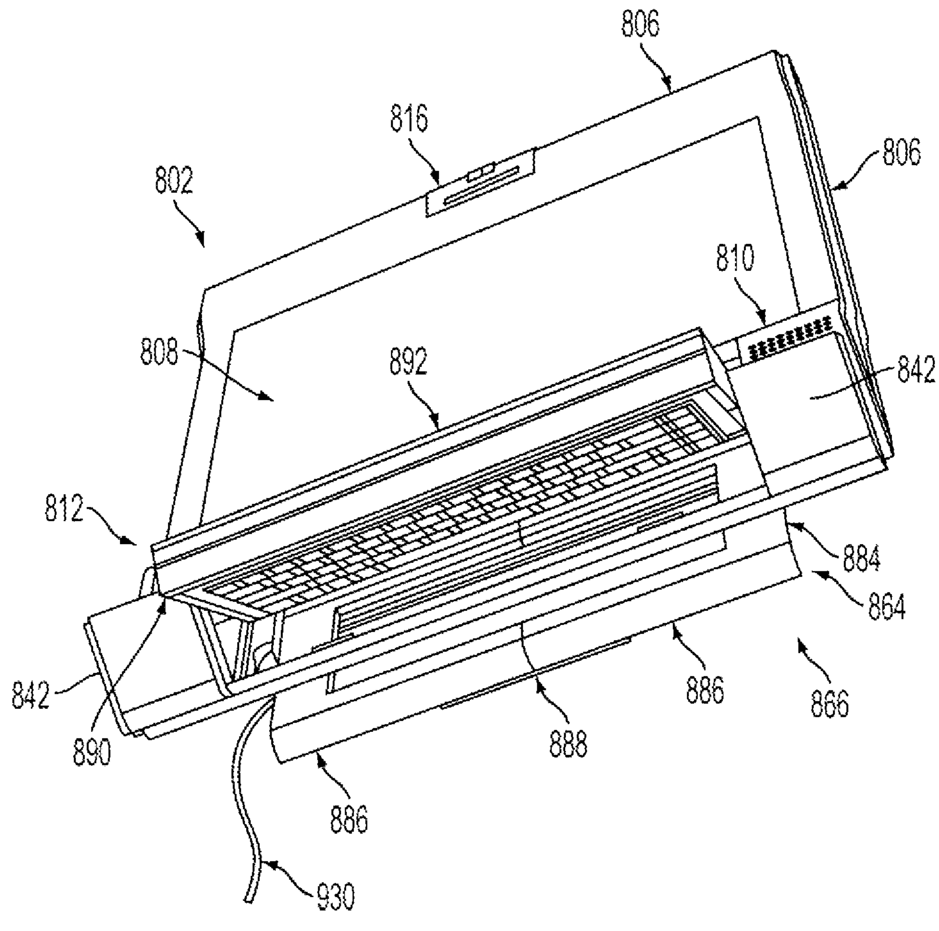
FIG. 51 is a bottom perspective view of the assembly of FIG. 48.
Figure 52:
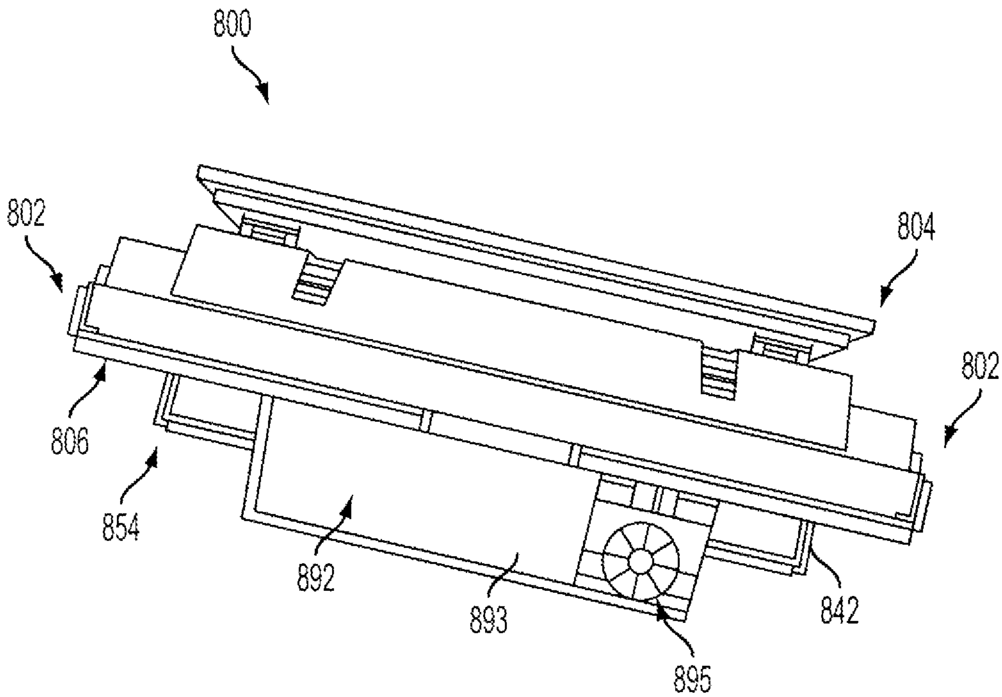
FIG. 52 is a top perspective view of the assembly of FIG. 48.

Referring to FIGS. 48-52, the user can open, swing-out and rotate the input assembly 812 so that the display panel 892 is faced upward, oriented at a desired angle for making inputs at the display panel 892. With reference to FIGS. 40 and 53, in one embodiment, when the arm assembly 814 is open, the user can repeatedly spin or rotate the input assembly 812 through three hundred sixty degrees. In the course of each such revolution, a portion of the input assembly 812 extends into the space 845. Also, during such rotation, it should be understood that the rotary couplers 848 provide a resistance force to counter such rotational movement. Such resistance force, in one embodiment, is sufficient to keep the input assembly 812 from rotating despite the force exerted by the user's arms, wrists and hands while typing on, or using, the input assembly 812.

Figure 66:
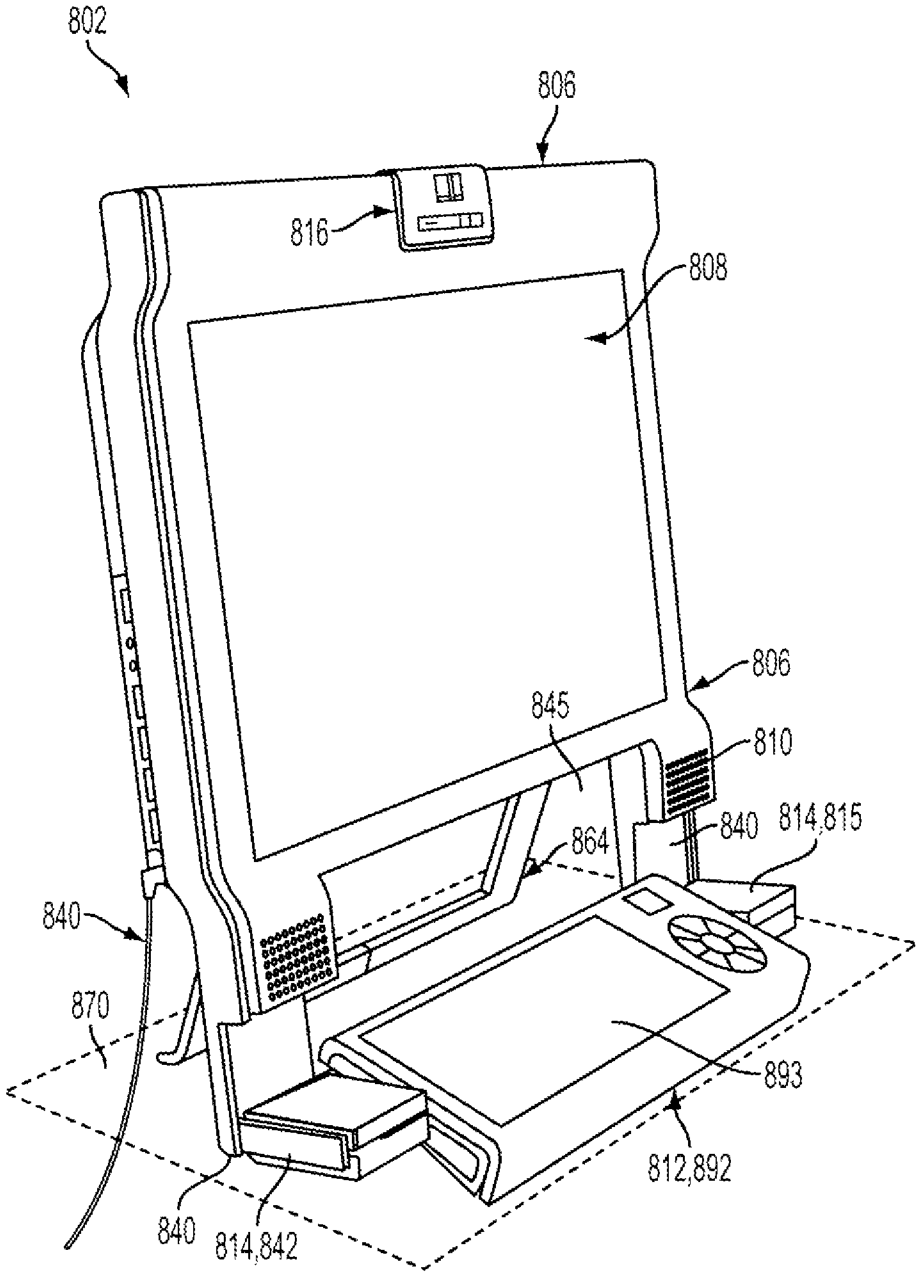
FIG. 66 is a front perspective view of the main unit standing on a support surface, illustrating the input assembly open with the display panel upward.

When the user removes the main unit 804 from the mounting unit 806, the user can use the main unit 804 in any desired suitable fashion. In one example not illustrated, the user can operate the main unit 804, like a tablet computer, with the back 844 of the main unit 804 lying on a support surface. In another example illustrated in FIGS. 62-68, the user can operate the main unit 804, like a desktop computer, with the main unit 804 standing on a support surface 870. The user can open the arm assembly 814 so that the arms 842 and the input assembly 812 are in contact with, and supported by, the support surface 870. In such example, the input assembly 812 is connected to the arm assembly 814. The user can rotate the input assembly 812 so that the display panel 892 is upward, as illustrated in FIG. 66. The user also has the option of detaching the input assembly 812 from the main unit 804, as illustrated in FIGS. 67 and 68, and operating the input assembly 812 apart from the main unit 804.

7.3 Mounting Unit

Referring to FIGS. 54-56 and 59-61, the mounting unit 804, in one embodiment, includes: (a) a base 920 which is attachable to a vertical or upstanding support structure 918, such as column or room wall; and (b) a cover 922 configured to mask or cover part of the mounting unit 804. In one embodiment, the base 920 houses an adapter or transformer operable to transform AC to DC, also known as an AC/DC transformer (not illustrated).

Figure 55:
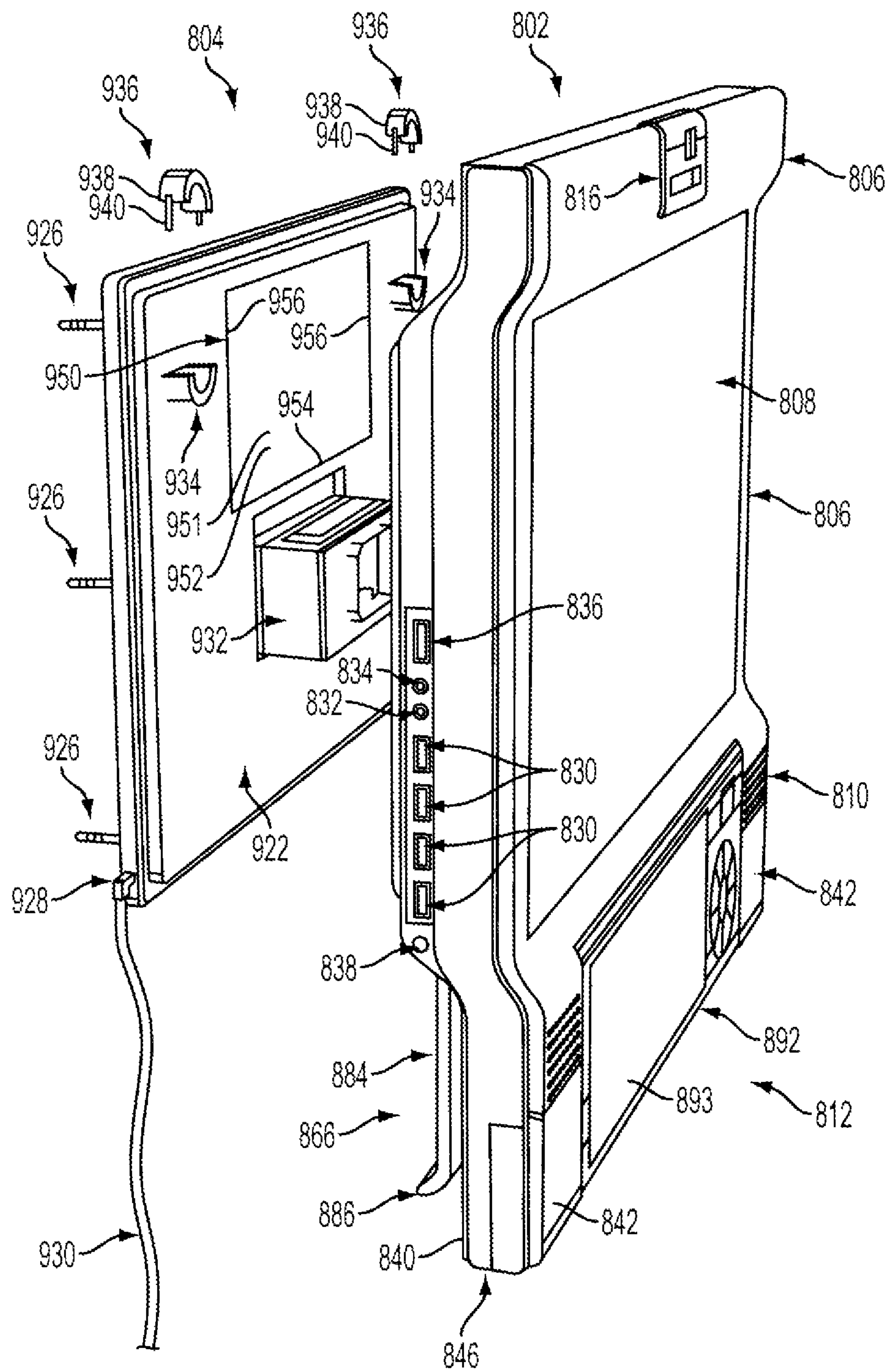
FIG. 55 is a left side elevation exploded perspective of one embodiment of the main unit spaced apart from the mounting unit, illustrating the securing members of the mounting unit.
Figure 61:
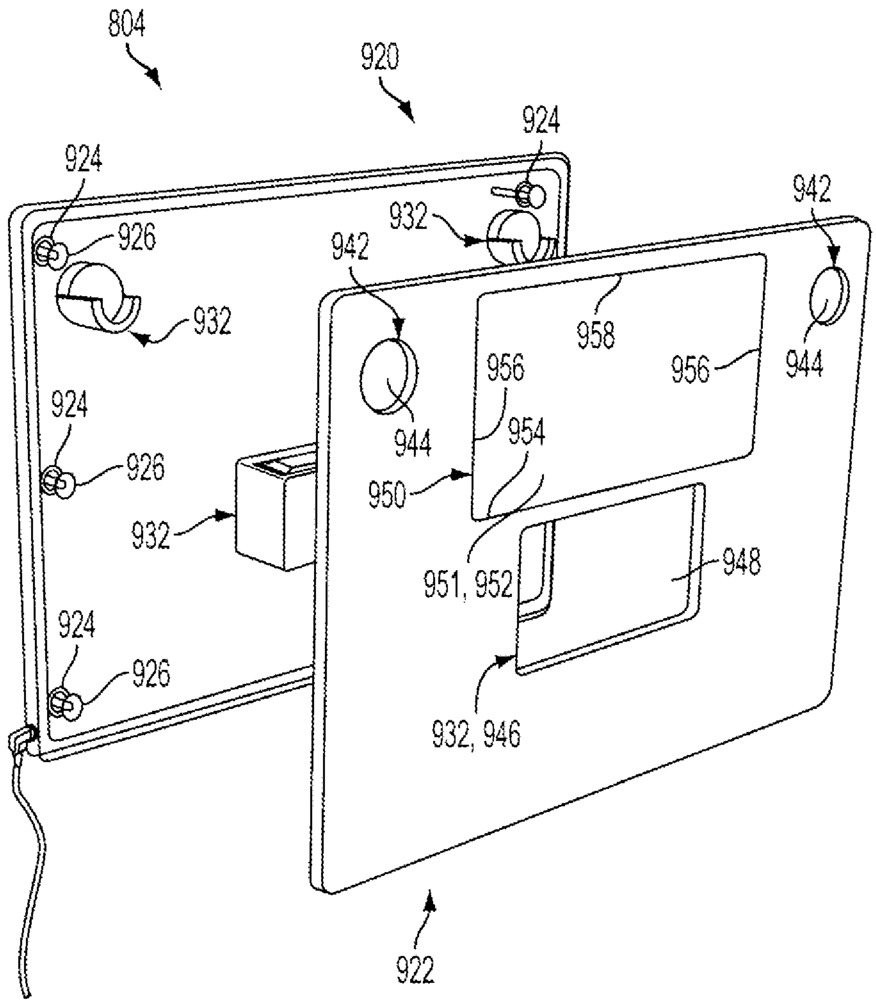
FIG. 61 is an exploded front perspective view of one embodiment of the mounting unit, illustrating the base and the cover.
Figure 62:
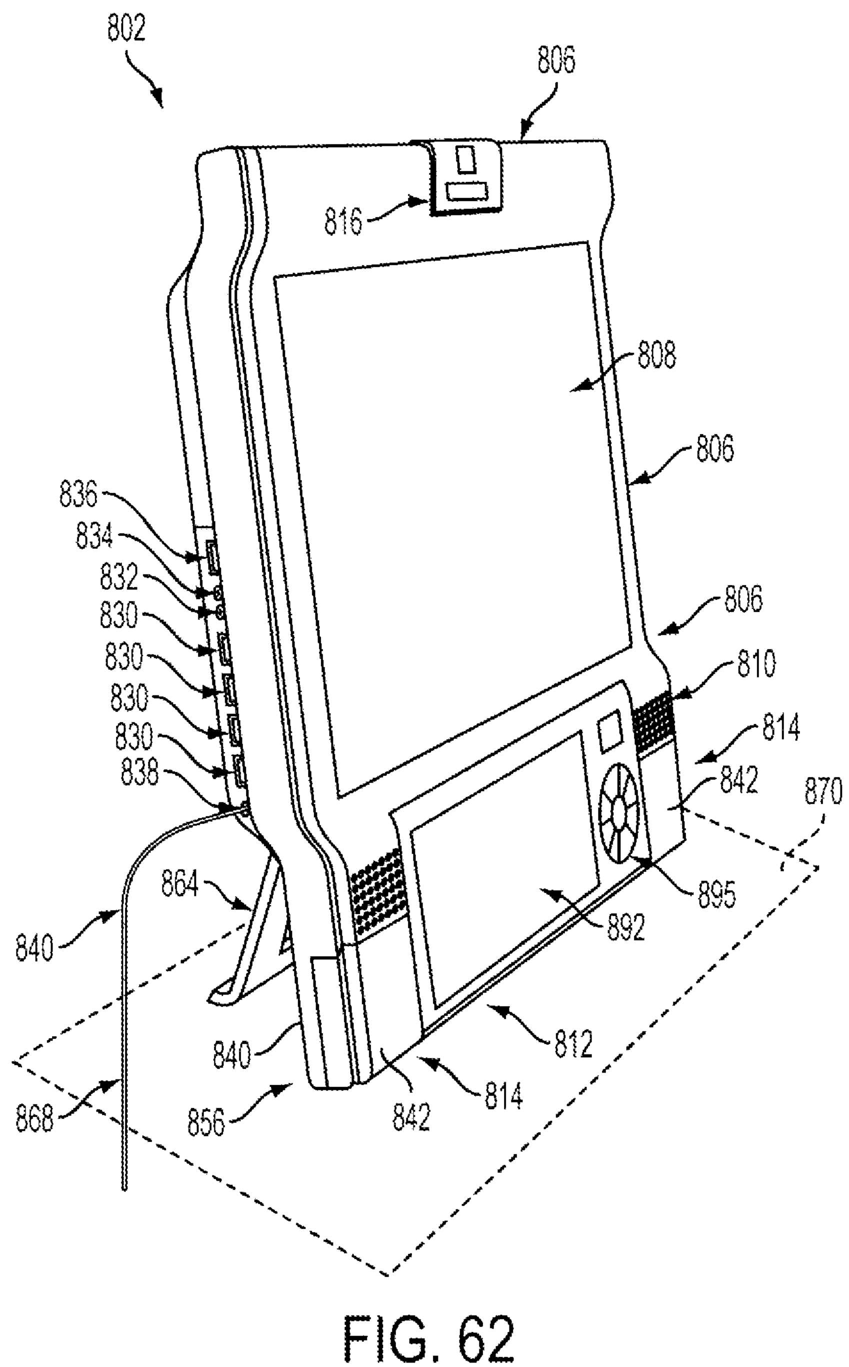
FIG. 62 is a front perspective view of one embodiment of the main unit standing on a support surface, illustrating the input assembly closed with the display panel facing outward.

Referring to FIGS. 55 and 61, the base 920 includes: (a) a face 923; (b) a plurality of fastener walls 924, each of which defines an opening, hole or edge which is configured to be received by, or engaged with, a fastener such as a bolt or screw 926; (c) an electrical connector 928 electrically connected to such AC/DC transformer; (d) an electrical chord 930 having one end connectable to the electrical connector 928 and another end connectable to an AC source, such as an electrical outlet of a building; (e) an electrical mount 932 electrically connected to such AC/DC transformer; (f) a plurality of non-electrical mounts 934; and (g) a plurality of locks, inserts or mount securing devices 936 configured to secure the main unit 804 to the mounting unit 806.

Figure 60:
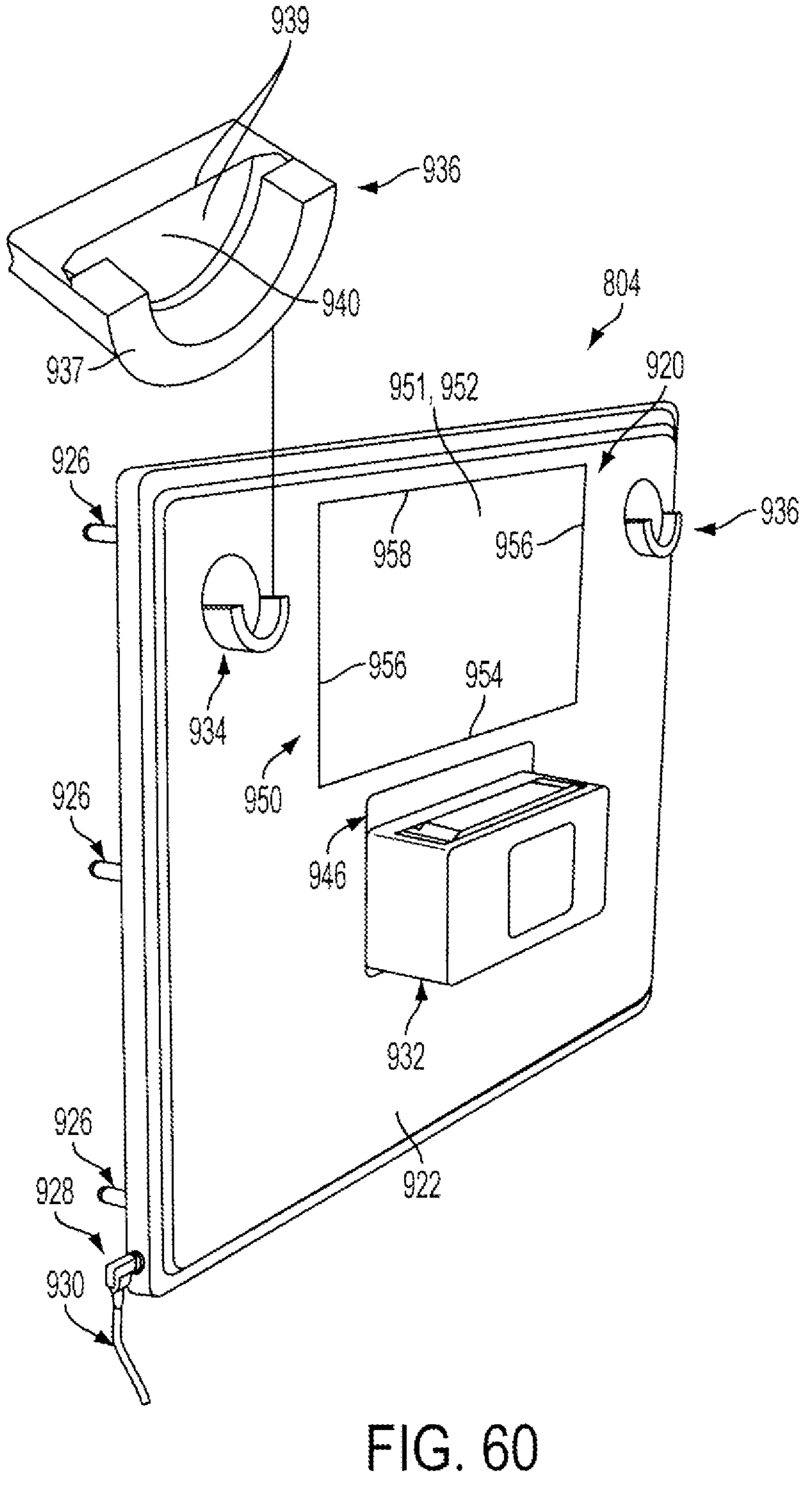
FIG. 60 is a front perspective view of one embodiment of the mounting unit.

Referring to FIG. 60, in one embodiment, the electrical mount 932 includes a positive terminal or metal contact and a negative terminal or metal contact. Such terminals can have any suitable configuration. In one embodiment, each such terminal has a concave shape to mate with the convex or dome shape of the terminals of the electrical mount engager 862 of the main unit 802. When the user mounts the main unit 802 on the mounting unit 804, the electrical mount 932 charges the battery unit of the main unit 804 until such battery unit has a full charge state. In addition to having an electrical function, the electrical mount 932 also supports the weight of the main unit 804 when the main unit 804 is mounted. In this sense, the electrical mount 932 has both electrical and non-electrical functionality.

Referring to FIGS. 56 and 60, in one embodiment, each non-electrical mount 934 has a U-shaped outer wall 937 spaced apart from an inner wall 939. When the main unit 804 is mounted, the disk-shaped head 878 of each mount engager 860 rests in the space between the inner wall 939 and the U-shaped outer wall 937. At the same time, the vertical slot 941 defined by the U-shaped outer wall 937 receives the neck of the mount engager 860. As such, the U-shaped outer wall 937 provides a retainer function, decreasing the likelihood that the main unit 804 might unintentionally be demounted or laterally pulled away from the mounting unit 806. In addition to this retainer function, the non-electrical mounts 934 support the weight of the main unit 804.

In one embodiment, referring to FIG. 55, each mount securing device 936 is shaped to mate with one of the non-electrical mounts 934, and each mount securing device 936 defines a plurality of fastener openings 938 sized to receive a plurality of fasteners, such as bolts or screws 940. To secure the main unit 804 to the mounting unit 806, the user screws the mount securing devices 936 into the non-electrical mounts 934, entrapping the disk-shaped heads 878 of the main unit 804. The installation of the mount securing devices 936 provides a theft deterrent function as well as additional coupling functionality.

In another embodiment not illustrated, the mount securing device includes a lock having a key opening, and such lock secures the main unit 804 to the mounting unit 806 as a theft deterrent function. In one embodiment not illustrated, the mount securing device includes a chain or steel cable which harnesses the main unit 804 to the mounting unit 806 through the use of a pad lock or other suitable lock.

Referring to FIG. 61, in one embodiment, the cover 922 includes: (a) a plurality of upper walls 942 which define a plurality of upper openings 944; (b) a lower wall 946 which defines a lower opening 948; and (c) an artistic item holder, such as a picture holder 950, connected to the face 951 of the cover 922. In one embodiment, each upper opening 944 has the same geometric shape as the perimeter of the non-electrical mount 934 received by such upper opening 944. In one embodiment, each upper opening 944 is only slightly larger than the perimeter of such non-electrical mount 934. In one embodiment, the lower opening 946 has the same geometric shape as the perimeter of the electrical mount 932 received by such lower opening 948. In one embodiment, each upper opening 944 is only slightly larger than the perimeter of such non-electrical mount 934.

In one embodiment, the cover 922 is fastenable to the base 920 through a snap-fit or press-fit process. It should be appreciated, however, that any suitable fastener can be used to attach the cover 922 to the base 920, including, but not limited, to adhesives, double-sided tape, and hook and loop fasteners.

In one embodiment, the picture holder 950 includes a front wall 952, a lower wall 954, and a plurality of side walls 956. The upper end 958 of the picture holder 950 is open, enabling the user to slide a photograph, picture or other substantially flat object into the picture holder 950. In one embodiment not illustrated, the picture holder only includes a single bent arm which is predisposed to apply a force to the face 951 of the cover 922. In one embodiment, the front wall 952 is fully or partially transparent or translucent, enabling the user to view the object inserted into the picture holder 950.

In other embodiments not illustrated, the picture holder includes: (a) a clasp device operable to releasably hold an item; (b) a plurality of vertical tracks or rails sized to receive vertical edges of a photograph or picture; (c) a plurality of horizontal tracks or rails sized to receive horizontal edges of a photograph or picture; (d) a plurality of track members seated within a plurality of grooves which enable the user to adjust the size of the picture holder for differently sized photographs and pictures; or (e) a device having any suitable combination of the foregoing elements.

By attaching the cover 922 to the base 920, the cover 922 masks or covers the heads of the screws 926. When the main unit 804 is demounted, the mounting unit 806 displays the photograph, picture or artistic object inserted into the picture holder 950. This facilitates coordinating the appearance of the mounting unit 806 with the decoration of the environment.

In one embodiment not illustrated, an alternate cover is sized with an area greater than the mounting unit 806. Here, the alternate cover is usable when the main unit 804 is demounted. The alternate cover has a thickness which is greater than the thickness of the mounting unit 806. In addition, the alternate cover is configured to be removably attached to the mounting unit 806. Due to the thickness of the alternate cover, the alternate cover defines an inner space which receives and covers all (or substantially all) of the components of the mounting unit 806. In one embodiment, the alternate cover has couplers configured to releasably attach the alternate cover to the non-electrical mounts 934 when the main unit 804 is demounted. In another embodiment, one or more of the walls of the alternate cover are configured to removably engage with the mounting unit 806 in a snap-fit fashion. In one embodiment, the alternate cover is a box-shaped picture frame having a plurality of windows to hold pictures. In another embodiment, the alternate cover is a convex-shaped picture frame having a plurality of windows to hold pictures.

In one example, the user carries out the following steps to use the main unit 804 with the mounting unit 806:

(a) hold the base 920 against the upstanding support structure 918, using the base 920 as a template to make six marks on the upstanding support structure 918 corresponding to the six circular fastener walls 924;

(b) remove the base 920 from the wall;

(c) drill a hole (not illustrated) on each one of the six marks on the upstanding support structure 918;

(d) insert six anchors (not illustrated) in such holes;

(e) align the fastener walls 924 of the base 920 with such anchors;
(f) screw a screw 926, through the base 920, into each one of such anchors, as illustrated in FIG. 61;
(g) snap the cover 922 onto the base 920, as illustrated in FIG. 60;
(h) connect the electrical chord 930 to the mounting unit 806 and to an electrical outlet;
(i) lift the main unit 804 and mount it to the mounting unit 806, as illustrated in FIG. 56; and
(j) if desired for security reasons, screw the mount securing devices 936 to the main unit 804 and mounting unit 806, as illustrated in FIG. 55.

7.4 Faceplates

Figure 59:
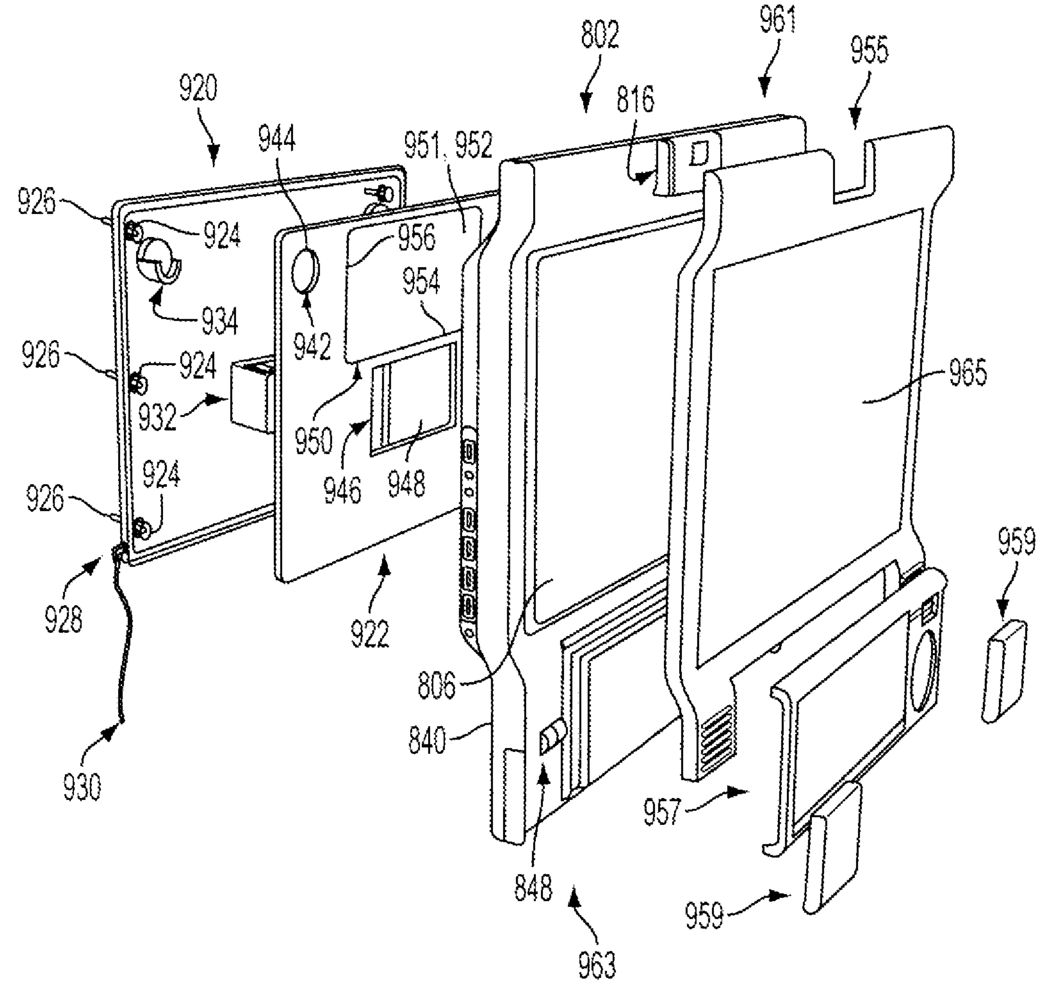
FIG. 59 is an exploded front perspective of one embodiment of the assembly illustrating the mount base, mount cover, main unit, main faceplate, input assembly faceplate, and housing extension faceplates.

Referring to FIG. 59, in one embodiment, the main unit 804 has a plurality of removable covers or faceplates including main faceplate 955, input assembly faceplate 957 and extension faceplates 959. The faceplates 955, 957 and 959 are removable for purposes of: (a) cleaning such faceplates; or (b) replacing such faceplates with replacement faceplates of the same color, a different color or replacements bearing different messages or symbols. In one embodiment, the main faceplate 955 has a transparent pane, cover or surface 965, though such surface can be translucent, tinted or otherwise incorporate a privacy characteristic. The main faceplate 955 is configured to cover the face or front 961 of the housing 806. Also, the main faceplate 955 has a plurality of couplers, such as bent walls, configured to be detachably connected to portions of the front 961. In one embodiment, the main faceplate 955 is removably attached to the front 961 in a snap-fit fashion. It should be appreciated, however, that main faceplate 955 can be removably attached to the front 961 through the use of any suitable fastener, including, but not limited to, hook and loop fasteners, snaps and screws.

The input assembly faceplate 957 is configured to cover the face or front 963 of the display panel 892 of the input assembly 812. Also, the input assembly faceplate 957 has a plurality of couplers, such as bent walls, configured to be detachably connected to portions of the display panel 892. In one embodiment, the input assembly faceplate 957 is removably attached to the display panel 892 in a snap-fit fashion. It should be appreciated, however, that input assembly faceplate 957 can be removably attached to the display panel 892 through the use of any suitable fastener, including, but not limited to, hook and loop fasteners, snaps and screws.

Each extension faceplate 959 is configured to cover the face or front 963 of a housing extension 840. Also, the extension faceplate 959 has a plurality of couplers, such as bent walls, configured to be detachably connected to portions of the front 963. In one embodiment, the extension faceplate 959 is removably attached to the front 963 in a snap-fit fashion. It should be appreciated, however, that extension faceplate 959 can be removably attached to the front 963 through the use of any suitable fastener, including, but not limited to, hook and loop fasteners, snaps and screws.

7.5 Logic and Interfaces for Control Panel

The display panel 892 of the input assembly 812 has a graphical user interface which displays a plurality of visual outputs and inputs. In one embodiment, the main unit 804 stores or accesses a software program which is executable to control such graphical user interface. The software program has a plurality of computer-readable instructions organized with a logic which is suitable for controlling such graphical user interface.

Figure 69:
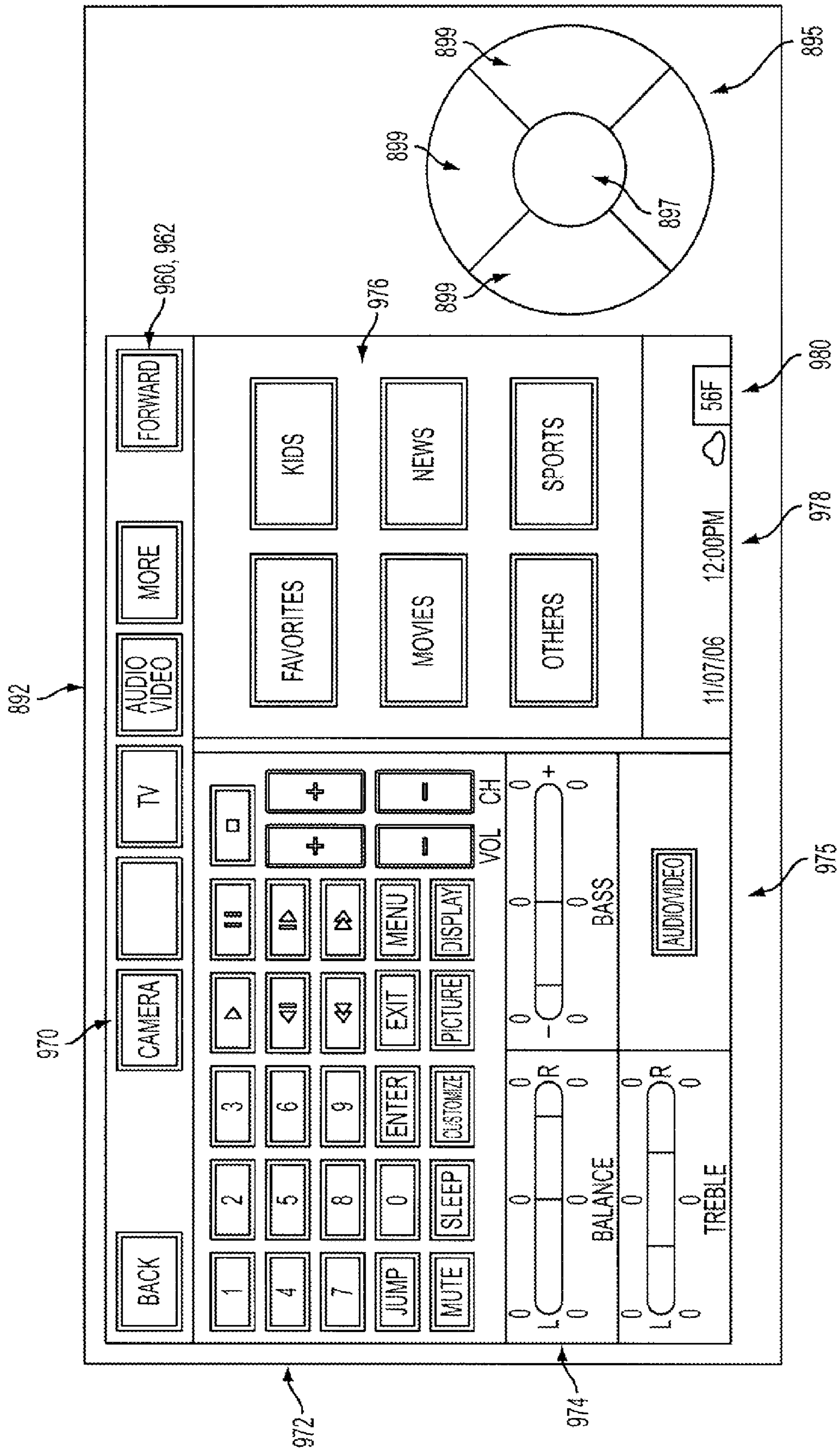
FIG. 69 is a top plan view of one embodiment of an initial screen of an entertainment interface of the display panel of the input assembly.
Figure 70:
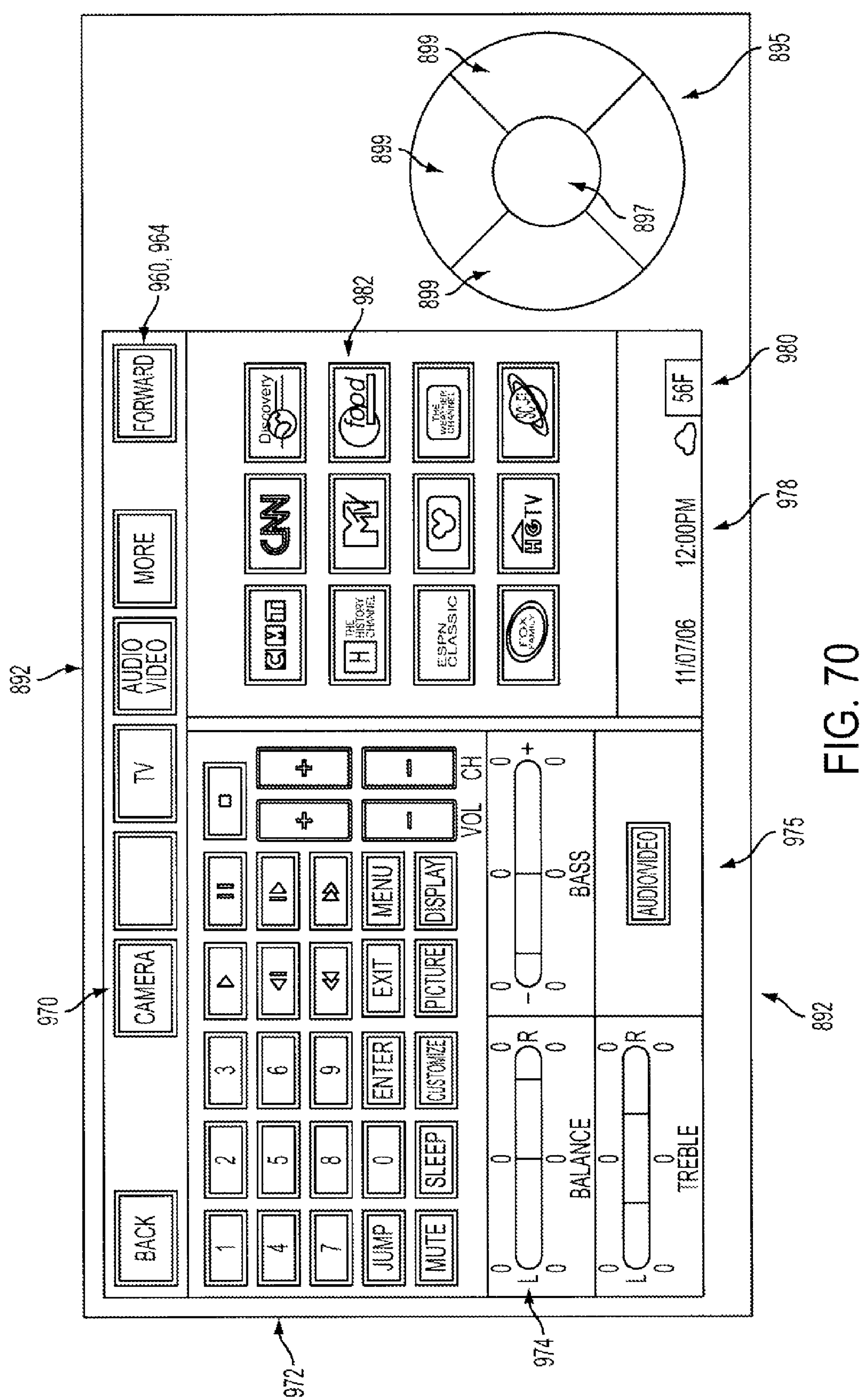
FIG. 70 is a top plan view of one embodiment of a second screen of an entertainment interface of the display panel of the input assembly.

In one embodiment illustrated in FIGS. 69-72, the display panel 892 has an entertainment interface 960 including example screens 962, 964, 966 and 968. Referring to FIG. 69, example screen 962 displays: (a) a top horizontal menu 970 of selectable inputs including CAMERA, CALCULATOR, TV, AUDIO/VIDEO and MORE; (b) a television and audio control set 972 including a plurality of selectable numbers, volume control inputs, play, forward, pause, mute, sleep and other audiovisual inputs; and (c) a level control set 974 including a plurality of slidable bars for adjusting the balance and the levels of bass, treble and other audiovisual parameters; (d) an ADVANCED input 975 for making advanced audiovisual settings; (e) a shortcut input set 976, including favorites MOVIES, OTHERS, KIDS, NEWS and SPORTS; (f) a data and clock output 978; and (g) a weather output 980. In one embodiment, the weather output 980 is periodically updated by a webserver connected to the main unit 804 over the Internet. For example, the user can subscribe to an online weather service of a weather website, and the service could periodically download weather data to the weather output 980.

In the illustrated example, the user uses his/her finger or the navigation button 895 to select the FAVORITES input of screen 962. Then, the user advances to screen 964 illustrated in FIG. 70. Screen 964 displays the favorite input set 982 in place of the shortcut input set 976. In this example, the favorite input set 982 displays a plurality of selectable TV channels.

Figure 71:
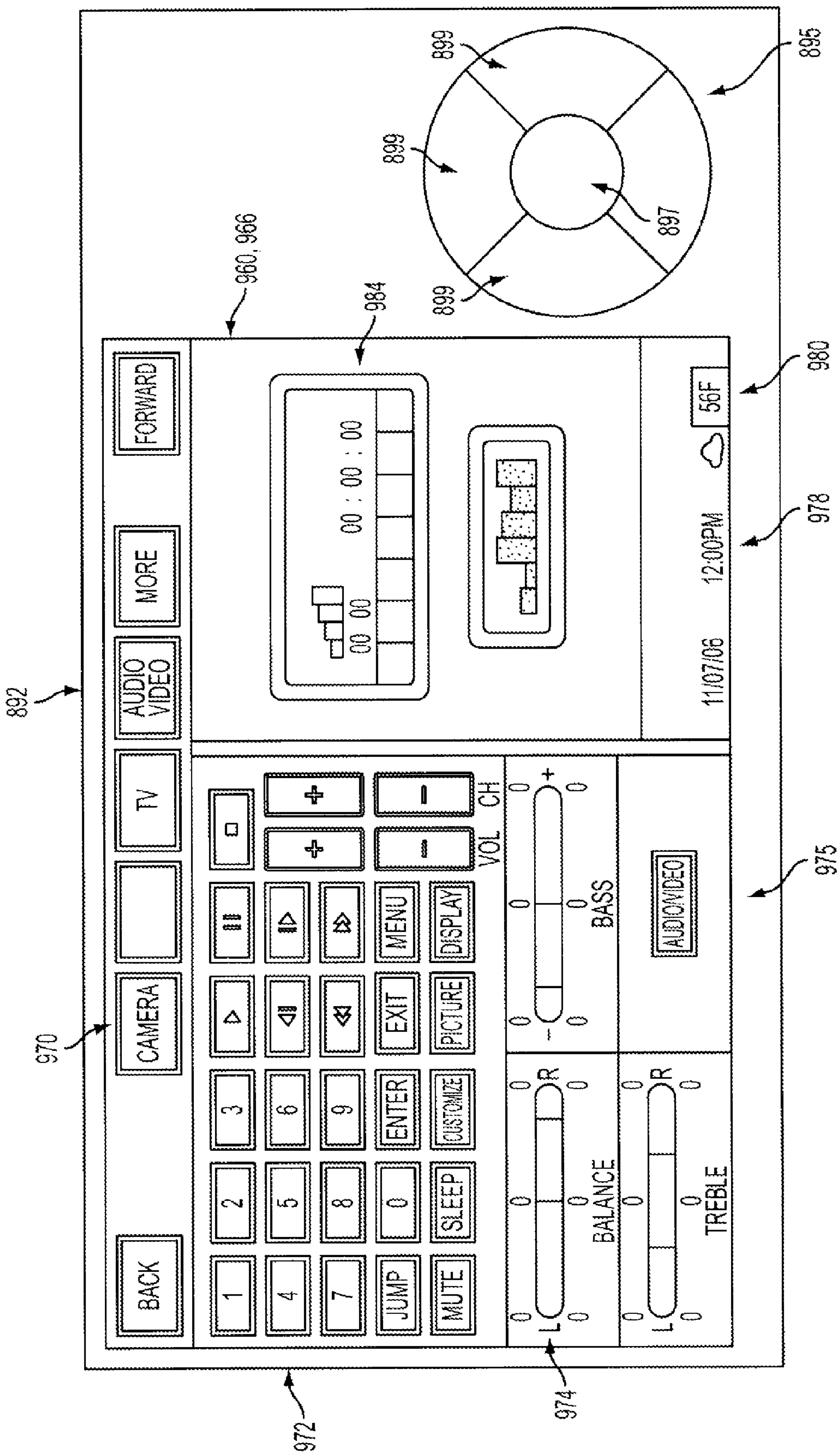
FIG. 71 is a top plan view of one embodiment of a third screen of an entertainment interface of the display panel of the input assembly.
Figure 72:
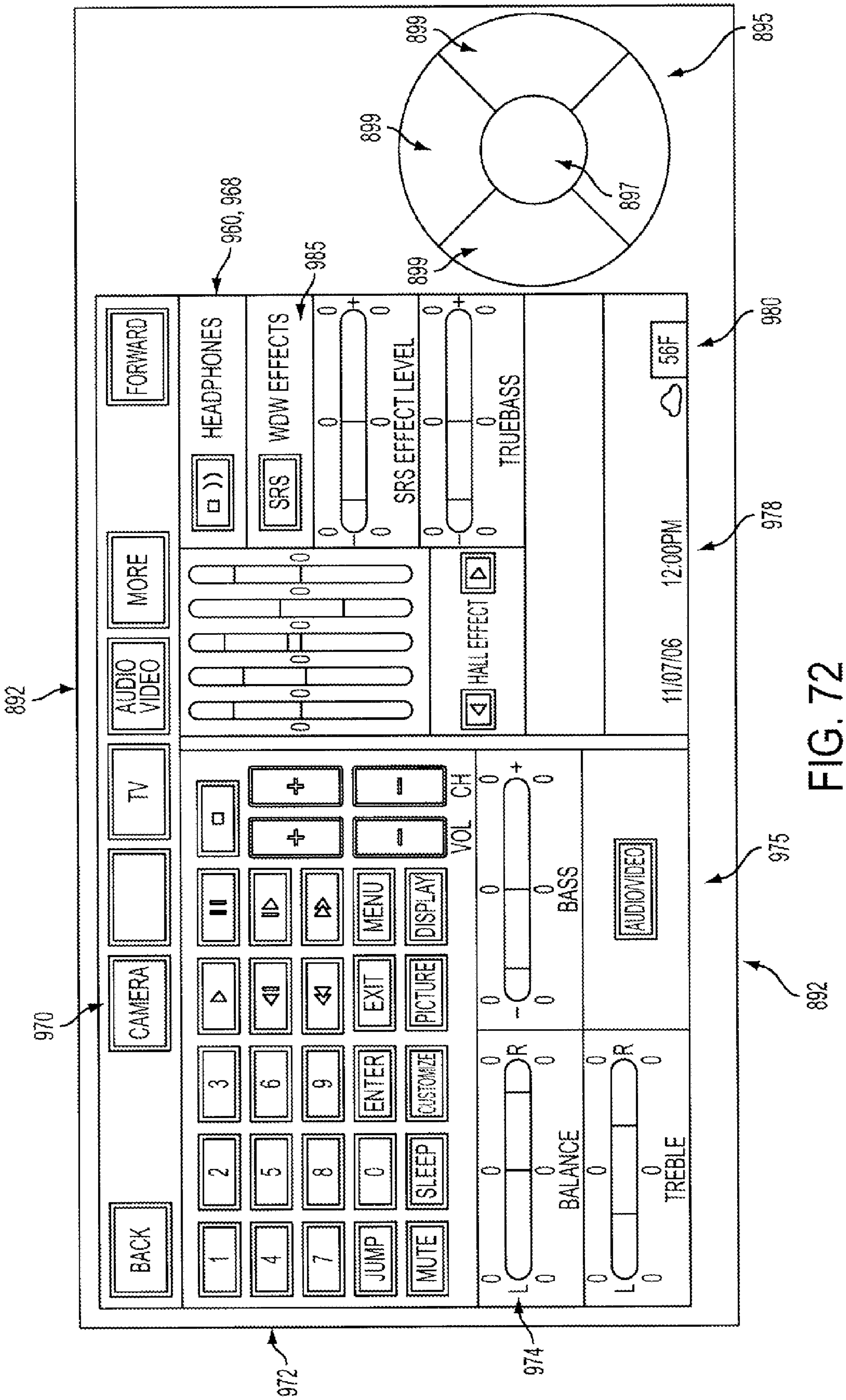
FIG. 72 is a top plan view of one embodiment of a fourth screen of an entertainment interface of the display panel of the input assembly.

If, rather than selecting the FAVORITES input of screen 962, the selects the AUDIO/VIDEO input of screen 962, this results in the display of screen 966 illustrated in FIG. 71. Screen 966 displays the audio meters 984 in place of the favorite input set 982. Next, the user uses his/her finger or the navigation button 895 to select the ADVANCED input 975, resulting in screen 968 illustrated in FIG. 72. Screen 968 displays a plurality of audio inputs to adjust a plurality of audio settings, including an equalizer and a plurality of other sound effect settings.

Figure 73:
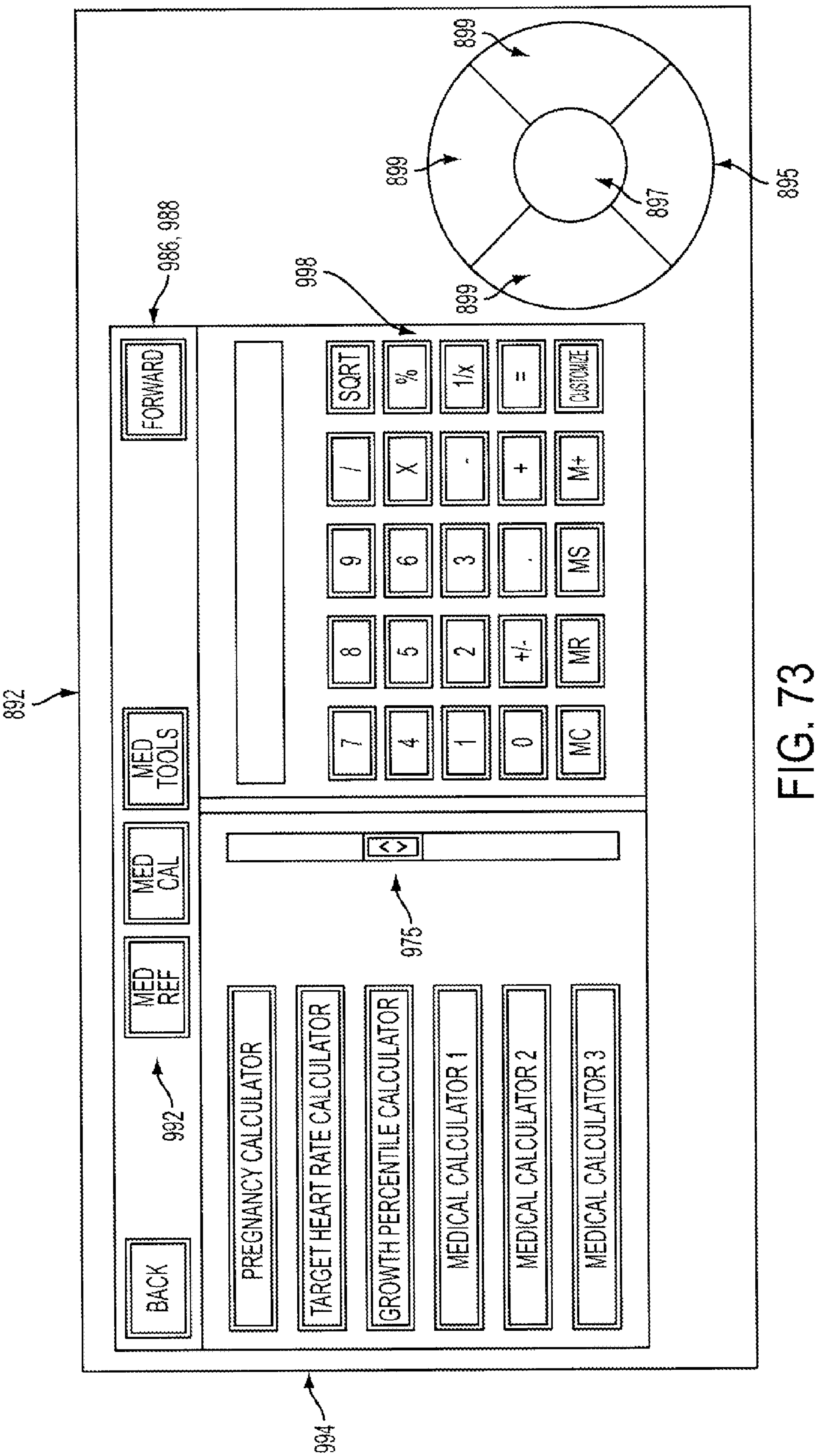
FIG. 73 is a top plan view of one embodiment of the initial screen of a medical calculator interface of the display panel of the input assembly.
Figure 74:
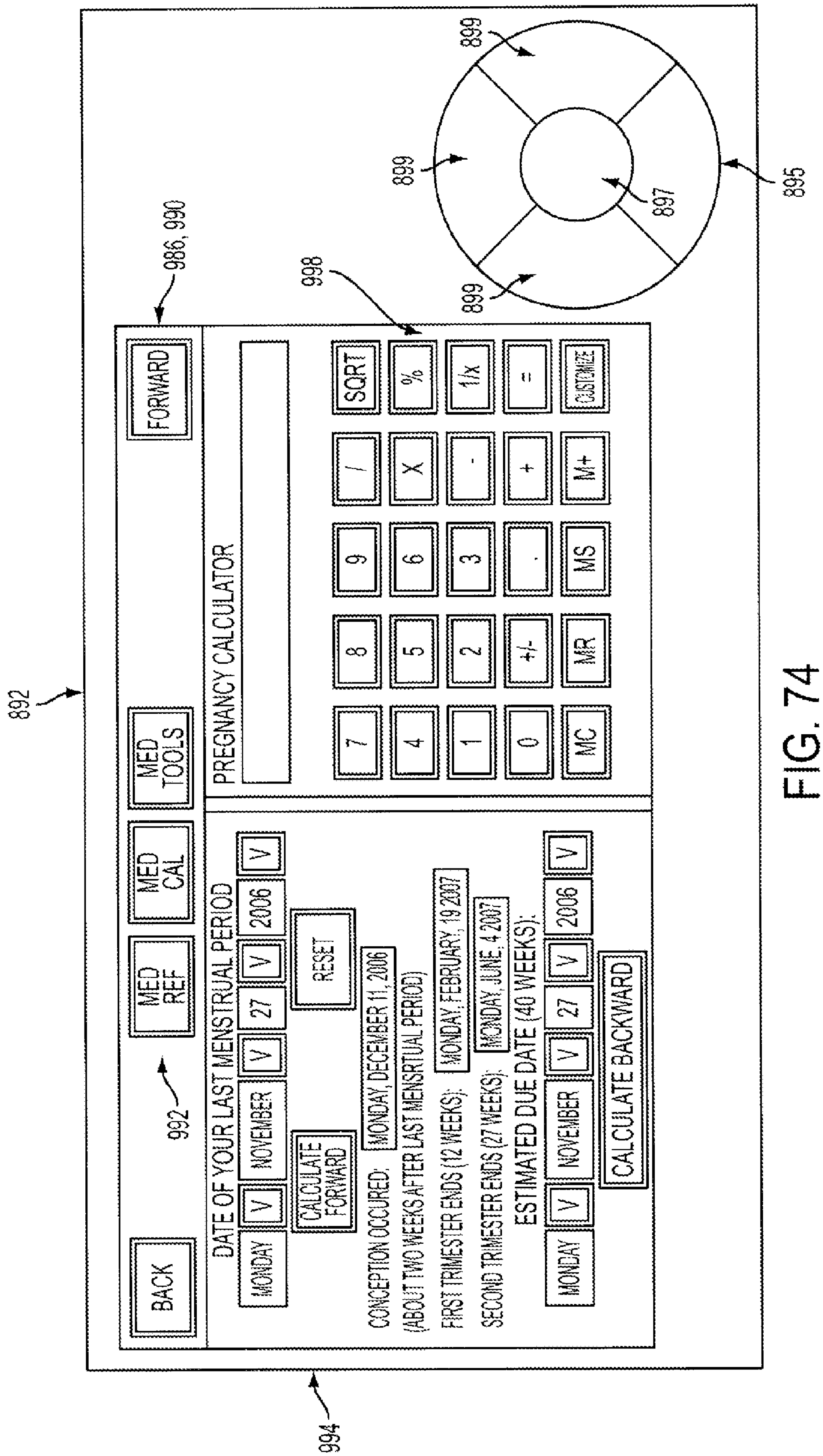
FIG. 74 is a top plan view of one embodiment of a second screen of a medical calculator interface of the display panel of the input assembly.

In one embodiment illustrated in FIGS. 73-74, the display panel 892 has a medical calculator interface 986 including example screens 988 and 990. Referring to FIG. 73, example screen 988 displays: (a) a top horizontal medical menu 992 of selectable inputs including MEDICAL REFERENCE, MEDICAL CALCULATOR, and MEDICAL TOOLS; (b) a vertical medical menu 994 of selectable inputs including a PREGNANCY CALCULATOR, TARGET HEART RATE CALCULATOR, GROWTH PERCENTILE CALCULATOR, MEDICAL CALCULATOR 1, MEDICAL CALCULATOR 2, and MEDICAL CALCULATOR 3 and a plurality of additional medical calculators and medical reference resources which are viewable by moving the scroll bar 996 downward; and (c) a general calculator 996.

In the illustrated example, the user uses his/her finger or the navigation button 895 to select the PREGENANCY CALCULATOR input of vertical medical menu 994. Then, the user advances to screen 990 illustrated in FIG. 74. Screen 990 has an interactive pregnancy calculation form 1000 and the general calculator 998. The pregnancy calculation form 100 includes a plurality of pull-down menus for entering data.

Figure 75:
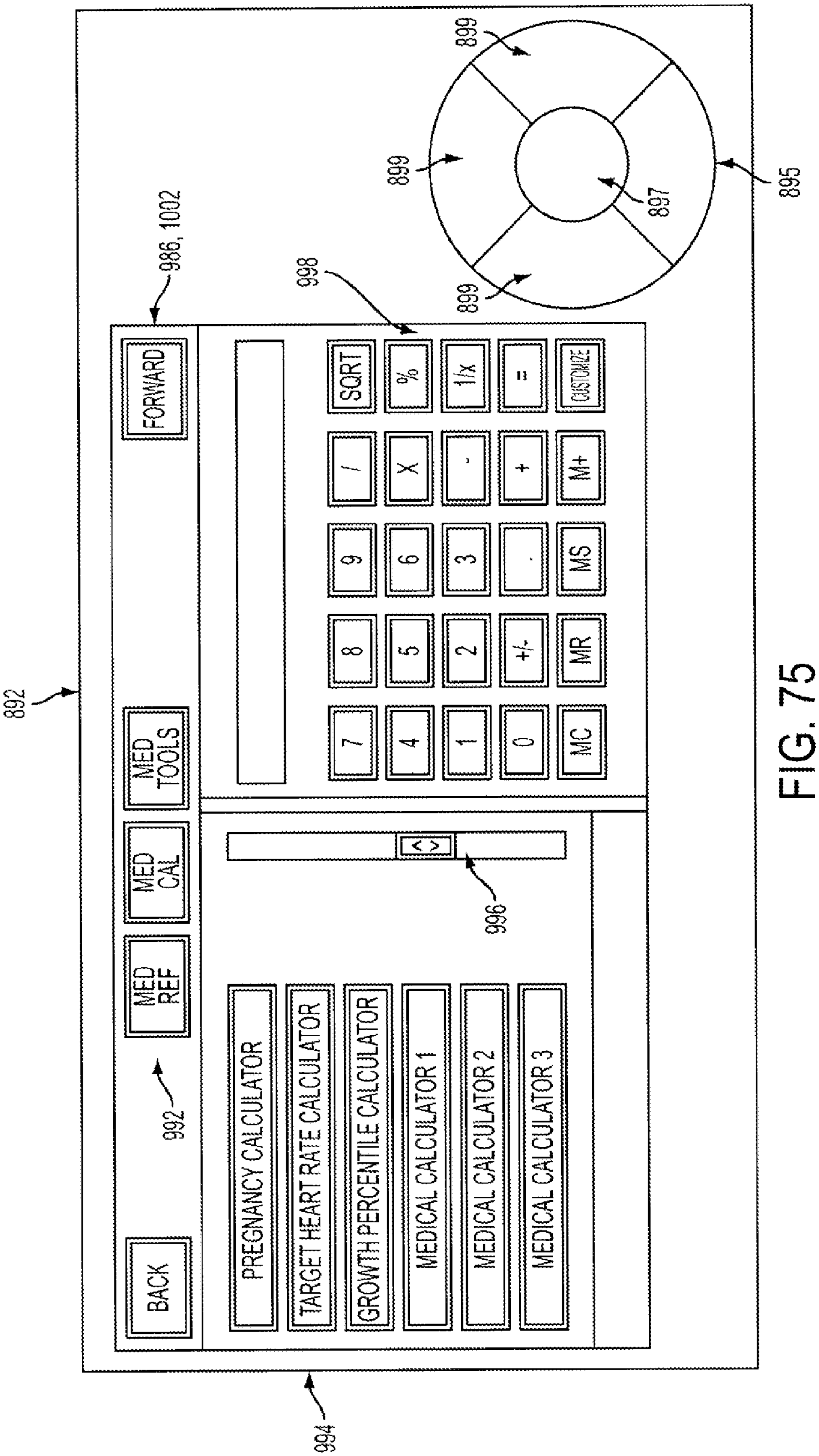
FIG. 75 is a top plan view of one embodiment of a third screen of a medical calculator interface of the display panel of the input assembly.
Figure 76:
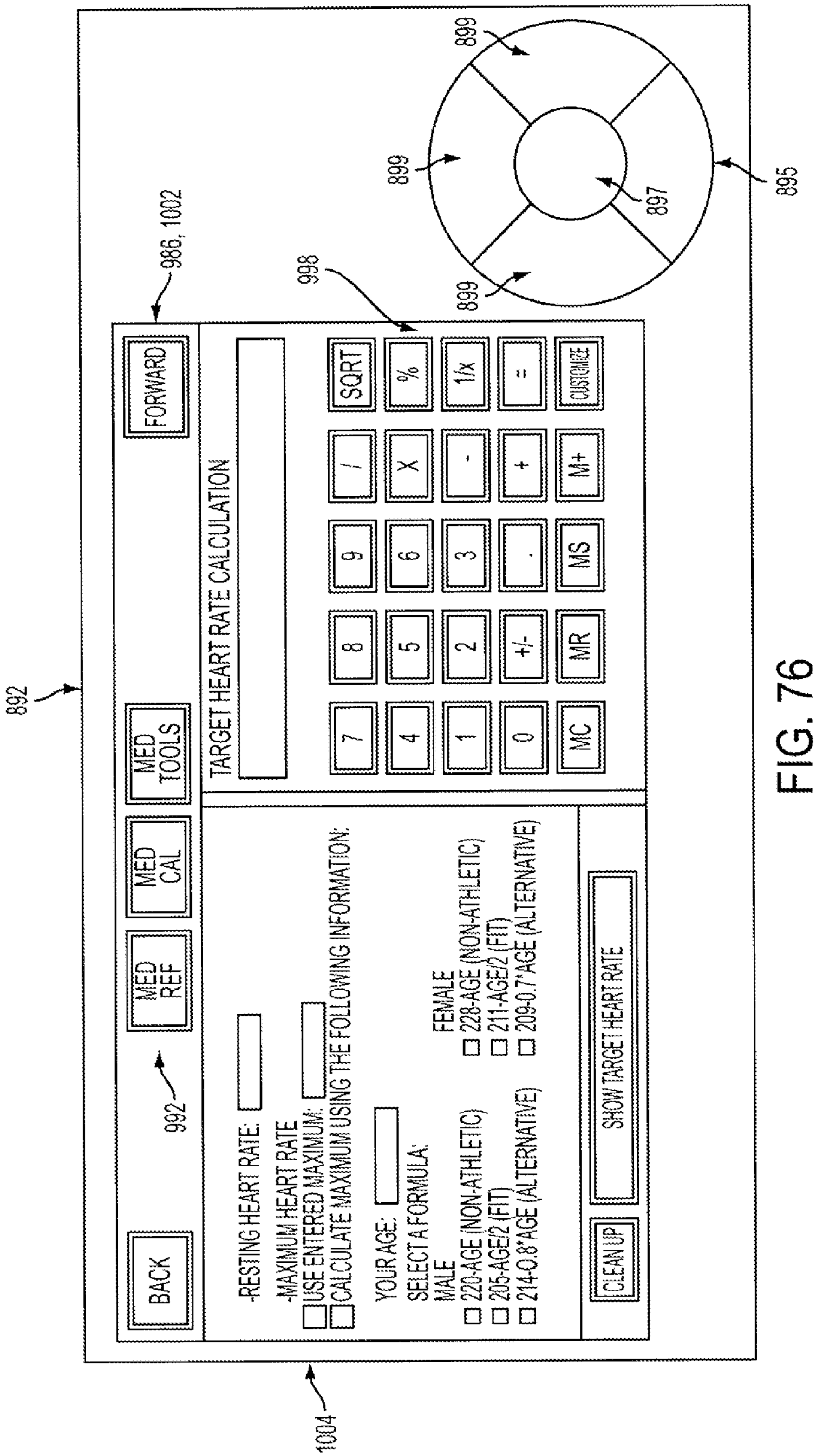
FIG. 76 is a top plan view of one embodiment of a fourth screen of a medical calculator interface of the display panel of the input assembly.
Figure 77:
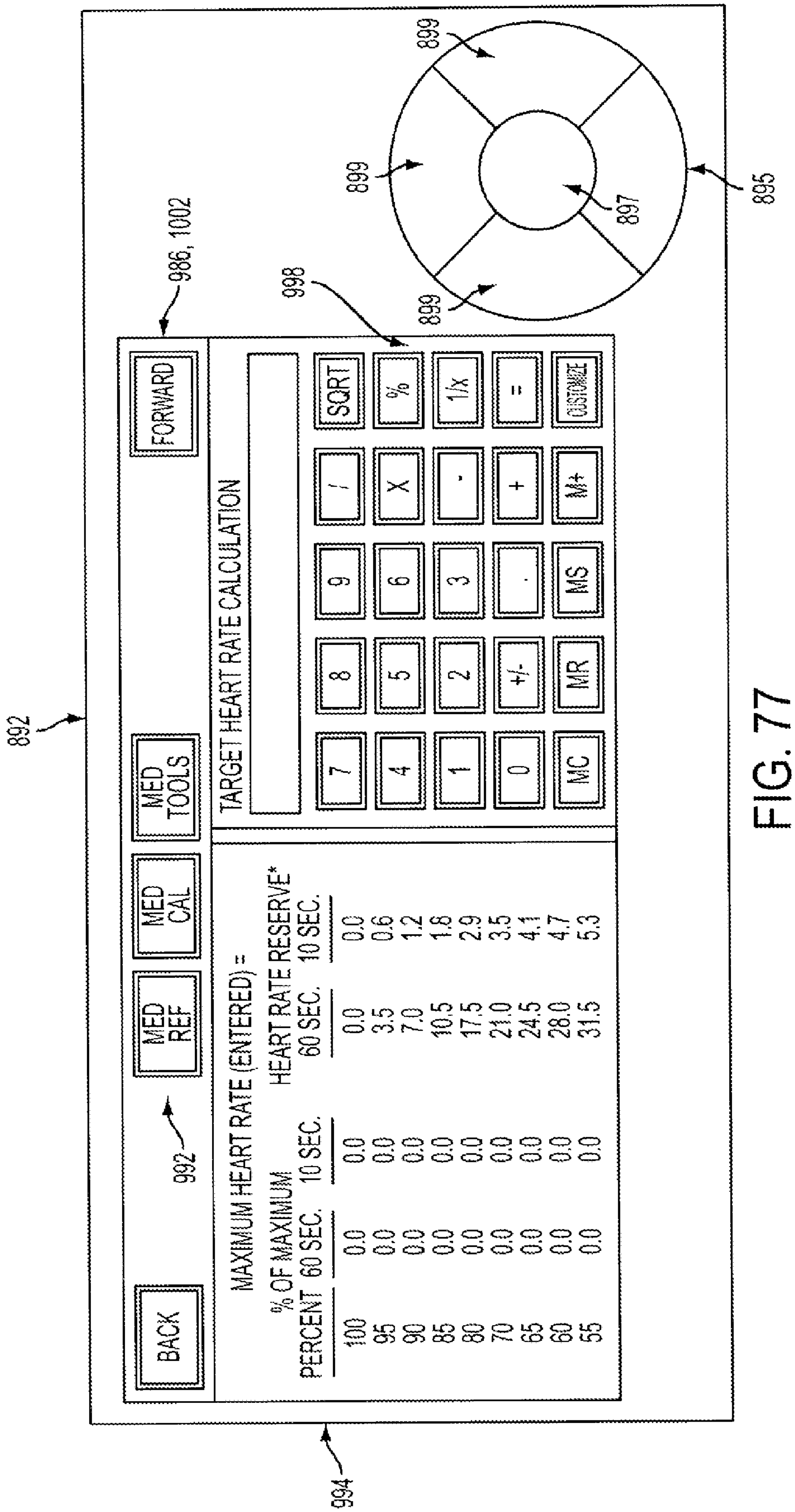
FIG. 77 is a top plan view of one embodiment of a fifth screen of a medical calculator interface of the display panel of the input assembly.

As illustrated in FIG. 75, the user then uses his/her finger or the navigation button 895 to select the TARGET HEART RATE CALCULATOR input of vertical medical menu 994. This causes the user to advance to screen 1002 illustrated in FIG. 76. Screen 1002 has an interactive heart rate form 1004 and the general calculator 998. The user can enter data into the heart rate form 1004 by entering data with the general calculator 998. When the user selects the SHOW TARGET HEART RATE CALCULATOR input 1006, the medical calculator interface 986 replaces the heart rate form 1004 with the heart rate data 1008 illustrated in FIG. 77.

Figure 78:
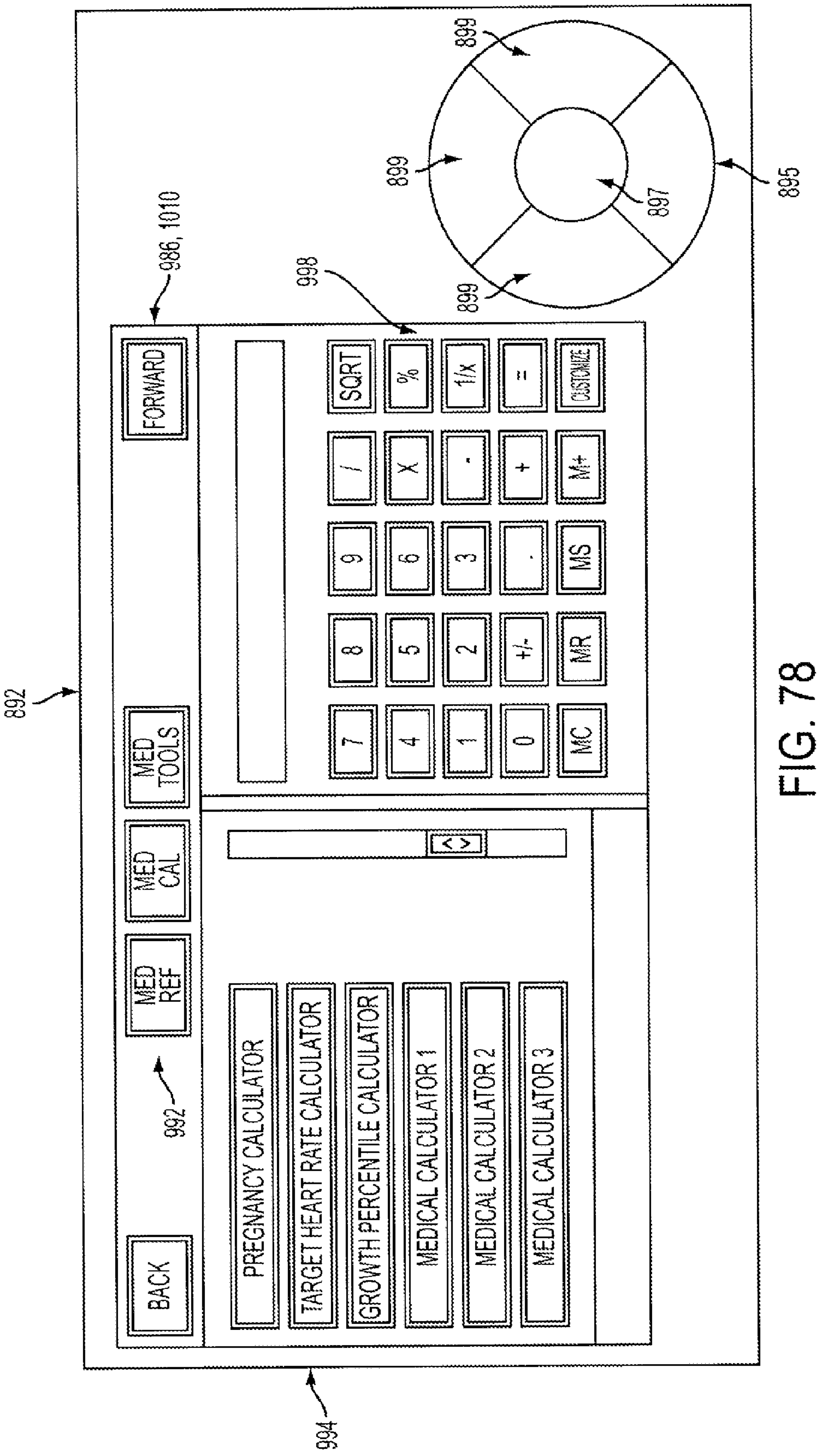
FIG. 78 is a top plan view of one embodiment of a sixth screen of a medical calculator interface of the display panel of the input assembly.
Figure 79:
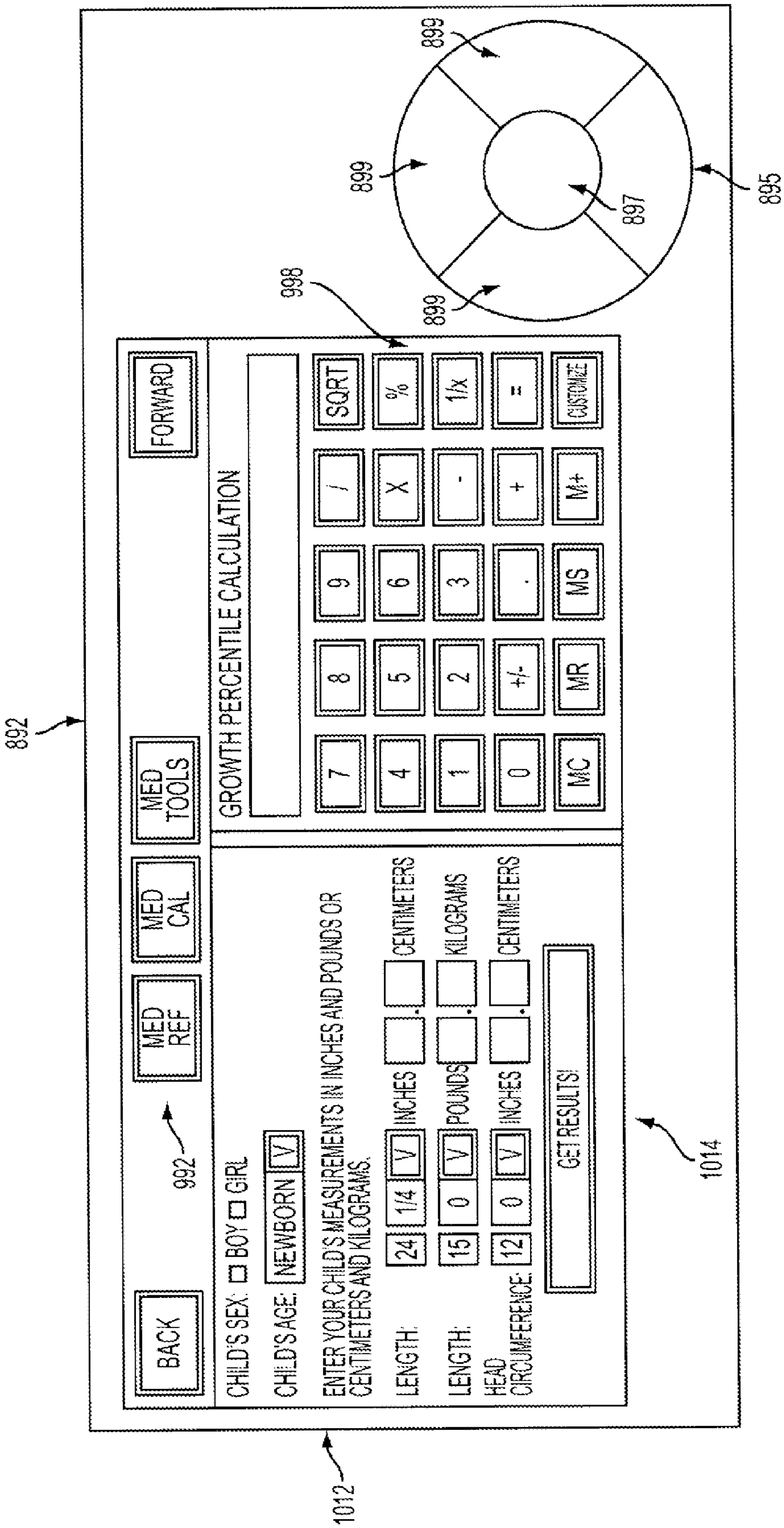
FIG. 79 is a top plan view of one embodiment of a seventh screen of a medical calculator interface of the display panel of the input assembly.
Figure 80:
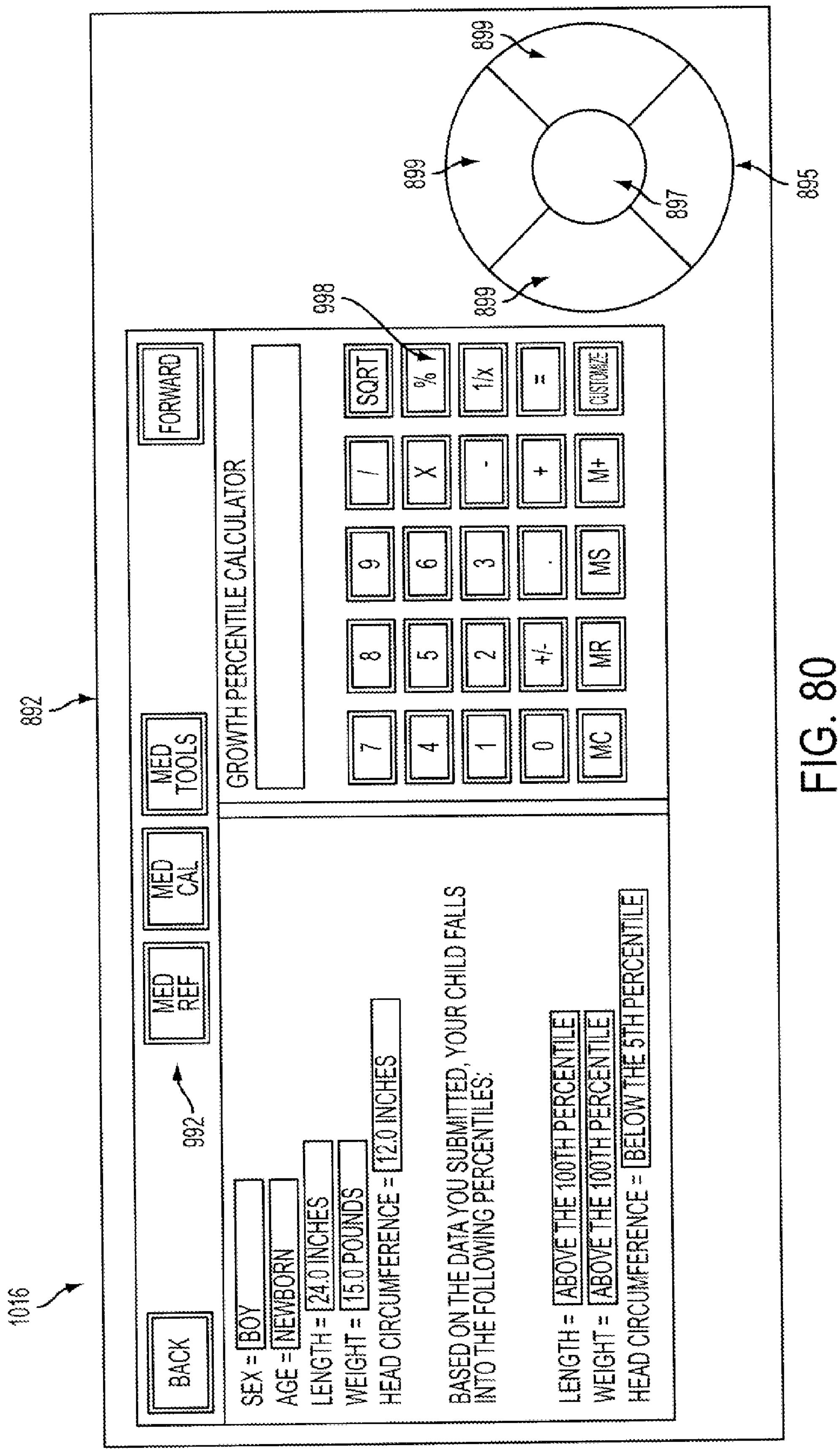
FIG. 80 is a top plan view of one embodiment of a eight screen of a medical calculator interface of the display panel of the input assembly.

As illustrated in FIG. 78, the user then uses his/her finger or the navigation button 895 to select the GROWTH PERCENTILE CALCULATOR input of vertical medical menu 994. This causes the user to advance to screen 1010 illustrated in FIG. 79. Screen 1010 has an interactive growth form 1012 and the general calculator 998. The growth form 1012 has a plurality of data fields and a plurality of pull-down menus. The user can enter data into the growth form 1012 by entering data with the general calculator 998. When the user selects the GET RESULTS input 1014, the medical calculator interface 986 replaces the growth form 1012 with the growth percentile data 1016 illustrated in FIG. 80.

As exemplified by the above description, the display panel 892 enables the user to adjust settings and controls for the main unit 804 in one embodiment. In another embodiment, the display panel 892 enables the user to make calculations and retrieve information. In one embodiment, the display panel 892 is operable without having to power-on or boot-up the main unit 804. In addition, the display panel 892 is operable to output useful audio, visual or audiovisual information, including, but not limited, to time, date, alarm, weather, temperature, news, stock prices and other time-sensitive data.

In one embodiment, the main unit 804 is connected to a webserver which causes healthcare-related advertisements to be displayed on the display panel 892. In one embodiment, the main unit 804 cooperates with such webserver to track the frequency or total display time of the advertisements displayed by the display panel 892. In one example, the advertisement provider gives financial incentives in exchange for the display of advertisements, such as advertisements for pharmaceutical products.

The following is one embodiment of a business method:

(a) pharmaceutical company A desires to circulate advertisements to promote company A's pharmaceutical product;

(b) pharmaceutical company A provides multiple assemblies 802 to a hospital at no charge;

(c) such hospital agrees to: (i) permit company A to control the display of such product advertisements by each main unit 804; and (ii) permit company A to display a certain quantity of advertisements (or a certain amount of display time of advertisements) per month;

(d) company A connects each main unit 802 in the hospital to the advertisement webserver owned or controlled by company A or its advertisement agent;

(e) the display panel 892 of each main unit 802 displays such product advertisements while the main unit 804 is mounted to the hospital walls, enabling patients, healthcare providers and passersby to view such advertisements;

(f) the display panel 892 displays such advertisements whether the main unit 802 is on or off; and (g) such advertisements vary from time to time and include videos, animations, useful medical information or other suitable audio, visual or audiovisual outputs.

7.6 Supplemental Devices

In one embodiment, the assembly 802 includes or incorporates: (a) a printer device having an ink holder; and (b) a paper holder movably coupled to the main unit 804 or mounting unit 806. In one embodiment, the paper holder includes a pivotable or movable arm sized to hold the paper dispensed by such printer.

In one embodiment, the assembly 802 includes one or more light sources, such as light emitting diodes (LEDs), a lamp, or a built-in flashlight, which automatically activates when a power outage or some other designated event occurs.

In one embodiment, the assembly 804 includes: (a) an environmental sensor, including, but not limited to, a smoke detector, carbon monoxide detector, temperature sensor, light sensor, or motion detector; and (b) an output device which produces an audible or visual output when a designated condition is present.

In one embodiment, the mounting unit 806 includes a chord cover which extends downward from the bottom end of the mounting unit 806 toward a floor, electrical outlet or data source. The chord cover, in one embodiment, is a pipe or conduit which receives and covers the electrical chord 840 and other data cables extending from the main unit 804.

7.7 Ancillary Devices

In one embodiment, the main unit 804 has one or more attachers or ancillary couplers (not illustrated). Each ancillary coupler is connected to (or integrated into) the housing 806 of the main unit 804, and the ancillary coupler is configured to releasably or removably attach an ancillary device (not illustrated) to the main unit 804. By way of example, the ancillary coupler can include: (a) a recess or cavity formed into the main unit 804 or mounting unit 806; or (b) an arm, a hand, a hook, a harness, a band, a line, a net or a fastener connected to the main unit 804 or the mounting unit 806. As such, when the main unit 804 is mounted to a room wall, for example, the user can attach ancillary devices to the mounted main unit 804. Doing so can increase the convenience of accessing ancillary devices.

Depending upon the embodiment, the ancillary device may or may not be electronically connectable to the main unit 804. In one embodiment, the ancillary device is electronic, and in another embodiment the ancillary device is non-electronic. In different embodiments, the ancillary devices include the following devices:

(a) a camera configured to be removably connectable to such ancillary coupler;

(b) a dry erase board, bulletin board, or roll-up flexible dry erase board removably connectable to such ancillary coupler;

(c) a clip or clasp removably connectable to such ancillary coupler;

(d) a flashlight configured to be removably connected to such ancillary coupler;

(e) any computer peripheral device, including, but not limited to, a printer, scanner, facsimile machine, external hard drive, external CD/DVD player, supplemental speakers, mouse, alternate keyboard, or video game player;

(f) a telephone, mobile phone, PDA, or camcorder;

(g) a key holder, writing instrument holder, eraser holder, or eye glass holder;

(h) a stethoscope holder, personal thermometer holder, otoscope holder or any other medical instrument holder;

(i) a cup holder or beverage container holder; and (j) any hand-holdable item, object, tool or instrument, whether electronic or non-electronic.

8. Electronic Device

Figure 89:
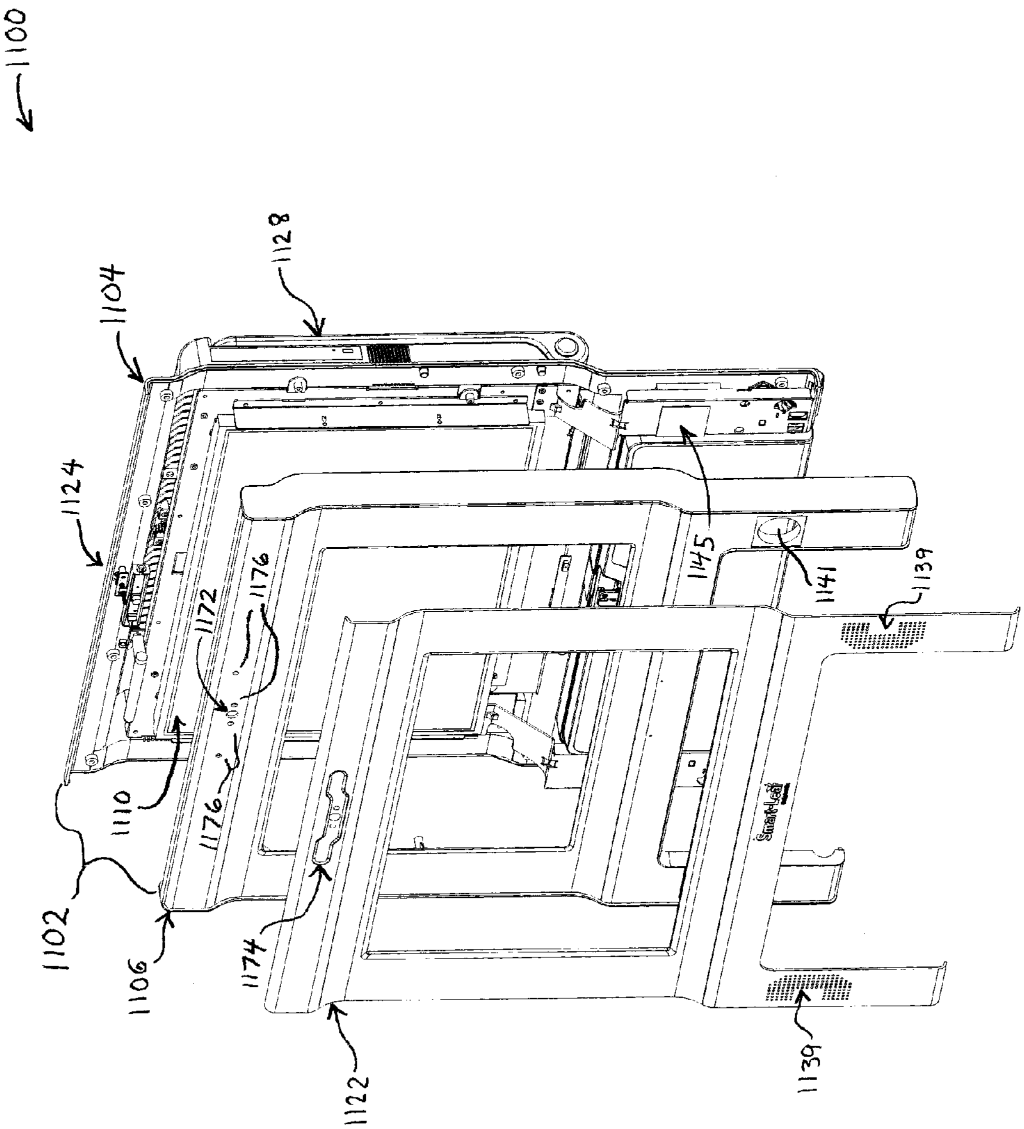
FIG. 89 is an exploded, front isometric view of the electronic device of FIG. 81.
Figure 90:
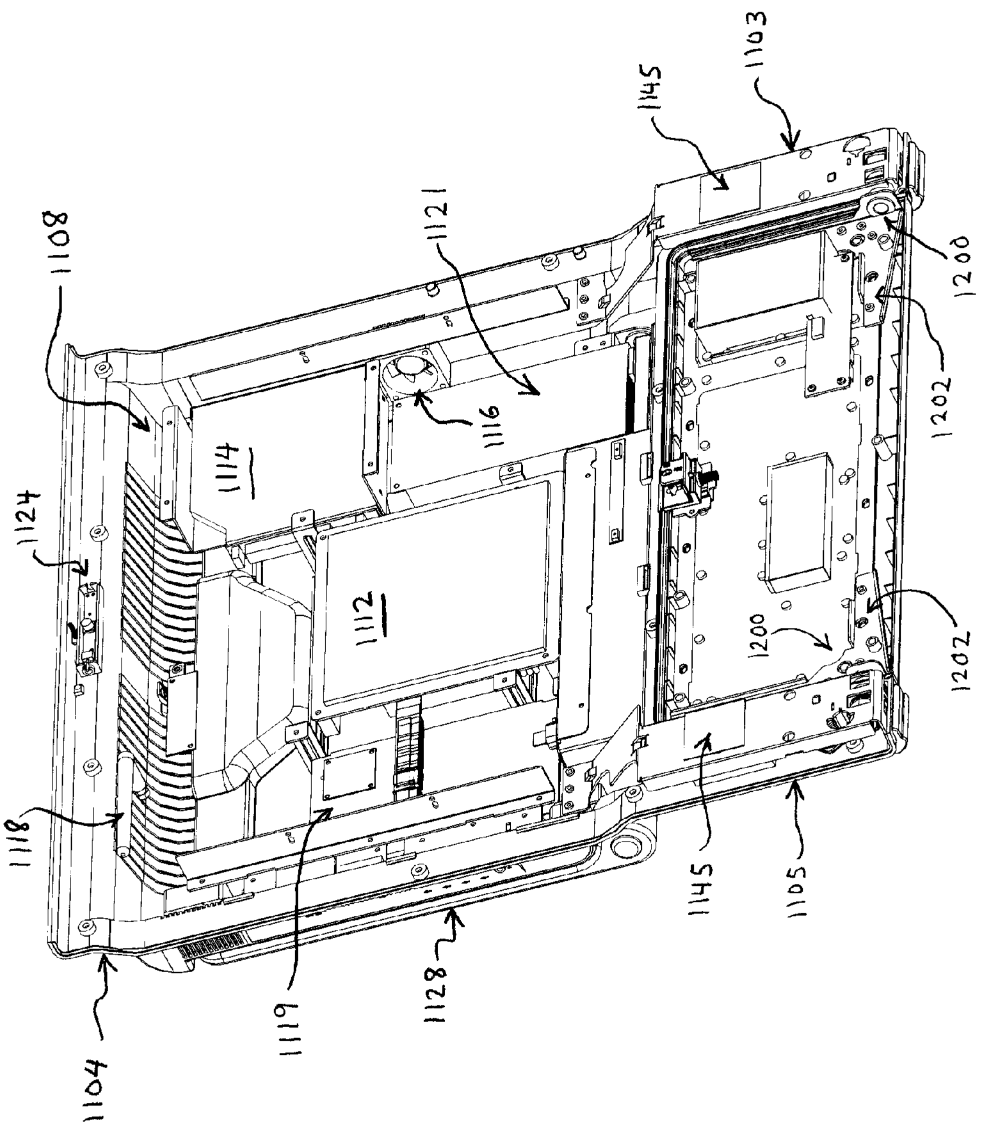
FIG. 90 is a front isometric view of the rear housing portion of the electronic device of FIG. 81.
Figure 91:
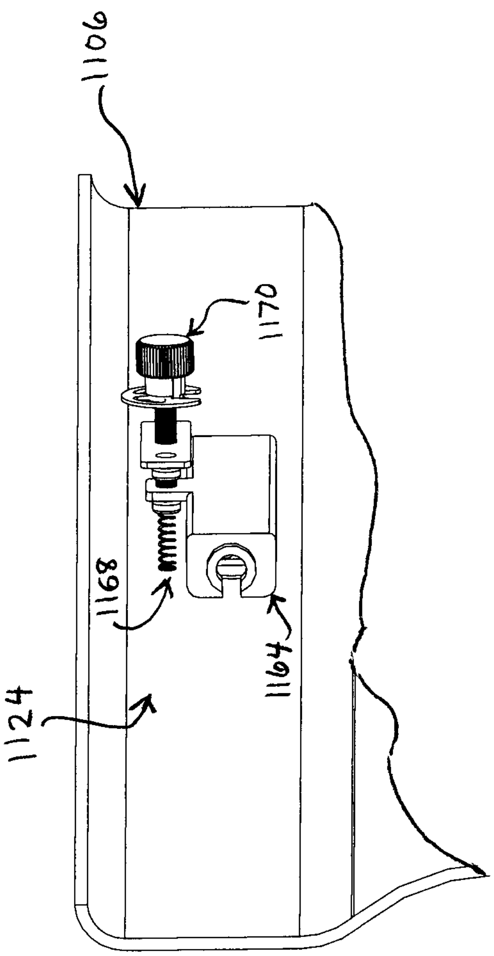
FIG. 91 is an isometric view of the camera assembly of the electronic device of FIG. 81.
Figure 92:
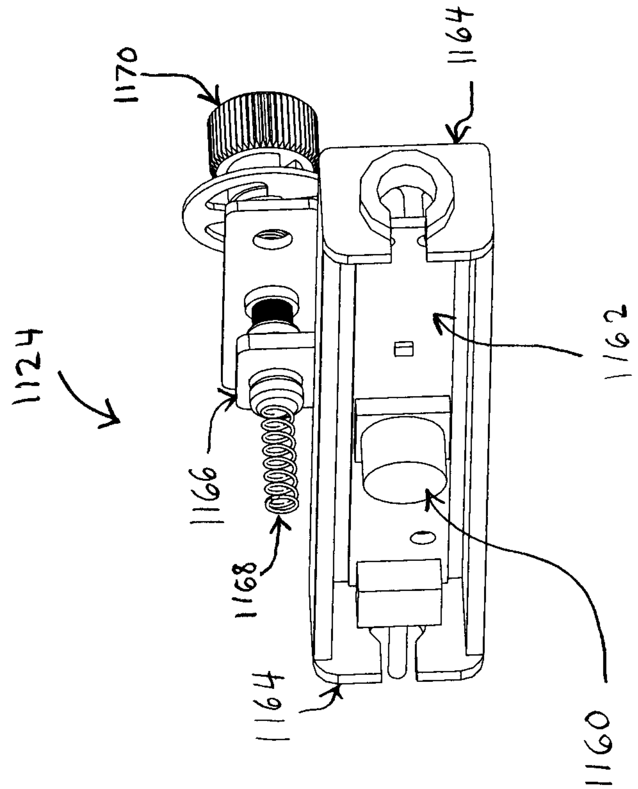
FIG. 92 is an isometric view of the camera assembly of FIG. 91, illustrating the lens and lens holder.
Figure 93:
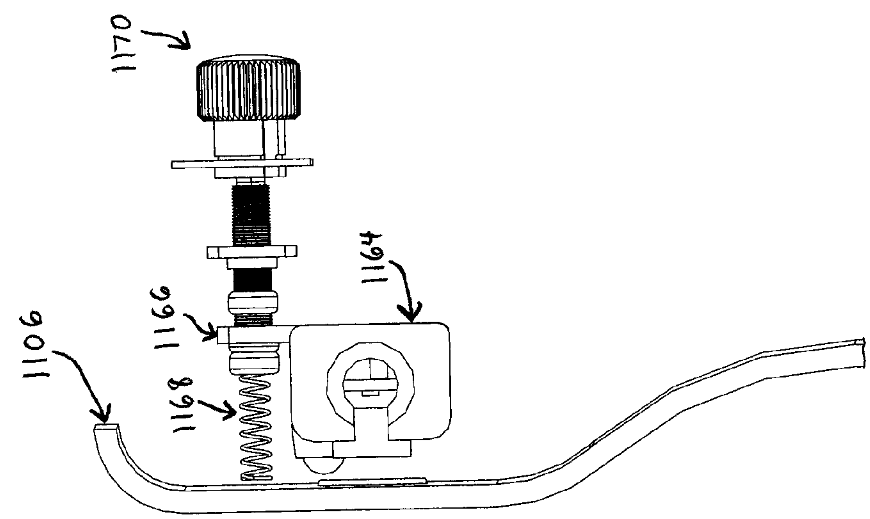
FIG. 93 is a side view of the camera assembly of FIG. 91.

Referring to FIGS. 81-116, electronic device 1100 is illustrated. As illustrated in FIGS. 89 and 90, electronic device 1100 has: (a) a main housing 1102 including a front housing portion 1104 and a rear housing portion 1106 which are fastened together in a shell-like fashion to define a cavity 1108; (b) a display screen 1110 supported by the main housing 1102; (c) a motherboard 1112 positioned within the cavity 1108 of the main housing 1102 behind the display screen 1110; (d) a DVD drive 1114 within the cavity 1108 of the main housing 1102; and (e) a plurality of other electronic components within the main housing 1102, such as fan 1116, antenna 1118, data storage or hard drive 1119, and electrical power unit 1121.

Figure 81:
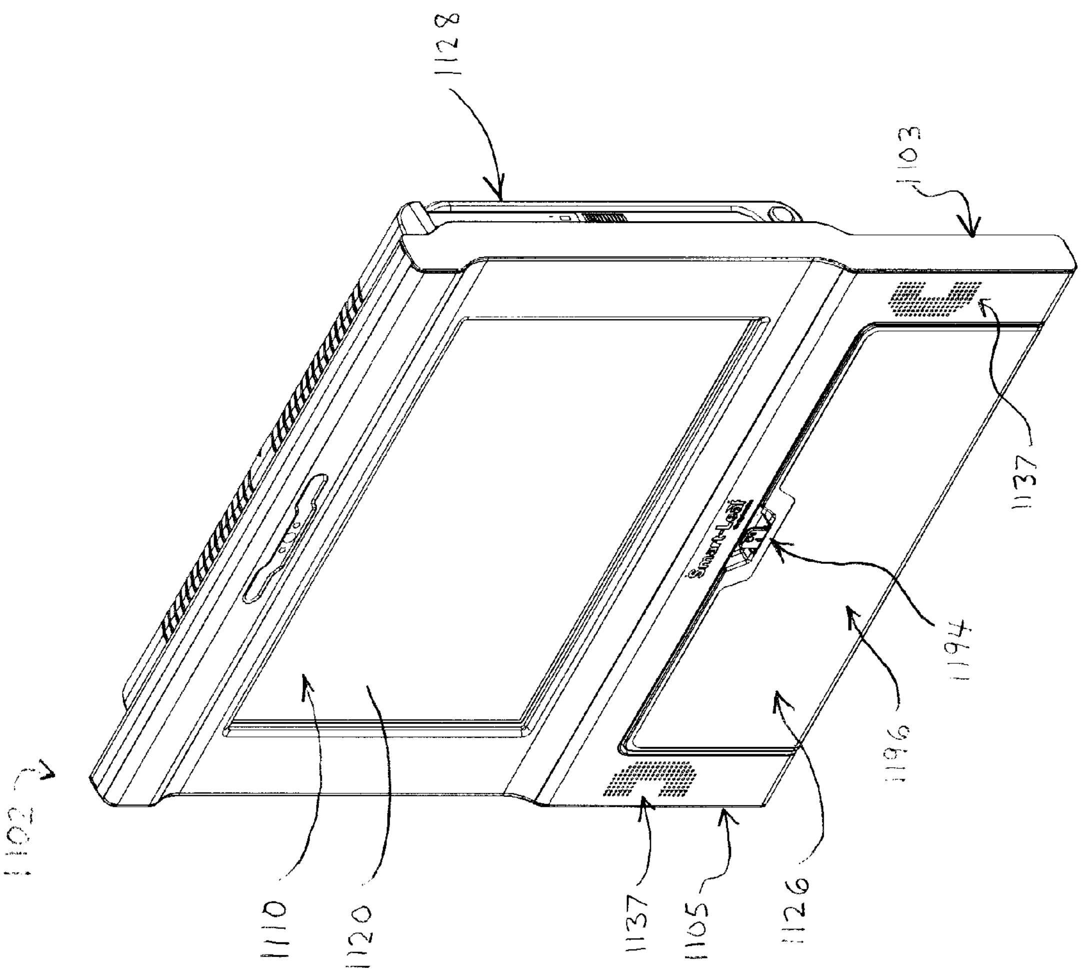
FIG. 81 is a front isometric view of one embodiment of the electronic device.
Figure 82:
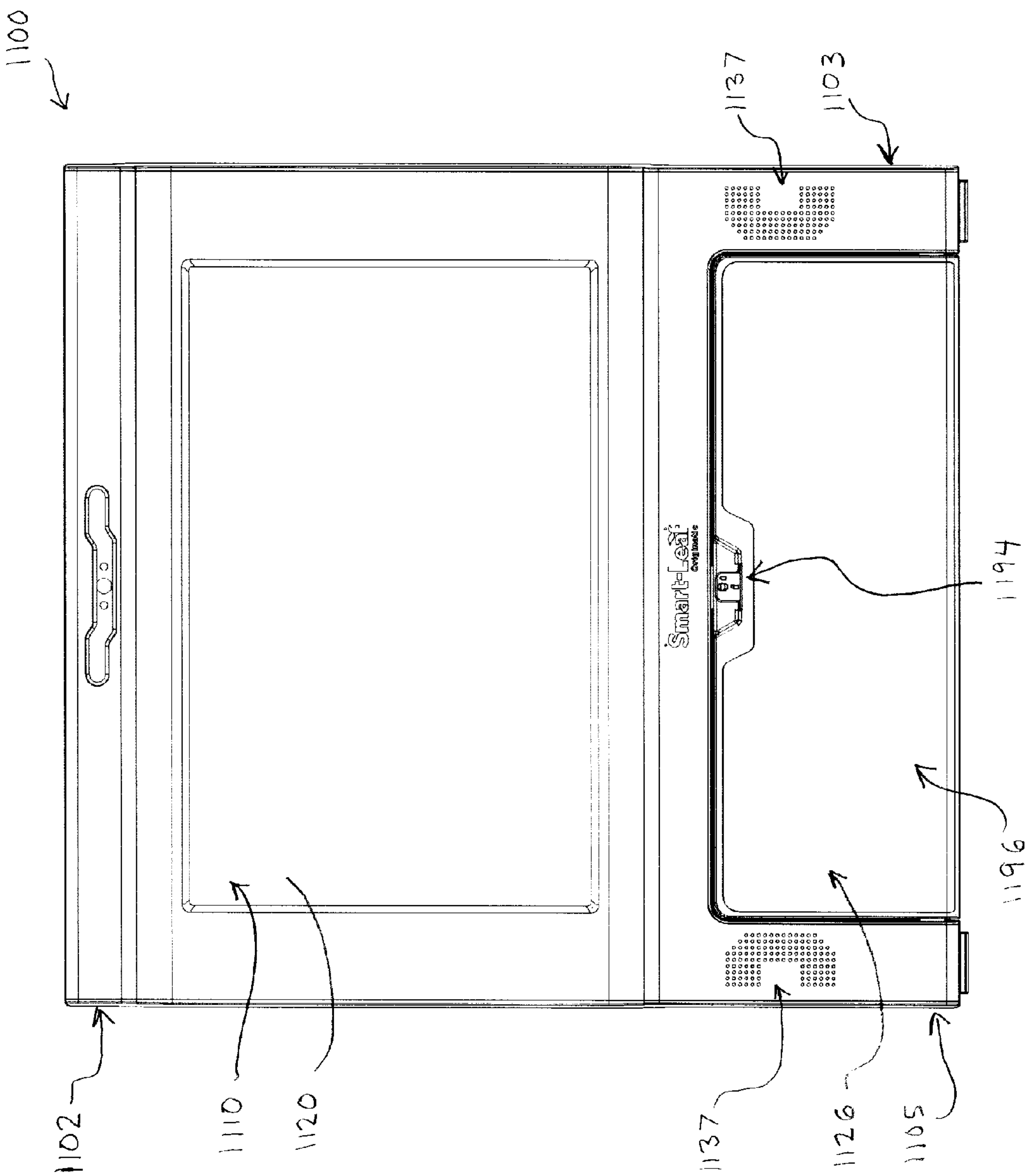
FIG. 82 is a front view of the electronic device of FIG. 81.
Figure 83:
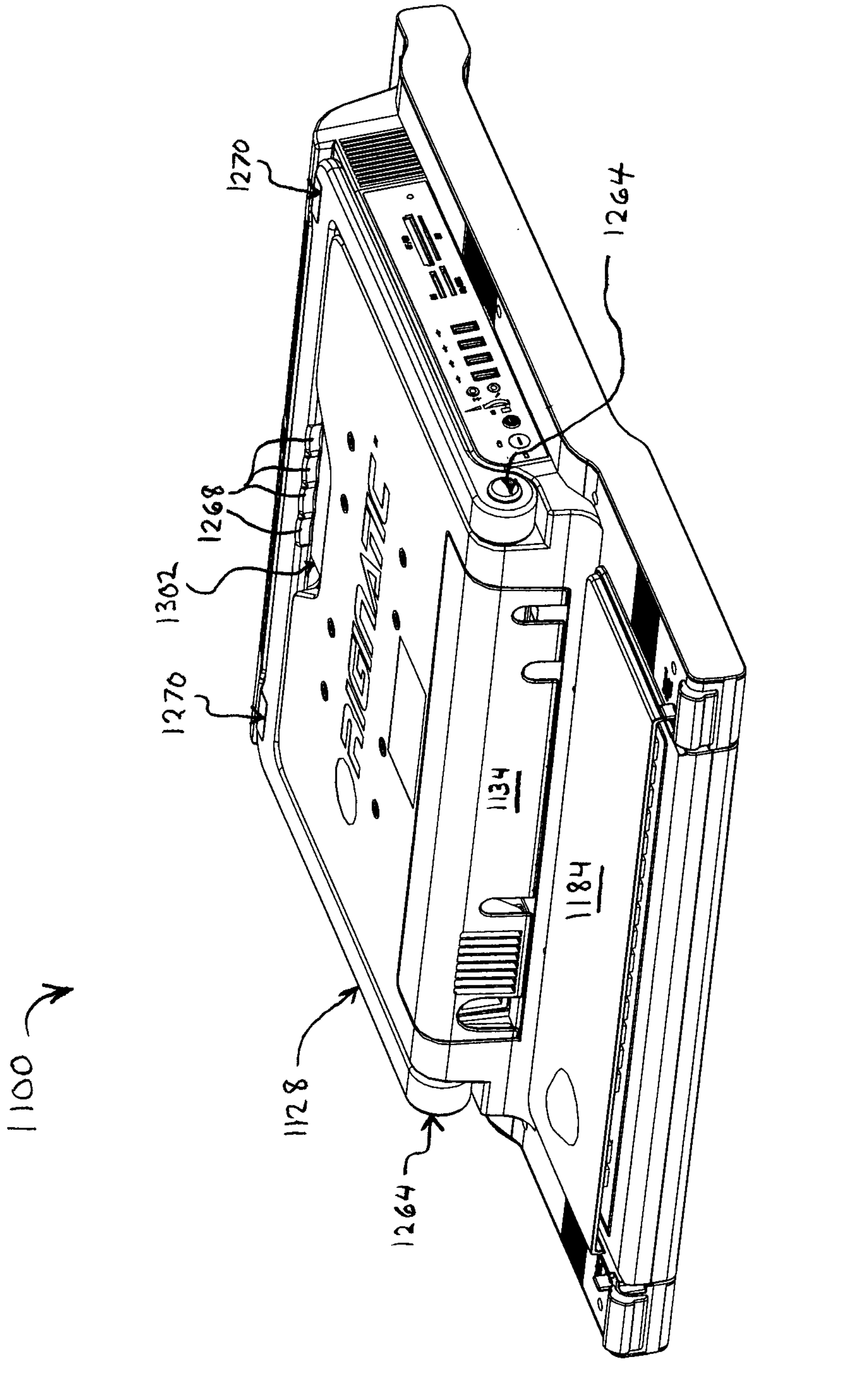
FIG. 83 is a bottom isometric view of the back of the electronic device of FIG. 81.

The main housing 1102 has a right leg 1103 and a left leg 1105. The legs 1103 and 1105 position the axis of the keyboard assembly 1126 by a designated distance. The designated distance enables the pivotable keyboard assembly 1126 to close in an upward position, where the keyboard assembly 1126 is parallel or substantially parallel to the plane of the screen 1110, as illustrated in FIG. 81.

In one embodiment, the electronic device 1100 has a touch screen layer or device 1120 attached to the screen 1110. The electronic device 1100 has: (a) a transparent cover or layer 1122 which covers the front housing portion 1104; (b) a camera assembly 1124; (c) a keyboard assembly 1126; (d) a desktop stand assembly 1128; (e) a right side panel 1130; (f) a left side panel 1132; (g) a bottom panel 1134; (h) a plurality of grips or rubber feet 1135; and (i) a plurality of speaker units 1137.

Figure 96:
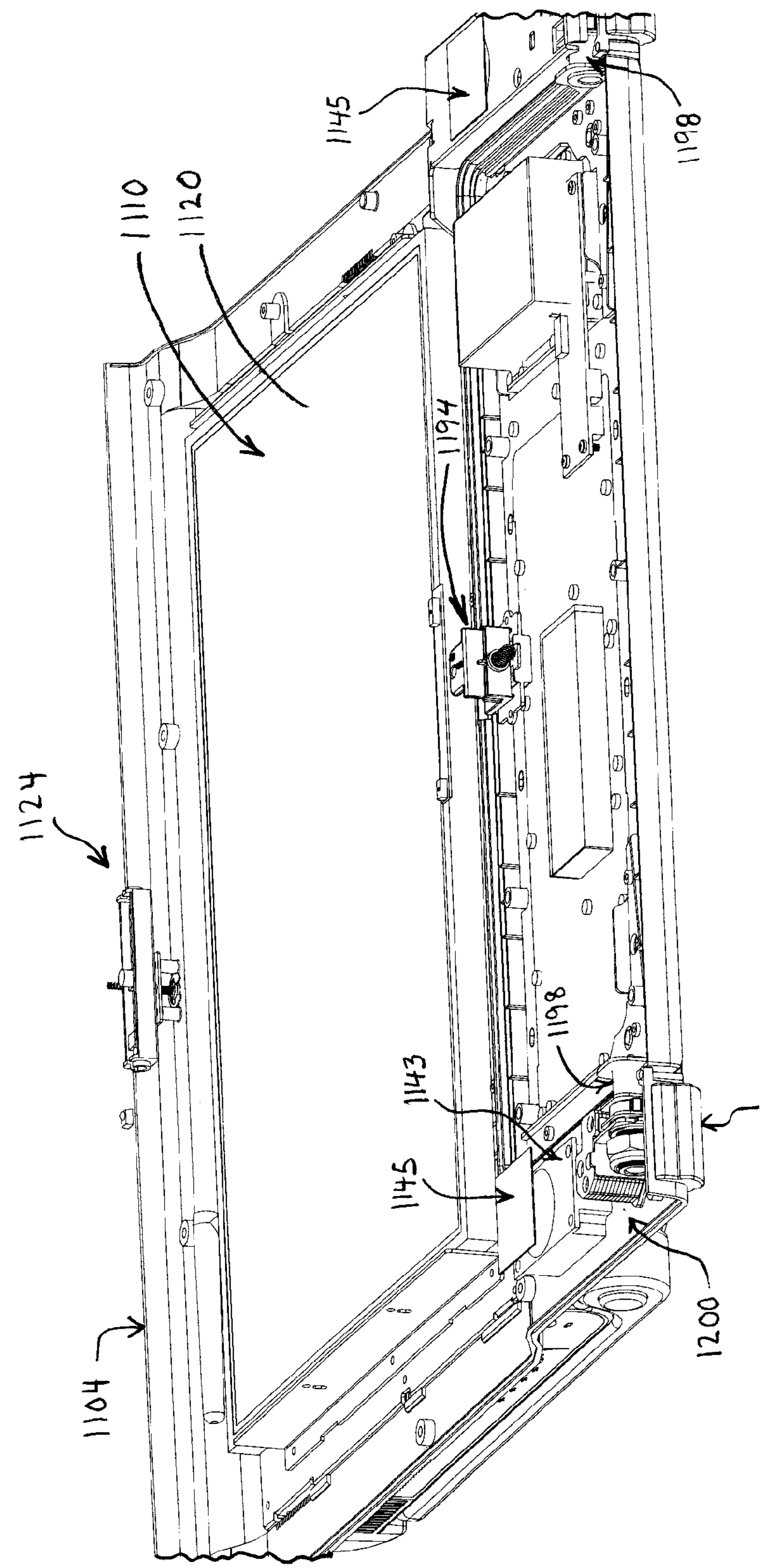
FIG. 96 is a top isometric view of the electronic device of FIG. 81 with the transparent cover and upper housing portion removed.

In one embodiment illustrated in FIGS. 89 and 96, each speaker unit 1137 has: (a) a plurality of inner walls 1139 of the cover 1122 which define a plurality of sound output holes; (b) sound output slot or opening 1141 defined by the housing portion 1106; (c) a speaker 1143; and (d) a liquid barrier 1145, such as a membrane, which forms a seal or barrier to block liquid from reaching the speaker 1143. In one embodiment, the liquid barrier 1145 achieves at least the IP54 seal standard.

Figure 85:
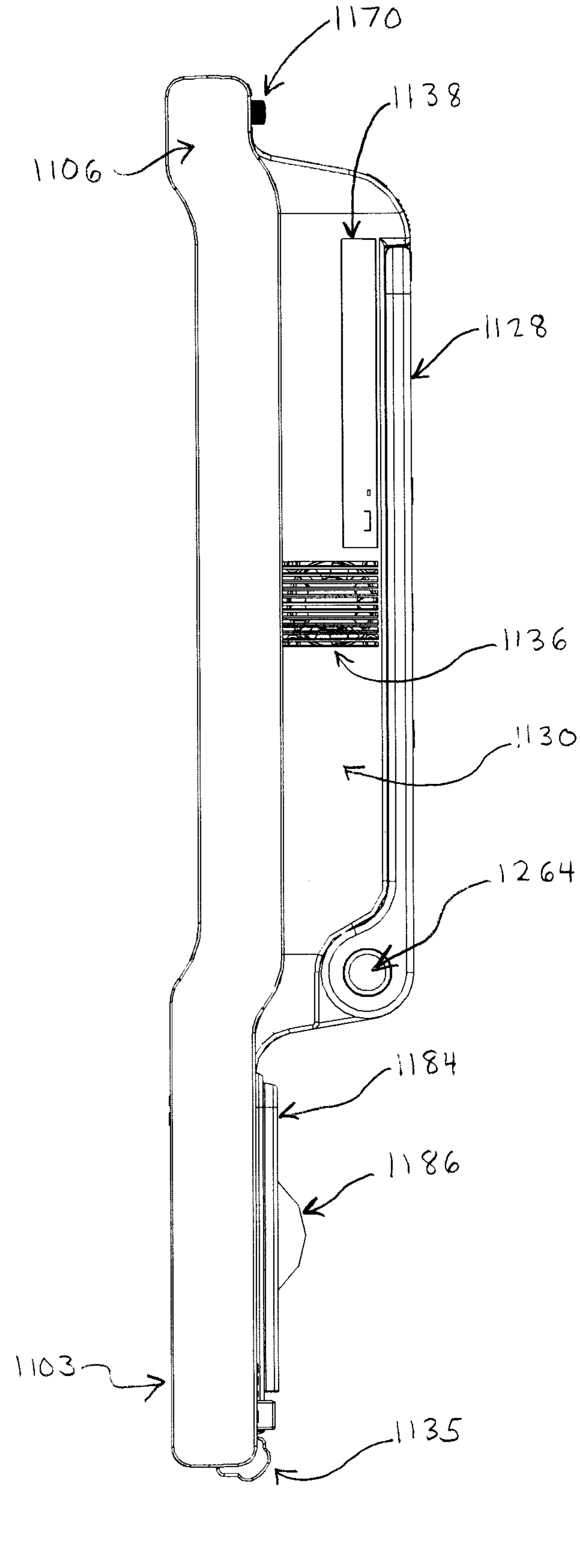
FIG. 85 is a right side view of the electronic device of FIG. 81.
Figure 86:
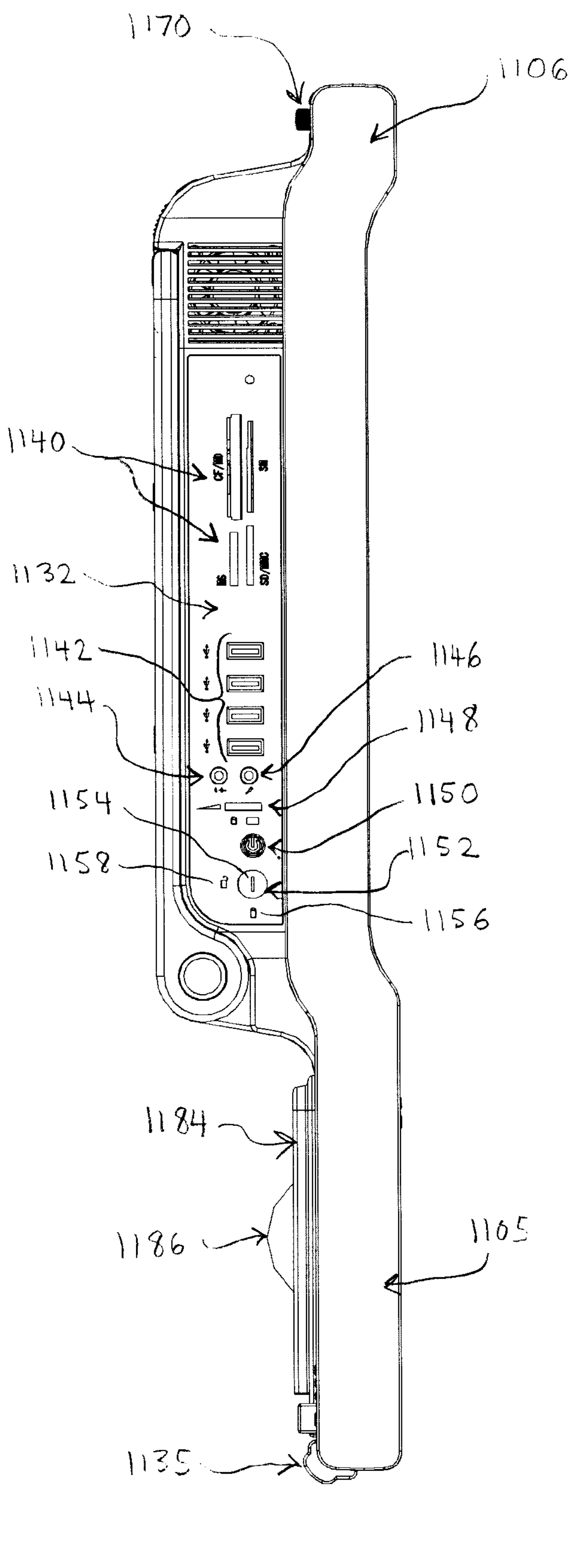
FIG. 86 is a left side view of the electronic device of FIG. 81.
Figure 87:
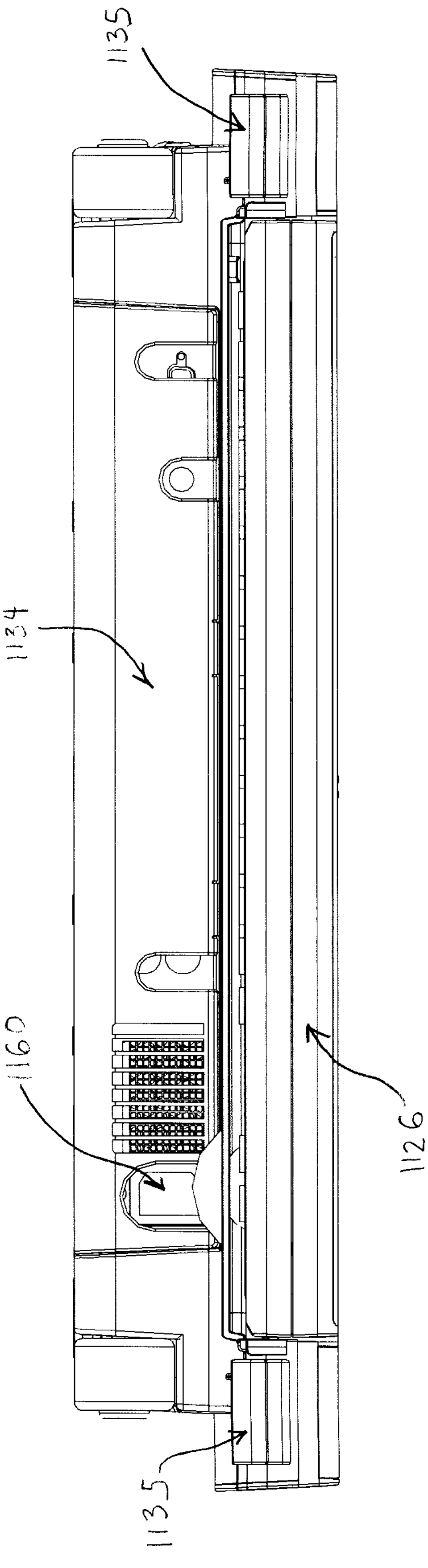
FIG. 87 is a bottom view of the electronic device of FIG. 81.
Figure 88:
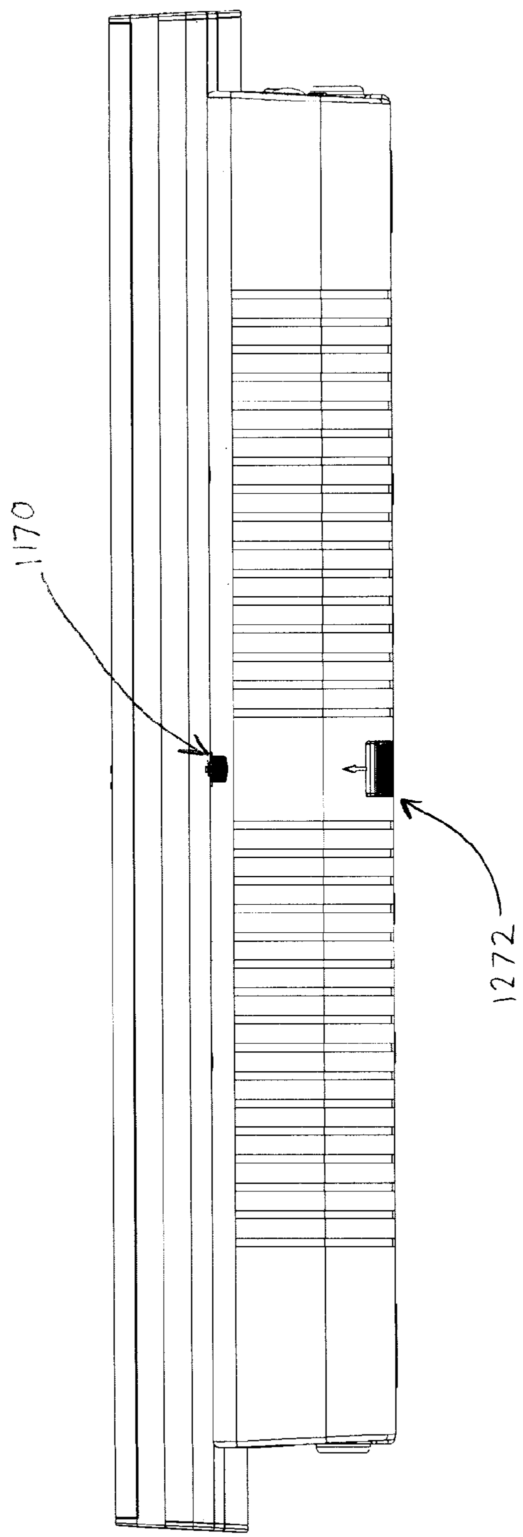
FIG. 88 is a top view of the electronic device of FIG. 81.

In one embodiment illustrated in FIG. 85, the right side panel 1130 includes a fan vent 1136 and a door or slot wall 1138 for the DVD drive 1114. In one embodiment illustrated in FIG. 86, the left side panel 1132 includes a plurality of differently sized SD card reader slots 1140; a plurality of USB ports 1142; an audio output port 1144; a microphone input port 1146; a volume adjustment dial 1148; a power button 1150; and a power lock device 1152. To lock the power, the user inserts a key (not shown) into the slot 1154 and then turns the key directed toward the lock symbol 1156. When the key is in that position, the electronic device 1100 will not power off if it is already powered on, and the electronic device 1100 will not power on if it is already powered off. To unlock the power control, the user turns the key so it is directed toward the unlock symbol 1158. In one embodiment illustrated in FIG. 87, the bottom panel 1134 covers a plurality of data ports, including serial ports, VGA port, TV tuner port, audio out port, microphone input port, and network communication ports. The bottom panel 1134 defines a plurality of openings, one of which reveals power supply 1160.

Referring to FIGS. 84 and 91-93, the camera assembly 1124 has: (a) a lens 1160; (b) a lens holder 1162 which holds the lens 1160; (c) a plurality of supports 1164 which pivotably couple the lens holder 1162 to the rear housing portion 1104; (d) an arm 1166 connected to the holder 1162; (e) a spring 1168 connected to the arm 1166; (f) a lens position controller 1168, such as a set screw, which is aligned to apply a force to the arm 1166; and (f) a rotatable grasp portion 1170 of the position controller 1168. The holder 1162 pivots in a cradle fashion relative to the supports 1164. In operation, the spring 1168 predisposes the holder 1162 to be tilted upward. As the user rotates the grasp portion 1170 clockwise, the holder 1162 pivots downward. By rotating the grasp portion 1170 clockwise or counterclockwise, the user is able to adjust the viewing angle of the lens 1160 upward or downward. The front housing portion 1106 defines an opening 1172, and the cover 1122 has a camera window 1174 with suitable optical properties. The lens 1160 is aligned with the opening 1172 and the camera window 1174.

The front housing portion 1106 also defines a plurality of additional openings 1176 which are aligned with the window 1174. In one embodiment, one or more of the additional openings 1176 are used to output light from LED light sources associated with the operational modes of the camera assembly 1124, such as camera on and camera off. In another embodiment, one or more of the additional openings 1176 receive an infrared light beam which is detected by an infrared signal receiver.

Referring to FIGS. 94-104, the keyboard assembly, in one embodiment, includes: (a) an input device having a plurality of keys or a keyboard 1178; (b) a curser steering device or pointer 1180, which, in the illustrated embodiment, is a trackball; (c) right and left selection buttons or mouse buttons 1182; (d) a keyboard shield or keyboard panel 1184 which guards the keyboard 1178 when the keyboard is closed, adds structural strength to the main housing 1102, and blocks user accessibility to electrical and data cords and cables which may hang down from the rear of the electronic device 1100; (e) a recessed area 1186 which has the opposite configuration of the pointer 1180 so as to receive the pointer 1180 when the keyboard is closed, as shown in FIG. 81; (f) a keyboard main housing 1188 including a plurality of keyboard housing portions 1190 and 1192 which fit together in a shell-fashion; (g) a keyboard latch 1194 connected to the main housing 1188; (h) a transparent plastic cover or layer 1196 attached to the keyboard housing portion 1192; (i) a plurality of projections, linear extensions or shaft devices 1198; and (j) a plurality of keyboard position controllers 1200, each of which is operable with one of the shaft devices 1198.

In one embodiment not illustrated, the electronic device 1100 does not have a keyboard panel 1184. In such embodiment, the main housing 1102 defines a pass-through opening below the display screen 1110.

Figure 97:
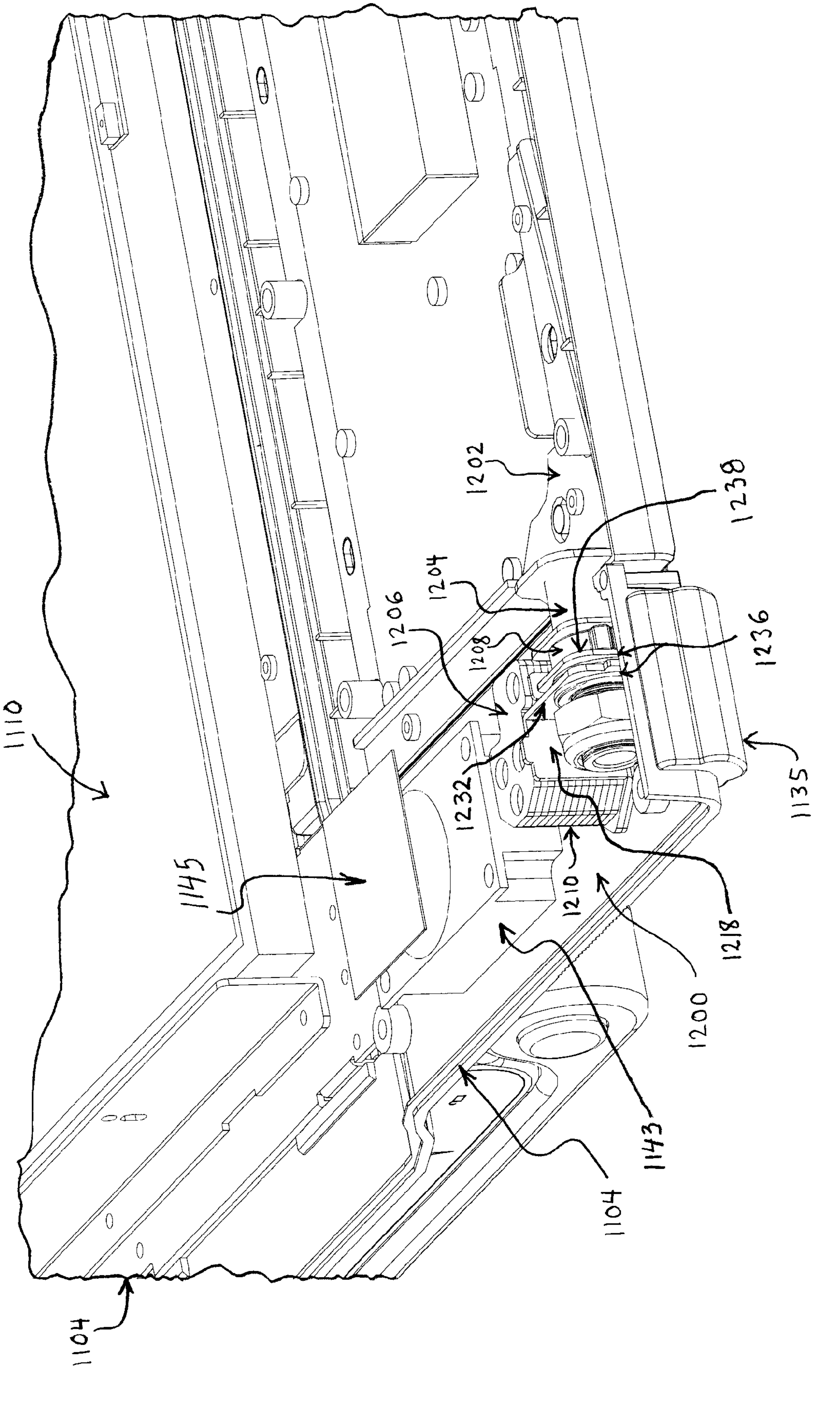
FIG. 97 is a top isometric view of a portion of the electronic device of FIG. 81, illustrating one of the two keyboard position controllers.

Referring to FIGS. 90 and 97, each shaft device 1198 has: (a) a mount 1202 connected to the keyboard main housing 1188; and (b) a shaft 1204 fixedly or non-rotatably connected to the mount 1202. Referring to FIGS. 97-104, the keyboard position controller 1200 has: (a) a spring device 1206 connected to the housing portion 1104; and (b) a spring device engager 1208. In one embodiment illustrated in FIGS. 97 and 104, the spring device 1208 includes: (a) a spacer or a stack of plates 1210; (b) a retaining frame 1212 attached to the uppermost plate 1214 by a plurality of screws (not shown) which extend through the openings 1216; and (c) a support 1218 which connects the plates 1210 to the housing portion 1104. The retaining frame 1212 has a leaf spring 1220 including a protruding contact region 1222.

In one embodiment illustrated in FIGS. 97-104, the spring device engager 1208 defines an opening which receives the shaft 1204. The spring device engager 1208 has a cam device 1224 having a plurality of protrusions 1226. The spring device engager 1208 is configured to be slid or moved between a plurality of positions along the shaft 1204. Also, the spring device engager 1208 has a fixed angular position on the shaft 1204. In other words, the engager 1208 is configured to slide along the shaft 1204 without rotating relative to the shaft 1204. When the keyboard assembly 1126 is pivoted or rotated, the shaft 1204 rotates, which, in turn, causes the engager 1208 to rotate.

The slider 1228 is configured to receive and surround the cam device 1224. In one embodiment, the slider 1228 has a grasp 1230 configured for a user's grasping of the slider 1228.

An arm 1232 of the support 1218 receives the shaft 1204. The arm 1232 is configured so that it does not restrict the rotation of the shaft 1204.

Figure 99:
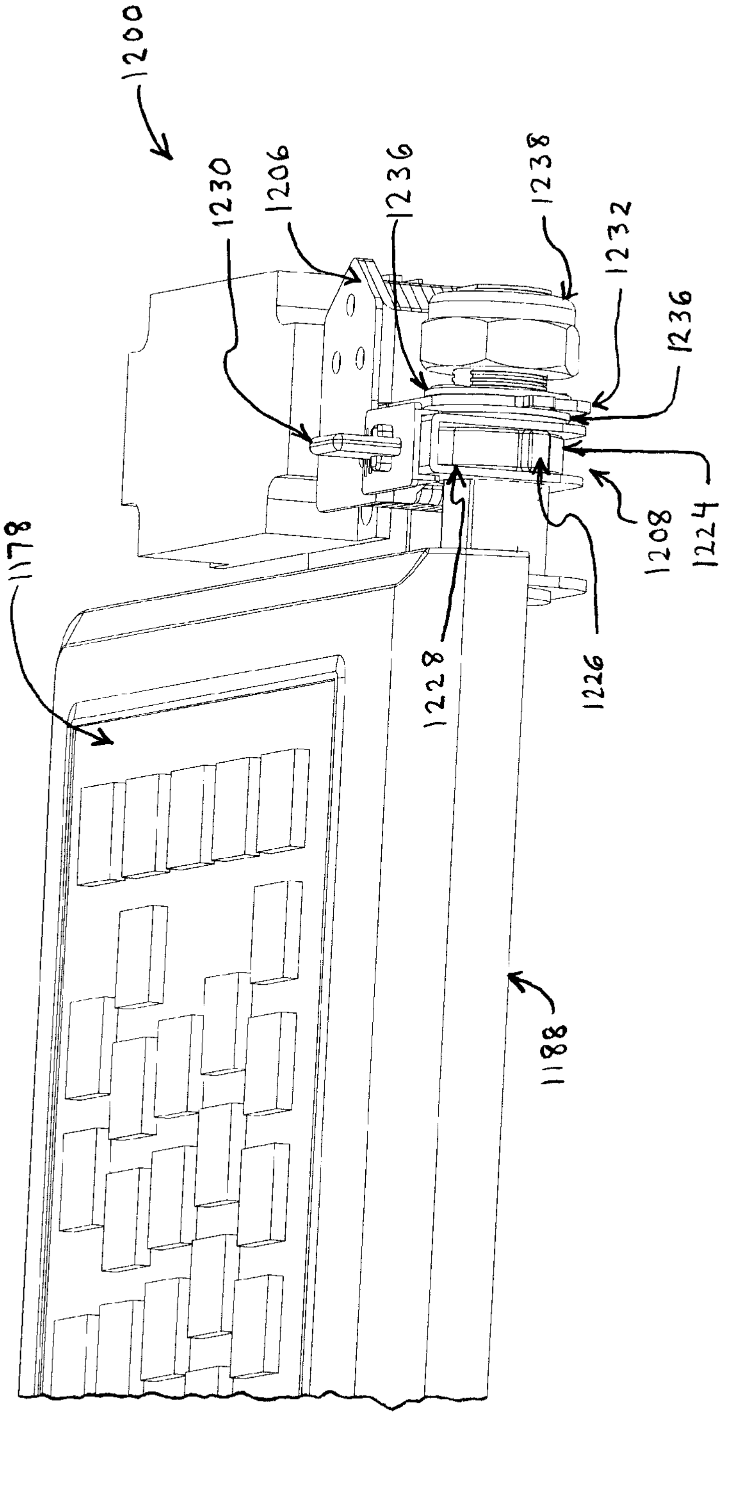
FIG. 99 is a back isometric view of a portion of the electronic device of FIG. 81, illustrating one of the two keyboard position controllers.
Figure 100:
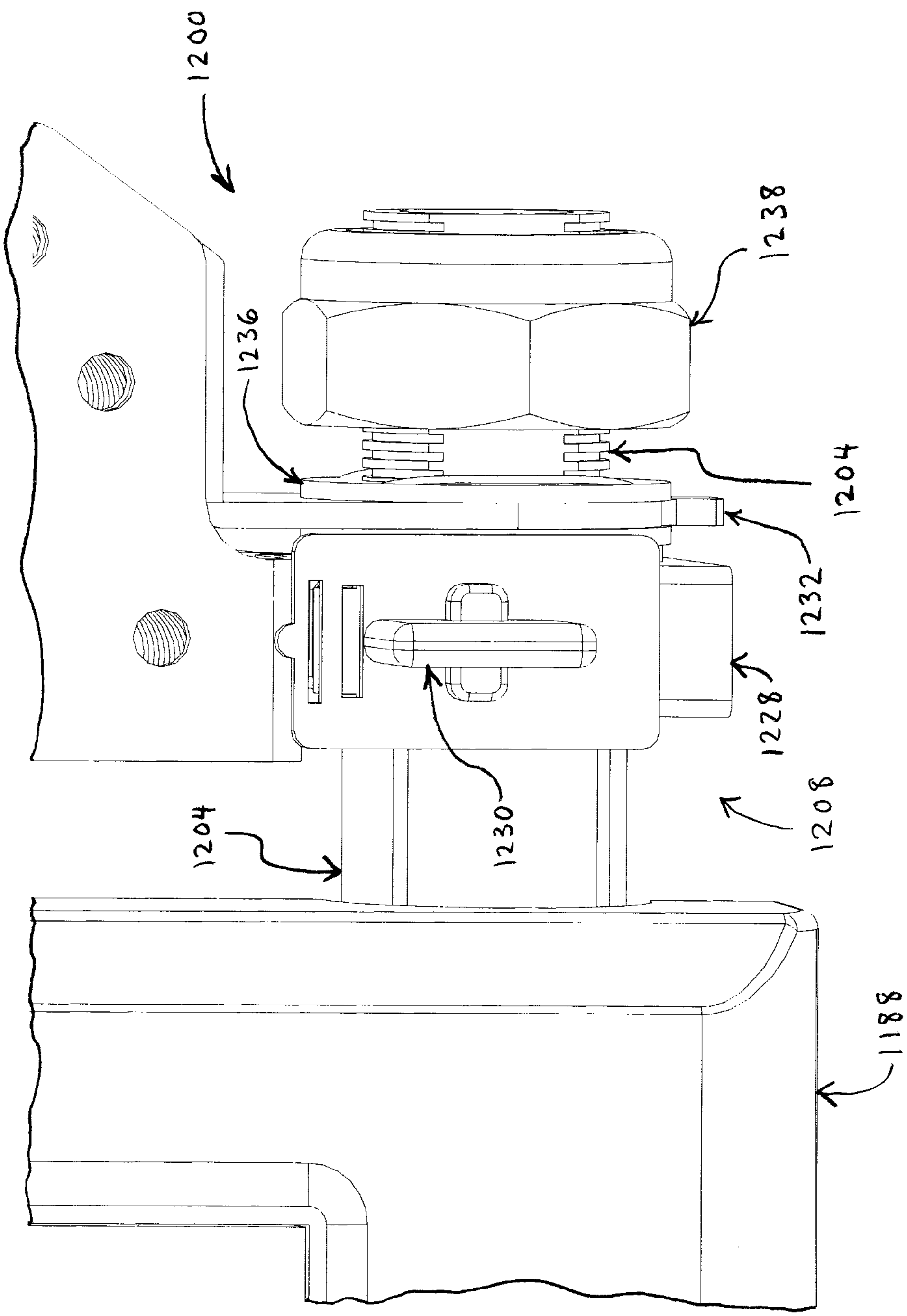
FIG. 100 is an enlarged, back isometric view of a portion of the electronic device of FIG. 81, illustrating one of the two keyboard position controllers.

In one embodiment, the keyboard assembly 1126 has a resistance device 1234 configured to produce a substantially constant resistance to the rotation of the shaft 1204. The resistance device 1234 keeps the keyboard assembly 1126 from slamming down when the latch 1194 is actuated for opening. Referring to FIGS. 97 and 99, the resistance device 1234 is an assembly of: (a) two bushings or washers (plastic washers in one embodiment) 1236; and (b) a fastener or nut 1238. The shaft 1204, in one embodiment, has a flange 1238 illustrated in FIG. 97. To generate resistance, the nut 1238 is screwed onto the threaded shaft 1204 until it squeezes, and applies a suitable force to, the washers 1236 and the flange 1238. This forces the flange 1238 against the arm 1232. Since the arm 1232 is connected to the housing 1104, the flange 1238 (and the shaft 1204) undergo a frictional force. The frictional force produces a substantially constant resistance to the rotation of the keyboard assembly 1126.

Figure 94:
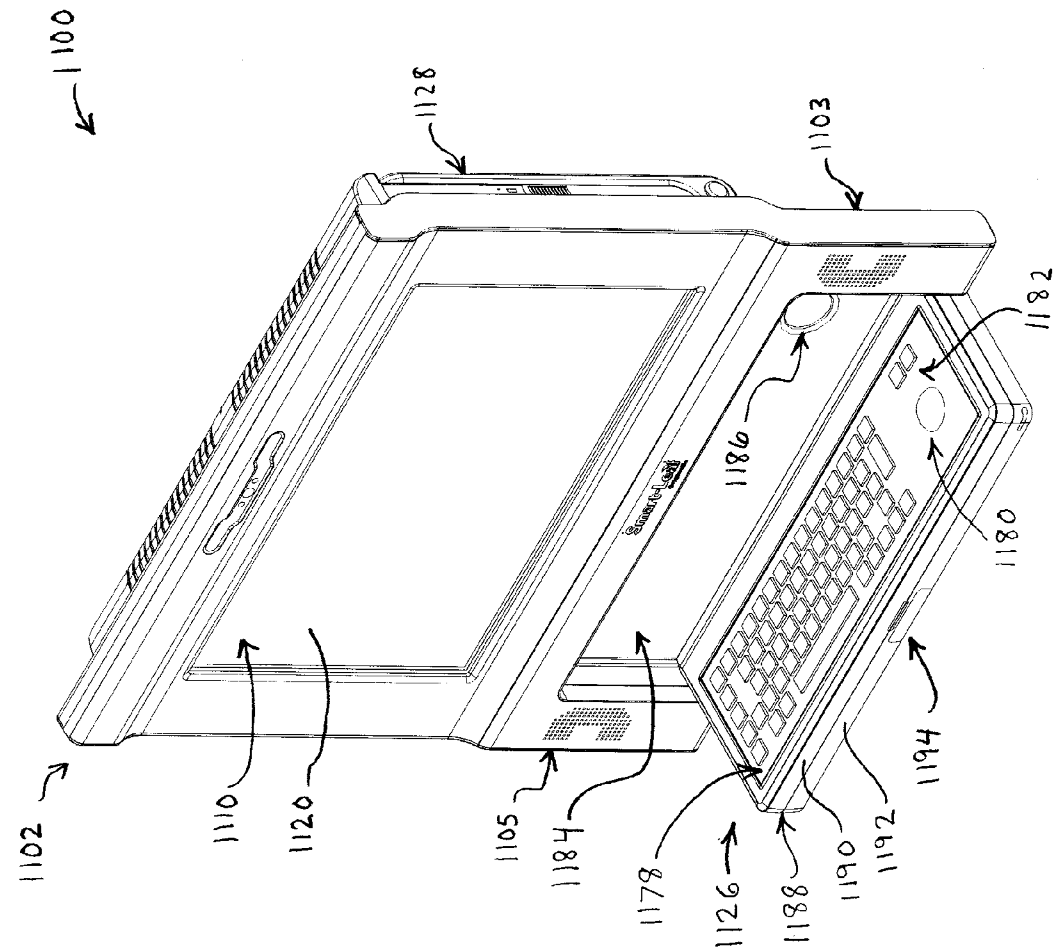
FIG. 94 is a front isometric view of the electronic device of FIG. 81, illustrating the keyboard in the open position.
Figure 95:
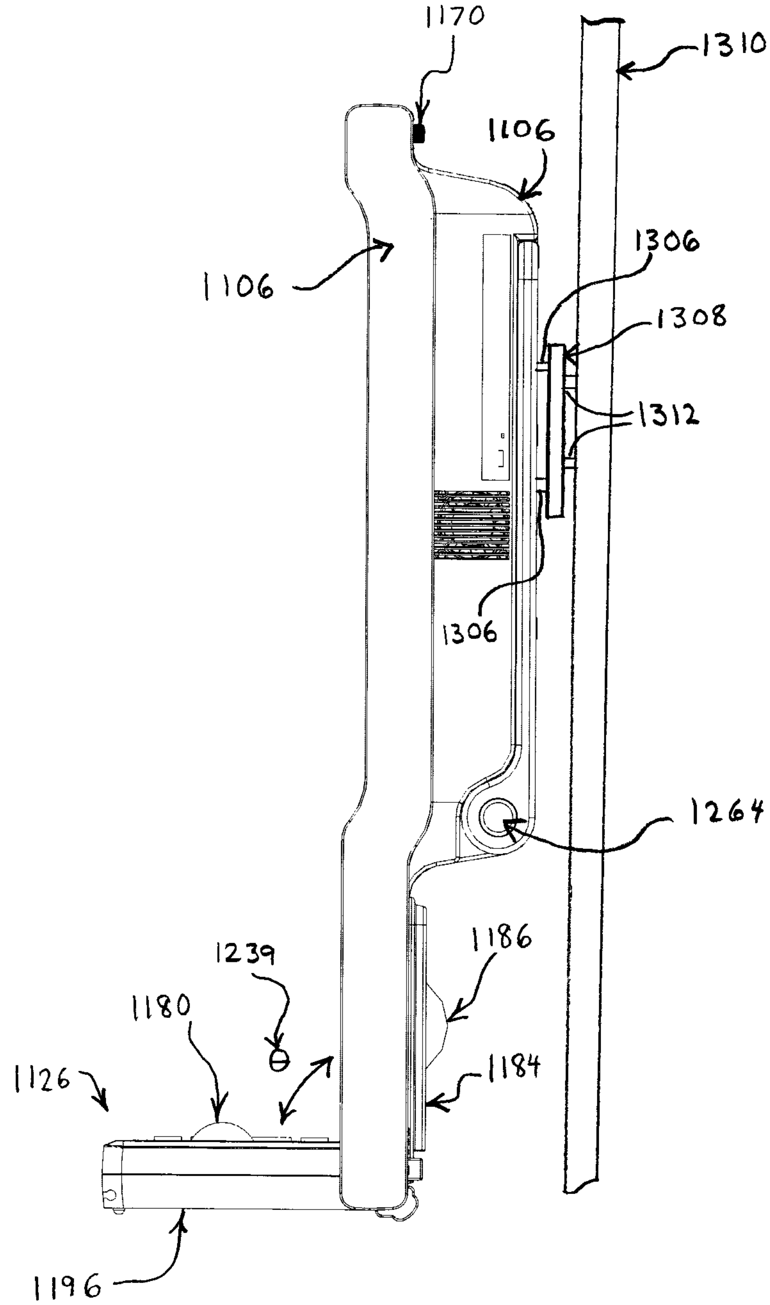
FIG. 95 is a right side view of the electronic device of FIG. 81, illustrating the keyboard in the open position.

In operation, the user may open the keyboard assembly 1126 by pulling it outward from the upward, closed position shown in FIG. 81 to the downward, open position shown in FIG. 94. While opening the keyboard assembly 1126, the frictional force keeps the keyboard assembly 1126 from slamming down. As the user pivots the keyboard assembly 1126 downward, one of the protrusions 1226 of the spring device engager 1208 engages the contact region 1222 of the leaf spring 1220. The spring force of the leaf spring 1222 maintains the keyboard assembly 1126 at a set angle 1239, as illustrated in FIG. 95. In one embodiment, this angle is one hundred and two degrees from the vertical plane. If an excessive load or weight is applied to the keyboard assembly 1126, for example over twenty-five pounds of force, the spring 1222 gives way, and the keyboard assembly 1126 pivots downward with no counteractive force other than the frictional force described above. The user may then reset the keyboard assembly 1126 by pivoting it upward until the spring 1222 gives way. Accordingly, the spring-based keyboard position controller 1200 provides over-force protection for the keyboard assembly 1126. In the event of an improper force, for example, the force of someone hanging or sitting on the keyboard assembly 1126, the spring 1222 gives way rather than resulting in the bending or destruction of the mechanical parts of the electronic device 1100.

Figure 84:
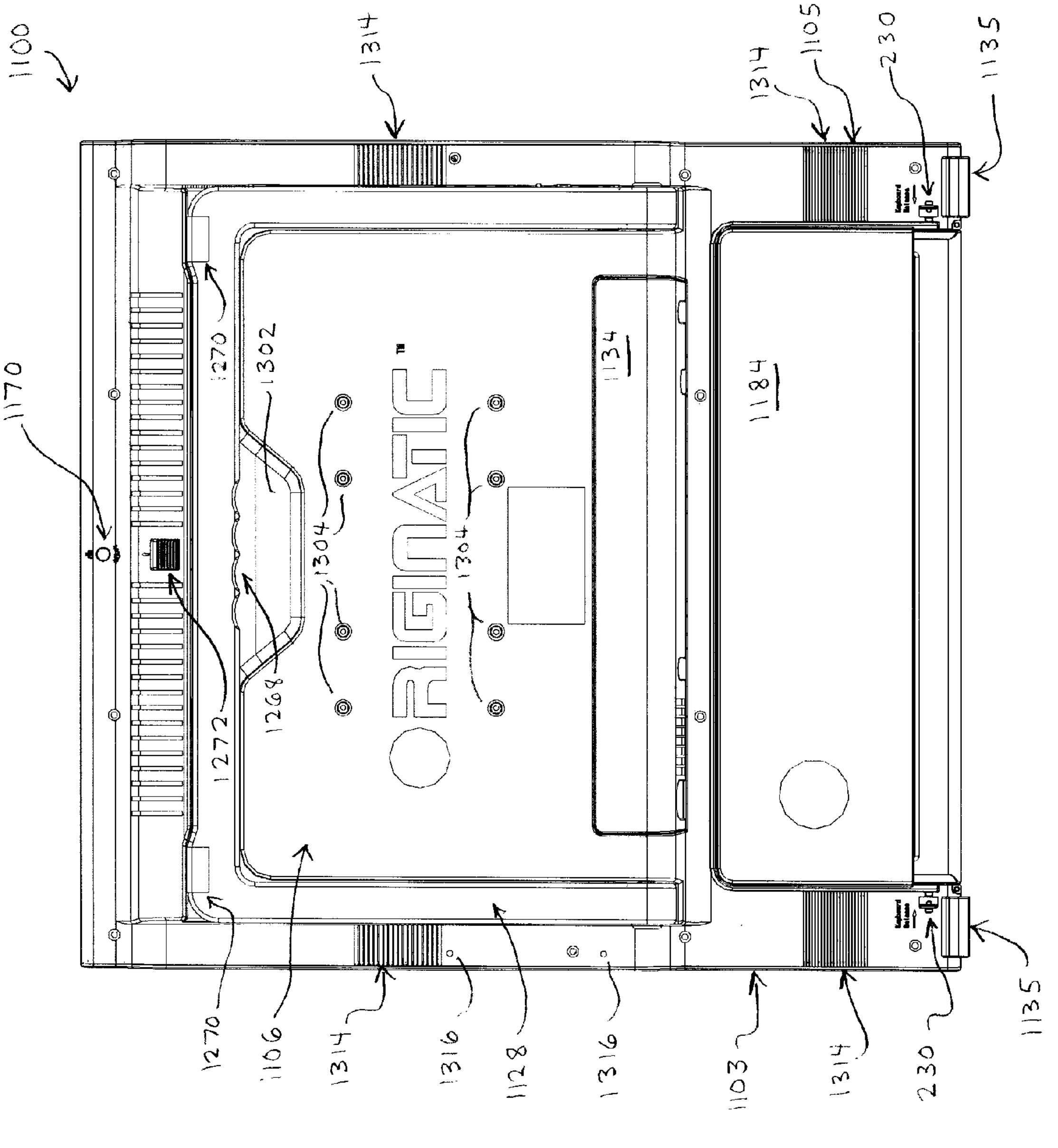
FIG. 84 is a back view of the electronic device of FIG. 81.
Figure 98:
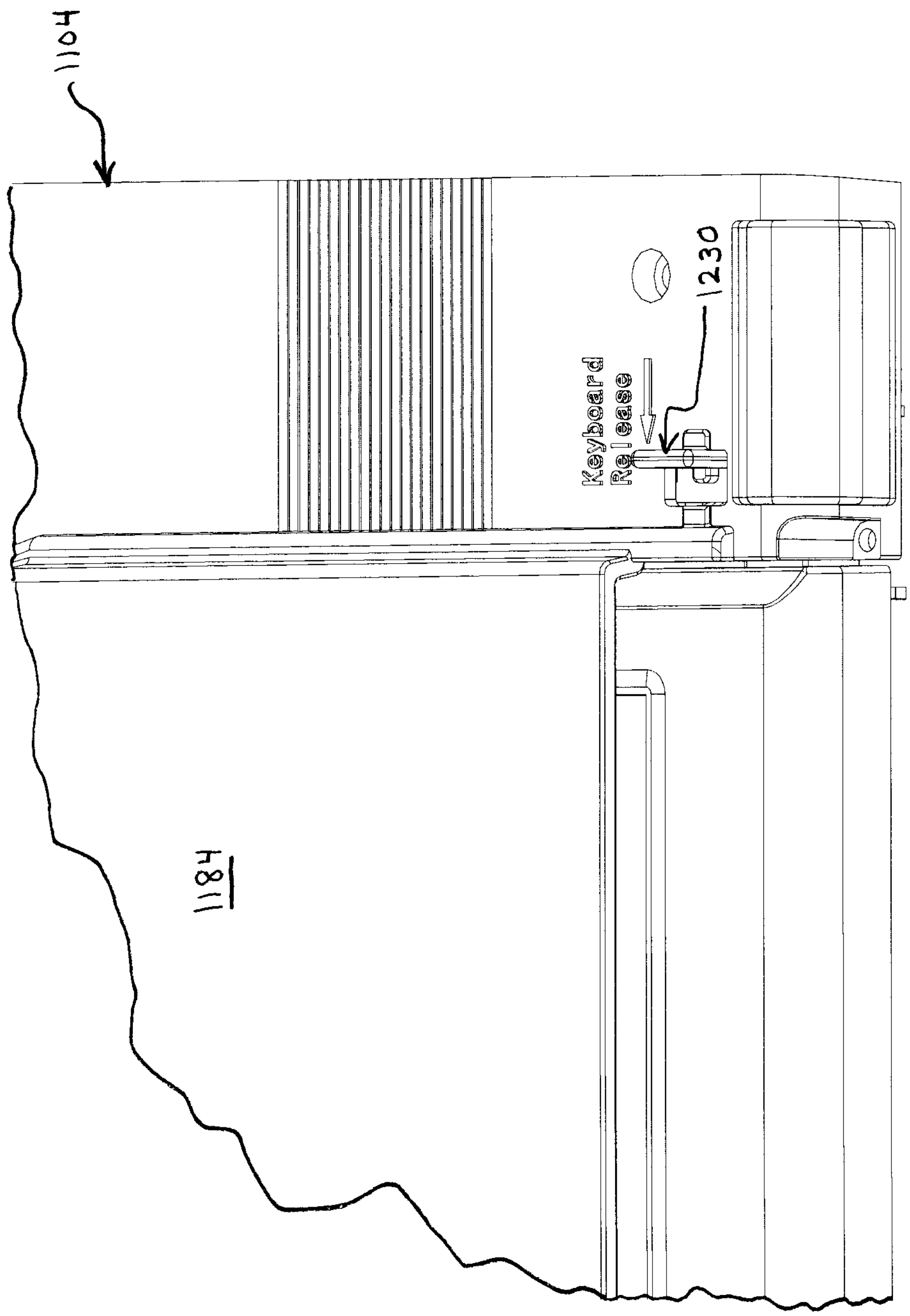
FIG. 98 is a back elevation view of a portion of the electronic device of FIG. 81, illustrating one of the two keyboard sliders or release levers.
Figure 111:
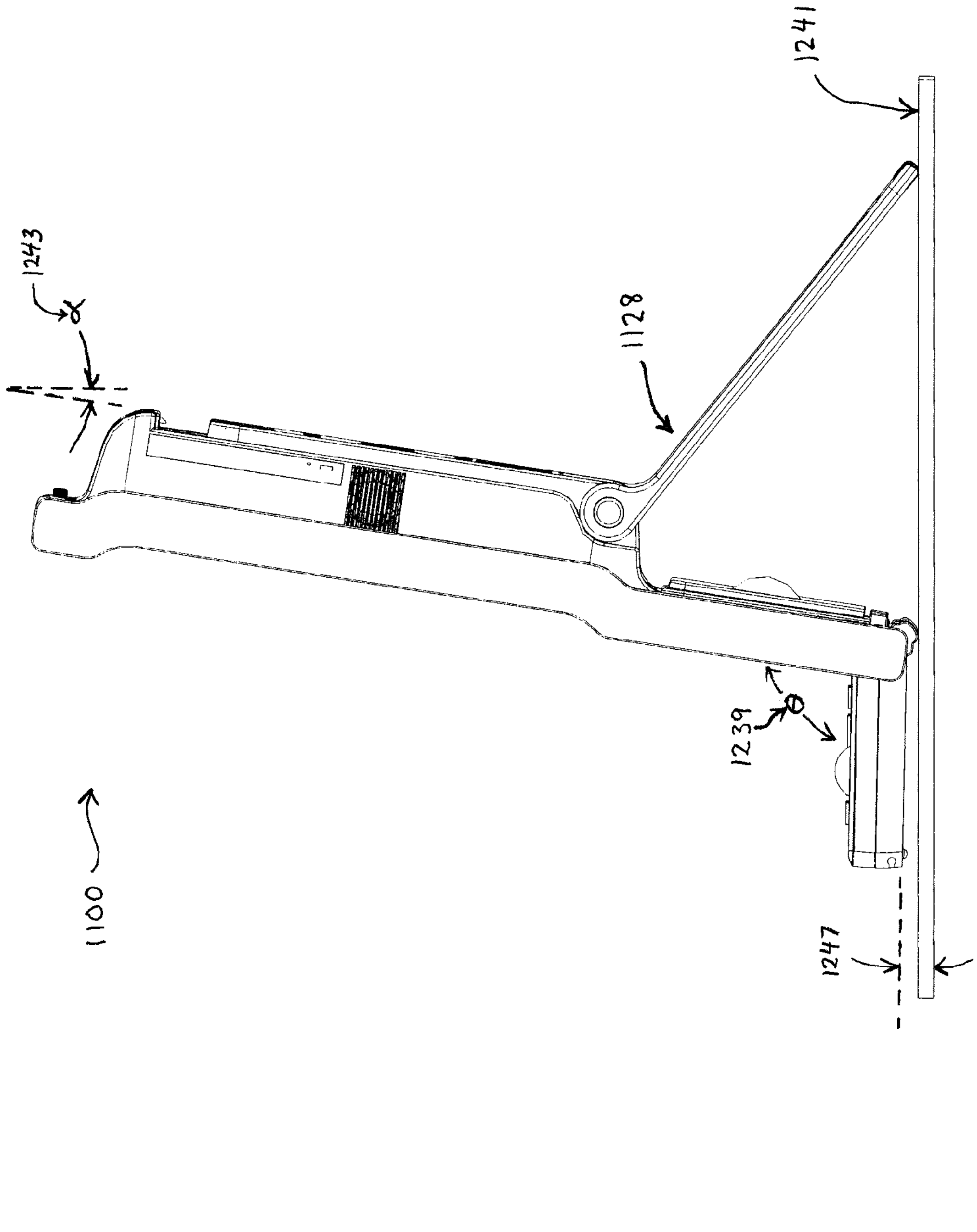
FIG. 111 is a side view of the electronic device of FIG. 81, illustrating the desktop stand open and the electronic device resting on a desktop.

The keyboard position controller 1200 also enables the user to disengage the leaf spring 1222. This enables free pivoting of the keyboard assembly beyond the set angle 1239, subject to the frictional force of the resistance device 1234. This may be desirable when resetting the keyboard as described above. This may also be desirable when using the electronic device 1100 when it sits on a desktop 1241, as illustrated in FIG. 111. For example, the electronic device 1000 leans back by an angle 1243. This causes the keyboard assembly 1126 to be positioned above the desktop 1241 at an angle 1247 equal to angle 1243. To enable the keyboard assembly 1126 to rest flat or flush on the desktop 1241, the user can push the grasps 230 inward, toward the center of the electronic device 1100, as illustrated in FIGS. 84 and 98.

Figure 101:
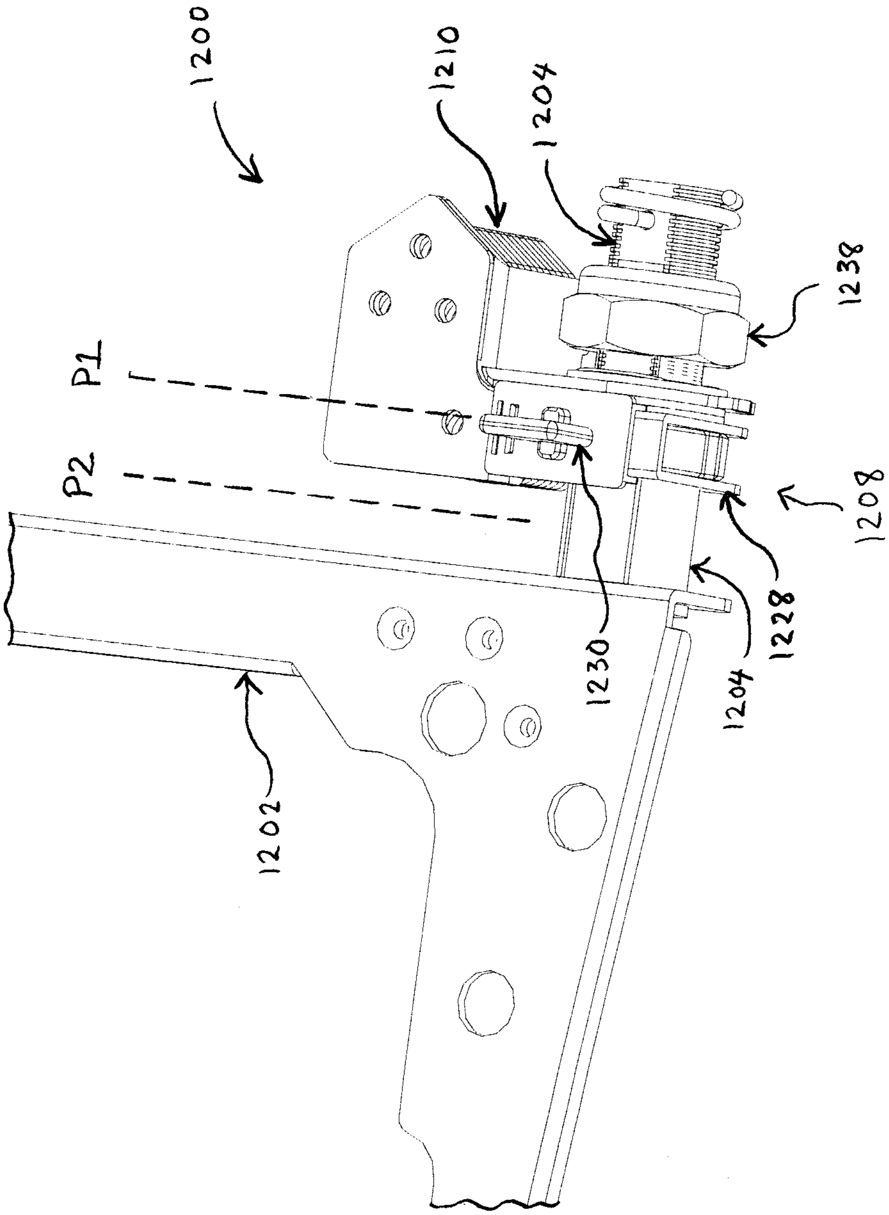
FIG. 101 is an enlarged, back isometric view of a portion of the electronic device of FIG. 81, illustrating the different slide positions of the slider of one of the two keyboard position controllers.
Figure 102:
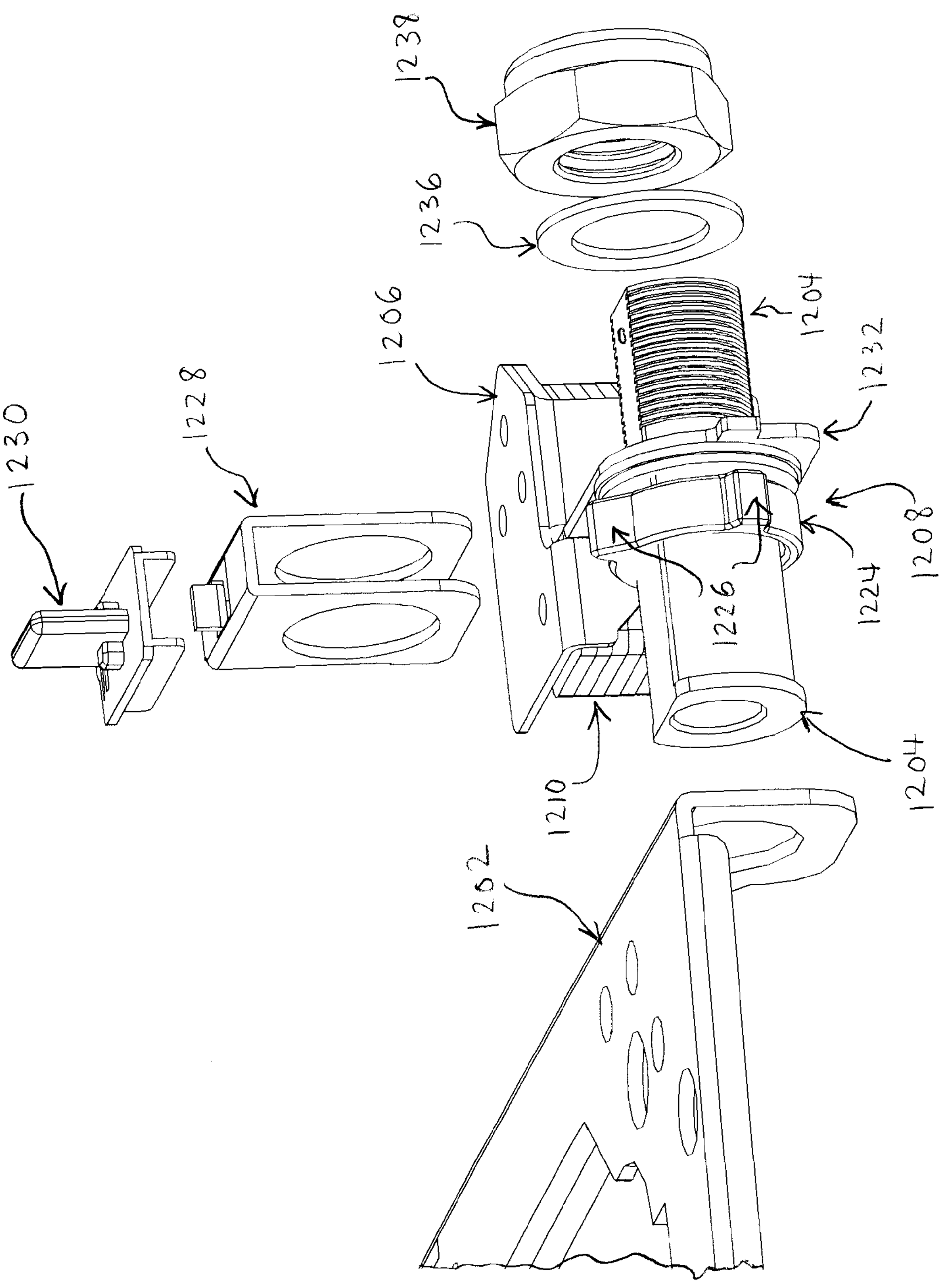
FIG. 102 is an exploded, back isometric view of a portion of the electronic device of FIG. 81, illustrating one of the two keyboard position controllers.
Figure 103:
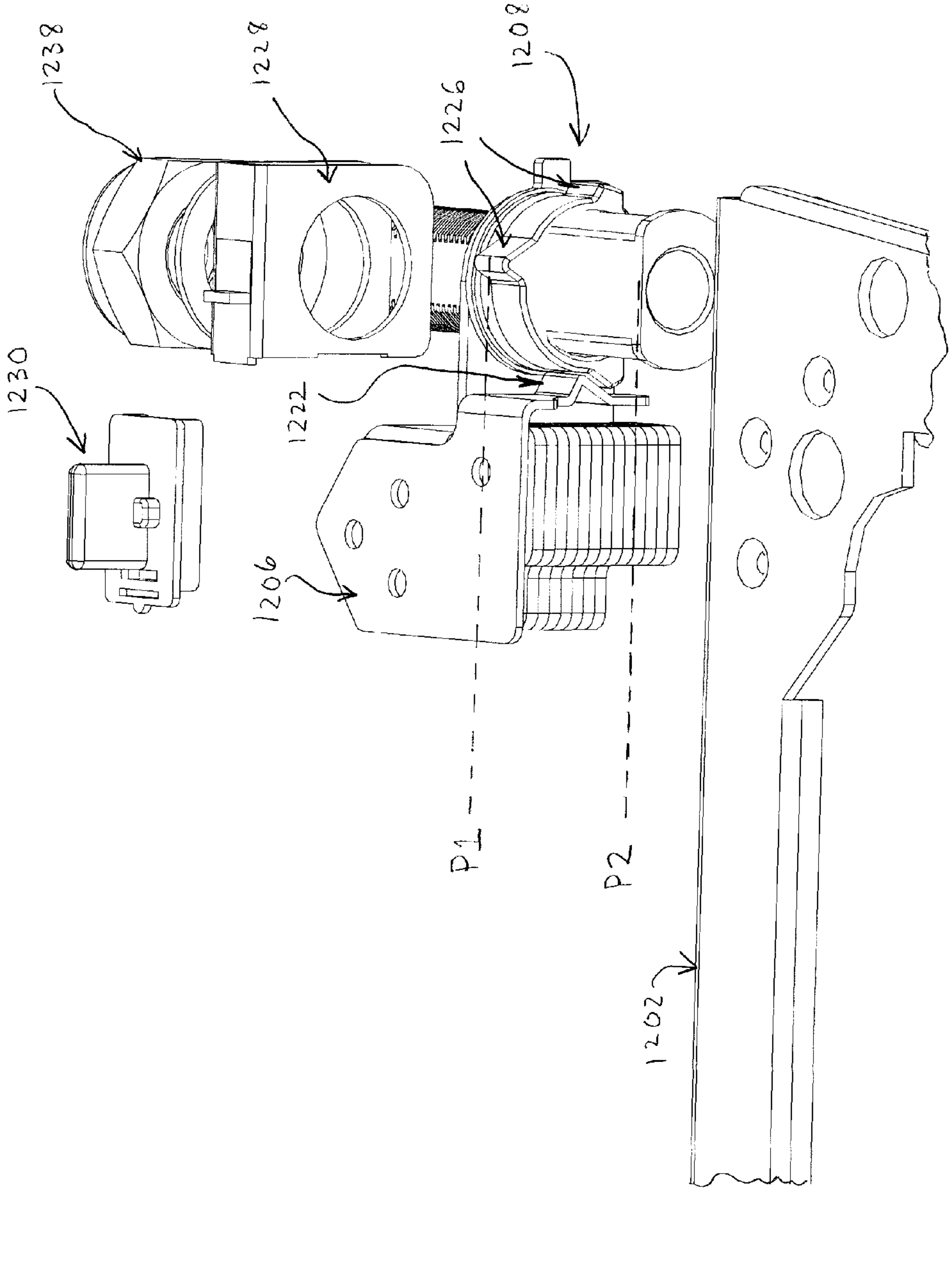
FIG. 103 is an exploded, top isometric view of a portion of the electronic device of FIG. 81, illustrating one of the two keyboard position controllers.
Figure 104:
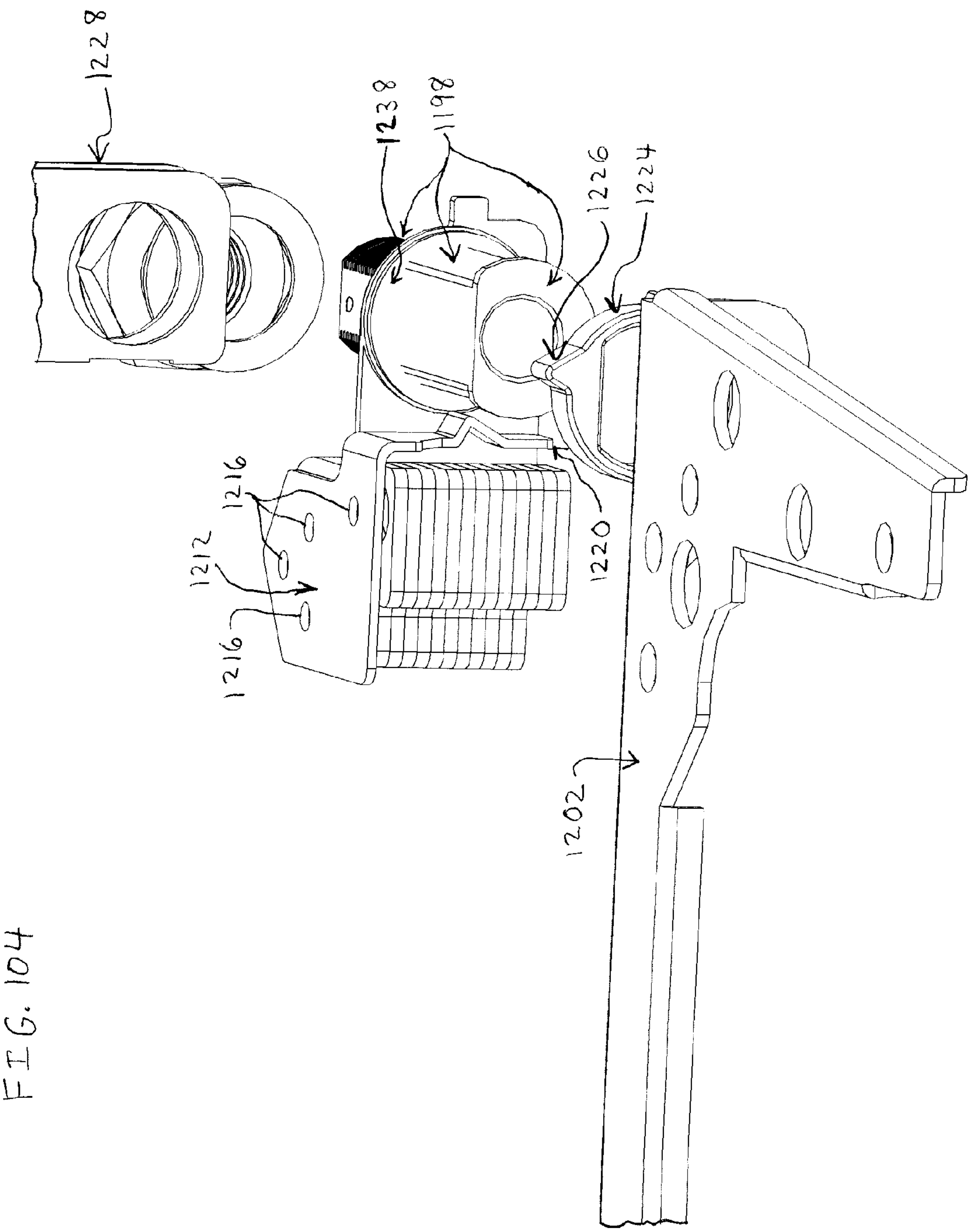
FIG. 104 is an exploded, side isometric view of a portion of the electronic device of FIG. 81, illustrating one of the two keyboard position controllers.
Figure 105:
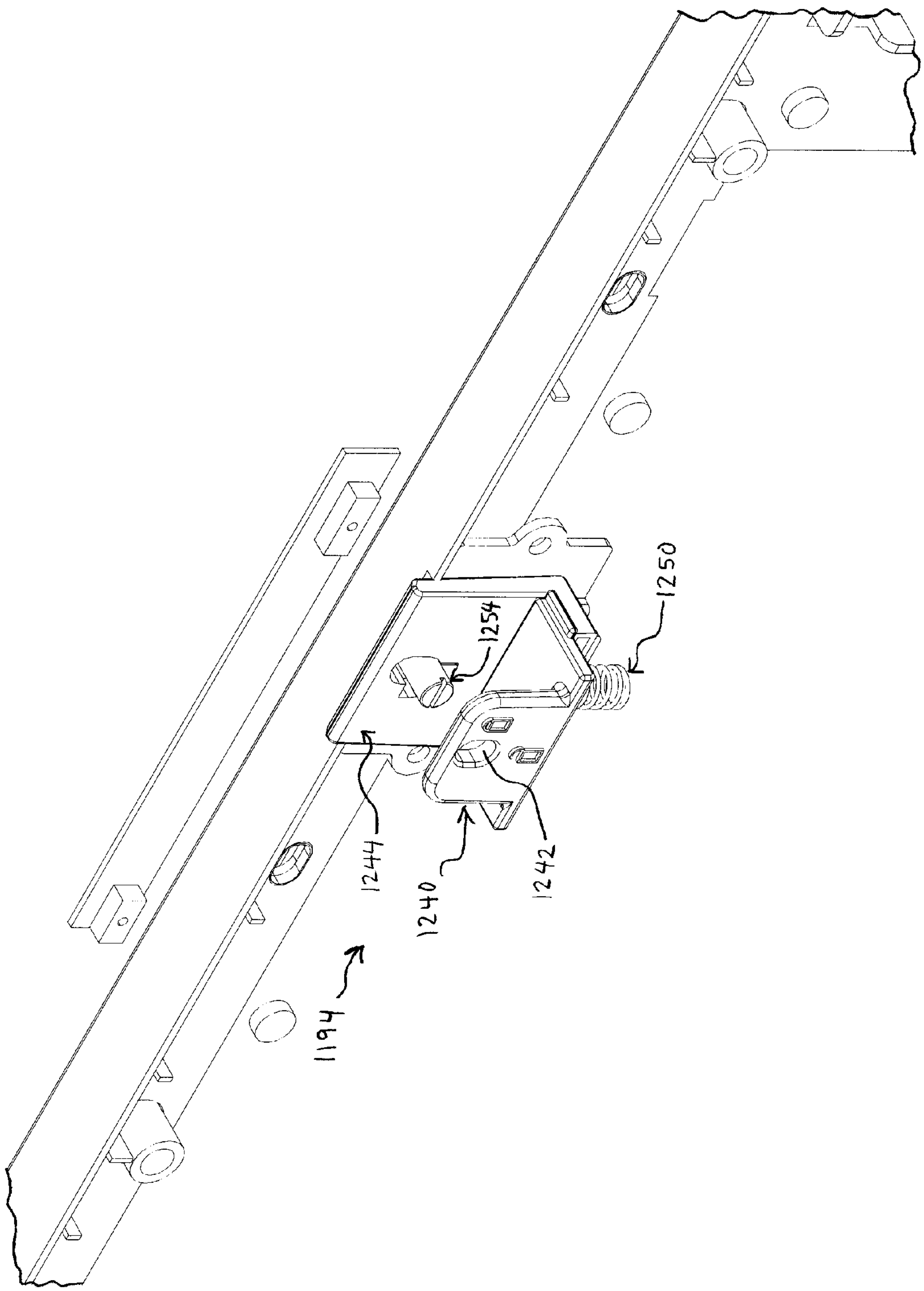
FIG. 105 is an enlarged, front isometric view of the keyboard latch of the electronic device of FIG. 81.
Figure 106:
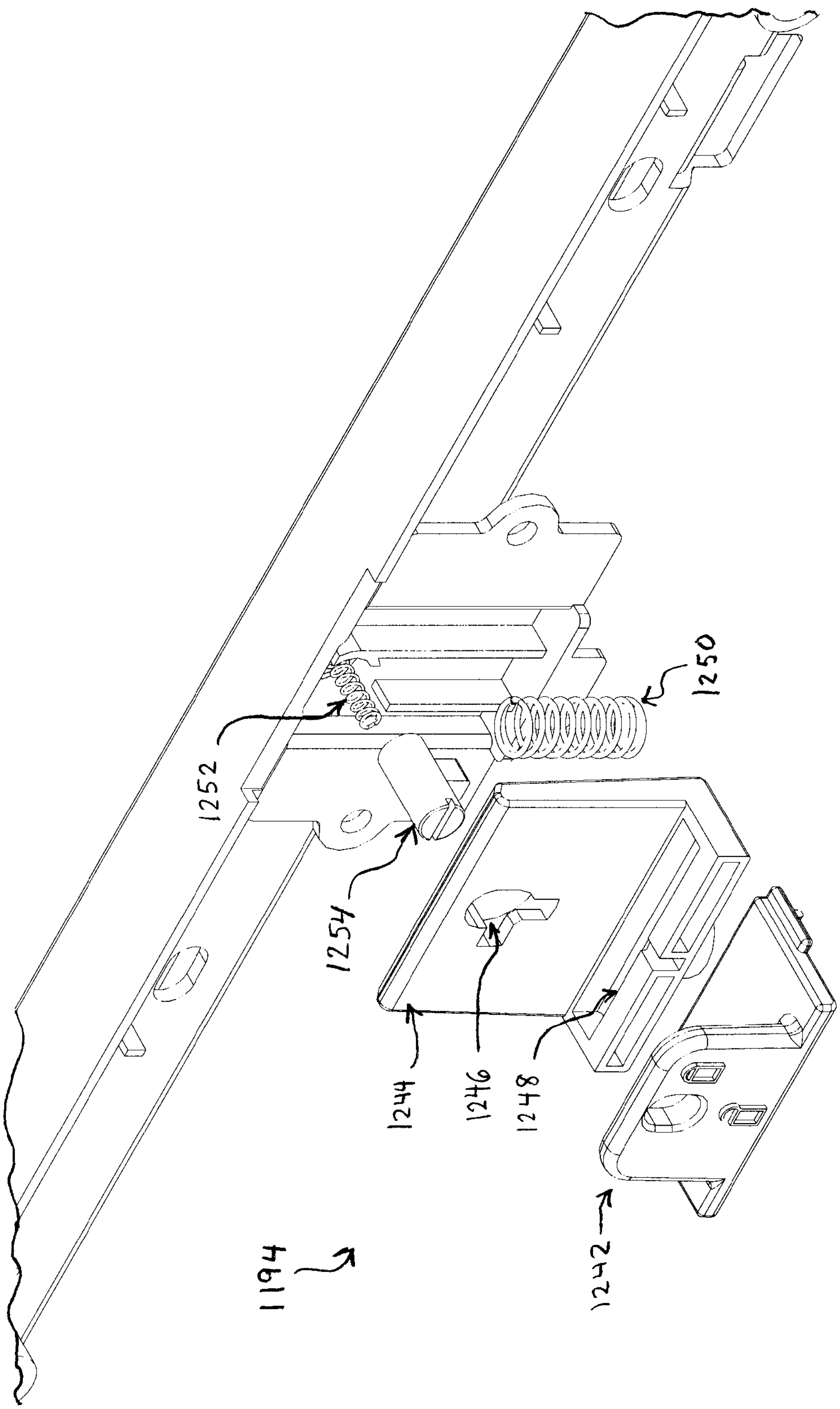
FIG. 106 is an exploded, enlarged, front isometric view of the keyboard latch of the electronic device of FIG. 81.
Figure 112:
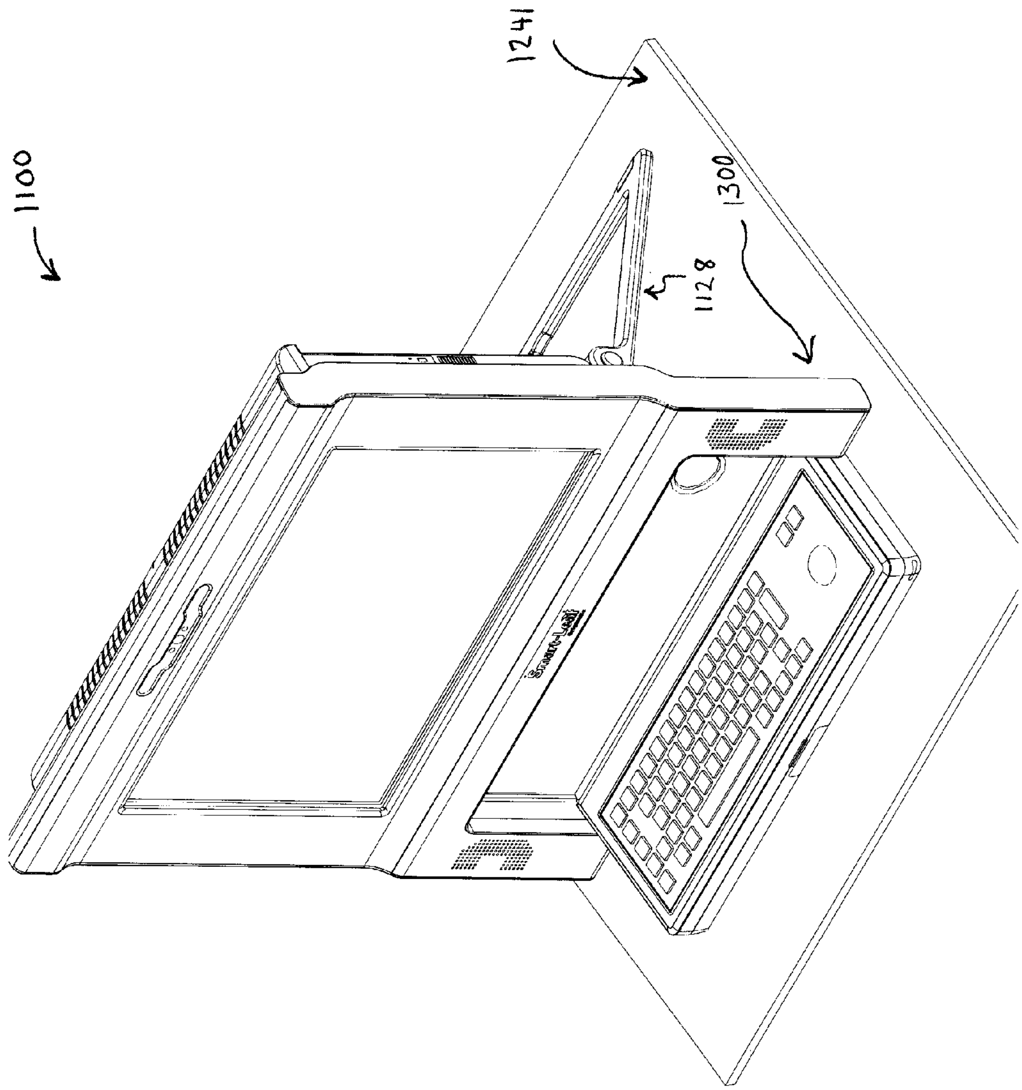
FIG. 112 is a top front isometric view of the electronic device of FIG. 81, illustrating the desktop stand open and the electronic device resting on a desktop.

Referring to FIGS. 101, 103 and 104, the movement of each grasp 230 from a lock or set position P1 to a released position P2, moves the spring device engager 1208 so that it is out of reach of the contact region 1222 of the leaf spring 1220. Therefore, in position P2, the engager 1208 remains disengaged from the leaf spring 1222 while the user pivots the keyboard assembly 1126 downward beyond the angle 1239. In one embodiment, when the grasps 230 are in position P2, the keyboard assembly 1126 is pivotable downward more than one hundred eighty degrees from the vertical plane without any engagement with the leaf spring 1222. Therefore, the keyboard assembly 1126 is positionable to lay substantially flat and flush with the desktop 1241, as illustrated in FIG. 112.

Figure 107:
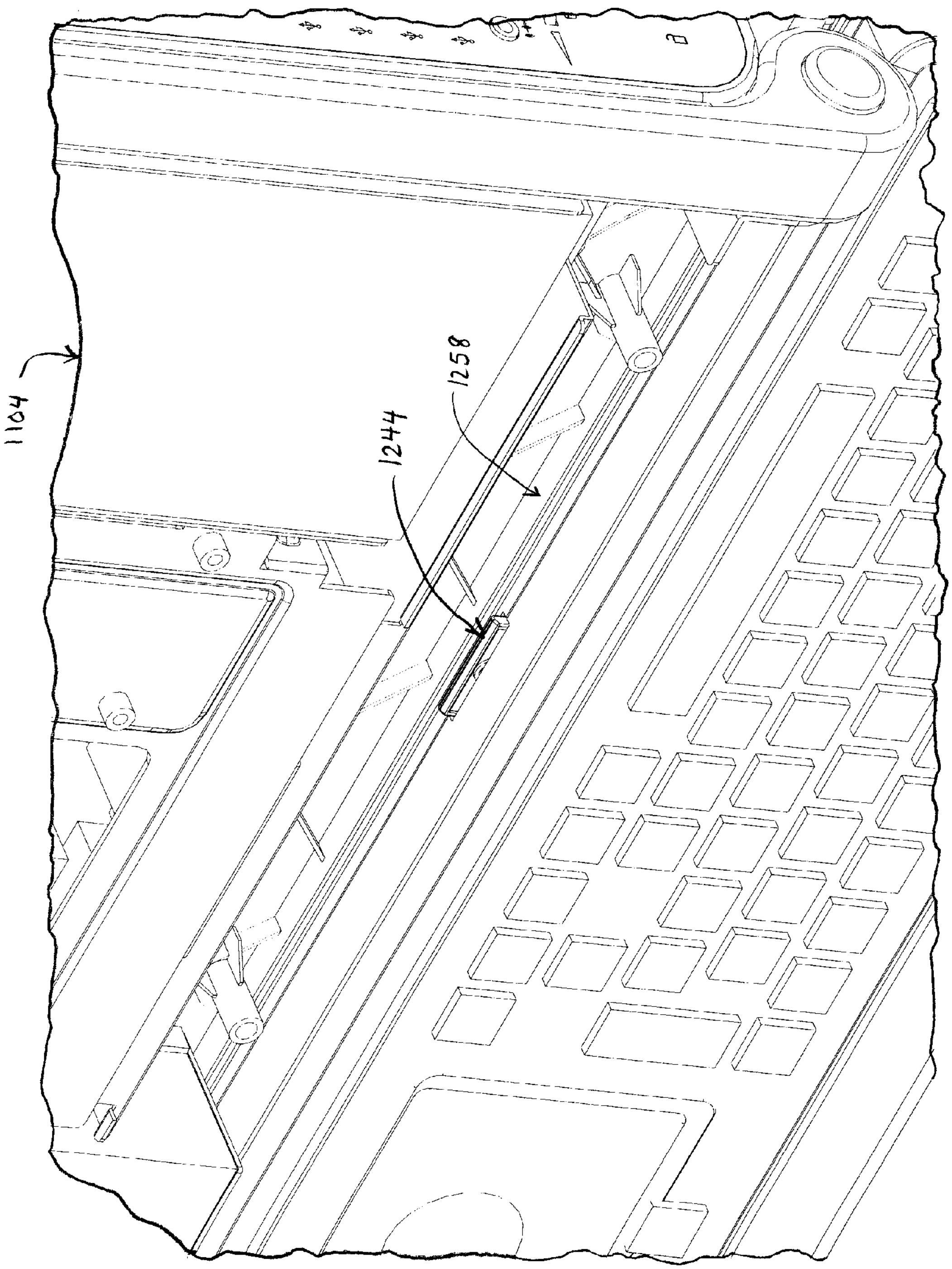
FIG. 107 is an enlarged, back isometric view of the projection of the keyboard latch of the electronic device of FIG. 81.
Figure 108:
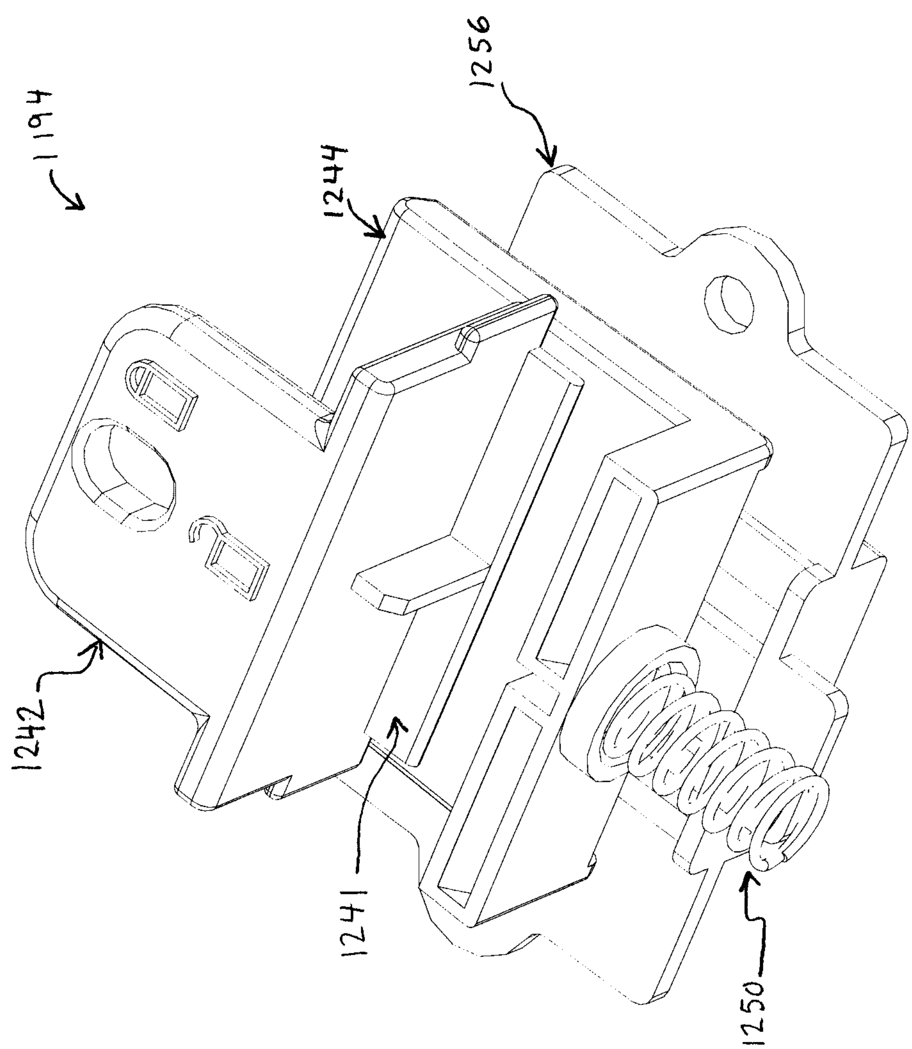
FIG. 108 is an enlarged, front, bottom isometric view of the keyboard latch of the electronic device of FIG. 81.
Figure 109:
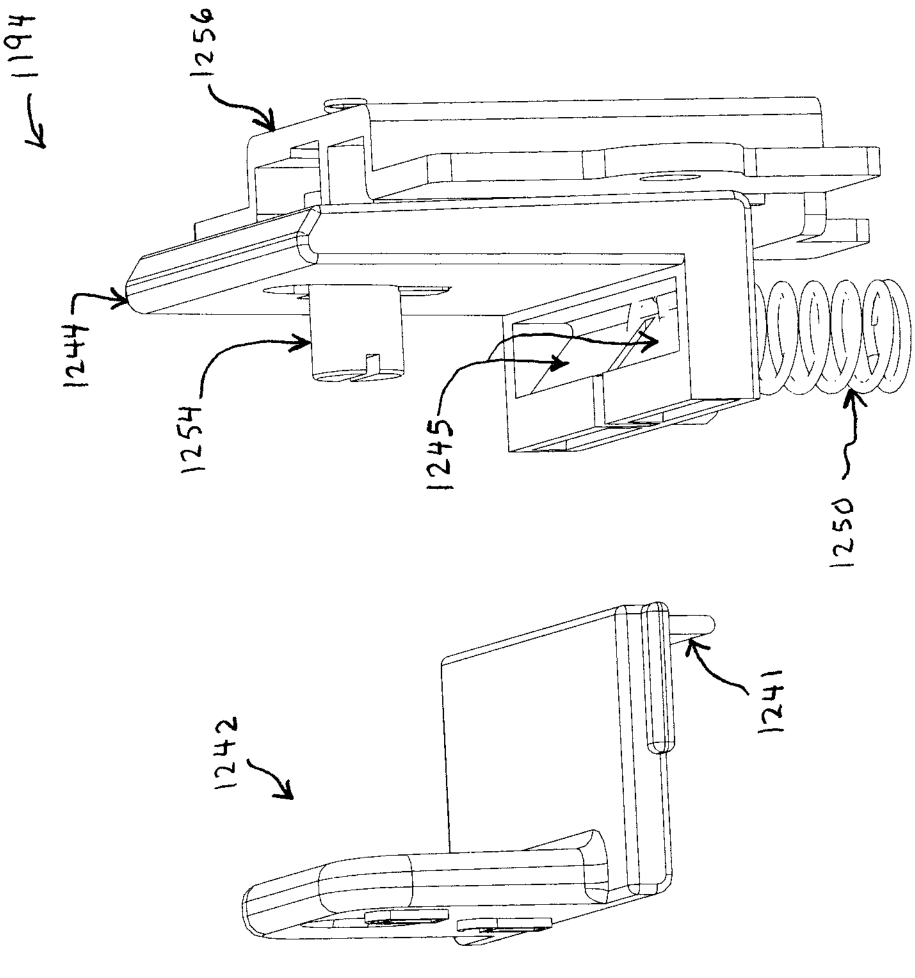
FIG. 109 is an exploded, enlarged, side isometric view of the keyboard latch of the electronic device of FIG. 81.
Figure 110:
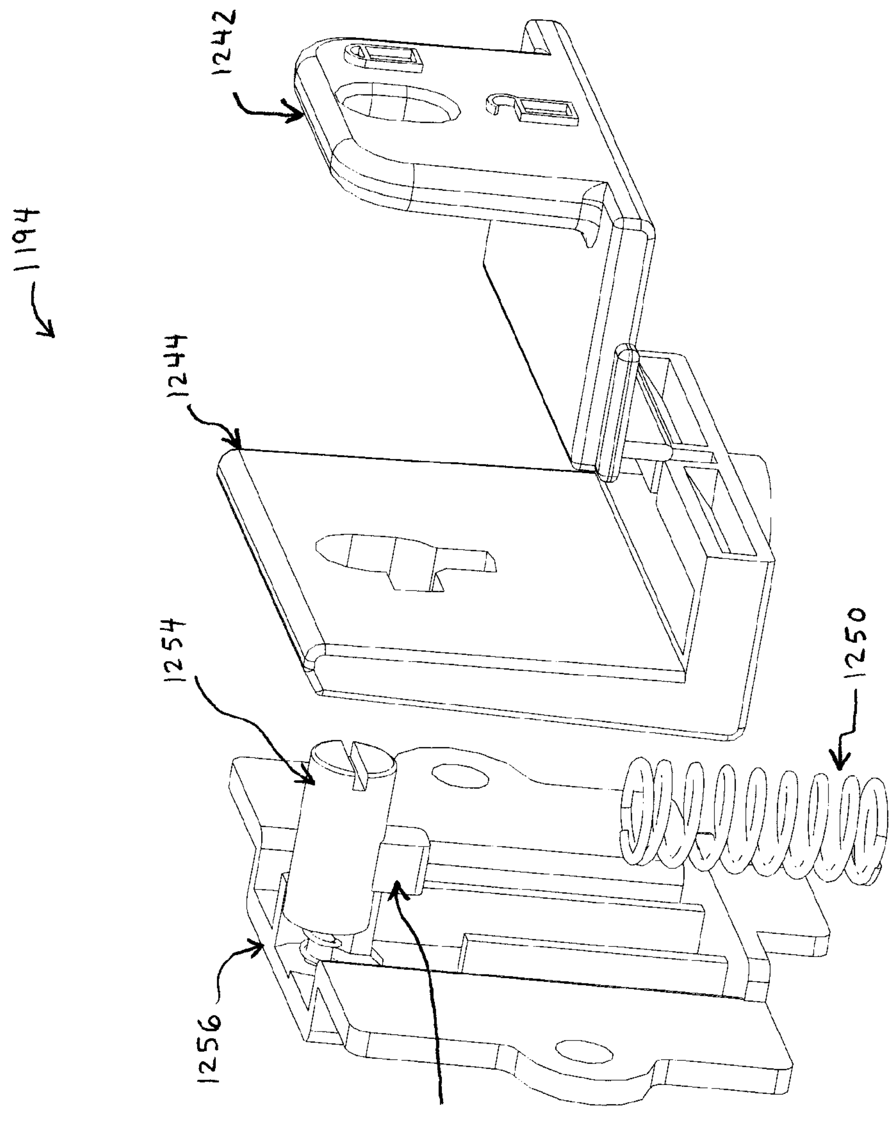
FIG. 110 is an exploded, enlarged, back isometric view of the keyboard latch of the electronic device of FIG. 81.

Referring to FIGS. 105-109, the keyboard latch 1194 includes: (a) a grasp 1240 which has a finger 1241 and which defines a tool opening 1242; (b) a projection device 1244 which defines a lock opening 1246 and a coupler opening 1248; (c) a spring 1250 which biases the projection device 1244 upward; (d) a spring 1252 received by the lock screw 1254; and (e) a rack 1256 which has a plurality of grooves which mate with the rear side of the projection device 1244. The projection device 1244 has a sloped floor or ramp 1245, as illustrated in FIG. 108. The projection screw 1254 has a protrusion 1247 sized to be received by the lock opening 1246.

In operation, the spring 1250 predisposes the projection device 1244 to have an upward or extended position. Referring to FIG. 107, in the extended position, the projection device 1244 extends above the lower edge 1258 of the housing portion 1104. Accordingly, the keyboard assembly 1126 is secured closed in its upward or closed position, as shown in FIG. 81. To open the keyboard assembly 1126, the user pulls the grasp 1240 outward, toward the user. The finger 1241 of the grasp 1240 slides along the ramp 1245. The force applied to the ramp 1245 pushes the projection device 1244 downward until the projection device 1244 recedes below the lower edge 1258 of the housing portion 1104. Accordingly, the ramp 1245 functions as a translator which translates horizontal movement of the grasp 1240 to vertical movement of the projection device 1244. The user may further pull the grasp 1240 to pivot the keyboard assembly 1126 outward to its open position, as illustrated in FIG. 94.

When the keyboard assembly 1126 is in the upward, closed position, as illustrated in FIG. 81, the user may desire to lock or secure the keyboard assembly 1126 in that closed position. To do so, the user may insert a tool, such as a screw driver, through the tool opening 1242. Then, the user may rotate the projection screw 1254 ninety degrees in either direction. The protrusion 1247 blocks the projection device 1244 from traveling downward. Therefore, if one were to pull the grasp 1240 outward, the projection device 1244 would not move downward, and the keyboard assembly 1126 would remain locked or secured closed.

Referring to FIGS. 83 and 111-116, the desktop stand assembly 1128 includes: (a) a stand 1260 having a substantially U-shaped configuration; (b) a stand latch 1262 connected to the housing portion 1104; and (c) a plurality of coupler assemblies 1264. The stand 1260 has a foot section 1262. The foot section 1262 defines: (a) a latch opening or latch recess 1266; (b) a plurality of arc-shaped grasp regions 1268 configured for relatively comfortable finger and hand engagement; and (c) a plurality of feet grips 1270 of a rubber or other suitable material.

Figure 113:
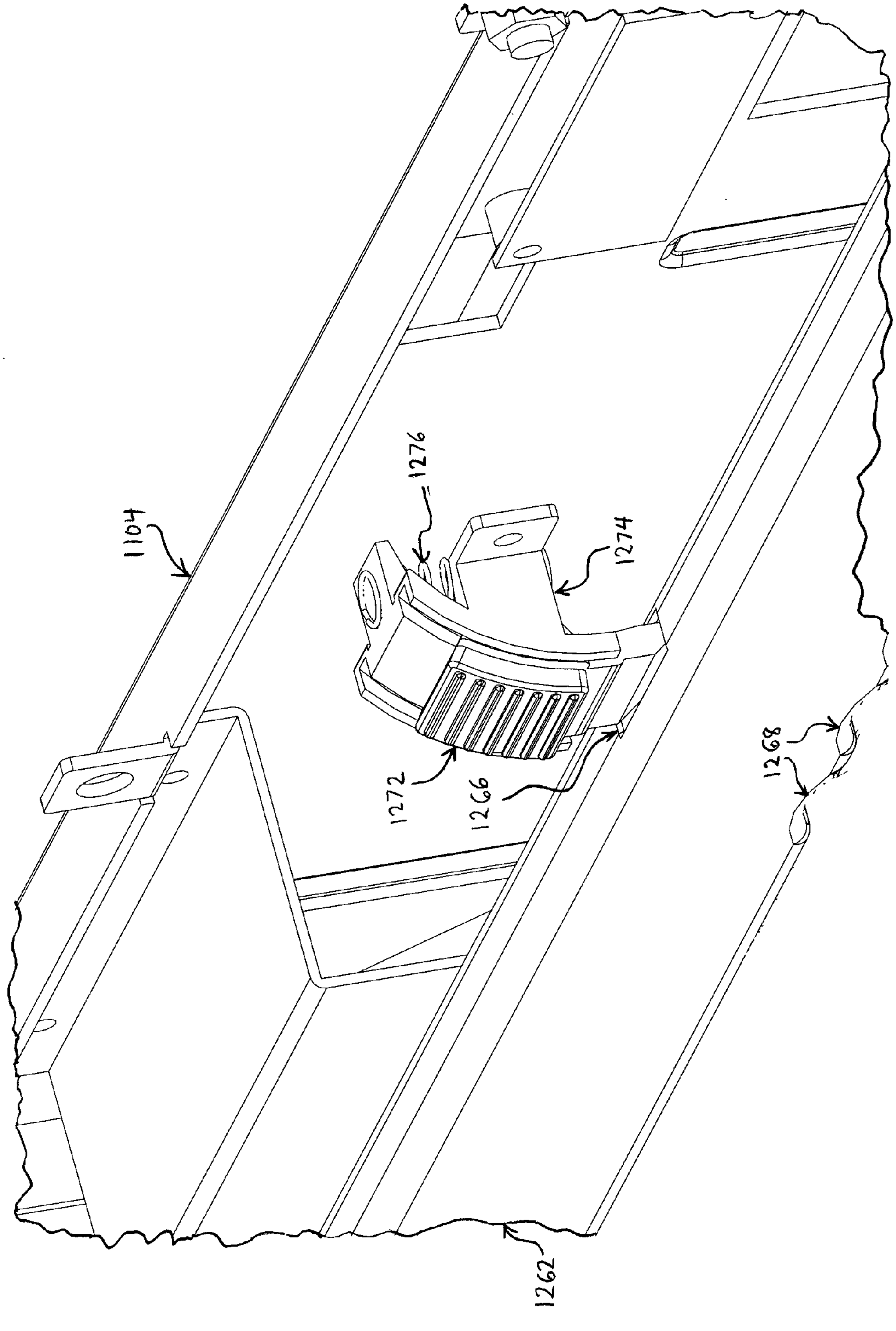
FIG. 113 is a back isometric view of the desktop stand latch of the electronic device of FIG. 81.

The stand latch 1262 includes: (a) a slider grasp 1272; (b) a support 1274 which connects the slider grasp 1272 to the housing portion 1104; and (c) a spring 1276 which biases the slider grasp 1272 to have a predisposed extended position, as illustrated in FIG. 113.

Figure 114:
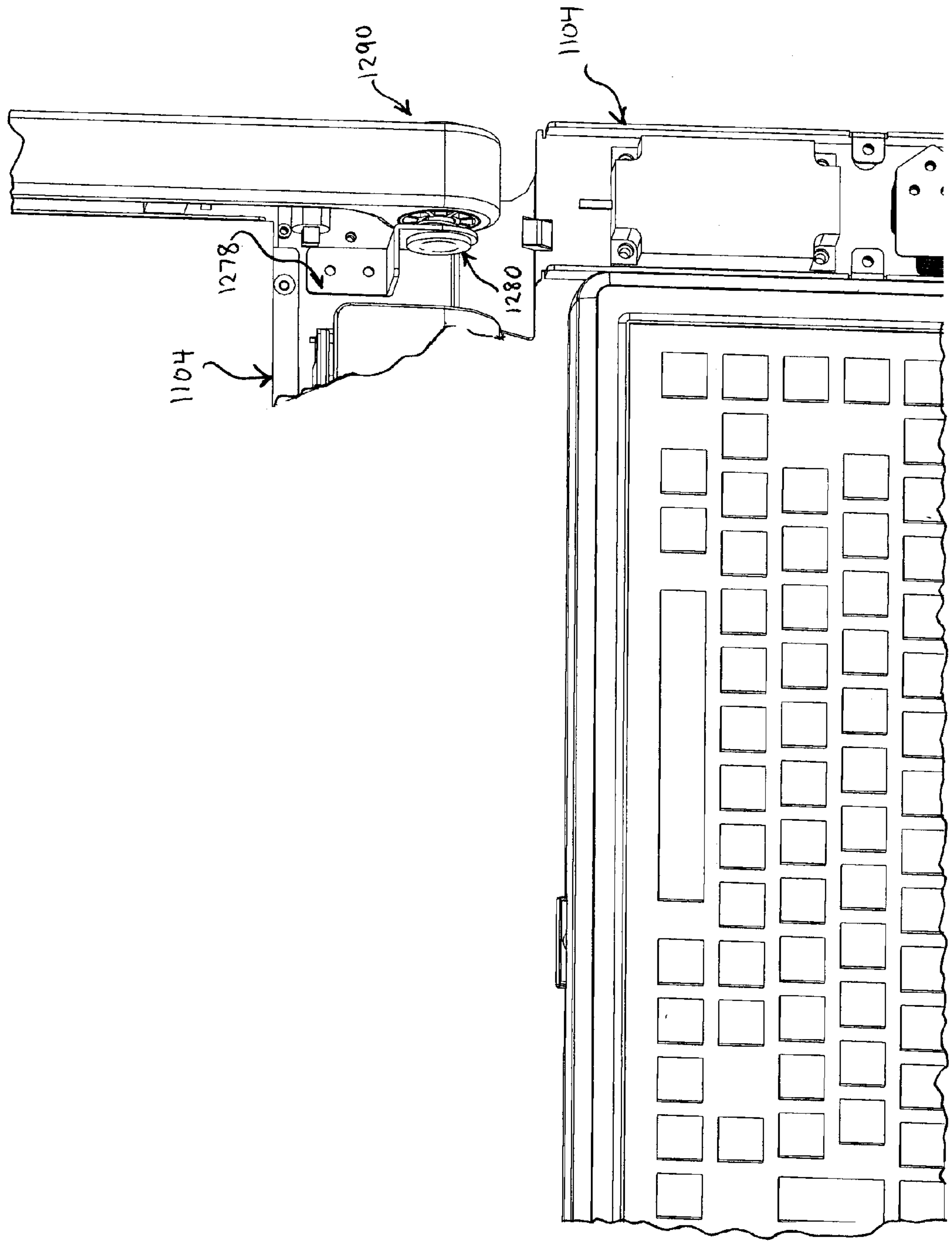
FIG. 114 is a back isometric view of the desktop stand assembly of the electronic device of FIG. 81.
Figure 115:
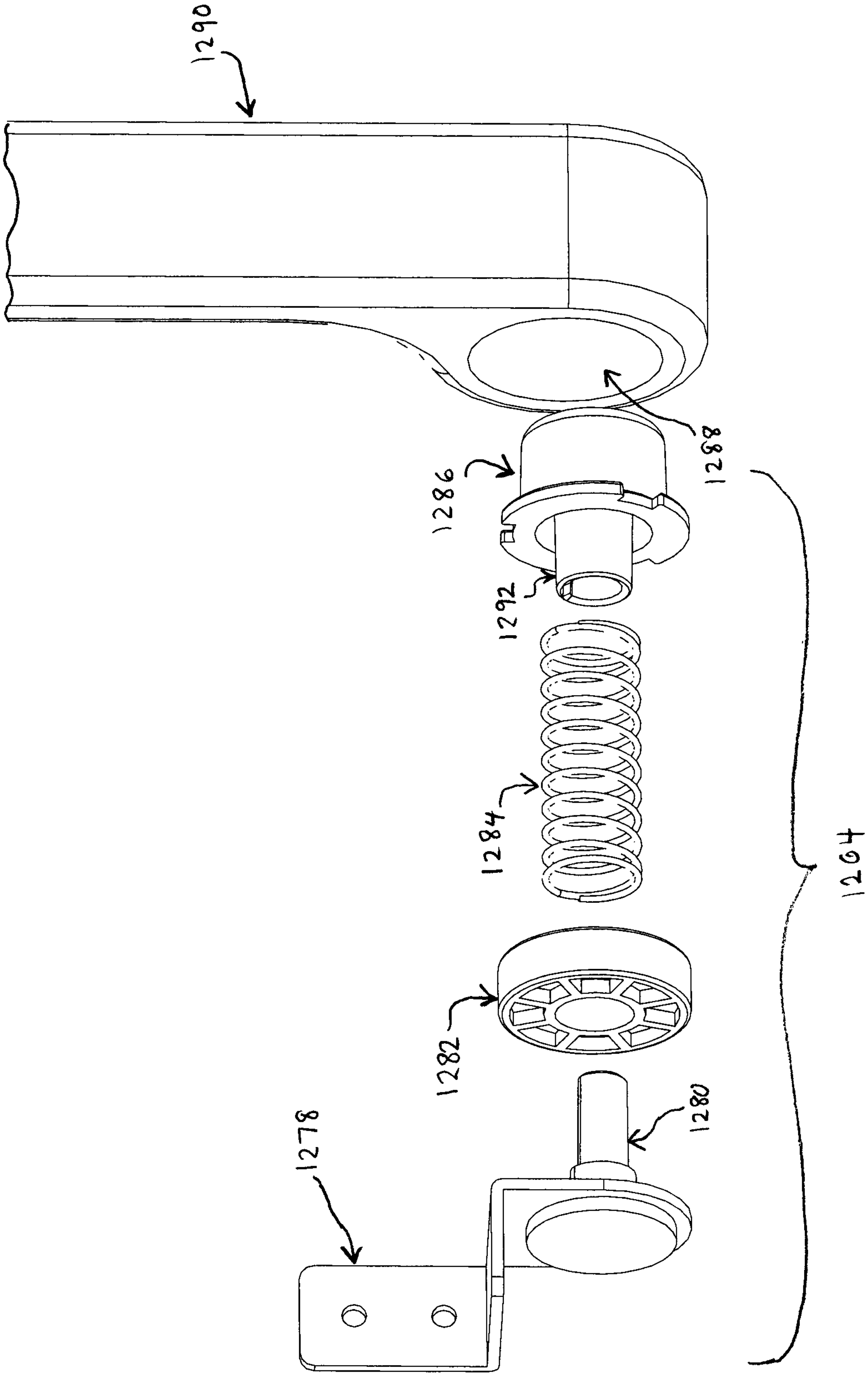
FIG. 115 is an exploded, enlarged isometric view of the desktop stand assembly of the electronic device of FIG. 81.
Figure 116:
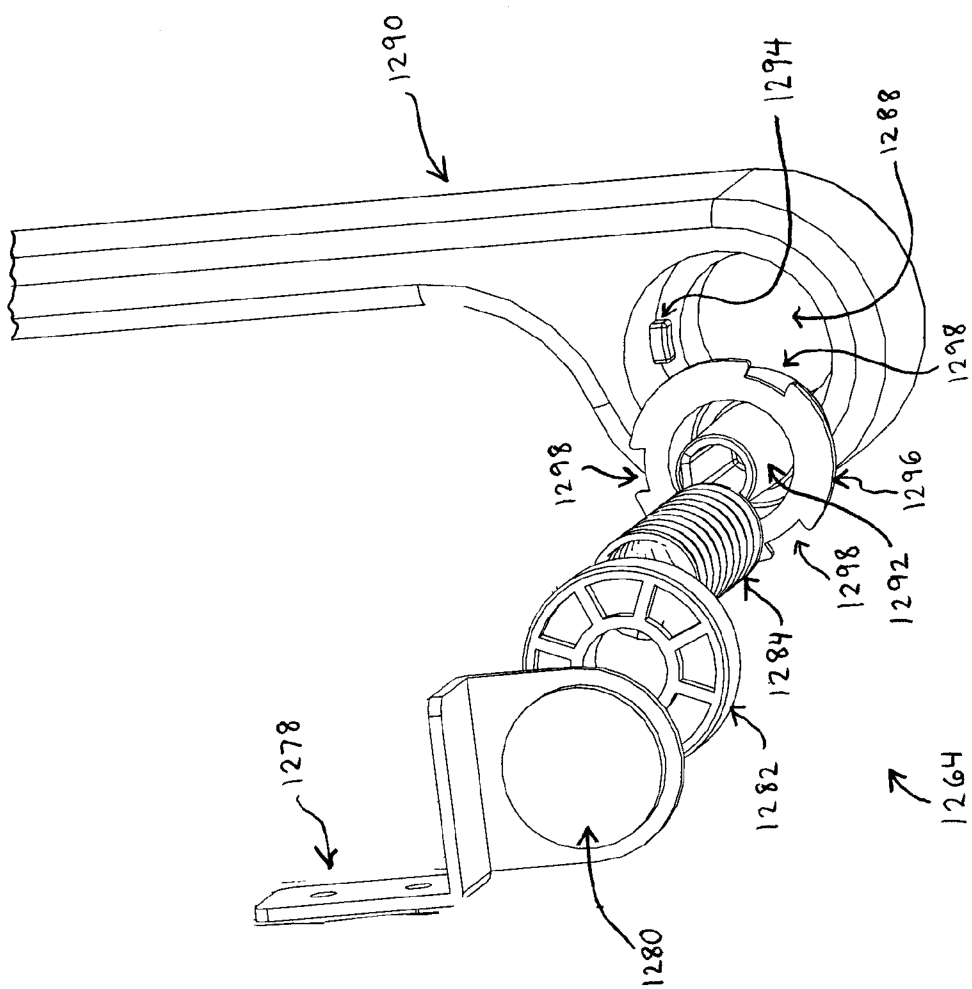
FIG. 116 is an exploded, enlarged side isometric view of the desktop stand assembly of the electronic device of FIG. 81.

As illustrated in FIGS. 114-116, each coupler assembly 1264 includes: (a) a support 1278 connected to the housing portion 1104, wherein the support 1278 defines an opening; (b) a shaft 1280 inserted through the opening of the support 1278; (c) an annular spacer 1282 which receives the shaft 1280; (d) a spring 1284; and (e) a depressible coupler 1286. The spring 1284 biases the depressible coupler 1286 to have a predisposed position pressed within the cavity 1288 defined by the joint 1290.

The depressible coupler 1286 has a tube or hollow shaft 1292 configured to receive the shaft 1280. The interior surface of the hollow shaft 1292 has a non-cylindrical shape. The exterior surface of the shaft 1280 has a non-cylindrical shape configured for mating with the hollow shaft 1292. When the shaft 1280 is inserted into the hollow shaft 1292, the shafts 1280 and 1292 have a fixed angular position so that the rotation of the shaft 1292 causes rotation of shaft 1280.

The joint 1290 has a protrusion 1294 within the cavity 1288, as shown in FIG. 116. The coupler 1286 has a collar 1296 which defines a plurality of slot walls 1298. Each slot wall 1298 is configured to mate with, engage, and receive, the protrusion 1292.

The following steps or method enable the desktop stand assembly 1128 to be opened:

(a) slide the slider grasp 1272 upward;
(b) pull the foot section 1262 slightly outward;
(c) push both couplers 1286 inward so that none of the slot walls 1292 are mated or engaged with the protrusion 1294;
(d) while maintaining the couplers 1286 pushed inward, pull the stand 1260 outward until the foot section 1262 is near to the desktop 1241 (or otherwise adjacent to the bottom end 1300 of the electronic device 1100); and
(e) release the depressible couplers 1286 and slightly pivot the stand 1260 back and forth until the springs of the couplers 1286 pop the slot walls 1292 into position to receive the protrusions 1294.

The user may then lean the electronic unit 1100 backward for positioning and use on the desktop 1241, as illustrated in FIG. 112.

The stand 1260 also functions as a carrying handle when the stand is in its upward, closed position. One method for carrying the electronic device 1100 is to grab the grasp regions 1268 of the stand 1260. The housing portion 1104 defines a hand recess 1302, illustrated in FIG. 83, which receives a portion of the user's hand while the user's hand is holding the grasp regions 1268.

As illustrated in FIGS. 84 and 95, the rear housing portion 1106 has a plurality of wall mount screw anchors 1304 arranged in a VESA 75 mm hole pattern and a VESA 100 mm hole pattern. The wall mount screw anchors 1304 are configured to receive a plurality of screws 1306. In one embodiment, screws 1306 are configured to fasten a suitable wall mount plate or device 1308 to the rear housing portion 1106. The wall mount device 1308 may, in turn, be used to mount the electronic device 1100 to a wall or other upstanding structure 1310 using screws 1312.

The rear housing portion 1106 has a plurality of grip or traction regions 1314. The traction regions define a ridges or friction increasers which facilitate handling of the electronic device 1100.

The electronic device 1100 defines at least one peripheral hole pattern 1316, as illustrated in FIG. 84. The hole pattern 1316 is configured to receive screws which, in turn, are connected to a peripheral, such as a magnetic swipe card reader, slot optical card reader or any other suitable peripheral. In one embodiment not shown, the main housing 1102 houses or holds an optical code reader (such as a bar code reader), a printer, a scanner, a biometry reader or any other suitable input or output device.

In one embodiment, the keyboard 1178 and the entire front of the electronic device 1100 are sealed from liquid penetration at least to satisfy the IP54 standard. In one embodiment, one or more gaskets or seals are incorporated into the housing 1102 to form a liquid seal for the screen 1110, speakers 1105 and electronic components of the keyboard 1178. In one embodiment, the keyboard housing 1188 defines one or more drain holes to enable liquid to drain from the keyboard housing 1188.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the presently preferred embodiments described herein will be apparent to those skilled in the art.

Such changes and modifications can be made without departing from the spirit and scope of the present invention and without diminishing its intended advantages. It is therefore intended that such changes and modifications be covered by the appended claims.

Part B

In one embodiment illustrated in FIGS. 117-126, accessory 2010 holds, supports and is attachable to, electronic device 2012. In the example shown, the electronic device 2012 is a brand H, all-in-one desktop computer having an arc-shaped rear housing 2013, a right side 2015 and a left side 2017. The electronic device 2012 has a touch-enabled display device, which includes a screen 2019. The housing or case of the electronic device 2012 houses a motherboard, central processing unit and hard drive or mass storage device, each of which is fully or partially located behind the screen 2019. The right side 2015 of electronic device 2012 defines a DVD drive slot, and the right side 2015 also has a power button. The left side 2017 of electronic device 2012 has a plurality of electrical ports, including audio-in and audio-out ports, a plurality of USB ports and an SD card reader port. Also, the left side 2017 includes a plurality of audio-visual control buttons.

The rear housing 2013 has four screw bosses or screw receivers arranged at the four corners of a rectangle. The screw receivers of electronic device 2012 are not positioned in accordance with any of the VESA Mounting Interface Standard mounting hole patterns defined by the Video Electronics Standards Association (hereafter, "VESA Standard"). The VESA Standard specifies screw receivers located at the corners of squares or rectangles having the following widths and heights and screw compatibility:

TABLE A

| Width × Height | Screw |
|---|---|
| 75 mm × 75 mm | M4 |
| 2100 mm × 2100 mm | M4 |
| 2200 mm × 2100 mm | M4 |
| 2200 mm × 2200 mm | M6, M8 |
| 400 mm × 400 mm | |
| 600 mm × 2200 mm | |
| 600 mm × 400 mm | |
| 800 mm × 400 mm | |
| 280 mm × 2150 mm | |

Accessory 2010 is attachable to the electronic device's non-VESA Standard screw receivers using four screws. Once attached, accessory 2010 converts the chassis of the electronic device 2012 from a conventional all-in-one form to an all-in-one form having an integrated, fold-out keyboard holder 2014, enabling the user to operate the electronic device 2012 in a wall-mounted mode, a stand-mounted mode, a cart-mounted mode or a desktop mode.

Figure 127:
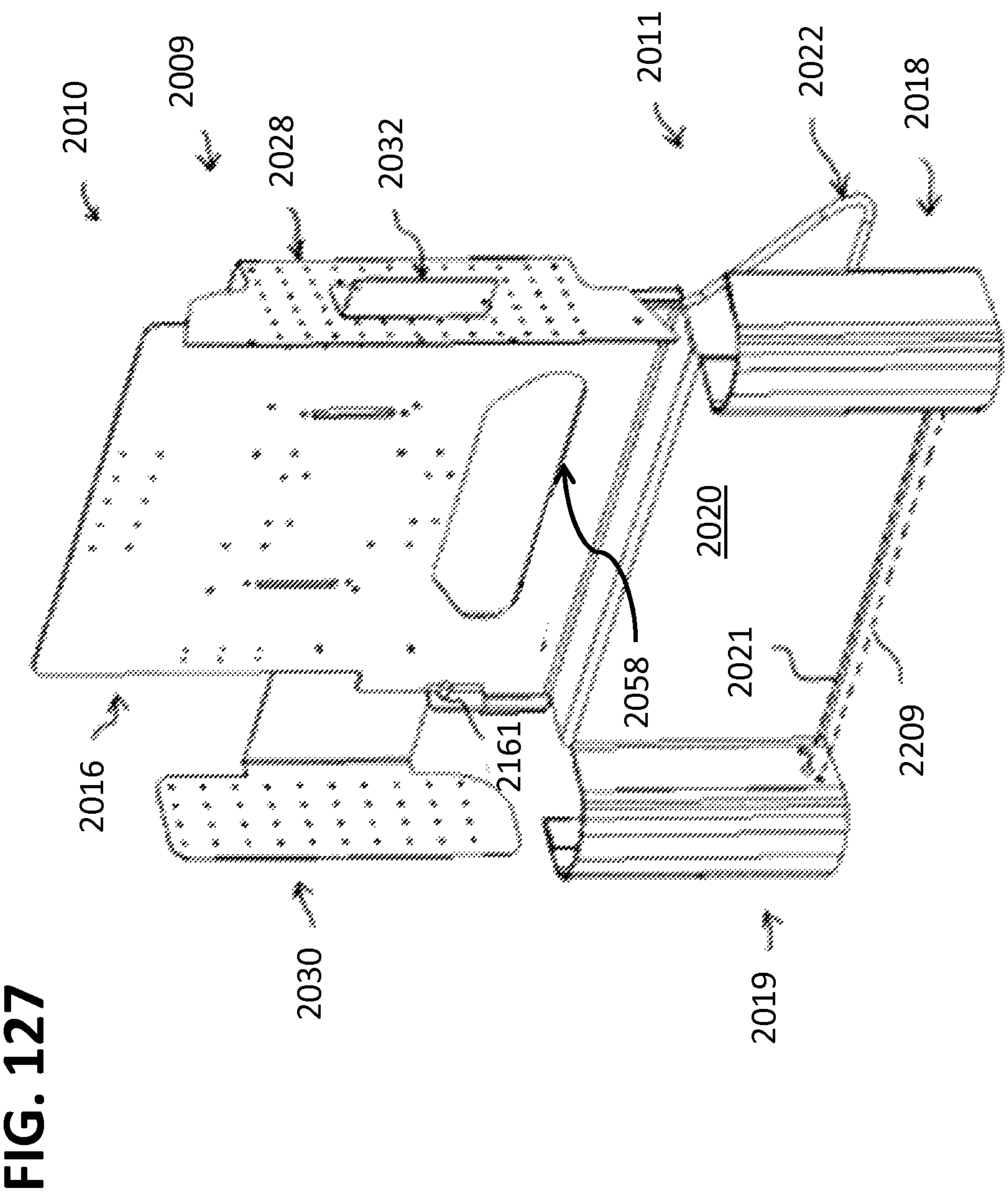
Figure 128:
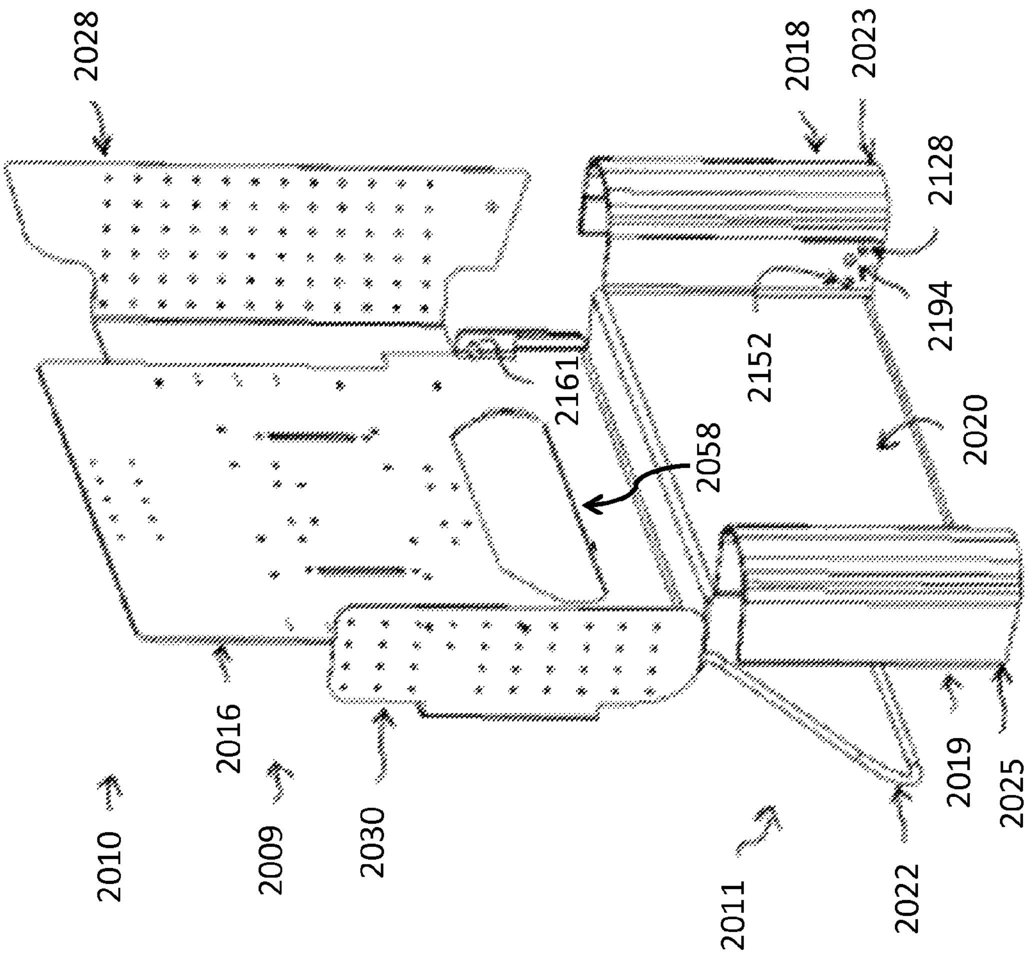
Figure 129:
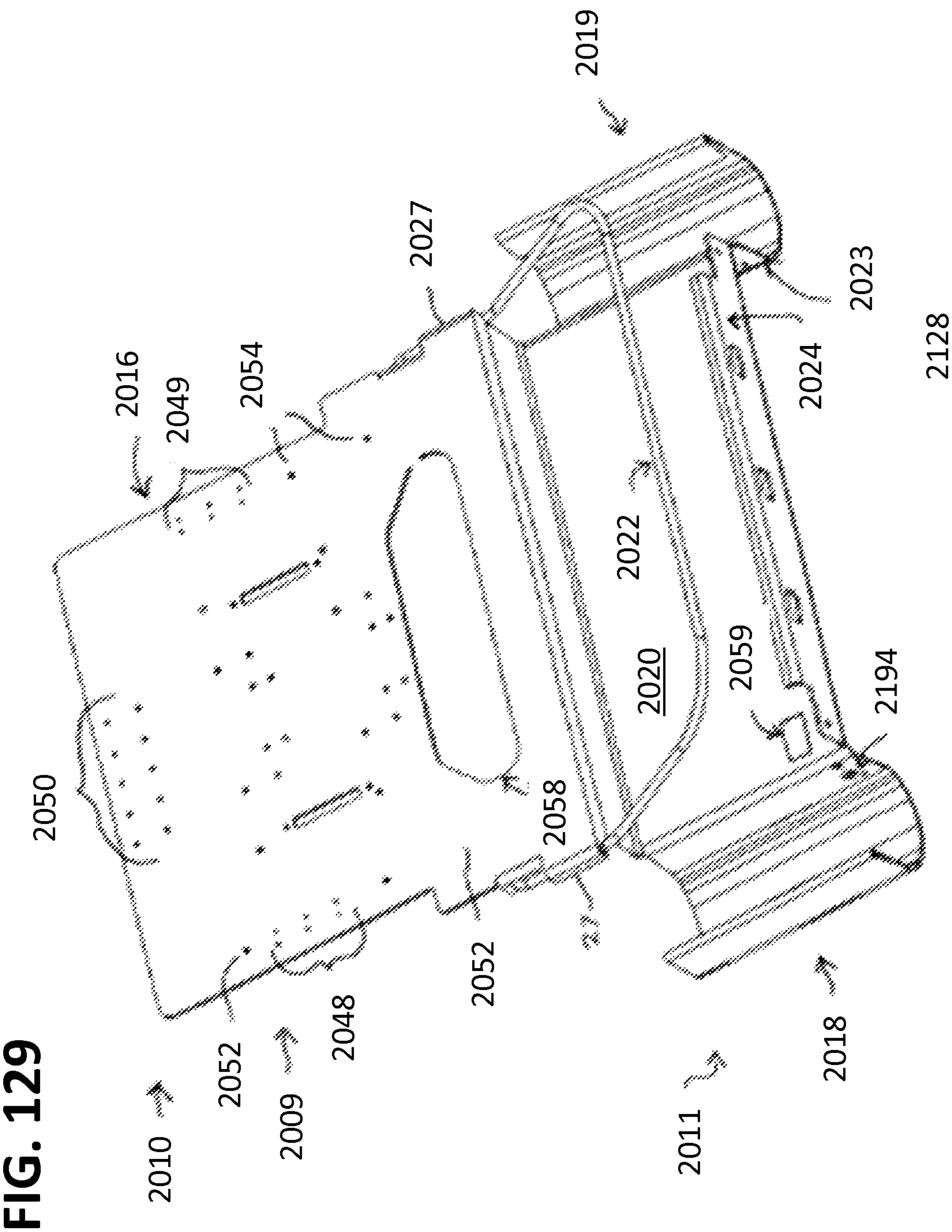

In one embodiment illustrated in FIGS. 127-129, accessory 2010 includes: (a) a frame 2016 having an upper portion 2009 and a lower portion 2011; (b) right leg 2018; (c) left leg 2031; (c) a panel 2020 connected to, and located between, the legs 2018 and 2019; (d) the keyboard holder 2014 rotatably coupled to the frame 2016; (e) a kickstand or stand 2022 moveably connected to the frame 2016; (f) a power unit holder 2024 sized to hold an external power supply, battery pack, power adapter unit or power transformer 2026; (g) a right security cover 2028 removably attachable to the frame 2016; (h) a left security cover 2030 removably attachable the frame 2016; and (i) a card reader bracket 2032 removably attachable to the right security cover 2028.

Figure 120:
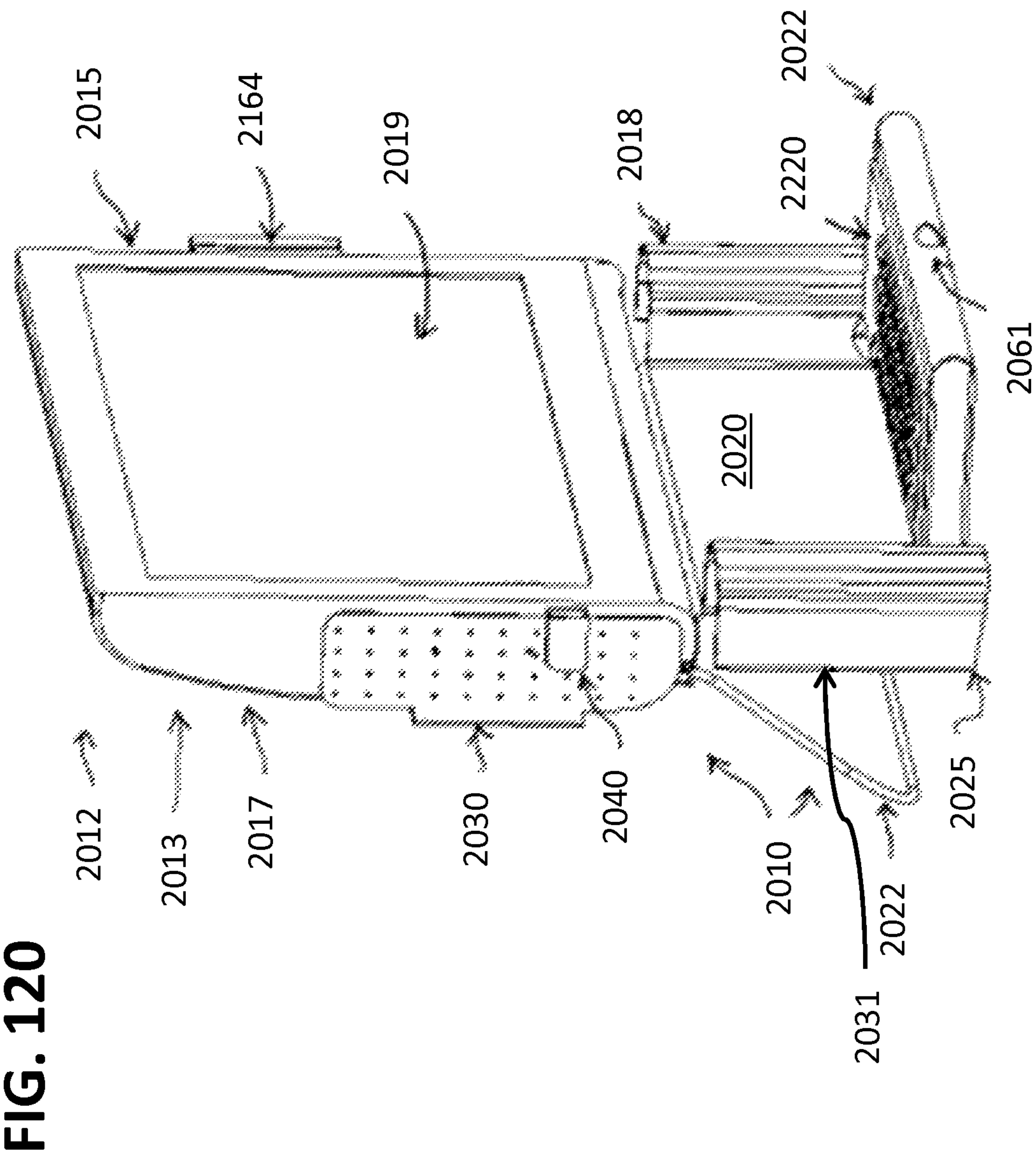

In the embodiment shown in FIGS. 117 and 120, a plurality of electronic, peripheral devices are incorporated into the accessory 2010. The keyboard holder 2014 houses or holds an electronic input device or keyboard 2220, described in detail below. The accessory 2010 also includes a magnetic stripe card reader (MSR) 2038 and barcode reader 2040 mounted as described in detail below. Depending upon the embodiment, the accessory 2010 can include other peripheral devices attached to the frame 2016 or security cover 2028 or 2030, including, but not limited to, a printer, currency receiver, electrical motor, solar panel, radiofrequency (RF) sensor, RFID reader, smart card reader, credit card reader, facial recognition device, infrared light sensor, audio sensor, microphone, visual or light sensor, camera, photo sensor, fingerprint reader, biometric reader or sensor, brainwave sensor, brain activity sensor, breath analyzer, health vitals checker, blood pressure measurer, sensor, motor, sound sensor, and odor sensor.

As illustrated in FIG. 230, the backside 2042 of frame 2016 defines the four electronic device attachment holes 2044. The attachment holes 2044 align with the four screw receivers of electronic device 2012. As such, four screws can be inserted into the attachment holes 2044 to attach the frame 2016 to the electronic device 2012. In one embodiment, the frame 2016 has a countersunk depression at each attachment hole 2044. The depression provides space for the screw heads so that the screw heads do not protrude above the surface of the backside 2042. The frame 2016 also defines a plurality of reliefs 2046. The reliefs 2046 are openings sized to receive the protruding or irregular portions of the electronic device 2012 which might otherwise interfere with the frame 2016 laying flush against the rear housing of the electronic device 2012.

In an alternative embodiment, the accessory 2010 includes a left arm, right arm, upper arm, and lower arm, each of which is moveably coupled to the frame 2016. The ends of the arms have hands, grips or holders which engage and hold the electronic device. The extension of each arm is adjustable and fixed by a set screw.

Figure 130:
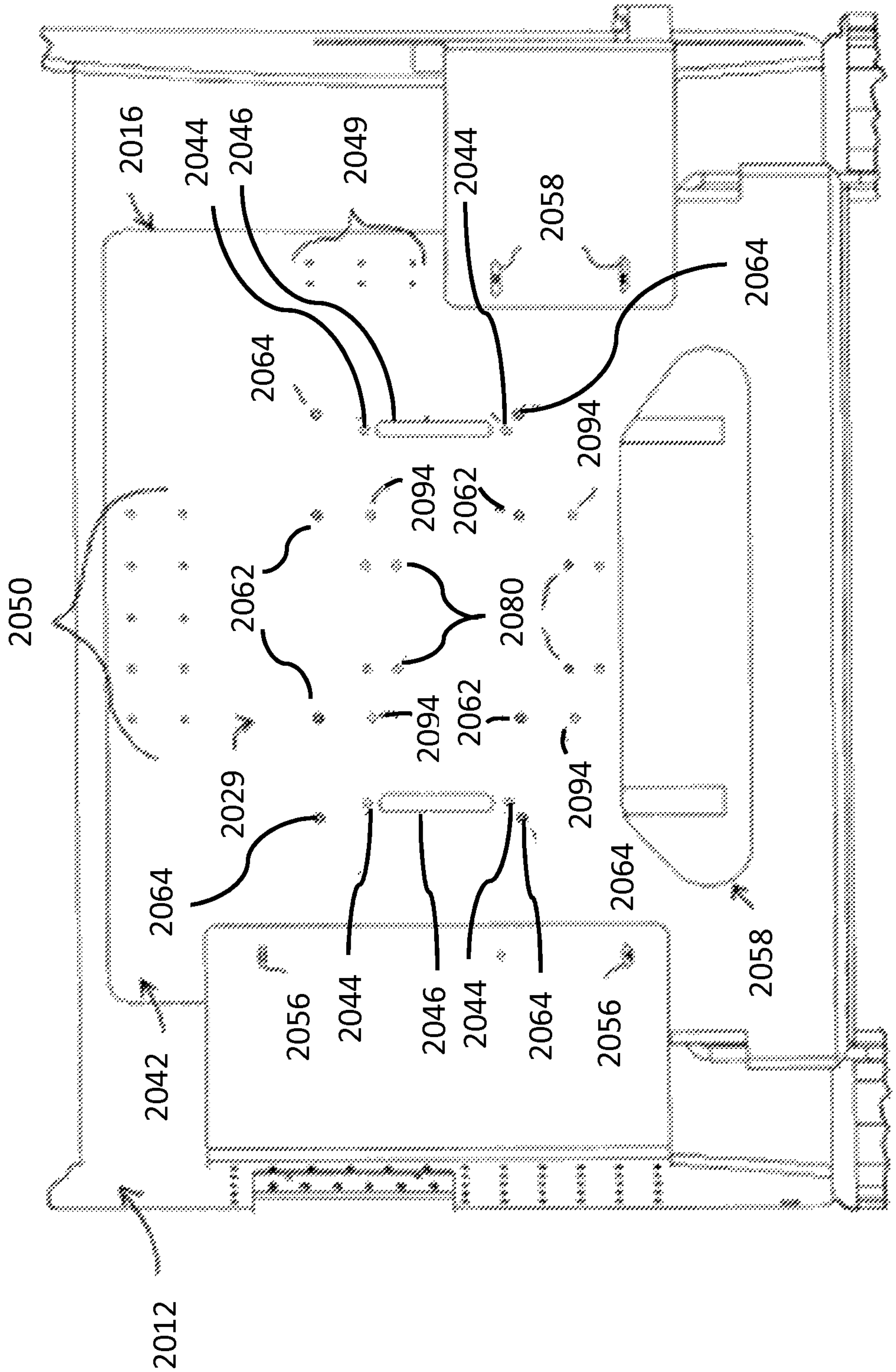

With reference to FIGS. 129-130, the backside 2042 of frame 2016 defines a plurality of side grids of holes or side hole grids 2048 and 2049. Backside 2042 also defines a top hole grid 2050. The side hole grids 2048 and 2049, and top hole grid 2050, are sized, positioned and arranged to enable a variety of peripherals, signs, umbrellas, awnings, devices and other attachments to be connected to, and supported by, the frame 2016. The holes of these grids are threaded to receive a plurality of screws (not shown). The screws couple the attachments to the frame 2016.

Frame 2016 also defines threaded, security cover hole sets 2052 and 2054 for right security cover 2028 and left security cover 2030, respectively. The right security cover 2028 is attachable to the frame 2016 by inserting screws through the oval or elongated holes 2056 and screwing them into the cover hole set 2052. Likewise, the left security cover 2030 is attachable to the frame 2016 by inserting screws through the oval or elongated holes 2058 and screwing them into the cover hole set 2054.

The electrical access slot 2058, defined by frame 2016, enables owners and operators to access the rear electrical ports of the electronic device 2012. In one embodiment, the cord of the keyboard 2220 is routed through the access slot 2058. The end of the keyboard cord has a USB connector which connects to the USB port of the electronic device 2012. In an alternative embodiment illustrated in FIG. 129, the panel 2020 defines a cord opening 2059 configured to receive the end of the keyboard cord.

Figure 118:
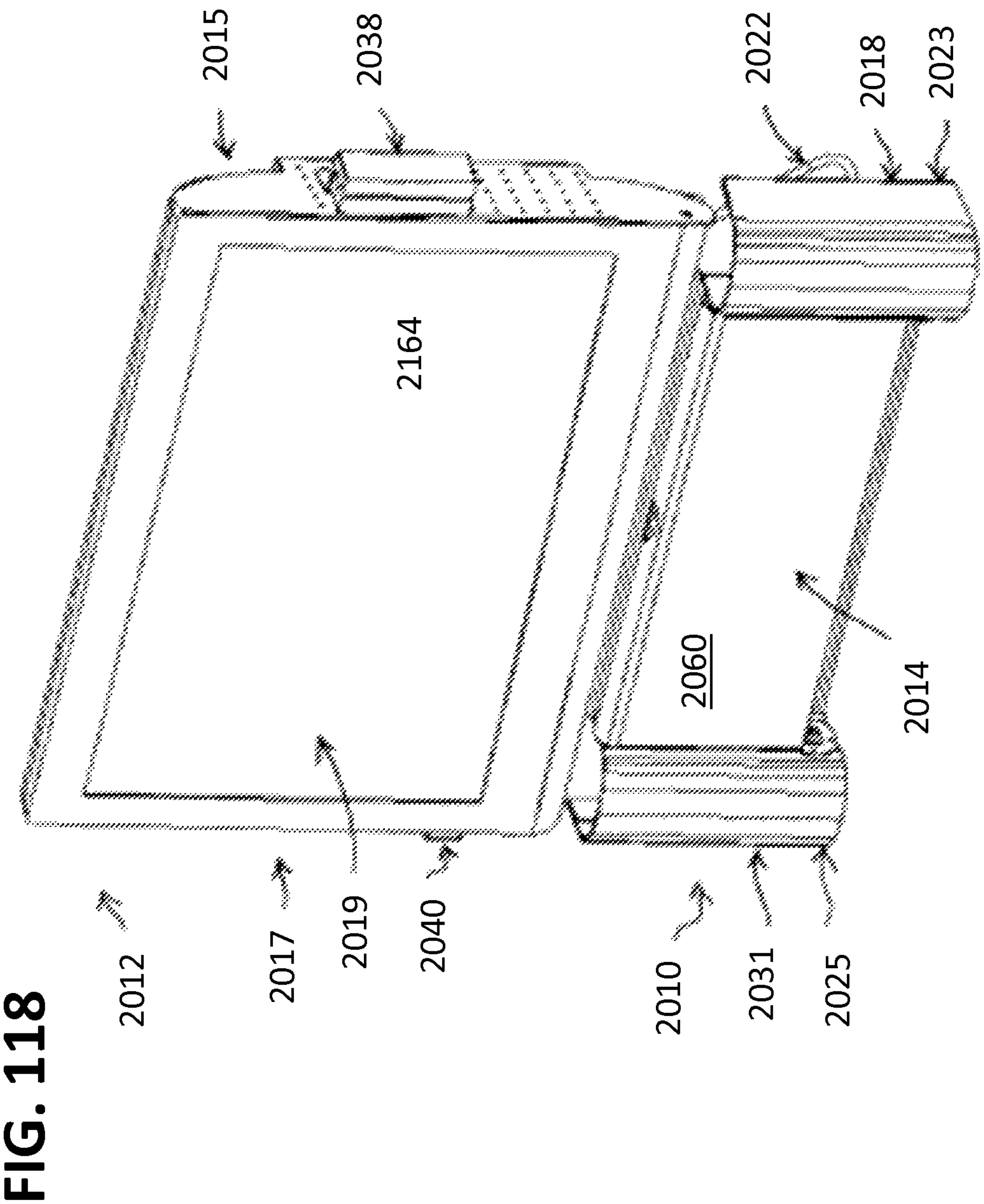
FIG. 118 is a front, right isometric view of the embodiment of the accessory with the first electronic device shown in FIG. 117, illustrating the keyboard in a closed position.
Figure 119:
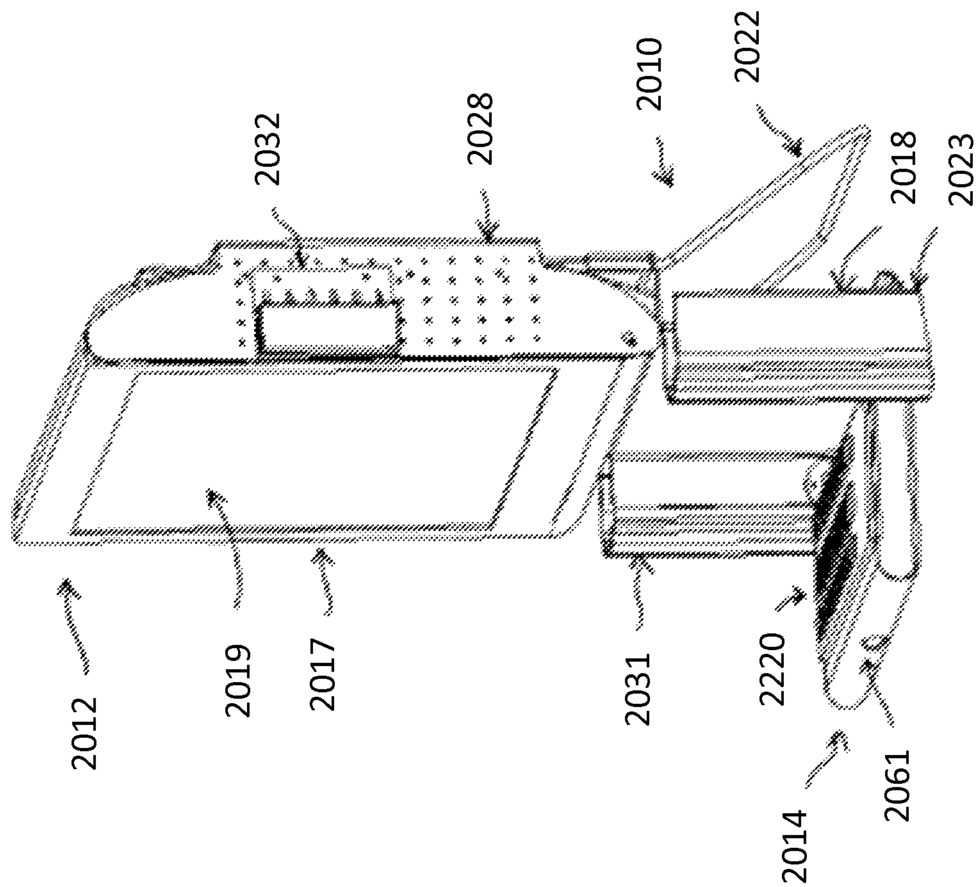
FIG. 119 is a side, right isometric view of the embodiment of the accessory with the first electronic device shown in FIG. 117, illustrating the keyboard and kickstand in open positions.
Figure 131:
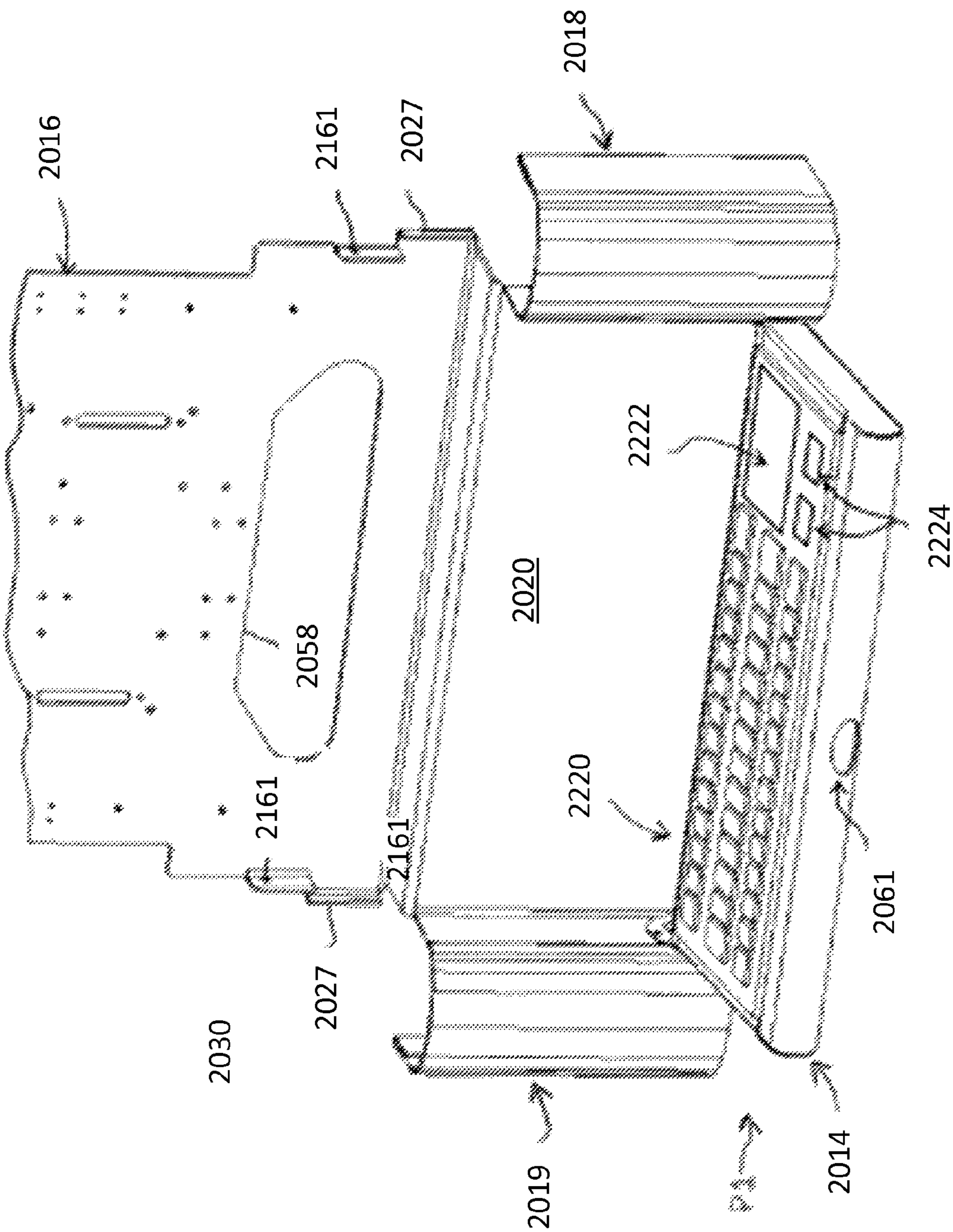

The keyboard holder 2014 is rotatable between a plurality of positions, including the open position, P1, shown in FIG. 131, the open position, P2, shown in FIG. 232, and the closed position, P3, shown in FIG. 133. In the closed position P3, the base wall 2060 of the keyboard holder 2014 lies in a plane which is parallel with, of substantially parallel with, the plane in which the screen 2013 lies, as illustrated in FIGS. 118 and 133. In one embodiment, when the keyboard holder 2014 is closed, the base wall 2060 and screen 2013 lie in the same plane or substantially lie in the same plane, as illustrated in FIGS. 118 and 133.

The keyboard holder 2014 includes or otherwise defines a grasp 2061. In one embodiment, the grasp 2061 is a slot defined by the keyboard holder 2014. By gripping the grasp 2061 with one or more fingers, the user can more easily open the keyboard holder 2014.

Figure 121:
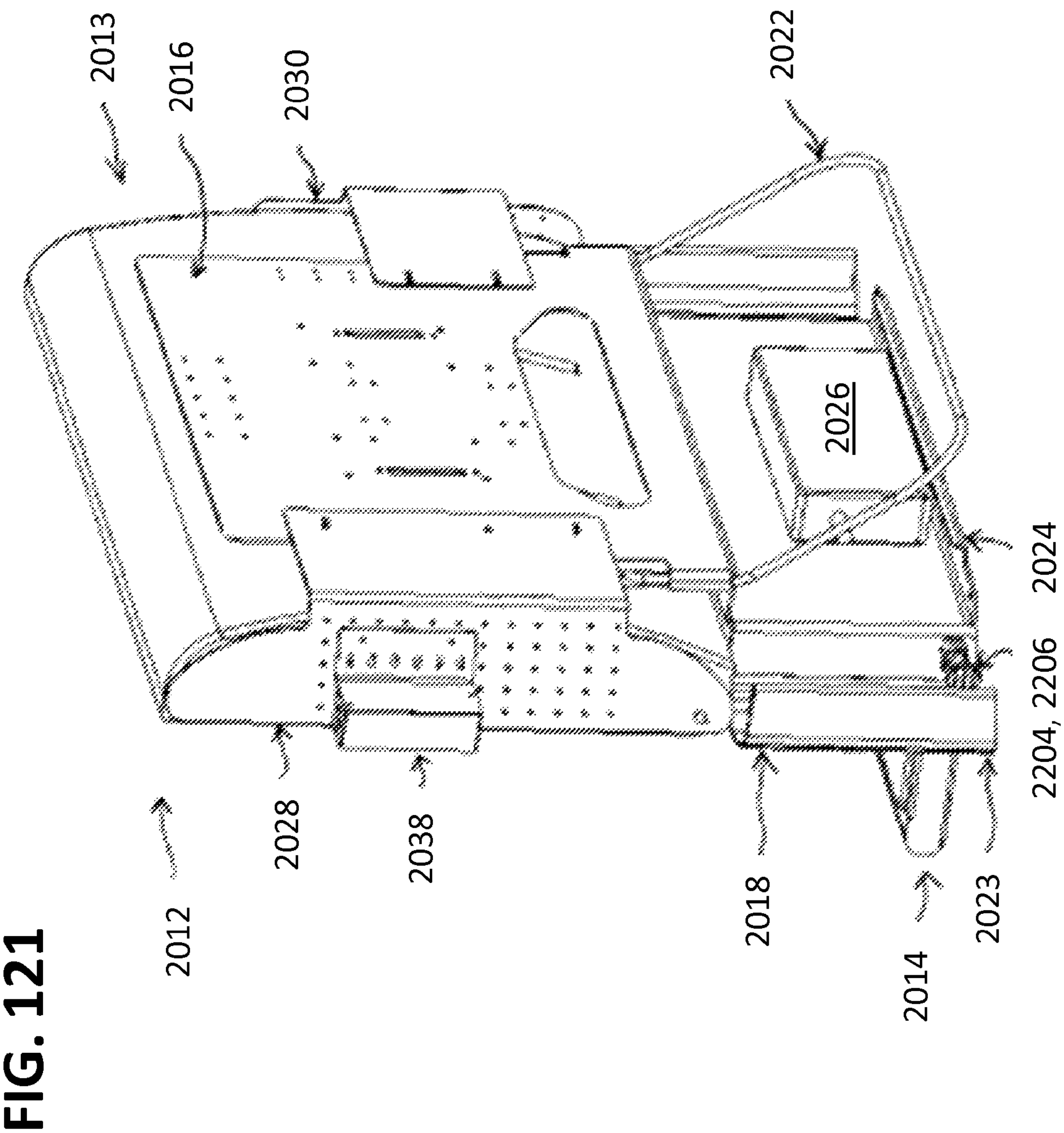
Figure 122:
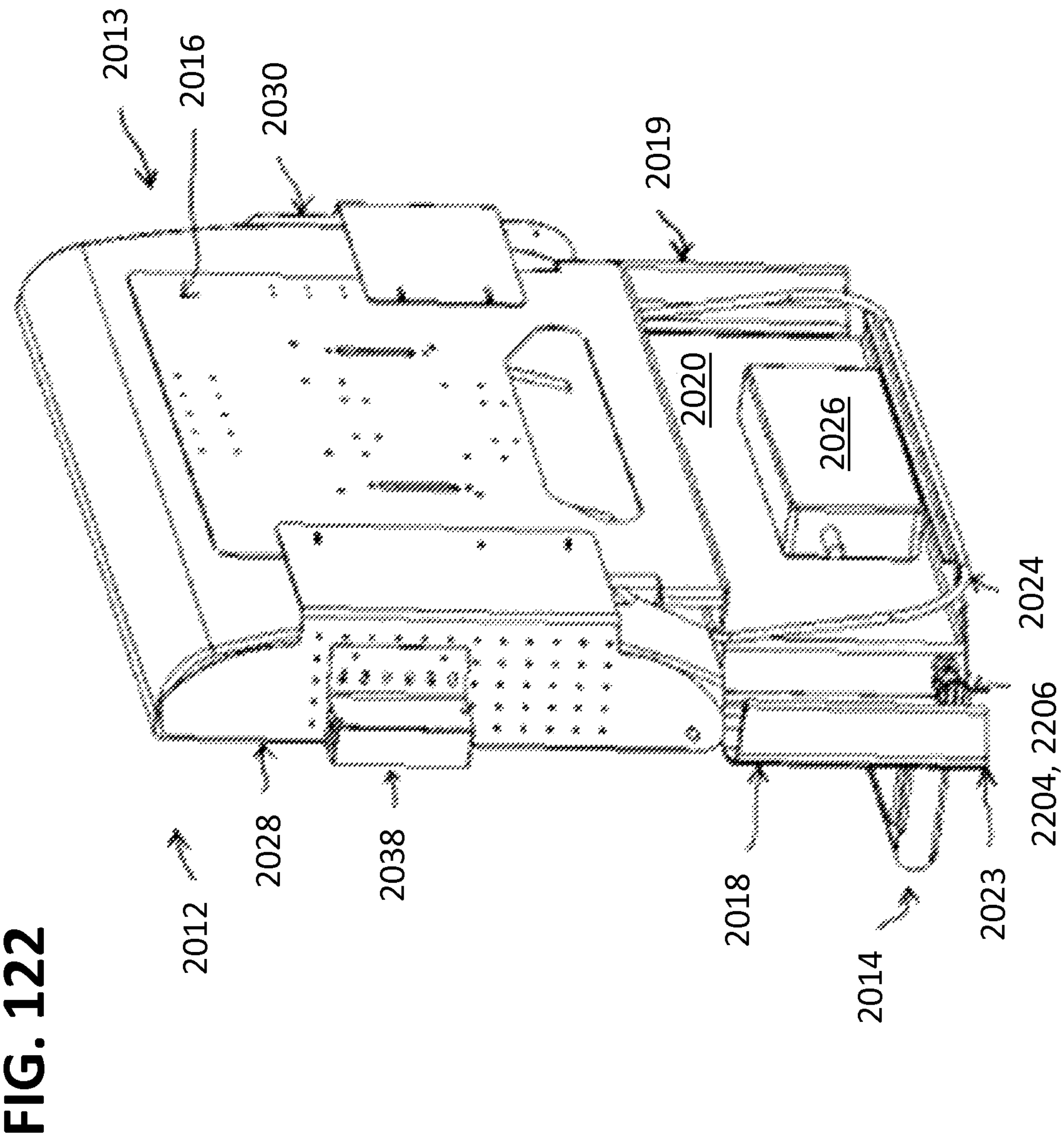
Figure 123:
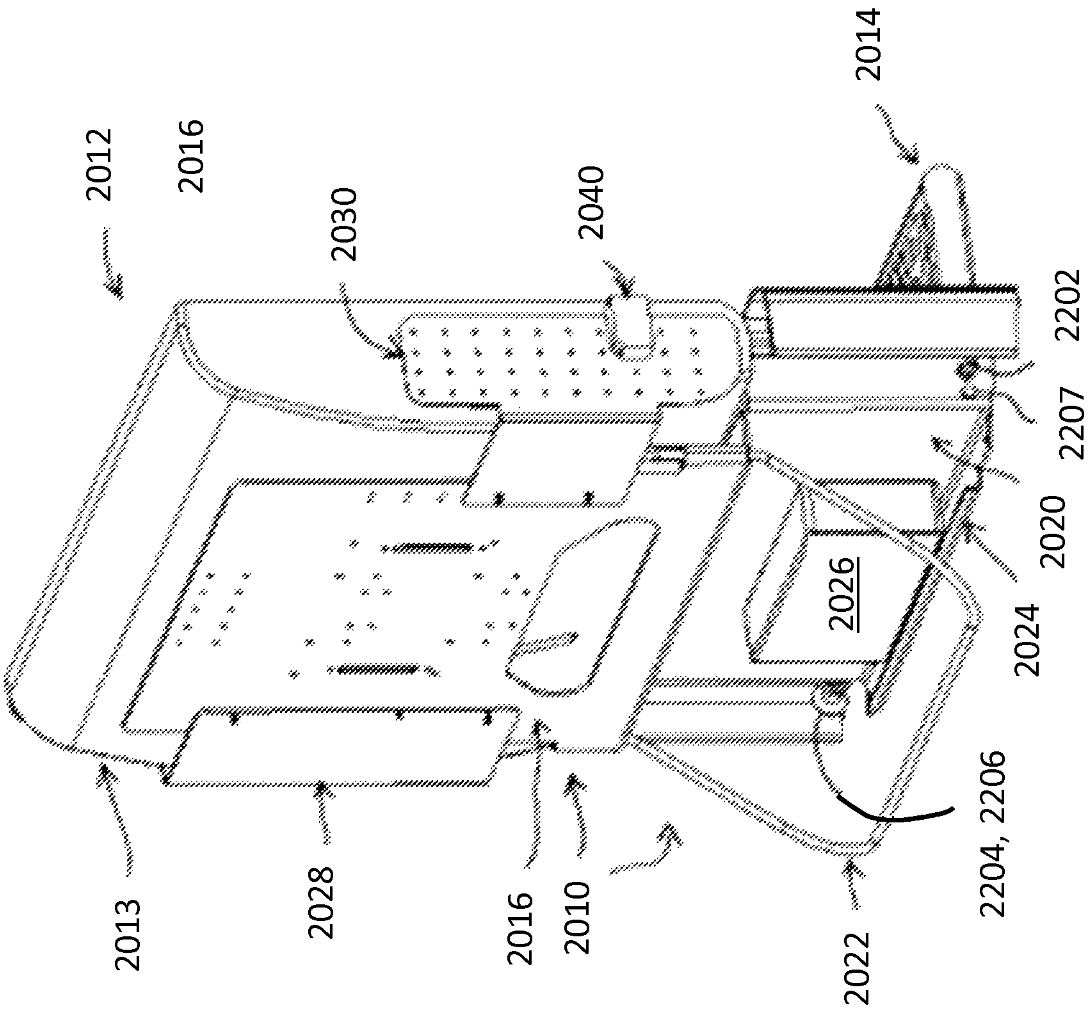
Figure 124:
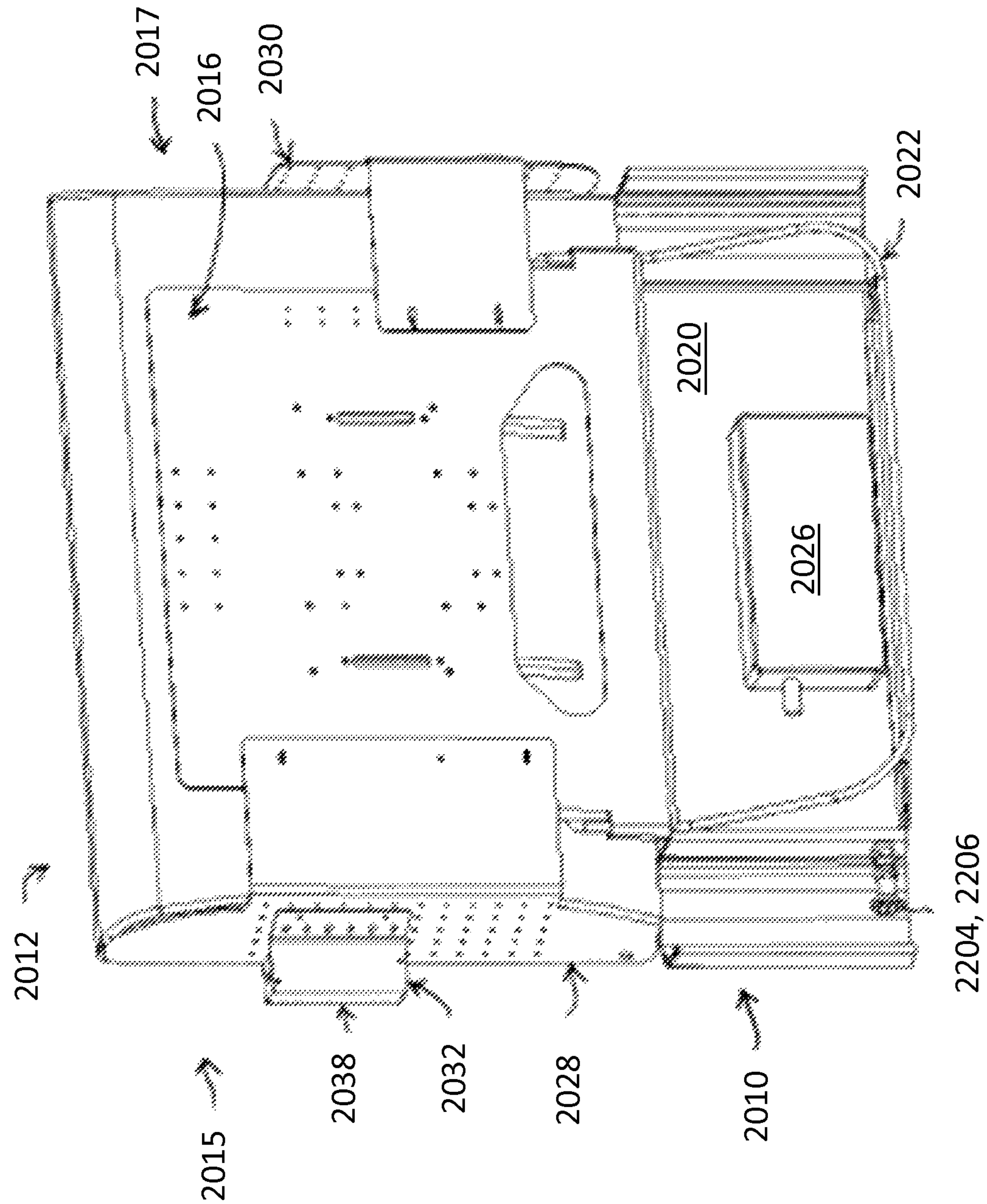
Figure 125:
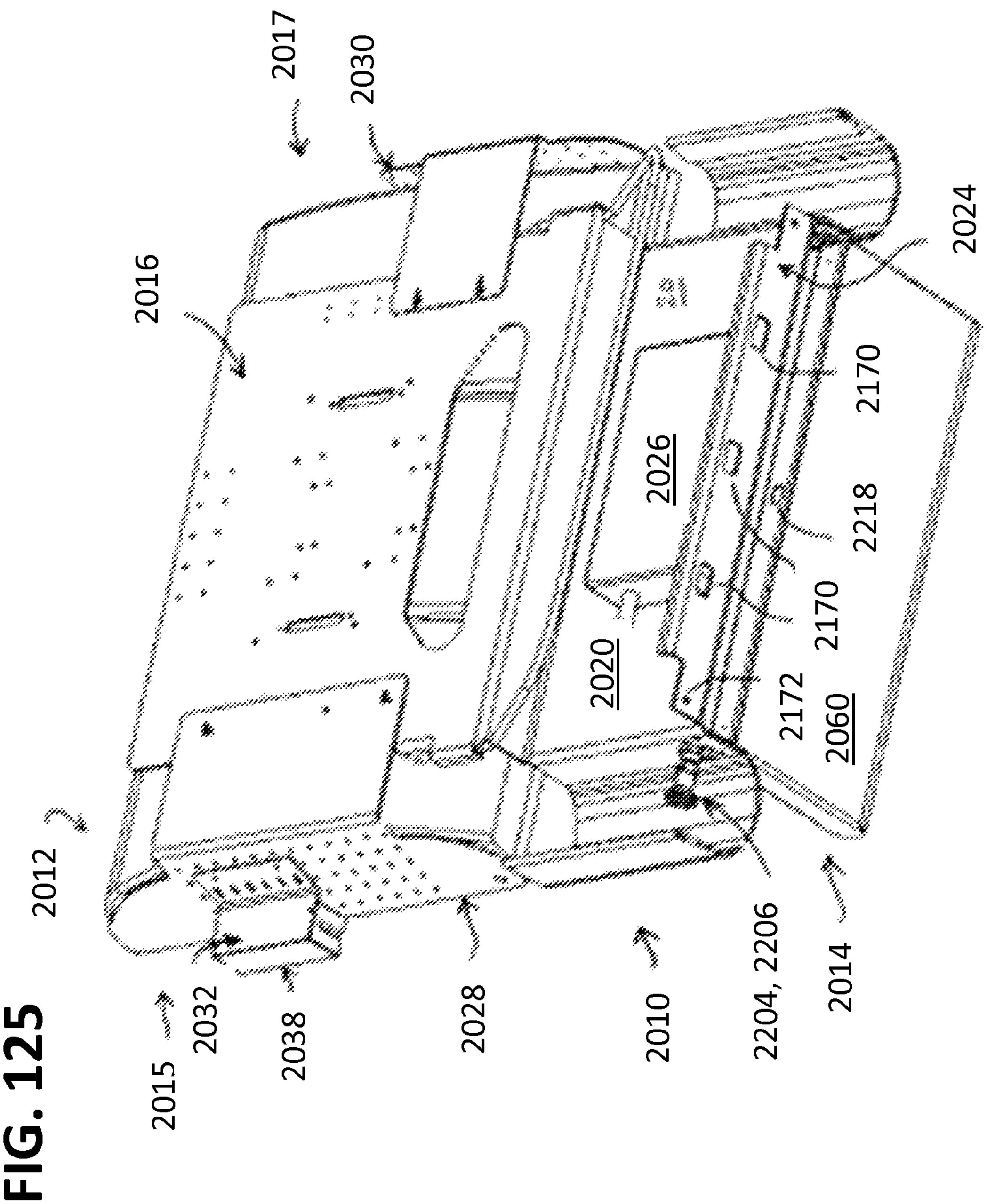
Figure 126:
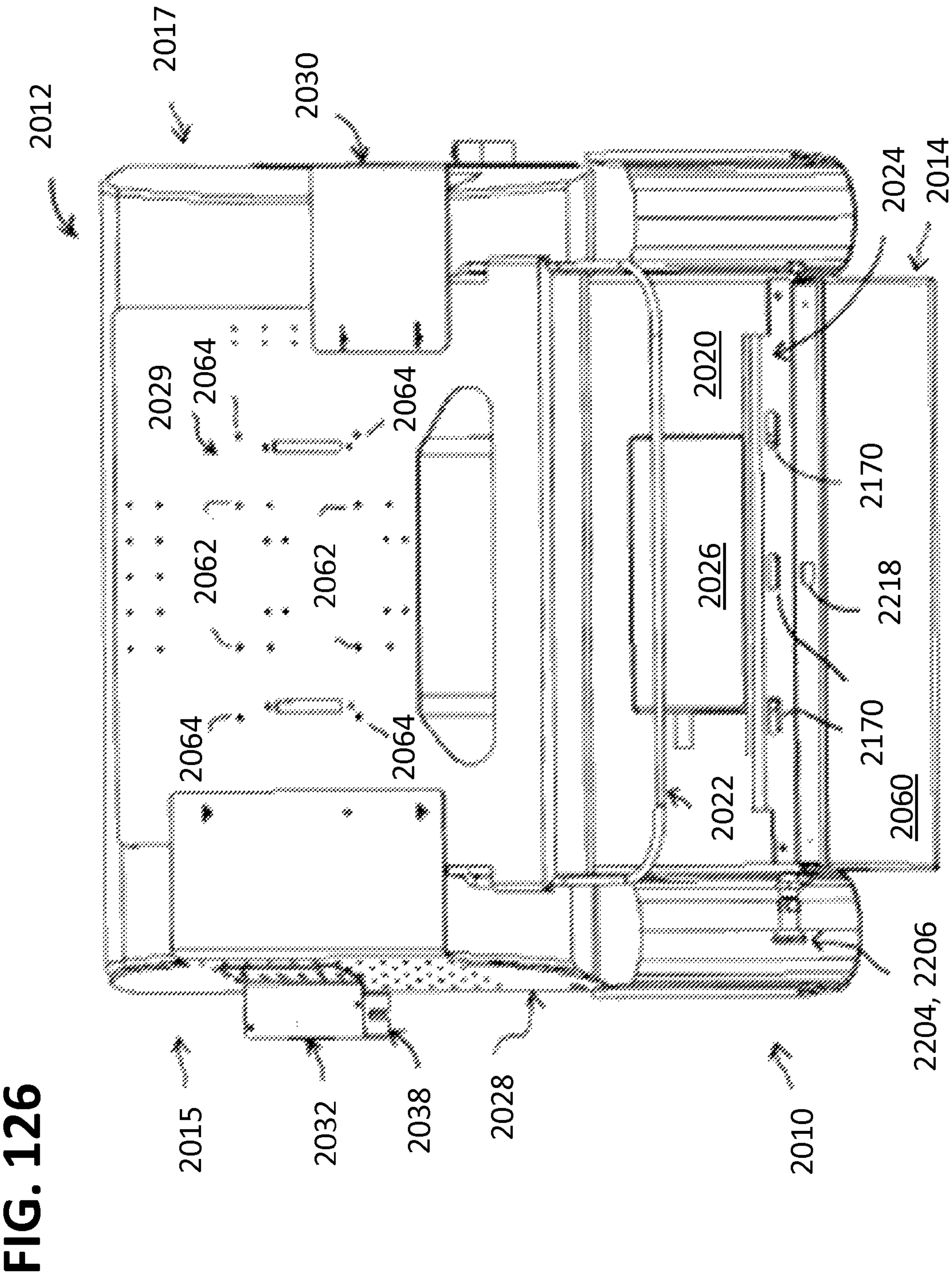

The stand 2022 is pivotable between the open position, illustrated in FIG. 121, and the closed position illustrated in FIG. 122. In the open position, the stand 2022 provides support for the electronic device 2012 when placed on a tabletop, counter or desk. In the closed position, the stand 2022 is located closer to the frame 2016 so that that stand 2022 does not interfere with the mounting of the frame 2016 to a wall, stand or cart. In one embodiment illustrated in FIG. 234, the stand 2022 is a U-shaped bar or rod having inwardly pointing ends 2159. The frame 2016 defines a plurality of stand openings 2161, illustrated in FIG. 127-128, which receive the stand ends 2023. The frame also has a plurality of hooks or stand stops 2027, illustrated in FIG. 129. In its closed position, the stand 2022 is relatively close to the frame 2016 and not engaged with the stops 2027. In the open position, the stops 2027 engage the stand 2022 to fix its maximum open position.

A commercially available, VESA Standard wall mount device, such as wall mount 2253, can be used to mount the frame 2016 to a structure or wall 2248, as illustrated in FIGS. 164-165. Typically, a commercially available wall mount device has a part X which attaches to the electronic device and a part Y which attaches to a wall, stand, cart, upright or other structure. Part X has a VESA Standard hole pattern, and part X also has a hook or coupler for mating part X with part Y. To mount the frame 2016 to a wall, stand or cart, the installer can attach part X of the VESA Standard wall mount device to the mount portion or mount interface 2029 of frame 2016, as illustrated in FIG. 2010. Then, the installer secures part Y to the studs of a wall, for example. Finally, the installer hangs part X (attached to accessory 2010) on part Y and screws-in set screws for security.

It should be appreciated that a wall mount device can include any suitable fastener or coupler configured to couple the mount interface 2029 to a structure. For example, the wall mount device can include a screw with threads at opposite ends, a hook or any other suitable fastener.

To facilitate mounting of accessory 2010, the mount interface 2029 defines a VESA Standard hole set 2062 having four, M4 threaded holes at the corners of a 2100 mm×2100 mm rectangle. The mount interface 2029 also defines a VESA Standard hole set 2064 having four, M4 threaded holes at the corners of a 2100 mm×2200 mm rectangle.

The accessory 2010 is compatible with electronic device 2010 and other electronic devices having different shapes and sizes, such as electronic device 2066 shown in FIG. 135 and electronic device 2068 shown in FIG. 236. Electronic device 2066 is a brand D all-in-one desktop computer having a housing which is substantially thinner than the housing of electronic device 2012. The electronic device 2066 has a touch-enabled display device, which includes a screen 2070. The housing of the electronic device 2066 houses a motherboard, central processing unit and hard drive or mass storage device located behind the screen 2070. The rear housing of electronic device 2066 has four screw bosses or screw receivers arranged at the four corners of a rectangle. In the illustrated embodiment, the screw receivers of electronic device 2066 are positioned in accordance with a VESA Standard mounting hole pattern of 2100 mm×2100 mm.

Referring to FIG. 137, in one embodiment, the spacer bracket 2072 adapts the accessory 2010 for use with the relatively thin housing of electronic device 2066. Without spacer bracket 2072, when the keyboard holder 2014 is closed, its base wall 2060 would not lie in a plane which is coplanar with, of substantially coplanar with, the plane in which the screen 2070 lies. Put another way, without spacer bracket 2072, screen 2070 would lie substantially behind the plane of the base wall 2060.

Spacer bracket 2072 has a hat-shaped or downward U-shaped configuration with outer flanges defining electronic device attachment holes 2074. The attachment holes 2074 align with the four VESA Standard screw receivers of electronic device 2066. In one example, the attachment holes 2074 and corresponding screw receivers of electronic device 2066 are located at the corners of a square with the dimensions, 2100 mm×2100 mm. As such, four screws can be inserted through the attachment holes 2074 to attach the spacer bracket 2072 to the electronic device 2066.

The top 2076 of spacer bracket 2072 defines a plurality of frame attachment holes 2078. Referring back to FIG. 230, the frame 2016 has a plurality of countersunk attachment holes 2080 which correspond to the frame attachment holes 2078. Four screws can be inserted through the countersunk attachment holes 2080 to attach the frame 2016 to the spacer bracket 2072 which, in turn, is attached to the electronic device 2066. In one embodiment the hole spacing of frame attachment holes 2078 does not match a VESA Standard, and the hole spacing of countersunk attachment holes 2080 does not match a VESA Standard. Once the frame 2016 is attached to electronic device 2066, however, the accessory 2010, attached to electronic device 2066, is attachable to a wall, stand or cart using the VESA Standard hole set 2062 or 2064 of frame 2016.

Electronic device 2068, illustrated in FIG. 236, is a brand L all-in-one desktop computer having a housing which is substantially thinner than the housing of electronic device 2012 and thicker than the housing of electronic device 2066. The electronic device 2068 has a touch-enabled display device, which includes a screen 2082. The housing of the electronic device 2068 houses a motherboard, central processing unit and hard drive or mass storage device located behind the screen 2082. The rear housing of electronic device 2068 has four screw bosses or screw receivers arranged at the four corners of a rectangle. The screw receivers of electronic device 2068 are positioned in accordance with a VESA Standard mounting hole pattern.

Referring to FIG. 238, in one embodiment, the spacer bracket 2084 adapts the accessory 2010 for use with the differently-sized housing of electronic device 2068. Without spacer bracket 2084, when the keyboard holder 2014 is closed, its base wall 2060 would not lie in a plane which is coplanar with, or substantially coplanar with, the plane in which the screen 2082 lies. Put another way, without spacer bracket 2084, screen 2082 would lie substantially behind the plane of the base wall 2060.

Spacer bracket 2084 has a hat-shaped or downward U-shaped configuration with outer flanges defining electronic device attachment holes 2088. The attachment holes 2088 align with the four screw receivers of electronic device 2068. In one example, the attachment holes 2088 and corresponding VESA Standard screw receivers of electronic device 2068 are located at the corners of a square with the dimensions, 2100 mm×2100 mm. As such, four M4 screws can be inserted through the attachment holes 2088 to attach the spacer bracket 2084 to the electronic device 2068. The top 2090 of spacer bracket 2084 defines a plurality of frame attachment holes 2092.

Referring back to FIG. 230, the frame 2016 has a plurality of countersunk attachment holes 2094 which correspond to the frame attachment holes 2092. Four screws can be inserted through the countersunk attachment holes 2092 to attach the frame 2016 to the spacer bracket 2084 which, in turn, is attached to the electronic device 2068. In one embodiment, the hole spacing of frame attachment holes 2092 does not match a VESA Standard, and the hole spacing of countersunk attachment holes 2092 does not match a VESA Standard. Once the frame 2016 is attached to electronic device 2068, however, the accessory 2010, attached to electronic device 2068, is attachable to a wall, stand or cart using VESA Standard hole set 2062 or 2064 of frame 2016.

Electronic devices 2012, 2066 and 2068 each include a plurality of rear electrical ports located at the rear housings of such electronic devices. The rear electrical ports, configured to receive the male connectors of cords, include, but are not limited to, USB ports, Ethernet ports, display ports, serial ports, and power cord ports. Referring back to FIG. 230, the electrical access slot 2058 provides access to the rear electrical ports of the electrical devices 2012, 2066 and 2068.

Referring to FIGS. 117-119, 121-122, 124-128, 130 and 139-141, the accessory 2010 includes the right security cover 2028 configured to guard electronic device 2012. Right security cover 2028 is removably attachable to the frame 2016. The backside 2014 of frame 2016 defines a plurality of threaded, security cover holes 2052. Right security cover 2028 defines a plurality of elongated slots 2056. By inserting screws through the slots 2056 and into holes 2052, the right security cover 2028 is attachable to the frame 2016. The slots 2100 enable the position of the right security cover 2028 to be adjusted relative to the frame 2016 by loosening the screws without removing them.

The right security cover 2028 defines a matrix or grid of holes or hole grid 2102, and a power switch restriction or power button restrictor 2104. In one embodiment, the hole grid 2102 defines a plurality of pass-through holes. In another embodiment, the hole grid 2102 defines a plurality of threaded holes. Depending upon the embodiment, the holes are configured to receive machine-threaded or self-tapping screws. Various peripherals and devices can be attached to the right security cover 2028 using such screws.

The power switch restriction or power button restrictor 2104 aligns with the power switch or button of the electronic device 2012. In the illustrated embodiment, the power button restrictor 2104 defines a power button access hole 2106. The power button access hole 2106, in one embodiment, has one or more dimensions, such as a diameter, which are smaller than the maximum dimension of the power button of the electronic device 2012. In one embodiment, the power button access hole 2106 has a diameter which is substantially smaller than the average diameter of a human finger. As such, the power button restrictor 2104 impedes or blocks finger access to the power button, making it more difficult for customers, passersby and members of the public to power-off or power-up the electronic device 2012. The owner or operator of the electronic device 2012 can power-up and power-off the electronic device 2012 by inserting a stylus, round-ended pin or stick through the power button access hole 2106.

In an alternative embodiment, the power button restrictor includes a panel or door moveably coupled to the right security cover 2028 or directly, moveably coupled to the frame 2016. In such embodiment, the power button restrictor includes a lock and key mechanism or set screws to lock the moveable panel or door in place.

The right security cover 2028 also serves as, or includes, a DVD drive restriction. The right security cover 2028 lays over the entire DVD drive slot of the electronic device 2012, blocking access to the DVD drive slot.

Referring to FIGS. 120, 123-124, 127-128, 130 and 142-144, the accessory 2010 includes a left security cover 2030 configured to guard the electronic device 2012. Left security cover 2030 is removably attachable to the frame 2016. The backside 2014 of frame 2016 defines a plurality of threaded, security cover holes 2110. Left security cover 2030 defines a plurality of elongated slots 2112. By inserting screws through the slots 2112 and into holes 2054, the left security cover 2030 is attachable to the frame 2016. The slots 2112 enable the position of the left security cover 2030 to be adjusted relative to the frame 2016 by loosening, but not removing, the screws.

The left security cover 2030 defines a matrix or grid of holes or hole grid 2114. In one embodiment, the hole grid 2114 defines a plurality of pass-through holes. In another embodiment, the hole grid 2114 defines a plurality of threaded holes. Depending upon the embodiment, the holes are configured to receive machine-threaded or self-tapping screws. Various peripherals and devices can be attached to the left security cover using such screws.

In one embodiment illustrated in FIGS. 120, 123, 165 and 167, the accessory 2010 includes the barcode reader 2040. The barcode reader 2040 has an internal, threaded screw receiver. To mount the barcode reader 2040, an owner or operator can insert a screw through one of the grid holes, from the underside of the left security cover 2030, into the threaded receiver of the barcode reader 2040.

The left security cover 2030 also serves as, or includes, an electrical port restriction. The left security cover 2030 lays over all of the electrical ports on the left side 2017, blocking public access to the audio-in and audio-out ports, USB ports and SD card reader port. Also, the left security cover 2030 lays over the audio-visual control buttons of the left side 2017, blocking public access to such buttons.

In one embodiment, the left security cover 2030 is compatible with, and configured to guard, electronic devices 2066 and 2068 as well as electronic device 2012. Like electronic device 2012, electronic devices 2066 and 2068 have electrical ports, input devices or controls at their left sides 2118. Accordingly, the left security cover 2030 blocks public access to such ports, devices and controls.

Referring to FIGS. 135 and 145-146, in one embodiment, the right side 2120 of electronic device 2066 has a power button and DVD drive slot. The power button of electronic device 2066 has a different location, relative to frame 2016, than the power button of electronic device 2012. Therefore, accessory 2010 includes right security cover 2122 configured to guard electronic device 2066.

Right security cover 2122 is removably attachable to the frame 2016. Right security cover 2122 defines a plurality of elongated slots, like slots 2124. By inserting screws through the elongated slots and into holes 2054, the right security cover 2122 is attachable to the frame 2016. The elongated slots enable the position of the right security cover 2122 to be adjusted relative to the frame 2016 by loosening the screws without removing them.

The right security cover 2122 defines a hole grid 2126 and a power button restrictor 2128. In one embodiment, the hole grid 2126 defines a plurality of pass-through holes. In another embodiment, the hole grid 2126 defines a plurality of threaded holes. Depending upon the embodiment, the holes are configured to receive machine-threaded or self-tapping screws. Various peripherals and devices can be attached to the right security cover using such screws.

The power button restrictor 2128 aligns with the power button of the electronic device 2066. In the illustrated embodiment, the power button restrictor 2128 defines a power button access hole 2130. The power button access hole 2130, in one embodiment, has one or more dimensions, such as a diameter, which are smaller than the maximum dimension of the power button of the electronic device 2066. In one embodiment, the power button access hole 2130 has a diameter which is substantially smaller than the average diameter of a human finger. As such, the power button restrictor 2128 blocks finger access to the power button, making it more difficult for customers, passersby and members of the public to power-off or power-up the electronic device 2066. The owner or operator of the electronic device 2066 can power-up and power-off the electronic device 2066 by inserting a stylus, round-ended pin or stick through the power button access hole 2130.

The right security cover 2122 also serves as, or includes, a DVD drive restriction. The right security cover 2122 lays over the entire DVD drive slot of the electronic device 2066, blocking access to the DVD drive slot.

Referring to FIGS. 136 and 147-149, in one embodiment, the front side 2132 of electronic device 2068 has a power button, and the right side 2134 of electronic device 2068 has a DVD drive slot. The power button of electronic device 2068 has a different location, relative to frame 2016, than the power button of electronic device 2012. Therefore, accessory 2010 includes the right security cover 2136 configured to guard electronic device 2068.

Right security cover 2136 is removably attachable to the frame 2016. Right security cover 2136 defines a plurality of elongated slots, like slots 2124. By inserting screws through the elongated slots and into holes 2052, the right security cover 2136 is attachable to the frame 2016. The elongated slots enable the position of the right security cover 2136 to be adjusted relative to the frame 2016 by loosening the screws without removing them.

The right security cover 2136 defines a hole grid 2140 and a projection, extension or finger 2142. The finger 2142 has an L-shape for reaching from the right side 2134 to the front side 2132. Also, finger 2142 defines a power button restrictor 2144. In one embodiment, the hole grid 2140 defines a plurality of pass-through holes. In another embodiment, the hole grid 2140 defines a plurality of threaded holes. Depending upon the embodiment, the holes are configured to receive machine-threaded or self-tapping screws. Various peripherals and devices can be attached to the right security cover using such screws.

The power button restrictor 2144 aligns with the power button on the front side 2132 of the electronic device 2068. In the illustrated embodiment, the power button restrictor 2144 defines a power button access hole 2146. The power button access hole 2146, in one embodiment, has one or more dimensions, such as a diameter, which are smaller than the maximum dimension of the power button of the electronic device 2068. In one embodiment, the power button access hole 2146 has a diameter which is substantially smaller than the average diameter of a human finger. As such, the power button restrictor 2144 impedes or blocks finger access to the power button, making it more difficult for customers, passersby and members of the public to power-off or power-up the electronic device 2068. The owner or operator of the electronic device 2068 can power-up and power-off the electronic device 2068 by inserting a stylus, round-ended pin or stick through the power button access hole 2146.

The right security cover 2136 also serves as, or includes, a DVD drive restriction. The right security cover 2136 lays over the entire DVD drive slot of the electronic device 2068, blocking access to the DVD drive slot.

Referring to FIGS. 119, 121-122, 124-127 and 150-152, the accessory 2010 includes a data card reader holder 2148. The data card reader holder 2148 is configured to be selectively attached to each of the following: right security cover 2028, right security cover 2122, right security cover 2136, and left security cover 2030. The data card reader holder 2148 has an L-shaped configuration with a frame attachment wall 2150 and a card reader attachment wall 2152. The frame attachment wall 2150 defines a column of spaced-apart, elongated mounting slots 2154. The mounting slots 2154 align with one or more of the holes of: (a) the hole grid 2102 of right security cover 2028; (b) the hole grid 2126 of right security cover 2122; (c) the hole grid 2140 of right security cover 2136; or (d) the hole grid 2114 of left security cover 2030. To attach the card reader holder 2148, an owner or operator can insert one or more threaded or self-tapping screws through one or more of the slots 2154 and screw them into the selected security cover.

The frame attachment wall 2150 also defines an angle adjuster 2156. The angle adjuster is operable to adjust the angle of the card reader attachment wall 2152. In one embodiment, the angle adjuster 2156 defines a plurality of threaded, angle adjustment holes 2158. When set screws are screwed through the angle adjustment holes 2158, the ends of the screws push against the security cover. If the screws through slots 2154 have a suitable level of looseness, the set screws adjust the angle of the card reader attachment wall 2152.

In one embodiment, the accessory 2010 includes a data card reader, such as the magnetic stripe reader (MSR) 2038 shown in FIGS. 117-119 and 135-136. The MSR 2038 includes a plurality of threaded screw receivers. The reader attachment wall 2152 defines a plurality of holes 2162 positioned to align with the screw receivers of the MSR 2038. To attach the MSR, machine-threaded screws can be inserted through the holes 2162 and screwed into the screw receivers.

Depending upon the shape of the installed security cover, the face 2164 of the MSR 2038 might not extend in a plane which is parallel with, or coplanar with, the plane of the display screen of the installed electronic device. In such case, the owner or operator can adjust the angle of the face 2164 by screwing the set screws inward or outward.

Referring to FIGS. 121-123, 125-126, 129 and 153-156, in one embodiment, the power unit holder 2024 includes a support wall 2166 sized to hold the transformer 2026. In one embodiment illustrated in FIGS. 153-154, the support wall 2166 has an upturned, side wall 2168 to retain or guide the transformer 2026. The support wall 2166 defines a plurality of slots 2170 and a plurality of security mount holes 2172. The slots 2170 increase the rate of heat transfer from the transformer 2026 to ambient air. Also, the slots 2170 provide access for routing cables between peripherals and the rear ports of the electronic device. The security mount holes 2172 are sized and configured to receive screws or bolts for mounting the frame 2016 to a tabletop, counter or desktop.

Referring to FIGS. 157-163, the keyboard holder 2014 includes keyboard case 2174, which has base wall 2060, side walls 2176 and front wall 2178. Side walls 2176 are mirror images of each other. Each side wall 2176 has an upper flange wall 177 extending to retain and frame the keyboard 2180 or 2182. The front wall 2178 defines the centrally-located grasp 2061. In the embodiment illustrated, the finger grasp 2061 defines an elliptical hole 2181.

Also, each side wall 2176 has a disk or circular-shaped coupler 2184. The coupler 2184 defines a central axis hole 2186, a P1 open setting hole 2188 located along an arc or circle perimeter, a P2 open setting hole 2190 located along the arc or circle perimeter, and a closed setting hole 2192 positioned along the arc or circle perimeter.

Referring to FIGS. 127-129, 132, 153-154 and 157, the accessory 2010 has the right leg 2018 and left leg 2031, which are coupled to the frame 2016. Each leg defines: (a) a central axis hole 2194 positioned along rotation axis 2021 to align with one of the central axis holes 2186; (b) a pin receiver hole 2128 positioned to selectively align with the P1 open setting hole 2188, P2 open setting hole 2190 and closed setting hole 2192; and (c) a locking hole 2152.

Right leg 2018 include a lower portion or right foot 2023. Left leg 19 includes a lower portion of left foot 2025. The right foot 2023 extends below the rotation keyboard axis 2021, and the left foot 2025 also extends below the rotation keyboard axis 2021. Therefore, when the accessory 2010 is set on a tabletop, the feet 2023 and 2025 carry the front load rather than the keyboard holder 2014. Consequently, the owner, operator or user can relatively easily rotate the keyboard holder 2014 while the accessory 2010 sits on a tabletop.

In one embodiment, each foot (2023 and 2025) defines a mount hole. By inserting a screw or bolt through the mount holes of the feet, an installer can mount and secure the accessory 2010 to a table, counter or desk.

The keyboard case 2174 is attachable to frame 2016 by inserting a suitable fastener, such as a shaft or screw 2202, through a central axis hole 2186 and into right leg 2018. Likewise, a suitable fastener, such as a shaft or screw 2202, is inserted through a central axis hole 2186 and into left leg 19. In one embodiment illustrated in FIG. 153, the accessory 2010 includes a position setter 2204, such as the spring-activated pull-pin 2206. The pull-pin 2206 is screwed into or welded onto the inner wall 2208 of the right leg 2018. Also, the pull-pin is aligned along the same pin axis 2209 which extends through the pin receiver hole 2128. The head of the pin is moveable forward and backward along the pin axis 2209. The pin axis 2209 is parallel to the keyboard axis 2021. As the keyboard case 2174 is rotated relative to the frame 2016, the head of the pull-pin 2206 snaps into one of the setting holes 2188, 2190 and 2192.

When the head of the pull-pin 2206 is inside hole 2188, the keyboard holder 2014 has a fixed position, in which the base wall 2060 is oriented at an angle within the range of ninety and one hundred five degrees relative to panel 2020. When the head of pull-pin 2206 is inside hole 2190, the keyboard holder 2014 has a fixed position, in which the base wall 2060 is oriented at an angle of approximately one hundred eighty degrees relative to panel 2020. When the head of pull-pin 2206 is inside the hole 2192, the keyboard holder 2014 has a fixed position, in which the base wall 2060 extends in a plane which is substantially parallel to the plane of the panel 2020.

By pulling outward on the pull-pin 2206, the owner or operator can adjust the keyboard holder 2014 between these fixed positions. As illustrated in FIG. 254, to secure or lock the keyboard holder 2014 in one of these positions, a locking fastener, such as a thumb screw or clevis pin 2207, can be inserted into the locking hole 2152 of left leg 2031. In sequence, first, the owner or operator would pull outward on the pull-pin 2206 and rotate the keyboard holder 2014 until the pull-pin head snaps into a desired setting hole 2188, 2190 or 2192. Then, the owner or operator would insert the clevis pin 207 through the pin receiving hole 2128 or locking hole 2152 of the left leg 2031. With the clevis pin 2207 inserted on the left leg 2031, members of the public, passersby or customers would be restricted from repositioning the keyboard holder 2014 even if they discovered, and pulled on, the pull-pin 2206.

To place the keyboard holder 2014 in an unrestricted, free rotation mode, the owner or operator would pull on the pull-pin 2206 to remove the head of the pull-pin 2206 from the holes 2188, 2190, 2192. Then, the owner or operator would release the pull-pin 2206 so that the head of the pull-pin 2206 would be pressed against a solid surface of the coupler 2184.

It should be appreciated that various types of hardware fasteners, other than the pull-pin 2206, can be installed to serve as the position setter 2204, including, but not limited to, a spring-activated push-pin, a plunger, a slide pin, and a slide bolt.

Referring to FIGS. 158, 159 and 161, the keyboard holder 2014 includes a keyboard access panel 2208. The keyboard access panel 2208 has flanged ends 2210, each of which defines a central axis hole 2212. Each central axis hole 2212 receives a screw 2202 to rotatably couple the keyboard access panel 2208 to the frame 2016. The keyboard access panel 2208 includes a plurality of longitudinal, flanged edges 2214 and 2216. The upper edge 2214 extends over the keyboard 2180 or 2182 to retain and frame the keyboard 2180 or 2182. In one embodiment, the keyboard access panel 2208 defines a plurality of holes, including a keyboard cord opening 2218.

In one embodiment illustrated in FIG. 258, the accessory 2010 includes a metal, vandal-resistant keyboard 2220 having a liquid-sealing gasket to satisfy the IP65 sealing standard or higher sealing standards. Keyboard 2220 has an integrated or built-in pointer or cursor controller, such as the touchpad 2222 and right/left mouse buttons 2224. Also, keyboard 2220 has a full set of personal computer keys labeled with letters, numbers and symbols according to the QWERTY standard. The accessory 2010 includes an adapter or keyboard spacer 2226. The keyboard spacer 2226 defines a plurality of slots 2228 and 2230 to receive protrusions from the bottom of the keyboard 2220, such as protruding box 2232. The keyboard spacer 2226 positions and biases the keyboard 2220 upward to generate a press-fit within the keyboard case 2174. In one embodiment, keyboard spacer 2226 is made of foam or a deformable material having a biasing or spring characteristic.

In one embodiment illustrated in FIG. 159, the accessory 2010 includes a plastic keyboard 2234. Keyboard 2234 has a different shape and size than keyboard 2220. Keyboard 2234 has an integrated or built-in pointer or cursor controller, such as the touchpad 2236 and right/left mouse buttons 2238. Also, keyboard 2234 has a full set of personal computer keys labeled with letters, numbers and symbols according to the QWERTY standard. The accessory 2010 includes an adapter or keyboard spacer 2240. The keyboard spacer 2240 defines a central cavity 2244 surrounded by side retaining walls 2246. The keyboard spacer 2240 positions and biases the keyboard 2234 upward to generate a press-fit within the keyboard case 2174. In one embodiment, keyboard spacer 2240 is made of foam or a deformable material having a biasing or spring characteristic.

Referring to FIGS. 164-167, in one embodiment the bottom edges 247 of feet 2023 and 2025 are tapered. When the accessory 2010 is mounted upright, the leg sides 2249 are positioned parallel to the vertical wall or vertical axis 2248. The bottom edge 2247 extends along axis 2250, which intersects with the vertical axis 2248. The horizontal axis 2251, perpendicular to vertical axis 2248, intersects with axis 2250 at angle 2252.

When the accessory 2010 is set on a tabletop, as illustrated in FIGS. 166-167, the angle 2254 enables the bottom edges 2247 to rest flush on the tabletop while the accessory 2010 leans back. This increases stability of the accessory 2010. In one embodiment, the plane of the support wall 2166 of power unit holder 2024 extends along the axis 2250. As such, the support wall 2166 engages the tabletop to increase the stability of the accessory 2010.

In one embodiment, the keyboard holder is readily, removably attachable to the frame 2016. In such embodiment, the accessory 2010 includes one or more quick-release devices, pull-pins or push-pins which couple the keyboard holder to the frame 2016. In one embodiment, the legs 2018 and 2019 and feet 2023 and 2024 are readily, removably attachable to the frame 2016. In such embodiment, the accessory 2010 includes one or more quick-release devices, pull-pins or push-pins which couple legs 2018 and 2019 and feet 2023 and 2024 to the frame 2016.

Depending upon the embodiment, certain parts of accessory 2010, such as the frame 2016, legs 2018 and 2019, and feet 2023 and 2024 can be integrated into a single part, formed from a single sheet of metal or steel, or formed as a single plastic part through a molding process.

It should be understood that various types of suitable fasteners can be used to connect the parts of accessory 2010 together. Though screws, pins and other hardware have been described above, other suitable fasteners include, but are not limited to, bolts, rivets, washers, nuts, spacers, bushings, cables and springs.

One alternative embodiment includes a system or assembly having: (a) the accessory; (b) an electronic device (including, but not limited to, electronic device 2012, 2066 or 2068); and (c) a coupler or fastener suitable to attach the accessory to the electronic device.

In one embodiment, the accessory 2010 includes a front cover configured to cover part or all of the front of the electronic device. Depending upon the embodiment, the front cover can defines an opening substantially the size of the screen to expose the screen of the electronic device. Alternatively, the front cover can have a central transparent section covering the screen. In one embodiment, the front cover is flexible, substantially conforming to the shape of the front of the electronic device. In one embodiment, the accessory 2010 includes a plurality of arms or straps configured to couple the front cover to the frame 2016. In one embodiment, the front cover includes a gasket to form a seal with the housing of the electronic device to resist the entry of dust and liquid. In one embodiment where the front cover defines a central opening for screen access, the front cover includes a gasket around the perimeter of the opening to form a seal against the entry of liquid and dust.

In one embodiment, the accessory 2010 includes a privacy filter, layer, film or sheet configured to lie on top of the electronic device's screen. The privacy sheet is fully or partially transparent and limits the visibility of screen information to a designated viewing angle. The accessory 2010 includes a plurality of straps or fasteners to couple the privacy sheet to the frame 2016.

In one embodiment, the accessory 2010 includes an anti-glare or anti-reflection layer, film, sheet or light filter configured to lie on top of the electronic device's screen. The light filter is fully or partially transparent and decreases undesirable screen viewing characteristics, such as glares and reflection caused by artificial light, sunlight or daylight. The accessory 2010 includes a plurality of straps or fasteners to couple the light filter to the frame 2016.

In one embodiment, the accessory 2010 includes a weatherizer shell or case which covers most, or all, of the electronic device. The weatherizer case is coupled to the frame 2016 using suitable fasteners. In one embodiment, the weatherizer has a plurality of sealing gaskets. The weatherizer case also has a plurality of downwardly directed fins or vents. The vents facilitate heat escaping from the electronic device, provide fan ports, and provide openings for speaker output. In one embodiment, the weatherizer case has an electrical heater to maintain a designated temperature for the electronic device when operated in cold, outdoor weather.

In one embodiment, the accessory 2010 includes one or more pole holders attached to the frame 2016. The pole holders are configured to receive poles from an awning or umbrella for shading or sheltering of the electronic device.

In one embodiment, the accessory 2010 includes a shock absorber coupled to the front side 2256 of the frame 2016. When attaching the electronic device to the accessory 2010, the shock absorber is sandwiched between the rear housing of the electronic device and the front side 2256 of the frame 2016. The shock absorber absorbs vibration and shock transmitted to the frame 2016, thereby decreasing the vibration and shock transmitted to the electronic device. Depending upon the embodiment, the shock absorber can include a spring, bushing or a fluid or air-based suspension system.

In one embodiment, the accessory 2010 includes a ball joint device coupled to the backside 2042 of the frame 2016. The ball joint device includes a ball joint and a mount interface defining a plurality of VESA Standard hole sets.

In one embodiment, the frame 2016 defines a plurality of cable routing cavities configured to receive cables running to and from the electronic device.

In one embodiment, the accessory 2010 includes a retractable plate moveably coupled to the frame 2016. The plate is configured to serve as a writing surface.

In one embodiment, the accessory 2010 includes a document holder with clip moveably coupled to the frame 2016.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An apparatus operable to facilitate access to information, the apparatus comprising:

- a first member configured to be supported by a structure;
- a display device support coupled to the first member, wherein the display device support is configured to support a display device comprising a screen so that:
  - the screen extends in a plane; and
  - the screen is viewable by a user facing in a first direction;
- a second member coupled to the first member, wherein the second member is configured to hold a data processing module;
- a keyboard support coupled to the first member, wherein:
  - the keyboard support is configured to support a keyboard;
  - the keyboard comprises a plurality of input members;
  - the keyboard support is configured to be rotated between first and second positions about an axis;
  - a portion of the keyboard support extends along the axis;
  - in the first position, the input members face in the first direction; and
  - in the second position, the input members face in a second direction which is different from the first direction;
- at least one wall coupled to the first member, wherein the at least one wall is configured to position the axis vertically downward from the screen when the keyboard support is in the second position while the display device support is supporting the display device;
- a third member coupled to the first member, wherein:
  - the third member is associated with adjustment of the keyboard support in a third direction relative to the plane when the display device support is supporting the display device;
  - the third direction is opposite of the first direction;
  - the third member defines a slot extending in the third direction; and the third member is configured to moveably couple the keyboard support to the first member, so that, when the keyboard support is in the second position, the keyboard support is slidable in the third direction; and a fourth member coupled to the first member, wherein:

the fourth member is associated with vertical adjustment of at least the keyboard support; and the fourth member is configured so that, when the keyboard support is in the second position, at least the portion of the keyboard support is vertically movable relative to the structure.

2. The apparatus of claim 1, wherein:

the first member comprises one of a wall mount or a securing member;

the structure comprises an upstanding structure configured to be supported by a support surface;

the support surface comprises one of a floor or a land;

the support surface extends in a second plane;

the fourth member is configured so that, when the keyboard support is in the second position, the fourth member enables at least the portion of the keyboard support to vertically translate relative to the second plane;

the display device support comprises a first wall;

the keyboard support comprises a front side configured to support the input members;

the at least one wall comprises a second wall; and the second wall comprises at least one inner wall defining a cavity located vertically downward from the screen when the keyboard support is in the second position while the display device support is supporting the display device.

3. The apparatus of claim 2, wherein:

the apparatus comprises a backside;

the first member defines a fastener opening extending through the backside, the fastener opening configured to receive a fastener;

the apparatus comprises a housing configured to house the data processing module;

the second member is a first portion of the housing;

the apparatus comprises a sliding coupling device;

the sliding coupling device comprises at least one arc-shaped slot wall which defines the slot;

the at least one inner wall comprises the arc-shaped slot wall;

the third member comprises a first part of the arc-shaped slot wall, the first part defining a first section of the slot; and the fourth member comprises a second part of the arc-shaped slot wall, the second part defining a second section of the slot.

4. The apparatus of claim 1, wherein:

the keyboard support is configured to block access to a group of the input members when the keyboard support is in the first position when supporting the keyboard;

the group of input members is accessible when the keyboard support is in the second position when supporting the keyboard;

the plane in which the screen extends comprises a first plane;

the keyboard support comprises a surface configured to support the keyboard; and when the keyboard support is in the first position while the display device support is supporting the display device:

(a) the surface of the keyboard support extends in a second plane which is parallel to the first plane; and (b) the surface of the keyboard support is located vertically downward from the screen so as to avoid covering the screen.

5. A transport comprising the apparatus of claim 1, wherein:

the transport comprises a portion;

the portion of the transport comprises the structure of the apparatus;

the transport is configured to roll along a support surface;

the support surface comprises one of a floor or a land;

the transport comprises a plurality of wheels;

the apparatus comprises a battery; and the battery is configured to provide electrical power to at least a data processor that is operatively coupled to the display device.

6. The apparatus of claim 1, wherein:

the data processing module is configured to be operatively coupled to a data network; and the apparatus comprises a plurality of computer-readable instructions configured to be executed by the data processing module to:

receive an input signal corresponding to a battery condition;

generate an output signal in response to the input signal; and transmit the output signal to a device which is operatively coupled to the data network.

7. The apparatus of claim 6, wherein:

the device comprises a first device;

the input signal is generated by a sensor operatively coupled to a second device, wherein the second device is operatively coupled to the data network; and the sensor is configured to sense a variable battery condition of the second device.

8. The apparatus of claim 1, wherein:

the plane comprises a first plane;

the structure is configured to be supported by a support surface;

the support surface is configured to support a weight of the user, the support surface extending in a second plane which intersects with the first plane;

the support surface comprises one of a floor or a land;

the axis comprises a first axis;

the keyboard comprises a plurality of longitudinal edges and a central axis extending between the longitudinal edges;

the central axis is parallel to the longitudinal edges;

the first axis is offset from the central axis;

the vertical adjustment occurs along a second axis which intersects with the second plane;

the fourth member is configured so that, when the keyboard support is in the second position, at least the keyboard support is vertically movable along the second axis relative to the support surface;

the apparatus comprises right and left walls coupled to the first member;

the right wall is configured to extend along a third axis which is parallel to the second axis;

the left wall is configured to extend along a fourth axis which is parallel to the second axis; and the display device support is configured to support the display device so that the screen is at least partially located between the right and left walls when the keyboard support is in the second position while the display device support is supporting the display device.

9. The apparatus of claim 8, wherein the display device support is configured to support the display device so that the screen is fully located between the right and left walls when the keyboard support is in the first position while the display device support is supporting the display device.

10. The apparatus of claim 1, wherein:

the plane comprises a first plane;

the structure is configured to be supported by a support surface;

the support surface is configured to support a weight of the user, the support surface extending in a second plane which intersects with the first plane;

the support surface comprises one of a floor or a land;

the apparatus comprises a flat surface coupled to the first member;

the flat surface is configured to extend in a third plane which is parallel to the second plane when the keyboard support is in the second position while the display device support is supporting the display device;

the flat surface is configured to withstand a writing force acting downward; and the third plane is located between the screen and the input members when the keyboard support is in the second position while the display device support is supporting the display device.

11. The apparatus of claim 1, wherein:

the apparatus comprises a housing defining a space configured to receive the data processing module;

the housing comprises the second member;

the apparatus comprises a door moveably coupled to the housing, the door configured to be moved from a first door position relative to the housing to a second door position relative to the housing, wherein:

in the first door position, the door blocks access to the space;

in the second door position, the door provides access to the space; and the door remains coupled to the housing in both the first and second door positions.

12. The apparatus of claim 1, wherein:

the input members comprise a plurality of keys corresponding to letters A through Z;

when the keyboard support is in the second position, the keyboard support is configured to support an input device other than the input members;

the input device comprises at least one of a mouse, a touch pad, a trackball or a stylus; and the apparatus comprises a lock coupled to the first member.

13. An apparatus operable to facilitate access to information, the apparatus comprising:

a first member configured to be supported by a structure, wherein:

the structure is configured to be supported by a support surface;

the support surface extends in a first plane; and the support surface comprises one of a floor or a land;

a display device support which is supported by the first member, wherein the display device support is configured to support a display device comprising a screen so that:

the screen comprises a height which extends vertically; and the screen extends in a second plane; and a second member which is supported by the first member, wherein the second member is configured to support data processing circuitry;

a keyboard support which is supported by the first member, wherein:

the keyboard support is configured to support a keyboard;

the keyboard comprises a plurality of input members;

the keyboard support is configured to be pivoted between first and second positions about a first axis;

in the first position, the input members face in a first direction;

the first direction extends along a second axis which intersects with the second plane; and in the second position, the input members face in a second direction; and the second direction extends along a third axis which intersects with the first plane;

at least one wall which is supported by the first member, wherein the at least one wall is configured to position the first axis vertically downward from the screen when the keyboard support is in the second position and when the display device support is supporting the display device;

a third member which is supported by the first member, wherein:

the third member is associated with adjustment of the keyboard support relative to the second plane when the display device support is supporting the display device;

the third member defines a slot extending along a fourth axis;

the fourth axis intersects with the second plane; and the third member is configured so that, when the keyboard support is in the second position, the keyboard support is slidable along the fourth axis; and a fourth member which is supported by the first member, wherein:

the fourth member is associated with vertical adjustment of at least the keyboard support; and the fourth member is configured so that, when the keyboard support is in the second position, at least the keyboard support is vertically movable relative to the first plane, wherein the vertical movement of at least the keyboard support causes the first axis to move relative to the first plane when the first member is supported by the structure.

14. The apparatus of claim 13, wherein:

the keyboard support is associated with:

a closed condition in which the keyboard is inaccessible for use when the keyboard is supported by the keyboard support in the first position; and an open condition in which the keyboard is accessible for use when the keyboard is supported by the keyboard support in the second position;

in the closed and open conditions, the keyboard remains below the screen when the keyboard is supported by the keyboard support and when the display device is supported by the display device support;

the sliding of the keyboard support along the fourth axis occurs independent of the pivoting of the keyboard about the second axis; and the vertical adjustment of at least the keyboard support occurs independent of the pivoting of the keyboard about the first axis.

15. The apparatus of claim 14, wherein:

the keyboard support is configured to block access to a group of the input members when the keyboard support is in the first position when supporting the keyboard;

the group of input members is accessible when the keyboard support is in the second position when supporting the keyboard;

the keyboard support comprises a surface configured to support the keyboard; and when the keyboard support is in the first position when the display device support is supporting the display device:

(a) the surface of the keyboard support extends parallel to the first plane; and (b) the surface of the keyboard support is located vertically downward from the screen so as to avoid covering the screen;

the keyboard comprises a plurality of longitudinal edges and a central axis extending between the longitudinal edges;

the central axis is parallel to the longitudinal edges;

the first axis is offset from the central axis;

the vertical adjustment occurs along a fifth axis which intersects with the first plane;

the fourth member is configured so that, when the keyboard support is in the second position, at least the keyboard support is vertically movable along the fifth axis relative to the support surface;

the apparatus comprises right and left walls coupled to the first member;

the right wall is configured to extend along a sixth axis which is parallel to the fifth axis;

the left wall is configured to extend along a seventh axis which is parallel to the fifth axis;

the display device support is configured to support the display device so that the screen is at least partially located between the right and left walls when the keyboard support is in the second position when the display device support is supporting the display device;

the apparatus comprises a flat surface supported by the first member;

the flat surface is configured to extend in a third plane which is parallel to the first plane when the keyboard support is in the second position when the display device support is supporting the display device;

the flat surface is configured to withstand a writing force acting downward; and the third plane is located between the screen and the input members when the keyboard support is in the second position when the display device support is supporting the display device.

16. The apparatus of claim 13, wherein:

the apparatus comprises a battery configured to provide electrical power to the data processing circuitry;

the data processing circuitry is configured to be operatively coupled to a data network; and the apparatus comprises a plurality of computer-readable instructions configured to be executed by the data processing circuitry to:

receive an input signal corresponding to a battery condition; and in response to the input signal:

generate an output signal; and transmit the output signal to a device which is operatively coupled to the data network.

17. A transport comprising the apparatus of claim 13, wherein:

the transport comprises a portion;

the portion of the transport comprises the structure of the apparatus;

the transport is configured to roll along a support surface;

the support surface comprises one of a floor or a land;

the transport comprises a plurality of wheels;

the apparatus comprises a battery; and the battery is configured to provide electrical power to at least the data processor processing circuitry.

18. The transport of claim 17, wherein:

the transport comprises a vehicle;

the data processing circuitry is configured to be operatively coupled to a data network; and the apparatus comprises a plurality of computer-readable instructions configured to be executed by the data processing circuitry to perform a plurality of steps comprising:

receiving a first signal corresponding to a battery condition;

generating a second signal in response to the first signal; and transmitting the second signal to a device which is operatively coupled to the data network, wherein the steps occur without requiring any signals from the input members operated by a user.

19. An apparatus operable to facilitate access to information, the apparatus comprising:

a first member structured to be supported by a structure;

a display device support which is supported by the first member, wherein the display device support is structured to support a display device comprising a screen so that:

the screen comprises a height which extends vertically upward;

the screen extends in a plane; and the screen is viewable along a first axis in a first direction, wherein the first axis intersects with the plane;

a second member which is supported by the first member, wherein the second member is structured to support a data processor;

a keyboard support which is supported by the first member, wherein:

the keyboard support is structured to support a plurality of input members;

the keyboard support is associated with a first adjustment of the keyboard support;

the keyboard support is structured to be pivoted in the first adjustment between first and second positions about a second axis;

in the first position, the input members face in the first direction; and in the second position, the input members face vertically upward in a second direction;

at least one wall which is supported by the first member, wherein the at least one wall is structured to position the second axis below the screen when the keyboard support is in the second position and when the display device support is supporting the display device;

a third member which is supported by the first member, wherein:

the third member is associated with a second adjustment of the keyboard support along a third axis when the display device support is supporting the display device;

the third axis intersects with the plane;

the third member defines a slot extending along the third axis;

the third member is structured so that, when the keyboard support is in the second position, the keyboard support is slidable in the second adjustment along the third axis; and a fourth member which is supported by the first member, wherein:

the fourth member is associated with a third adjustment of at least the keyboard support;

the fourth member is structured so that, when the keyboard support is in the second position, at least the keyboard support is vertically movable relative to the structure in the third adjustment;

wherein the apparatus is structured to enable the second adjustment independent of the first adjustment; and wherein the apparatus is structured to enable the third adjustment independent of the first adjustment.

20. The apparatus of claim 19, wherein:

a portion of the keyboard support extends along the second axis;

the fourth member is structured so that, when the keyboard support is in the second position, the fourth member enables at least the portion of the keyboard support to vertically translate relative to the structure in the third adjustment;

the keyboard support is associated with:

a closed condition in which a group of the input members is inaccessible for use when the keyboard support is in the first position; and an open condition in which the group of input members is accessible for use when the keyboard support is in the second position;

in the closed and open conditions, the group of input members remain below the screen when the input members are supported by the keyboard support and when the display device is supported by the display device support;

the plane in which the screen extends comprises a first plane;

the keyboard support comprises a surface configured to support the input members; and when the keyboard support is in the first position when the display device support is supporting the display device:

(a) the surface of the keyboard support extends in a second plane which is parallel to the first plane; and (b) the surface of the keyboard support is located below the screen so as to avoid covering the screen;

the structure is configured to be supported by a support surface;

the support surface is configured to support a weight of a user, the support surface extending in a second plane which intersects with the first plane;

the keyboard comprises a plurality of longitudinal edges and a central axis extending between the longitudinal edges;

the central axis is parallel to the longitudinal edges;

the second axis is offset from the central axis;

the third adjustment occurs along a fourth axis which intersects with the second plane;

the fourth member is configured so that, when the keyboard support is in the second position, at least the keyboard support is vertically movable along the fourth axis relative to the support surface;

the apparatus comprises right and left walls coupled to the first member;

the right wall is configured to extend along a fifth axis which is parallel to the fourth axis;

the left wall is configured to extend along a sixth axis which is parallel to the fourth axis;

the display device support is configured to support the display device so that the screen is at least partially located between the right and left walls when the keyboard support is in the second position when the display device support is supporting the display device;

the apparatus comprises a flat surface supported by the first member;

the flat surface is configured to extend in a third plane which is parallel to the second plane when the keyboard support is in the second position when the display device support is supporting the display device; and the flat surface is configured to withstand a writing force acting downward.

21. The apparatus of claim 19, wherein:

the apparatus comprises a battery configured to provide electrical power to the data processor;

the data processor is configured to be operatively coupled to a data network; and the apparatus comprises a plurality of computer-readable instructions configured to be executed by the data processor to perform a plurality of steps comprising:

receiving a first signal corresponding to a battery condition;

generating a second signal in response to the first signal; and transmitting the second signal to a device which is operatively coupled to the data network, wherein the steps occur without requiring any signals from the input members or any other user input elements operatively coupled to the data processor.

22. The apparatus of claim 20, wherein:

the apparatus comprises a battery configured to provide electrical power to the data processor;

the data processor is configured to be operatively coupled to a data network; and the apparatus comprises a plurality of computer-readable instructions configured to be executed by the data processor to perform a plurality of steps comprising:

receiving a first signal corresponding to a battery condition; and in response to the first signal:

generating a second signal; and transmitting the second signal to a device which is operatively coupled to the data network.

* * * * *